US005873062A

United States Patent [19]

Hansen et al.

[11] Patent Number: 5,873,062

[45] **Date of Patent: *Feb. 16, 1999**

[54] USER INDEPENDENT, REAL-TIME SPEECH RECOGNITION SYSTEM AND METHOD

[75] Inventors: C. Hal Hansen, Provo; Dale Lynn Shepherd, Lindon; Robert Brian Moncur, Orem, all of Utah

[73] Assignee: Fonix Corporation, Salt Lake City, Utah

[ * ] Notice: The term of this patent shall not extend beyond the expiration date of Pat. No. 5,640,490.

[21] Appl. No.: 781,625

[22] Filed: Jan. 9, 1997

Related U.S. Application Data

[63] Continuation of Ser. No. 339,902, Nov. 14, 1994, Pat. No. 5,640,490.

[51] Int. Cl.[6] .......... G10L 5/06

[52] U.S. Cl. .......... 704/254; 704/270; 704/251; 704/255; 704/500

[58] Field of Search .......... 395/2.63, 2.91, 395/2.92, 2.93, 2.94, 2.09; 704/254, 270, 500, 501, 502, 503, 504, 200, 251, 255

[56] References Cited

U.S. PATENT DOCUMENTS 5,640,490 6/1997 Hansen et al. .......... 395/2.63

*Primary Examiner*—David R. Hudspeth
*Assistant Examiner*—Vijay B. Chawan
*Attorney, Agent, or Firm*—Finnegan, Henderson, Farabow, Garrett & Dunner, L.L.P.

[57] ABSTRACT

A system and method for identifying the phoneme sound types that are contained within an audio speech signal is disclosed. The system includes a microphone and associated conditioning circuitry, for receiving an audio speech signal and converting it to a representative electrical signal. The electrical signal is then sampled and converted to a digital audio signal with a digital-to-analog converter. The digital audio signal is input to a programmable digital sound processor, which digitally processes the sound so as to extract various time domain and frequency domain sound characteristics. These characteristics are input to a programmable host sound processor which compares the sound characteristics to standard sound data. Based on this comparison, the host sound processor identifies the specific phoneme sounds that are contained within the audio speech signal. The programmable host sound processor further includes linguistic processing program methods to convert the phoneme sounds into English words or other natural language words. These words are input to a host processor, which then utilizes the words as either data or commands.

11 Claims, 48 Drawing Sheets

USER INDEPENDENT, REAL-TIME SPEECH RECOGNITION SYSTEM AND METHOD

This application is a continuation of application Ser. No. 08/339,902, filed Nov. 14, 1994, now U.S. Pat. No. 5,640, 490.

A portion of the disclosure of this patent document contains material to which a claim of copyright protection is made. The copyright owner has no objection to the reproduction by anyone of the patent document or the patent disclosure as it appears in the Patent and Trademark Office patent file or records, but reserves all other rights with respect to the copyrighted work.

BACKGROUND OF THE INVENTION

1. Technical Field

The present invention relates generally to speech recognition. More particularly, the present invention is directed to a system and method for accurately recognizing continuous human speech from any speaker.

2. Background Information

Linguists, scientists and engineers have endeavored for many years to construct machines that can recognize human speech. Although in recent years this goal has begun to be realized in certain respects, currently available systems have not been able to produce results that even closely emulate human performance. This inability to provide satisfactory speech recognition is due primarily to the difficulties that are involved in extracting and identifying the individual sounds that make up human speech. These difficulties are exacerbated by the fact there are such wide acoustic variations that occur between different speakers.

Simplistically, speech may be considered as a sequence of sounds taken from a set of forty or so basic sounds called "phonemes." Different sounds, or phonemes, are produced by varying the shape of the vocal tract through muscular control of the speech articulators (lips, tongue, jaw, etc.). A stream of a particular set of phonemes will collectively represent a word or a phrase. Thus, extraction of the particular phonemes contained within a speech signal is necessary to achieve voice recognition.

However, a number of factors are present that make phoneme extraction extremely difficult. For instance, wide acoustic variations occur when the same phoneme is spoken by different speakers. This is due to the differences in the vocal apparatus, such as the vocal-tract length. Moreover, the same speaker may produce acoustically different versions of the same phoneme from one rendition to the next. Also, there are often no identifiable boundaries between sounds or even words. Other difficulties result from the fact that phonemes are spoken with wide variations in dialect, intonation, rhythm, stress, volume, and pitch. Finally, the speech signal may contain wide variations in speech-related noises that make it difficult to accurately identify and extract the phonemes.

The speech recognition devices that are currently available attempt to minimize the above problems and variations by providing only a limited number of functions and capabilities. For instance, many existing systems are classified as "speaker-dependent" systems. A speaker-dependent system must be "trained" to a single speaker's voice by obtaining and storing a database of patterns for each vocabulary word uttered by that particular speaker. The primary disadvantage of these types of systems is that they are "single speaker" systems, and can only be utilized by the speaker who has completed the time consuming training process. Further, the vocabulary size of such systems is limited to the specific vocabulary contained in the database. Finally, these systems typically cannot recognize naturally spoken continuous speech, and require the user to pronounce words separated by distinct periods of silence.

Currently available "speaker-independent" systems are also severely limited in function. Although any speaker can use the system without the need for training, these systems can only recognize words from an extremely small vocabulary. Further, they too require that the words be spoken in isolation with distinct pauses between words, and thus cannot recognize naturally spoken continuous speech.

OBJECTS AND BRIEF SUMMARY OF THE INVENTION

The present invention has been developed in response to the present state of the art, and in particular, in response to these and other problems and needs that have not been fully or completely solved by currently available solutions for speech recognition. It is therefore a primary object of the present invention to provide a novel system and method for achieving speech recognition.

Another object of the present invention is to provide a speech recognition system and method that is user independent, and that can thus be used to recognize speech utterances from any speaker of a given language.

A related object of the present invention is to provide a speech recognition system and method that does not require a user to first "train" the system with the user's individual speech patterns.

Yet another object of the present invention is to provide a speech recognition system and method that is capable of receiving and processing an incoming speech signal in substantially real time, thereby allowing the user to speak at normal conversational speeds.

A related object of the present invention is to provide a speech recognition system and method that is capable of accurately extracting various sound characteristics from a speech signal, and then converting those sound characteristics into representative phonemes.

Still another object of the present invention is to provide a speech recognition system and method that is capable of converting a stream of phonemes into an intelligible format.

Another object of the present invention is to provide a speech recognition system and method that is capable of performing speech recognition on a substantially unlimited vocabulary.

These and other objects and features of the present invention will become more fully apparent from the following description and appended claims, or may be learned by the practice of the invention as set forth hereinafter.

Briefly summarized, the foregoing and other objects are achieved with a novel speech recognition system and method, which can accurately recognize, continuous speech utterances from any speaker of a given language. In the preferred embodiment, an audio speech signal is received from a speaker and input to an audio processor means. The audio processor means receives the speech signal, converts it into a corresponding electrical format, and then electrically conditions the signal so that it is in a form that is suitable for subsequent digital sampling.

Once the audio speech signal has been converted to a representative audio electrical signal, it is sent to an analog-to-digital converter means. The A/D converter means samples the audio electrical signal at a suitable sampling rate, and outputs a digitized audio signal.

The digitized audio signal is then programmably processed by a sound recognition means, which processes the digitized audio signal in a manner so as to extract various time domain and frequency domain sound characteristics, and then identify the particular phoneme sound type that is contained within the audio speech signal. This characteristic extraction and phoneme identification is done in a manner such that the speech recognition occurs regardless of the source of the audio speech signal. Importantly, there is no need for a user to first "train" the system with his or her individual voice characteristics. Further, the process occurs in substantially real time so that the speaker is not required to pause between each word, and can thus speak at normal conversational speeds.

In addition to extracting phoneme sound types from the incoming audio speech signal, the sound recognition means implements various linguistic processing techniques to translate the phoneme string into a corresponding word or phrase. This can be done for essentially any language that is made up of phoneme sound types.

In the preferred embodiment, the sound recognition means is comprised of a digital sound processor means and a host sound processor means. The digital sound processor includes a programmable device and associated logic to programmably carry out the program steps used to digitally process the audio speech signal, and thereby extract the various time domain and frequency domain sound characteristics of that signal. This sound characteristic data is then stored in a data structure, which corresponds to the specific portion of the audio signal.

The host sound processor means also includes a programmable device and its associated logic. It is programmed to carry out the steps necessary to evaluate the various sound characteristics contained within the data structure, and then generate the phoneme sound type that corresponds to those particular characteristics. In addition to identifying phonemes, in the preferred embodiment the host sound processor also performs the program steps needed to implement the linguistic processing portion of the overall method. In this way, the incoming stream of phonemes are translated to the representative word or phrase.

The preferred embodiment further includes an electronic means, connected to the sound recognition means, for receiving the word or phrase translated from the incoming stream of identified phonemes. The electronic means, as for instance a personal computer, then programmably processes the word as either data input, as for instance text to a wordprocessing application, or as a command input, as for instance an operating system command.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not to be considered to be limiting of its scope, the invention in its presently understood best mode will be described and explained with additional specificity and detail through the use of the accompanying drawings in which:

FIGS. 3A–3H, 3J–3N, and 3P–3Y is a schematic illustrating in detail the circuitry that makes up the functional blocks in FIG. 2;

DETAILED DESCRIPTION OF THE PREFERRED EMBODIMENTS

The following detailed description is divided into two parts. In the first part the overall system is described, including a detailed description of the functional blocks which make up the system, and the manner in which the various functional blocks are interconnected. In part two, the method by which the overall system is programmably controlled to achieve real-time, user-independent speech recognition is described.

I. The System

Figure 1:
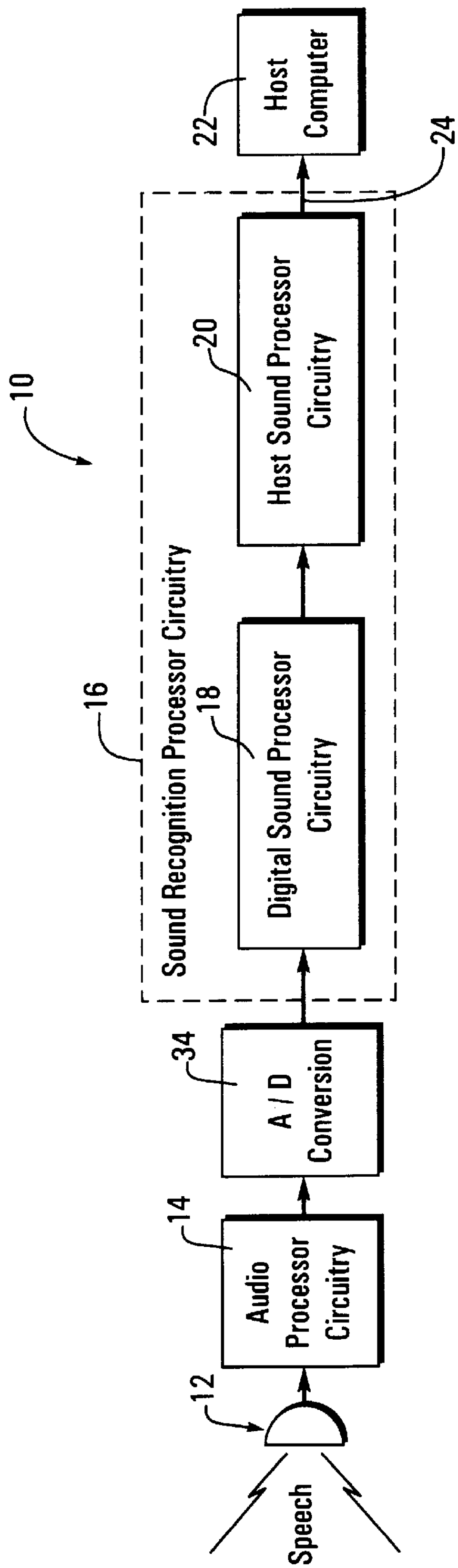
FIG. 1 is functional block diagram of the overall speech recognition system.

Reference is first made to FIG. 1, where one presently preferred embodiment of the overall speech recognition system is designated generally at 10. The system 10 includes an audio processor means for receiving an audio speech signal and for converting that signal into a representative audio electrical signal. In the preferred embodiment, the audio processor means is comprised of a means for inputting an audio signal and converting it to an electrical signal, such as a standard condenser microphone shown generally at 12. Various other input devices could also be utilized to input an audio signal, including, but not limited to such devices as a dictaphone, telephone or a wireless microphone.

In addition to microphone 12, the audio processor means also preferably comprises additional appropriate audio processor circuitry 14. This circuitry 14 receives the audio electrical signal generated by the microphone 12, and then functions so as to condition the signal so that it is in a suitable electrical condition for digital sampling.

The audio processor circuitry 14 is then electrically connected to analog-to-digital converter means, illustrated in the preferred embodiment as A/D conversion circuitry 34. This circuitry 34 receives the audio electrical signal, which is in an analog format, and converts it to a digital format, outputting a digitized audio signal.

This digitized audio signal is then passed to a sound recognition means, which in the preferred embodiment corresponds to the block designated at 16 and referred to as the sound recognition processor circuitry. Generally, the sound recognition processor circuitry 16 programmably analyzes the digitized version of the audio signal in a manner so that it can extract various acoustical characteristics from the signal. Once the necessary characteristics are obtained, the circuitry 16 can identify the specific phoneme sound types contained within the audio speech signal. Importantly, this phoneme identification is done without reference to the speech characteristics of the individual speaker, and is done in a manner such that the phoneme identification occurs in real time, thereby allowing the speaker to speak at a normal rate of conversation.

The sound recognition processor circuitry 16 obtains the necessary acoustical characteristics in two ways. First, it evaluates the time domain representation of the audio signal, and from that representation extracts various parameters representative of the type of phoneme sound contained within the signal. The sound type would include, for example, whether the sound is "voiced," "unvoiced," or "quiet."

Secondly, the sound recognition processor circuitry 16 evaluates the frequency domain representation of the audio signal. Importantly, this is done by successively filtering the time domain representation of the audio signal using a predetermined number of filters having a various cutoff frequencies. This produces a number of separate filtered signals, each of which are representative of an individual signal waveform which is a component of the complex audio signal waveform. The sound recognition processor circuitry 16 then "measures" each of the filtered signals, and thereby extracts various frequency domain data, including the frequency and amplitude of each of each signals. These frequency domain characteristics, together with the time domain characteristics, provide sufficient "information" about the audio signal such that the processor circuitry 16 can identify the phoneme sounds that are contained therein.

Once the sound recognition processor circuitry 16 has extracted the corresponding phoneme sounds, it programmably invokes a series of linguistic program tools. In this way, the processor circuitry 16 translates the series of identified phonemes into the corresponding syllable, word or phrase.

With continued reference to FIG. 1, electrically connected to the sound recognition processor circuitry 16 is a host computer 22. In one preferred embodiment, the host computer 22 is a standard desktop personal computer, however it could be comprised of virtually any device utilizing a programmable computer that requires data input and/or control. For instance, the host computer 22 could be a data entry system for automated baggage handling, parcel sorting, quality control, computer aided design and manufacture, and various command and control systems.

As the processor circuitry 16 translates the phoneme string, the corresponding word or phrase is passed to the host computer 22. The host computer 22, under appropriate program control, then utilizes the word or phrase as an operating system or application command or, alternatively, as data that is input directly into an application, such as a wordprocessor or database.

Figure 2:
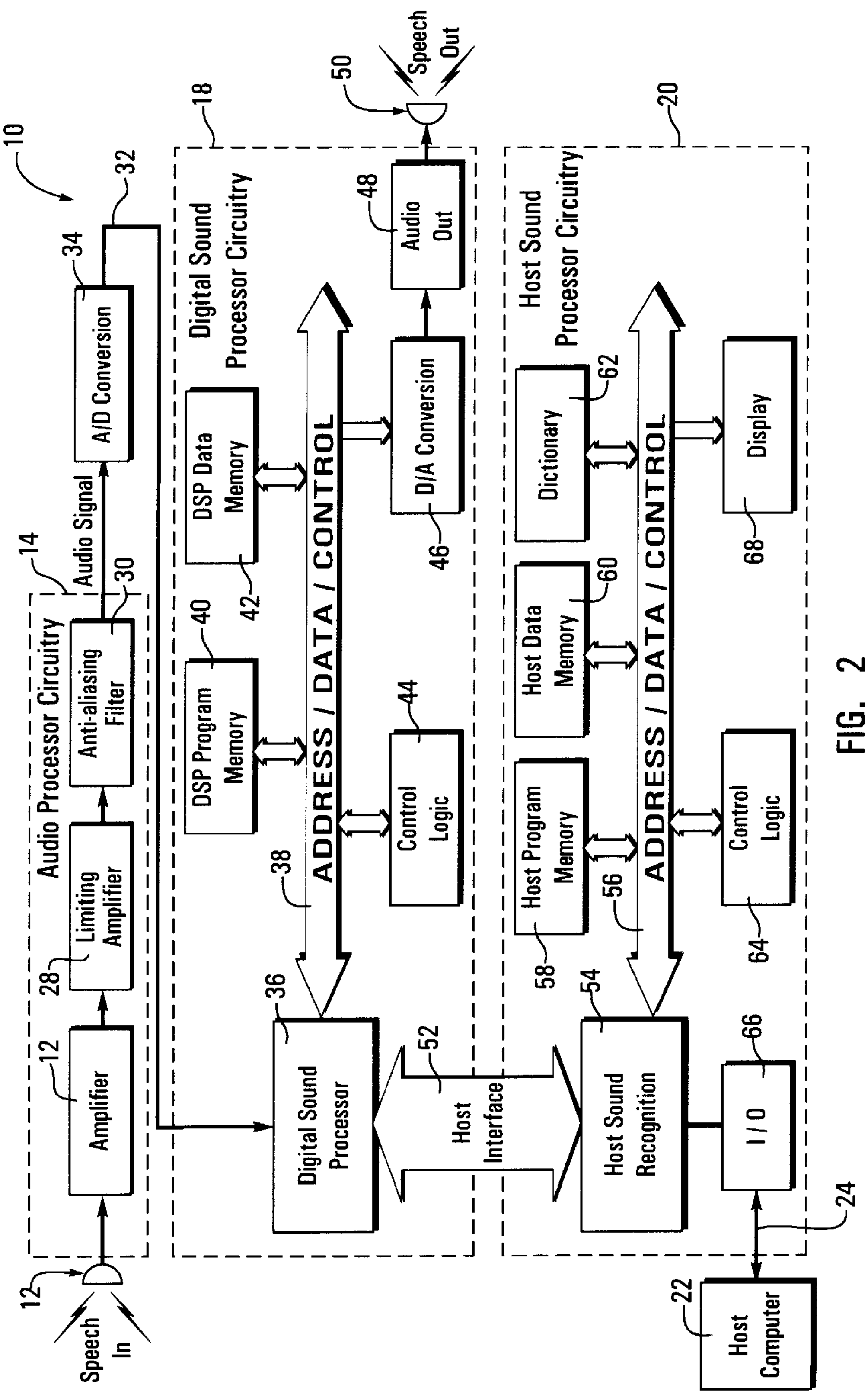
FIG. 2 is a more detailed functional block diagram illustrating the speech recognition system.

Reference is next made to FIG. 2 where one presently preferred embodiment of the voice recognition system 10 is shown in further detail. As is shown, an audio speech signal is received at microphone 12, or similar device. The representative audio electrical signal is then passed to the audio processor circuitry 16 portion of the system. In the preferred embodiment of this circuit, the audio electrical signal is input to a signal amplification means for amplifying the signal to a suitable level, such as amplifier circuit 26. Although a number of different circuits could be used to implement this function, in the preferred embodiment, amplifier circuit 26 consists of a two stage operational amplifier configuration, arranged so as to provide an overall gain of approximately 300. With such a configuration, with a microphone 12 input of approximately 60 dbm, the amplifier circuit 26 will produce an output signal at approximately line level.

In the preferred embodiment, the amplified audio electrical signal is then passed to a means for limiting the output level of the audio signal so as to prevent an overload condition to other components contained within the system 10. The limiting means is comprised of a limiting amplifier circuit 28, which can be designed using a variety of techniques, one example of which is shown in the detailed schematic of FIG. 3.

Next, the amplified audio electrical signal is passed to a filter means for filtering high frequencies from the electrical audio signal, as for example anti-aliasing filter circuit 30. This circuit, which again can be designed using any one of a number of circuit designs, merely limits the highest frequency that can be passed on to other circuitry within the system 10. In the preferred embodiment, the filter circuit 30 limits the signal's frequency to less than about 12 kHz.

The audio electrical signal, which is in an analog format, is then passed to a analog-to-digital converter means for digitizing the signal, which is shown as A/D conversion circuit 34. In the preferred embodiment, A/D conversion circuit 34 utilizes a 16-bit analog to digital converter device, which is based on Sigma-Delta sampling technology. Further, the device must be capable of sampling the incoming analog signal at a rate sufficient to avoid aliasing errors. At a minimum, the sampling rate should be at least twice the incoming sound wave's highest frequency (the Nyquest rate), and in the preferred embodiment the sampling rate is 44.1 kHz. It will be appreciated that any one of a number of A/D conversion devices that are commercially available could be used. A presently preferred component, along with the various support circuitry, is shown in the detailed schematic of FIG. 3.

With continued reference to FIG. 2, having converted the audio electrical signal to a digital form, the digitized signal is next supplied to the sound recognition processor circuitry 16. In the presently preferred embodiment, the sound recognition processor circuitry 16 is comprised of a digital sound processor means and a host sound processor means, both of which are preferably comprised of programmable devices. It will be appreciated however that under certain conditions, the sound recognition processor circuitry 16 could be comprised of suitable equivalent circuitry which utilizes a single programmable device.

In the presently preferred embodiment, the digital sound processor means is comprised of the various circuit components within the dotted box 18 and referred to as the digital sound processor circuitry. This circuitry receives the digitized audio signal, and then programmably manipulates that data in a manner so as to extract various sound characteristics. Specifically, the circuitry 18 first analyzes the digitized audio signal in the time domain and, based on that analysis, extracts at least one time domain sound characteristic of the audio signal. The time domain characteristics of interest help determine whether the audio signal contains a phoneme sound that is "voiced," "unvoiced," or "quiet."

The digital sound processor circuitry 18 also manipulates the digitized audio signal so as to obtain various frequency domain information about the audio signal. This is done by filtering the audio signal through a number of filter bands and generating a corresponding number of filtered signals, each of which are still in time domain. The circuitry 18 measures various properties exhibited by these individual waveforms, and from those measurements, extracts at least one frequency domain sound characteristic of the audio signal. The frequency domain characteristics of interest include the frequency, amplitude and slope of each of the component signals obtained as a result of the filtering process. These characteristics are then stored and used to determine the phoneme sound type that is contained in the audio signal.

With continued reference to FIG. 2, the digital sound processor circuitry 18 is shown as preferably comprising a first programmable means for analyzing the digitized audio signal under program control, such as digital sound processor 36. Digital sound processor 36 is preferably a programmable, 24-bit general purpose digital signal processor device, such as the Motorola DSP56001. However, any one of a number of commercially available digital signal processors could also be used.

As is shown, digital sound processor 36 is preferably interfaced—via a standard address, data and control bus-type arrangement 38—to various other components. They include: a program memory means for storing the set of program steps executed by the DSP 36, such as DSP program memory 40; data memory means for storing data utilized by the DSP 36, such as DSP data memory 42; and suitable control logic 44 for implementing the various standard timing and control functions such as address and data gating and mapping. It will be appreciated by one of skill in the art that various other components and functions could be used in conjunction with the digital sound processor 36.

With continued reference to FIG. 2, in the presently preferred embodiment, the host sound processor means is comprised of the various circuit components within the dotted box 20 and referred to as the host sound processor circuitry. This host sound processor circuitry 20 is electrically connected and interfaced, via an appropriate host interface 52, to the digital sound processor circuitry 18. Generally, this circuitry 20 receives the various audio signal characteristic information generated by the digital sound processor circuitry 18 via the host interface 52. The host sound processor circuitry 20 analyzes this information and then identifies the phoneme sound type(s) that are contained within the audio signal by comparing the signal characteristics to standard sound data that has been compiled by testing a representative cross-section of speakers. Having identified the phoneme sounds, the host sound processor circuitry 20 utilizes various linguistic processing techniques to translate the phonemes into a representative syllable, word or phrase.

The host sound processor circuitry 20 is shown as preferably comprising a second programmable means for analyzing the digitized audio signal characteristics under program control, such as host sound processor 54. Host sound processor 36 is preferably a programmable, 32-bit general purpose CPU device, such as the Motorola 68EC030. However, any one of a number of commercially available programmable processors could also be used.

As is shown, host sound processor 54 is preferably interfaced—via a standard address, data and control bus-type arrangement 56—to various other components. They include: a program memory means for storing the set of program steps executed by the host sound processor 54, such as host program memory 58; data memory means for storing data utilized by the host sound processor 54, such as host data memory 60; and suitable control logic 64 for implementing the various standard timing and control functions such as address and data gating and mapping. Again, it will be appreciated by one of skill in the art that various other components and functions could be used in conjunction with the host sound processor 54.

Also included in the preferred embodiment is a means for interfacing the host sound processor circuitry 20 to an external electronic device. In the preferred embodiment, the interface means is comprised of standard RS-232 interface circuitry 66 and associated RS-232 cable 24. However, other electronic interface arrangements could also be used, such as a standard parallel port interface, a musical instrument digital interface (MIDI), or a non-standard electrical interface arrangement.

In the preferred embodiment, the host sound processor circuitry 20 is interfaced to a electronic means for receiving the word generated by the host sound processor circuitry, 20 and for processing that word as either a data input or as a command input. By way of example and not limitation, the electronic receiving means is comprised of a host computer 22, such as a standard desktop personal computer. The host computer 22 is connected to the host sound processor circuitry 20 via the RS-232 interface 66 and cable 24 and, via an appropriate program method, utilizes incoming words as either data, such as text to a wordprocessor application, or as a command, such as to an operating system or application program. It will be appreciated that the host computer 22 can be virtually any electronic device requiring data on command input.

Figure 3A:
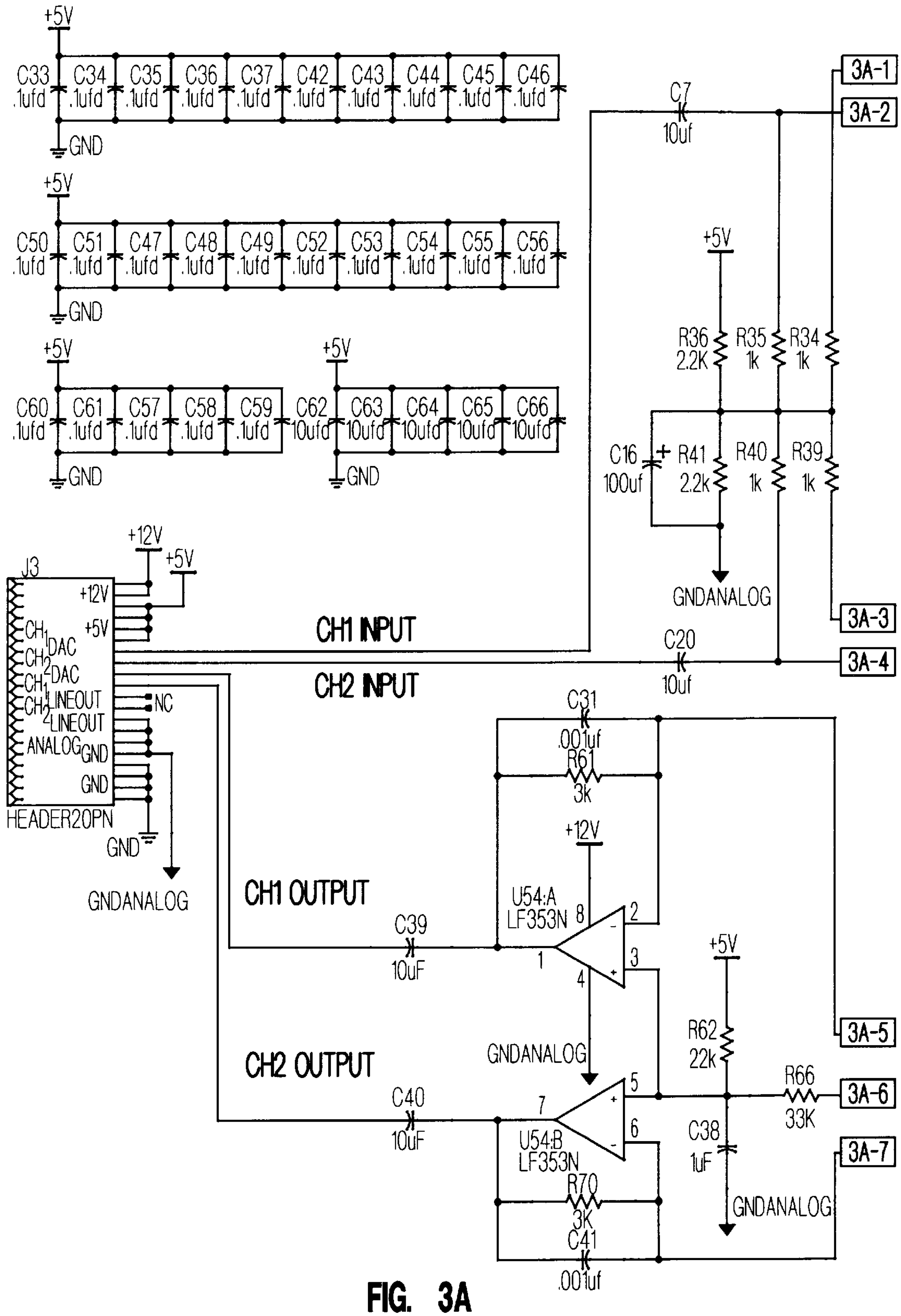
Figure 3B:
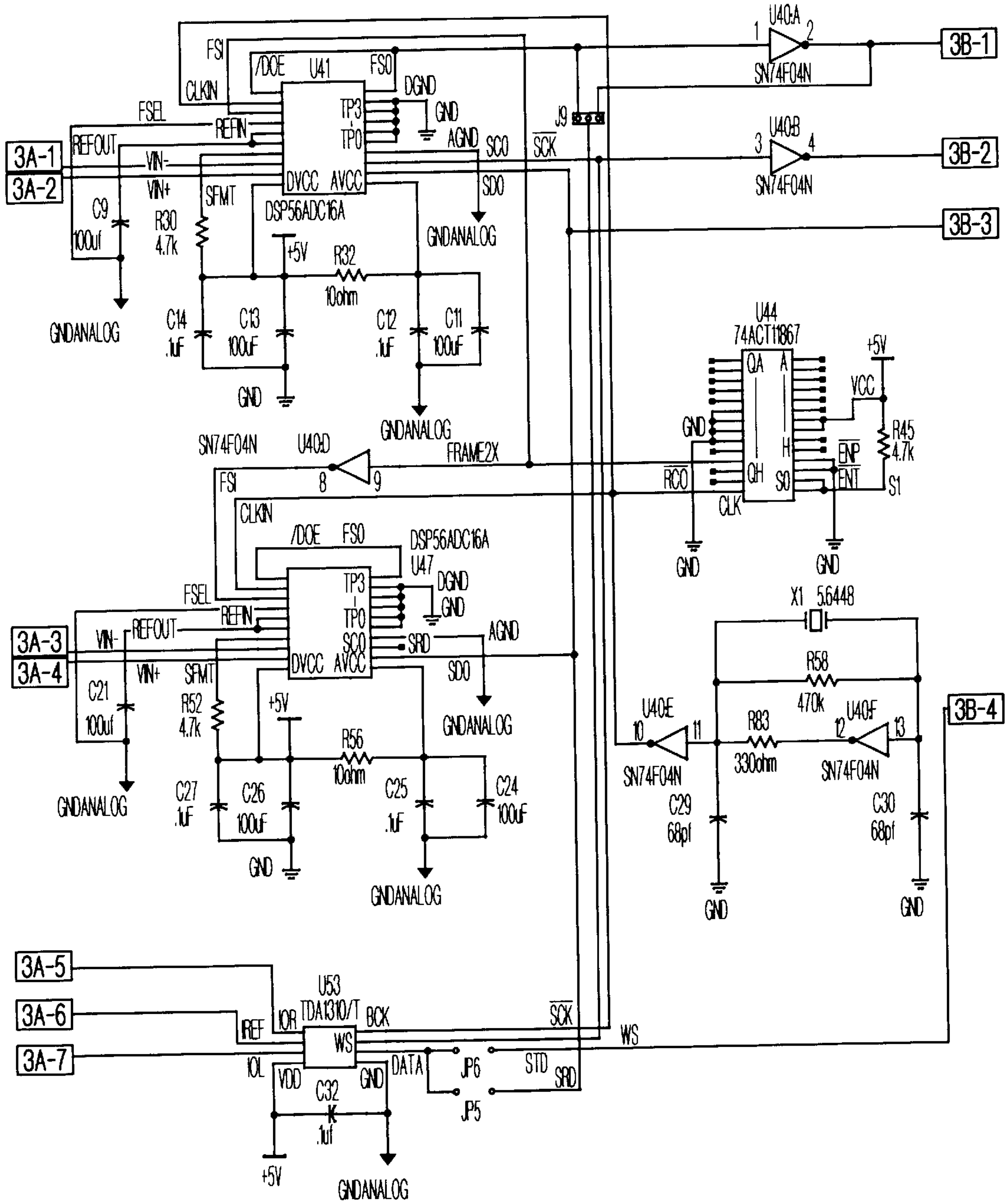
Figure 3C:
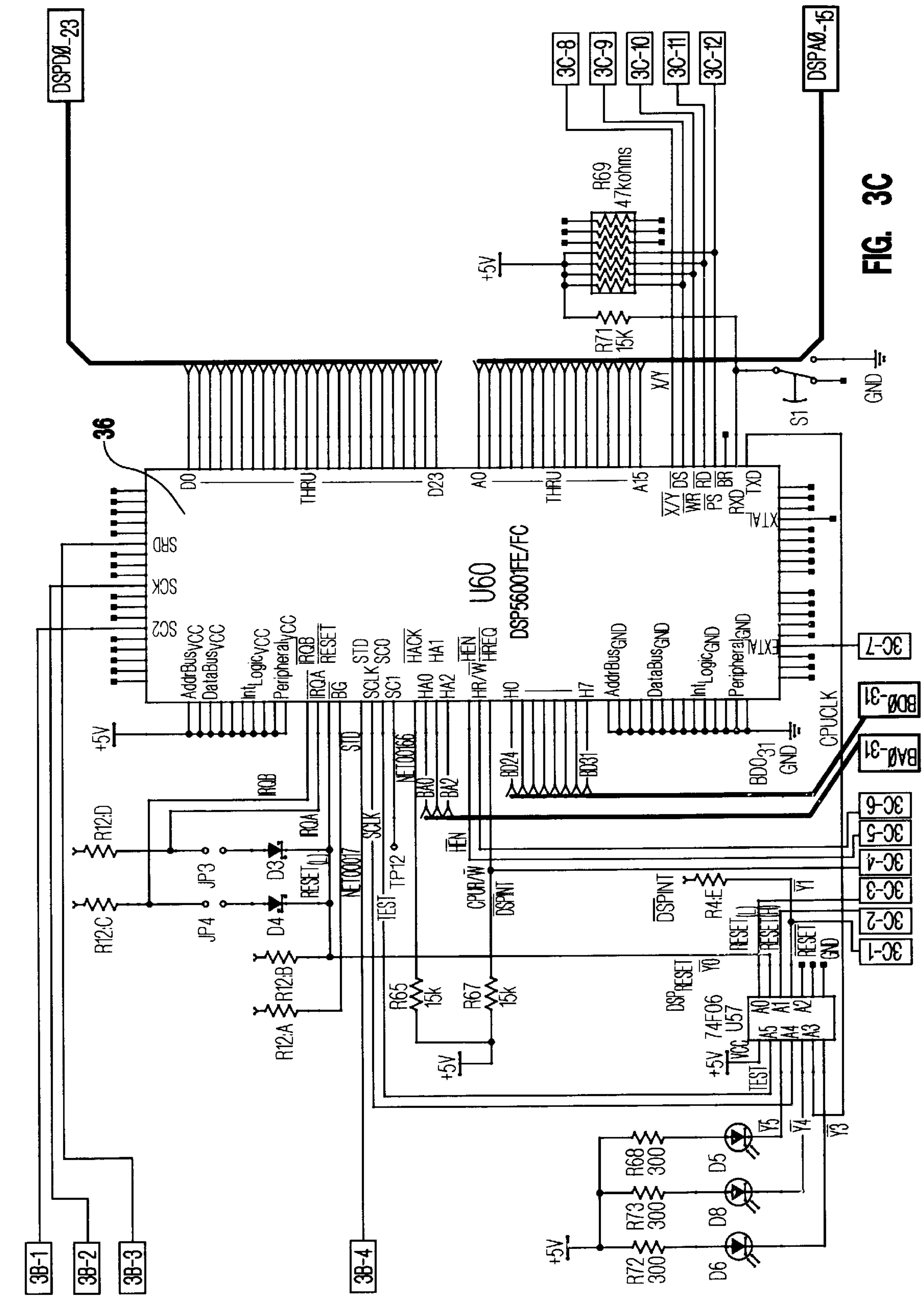
Figure 3D:
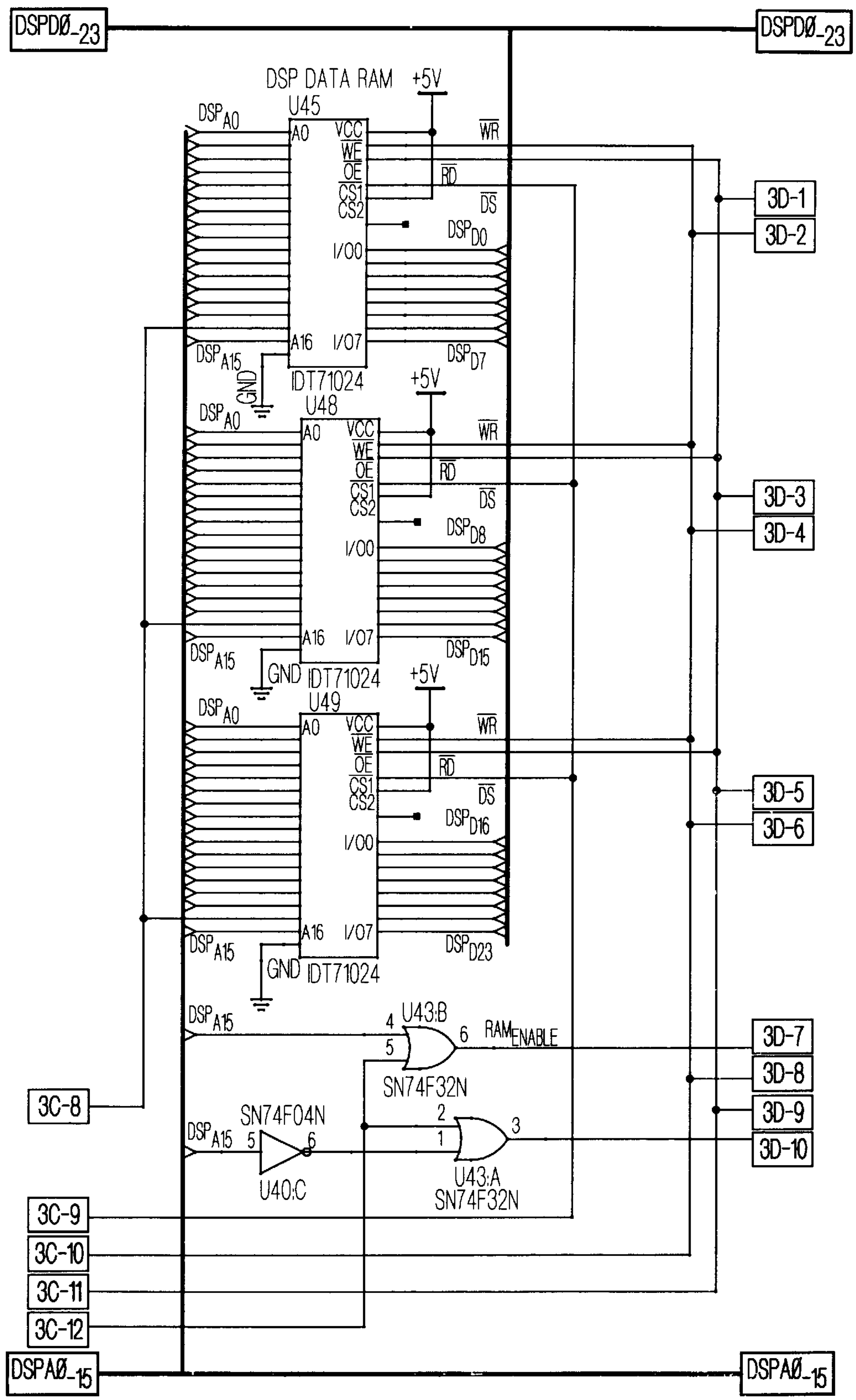
Figure 3E:
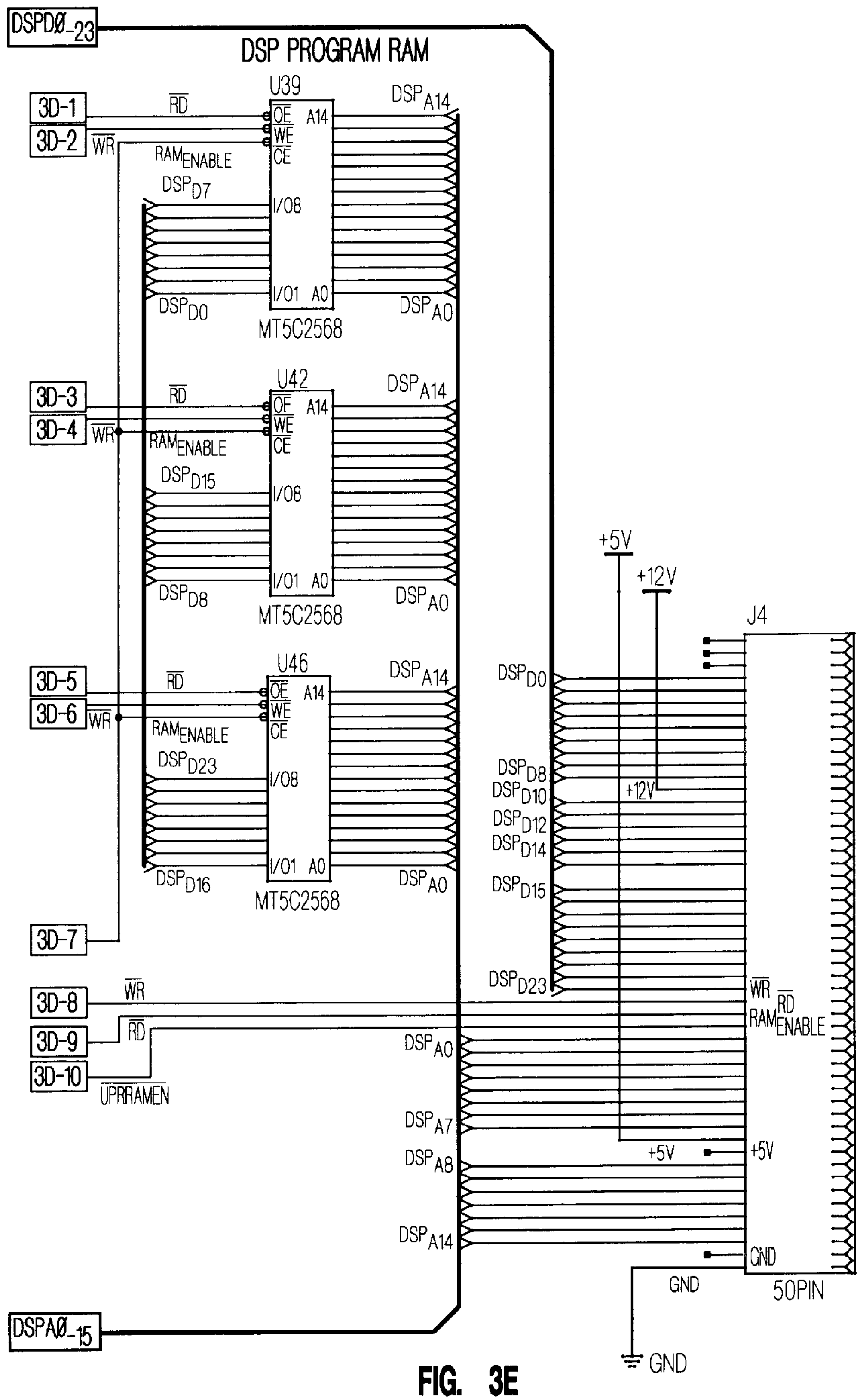
Figure 3F:
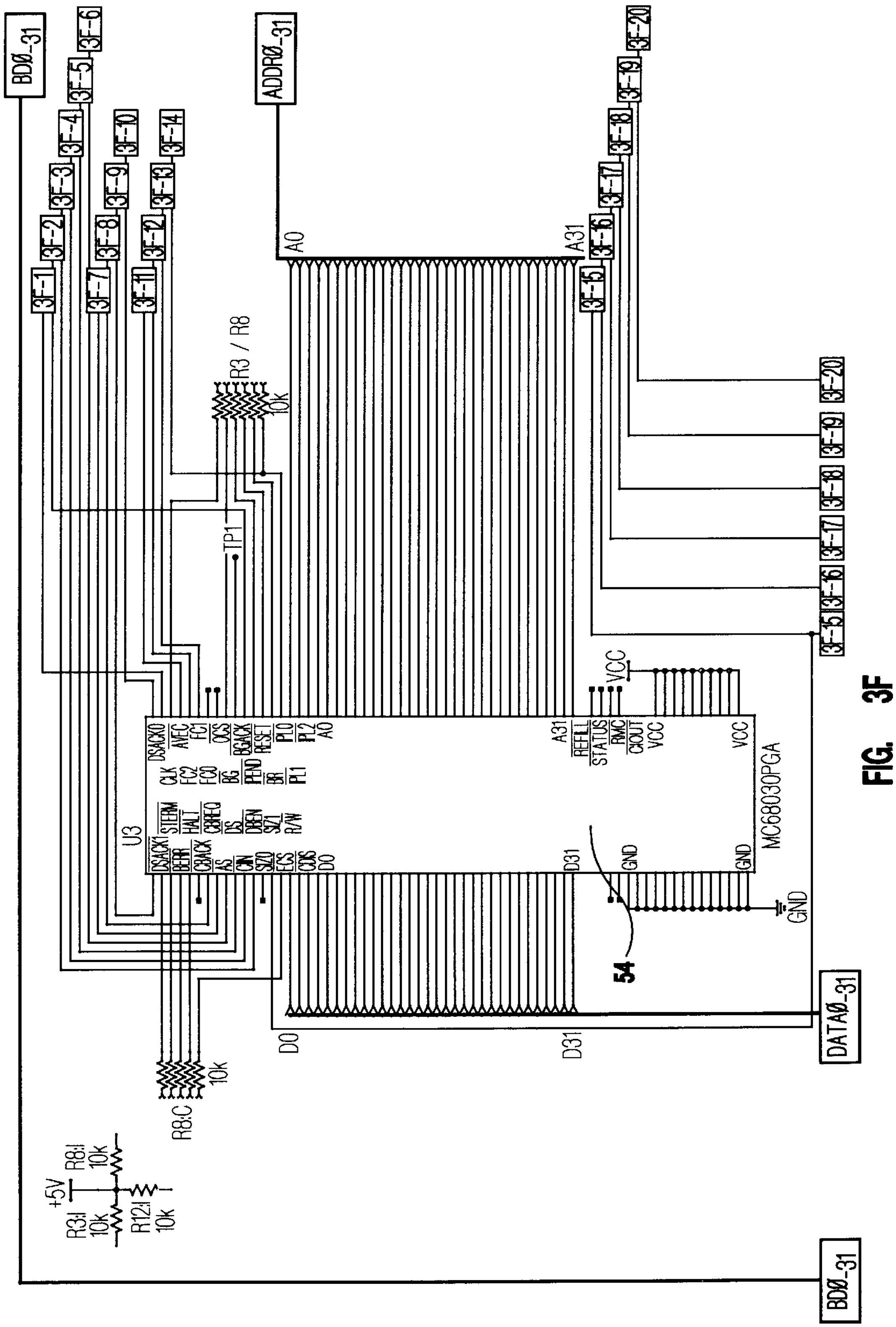
Figure 3G:
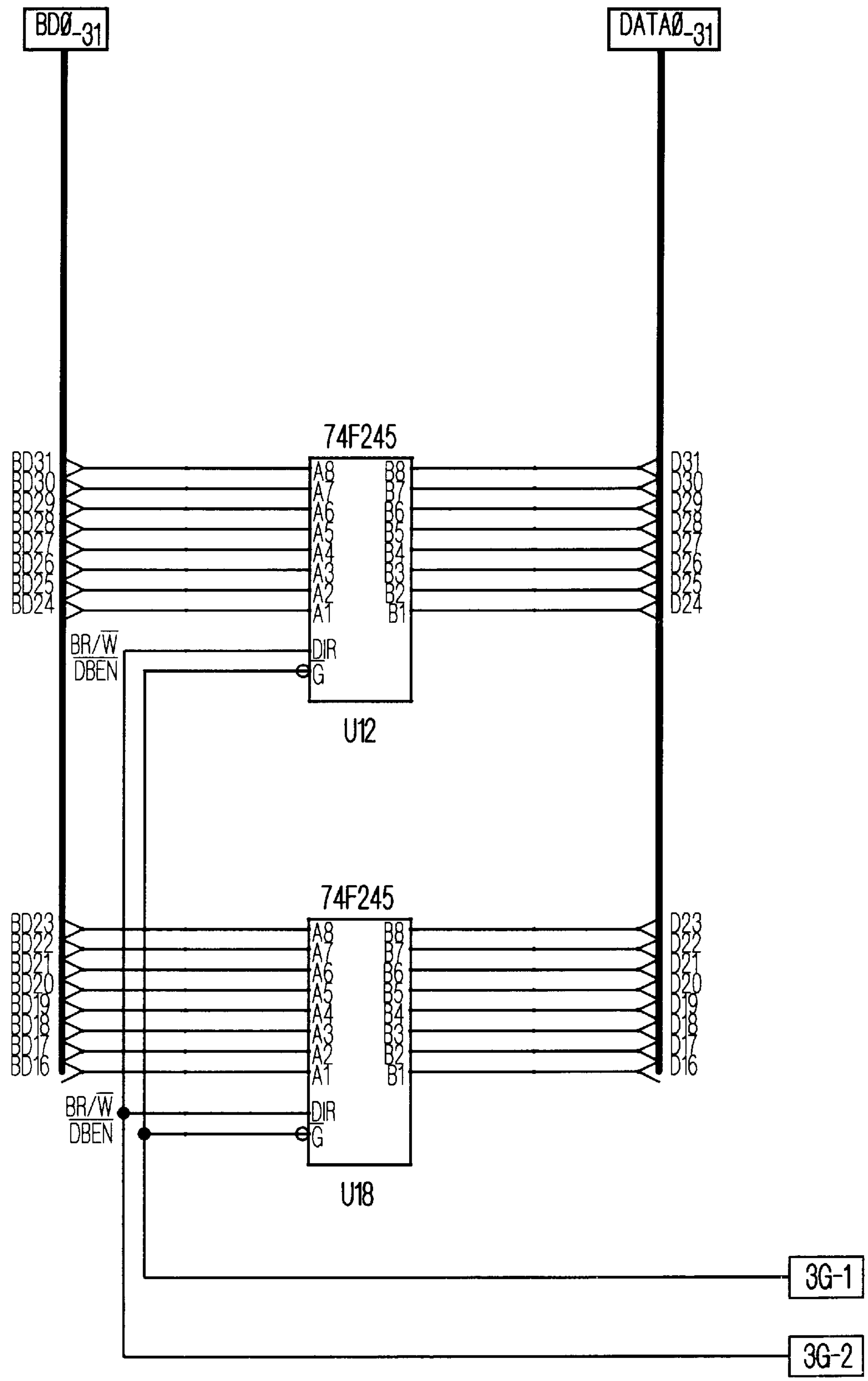
Figure 3H:
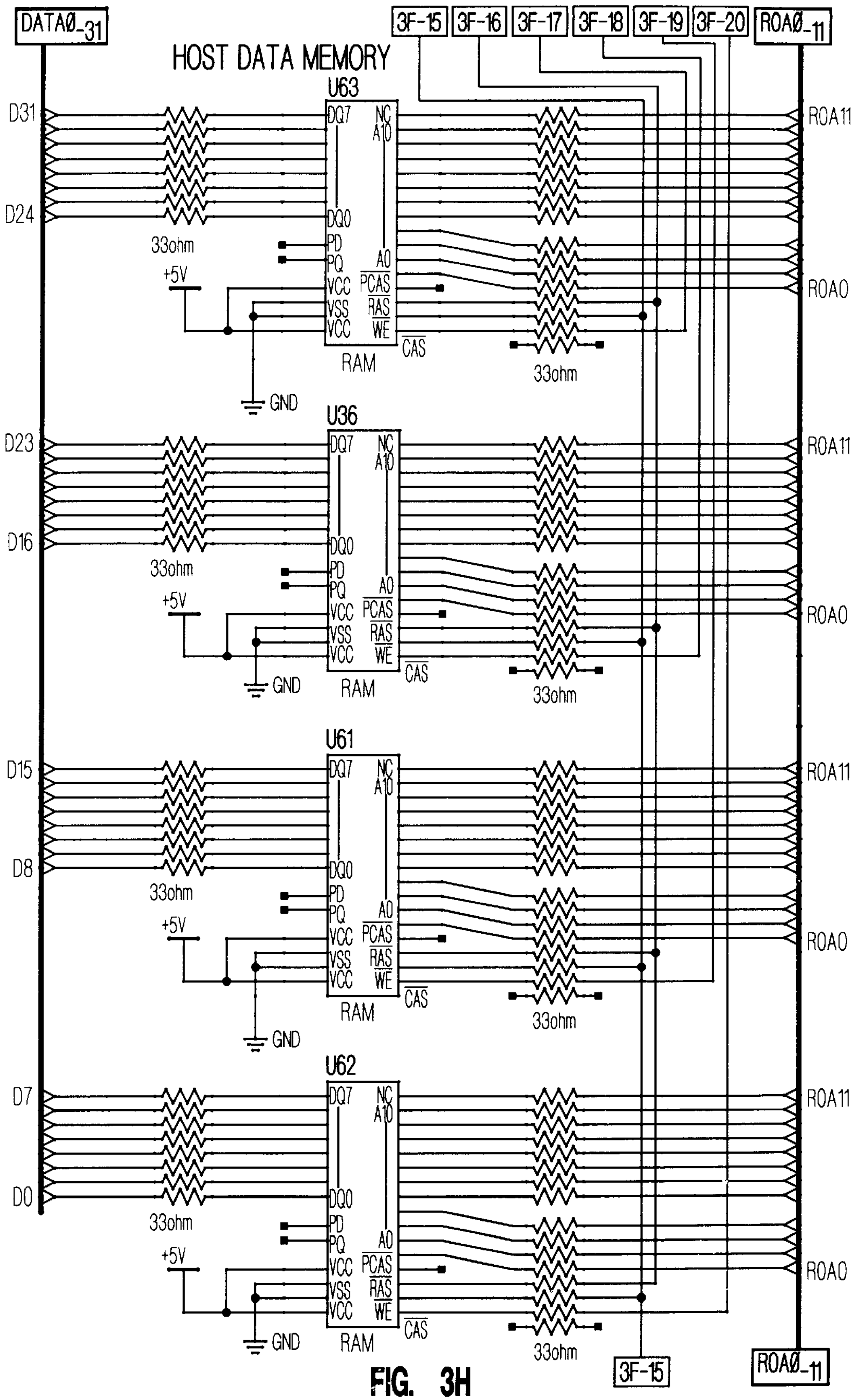
Figure 3J:
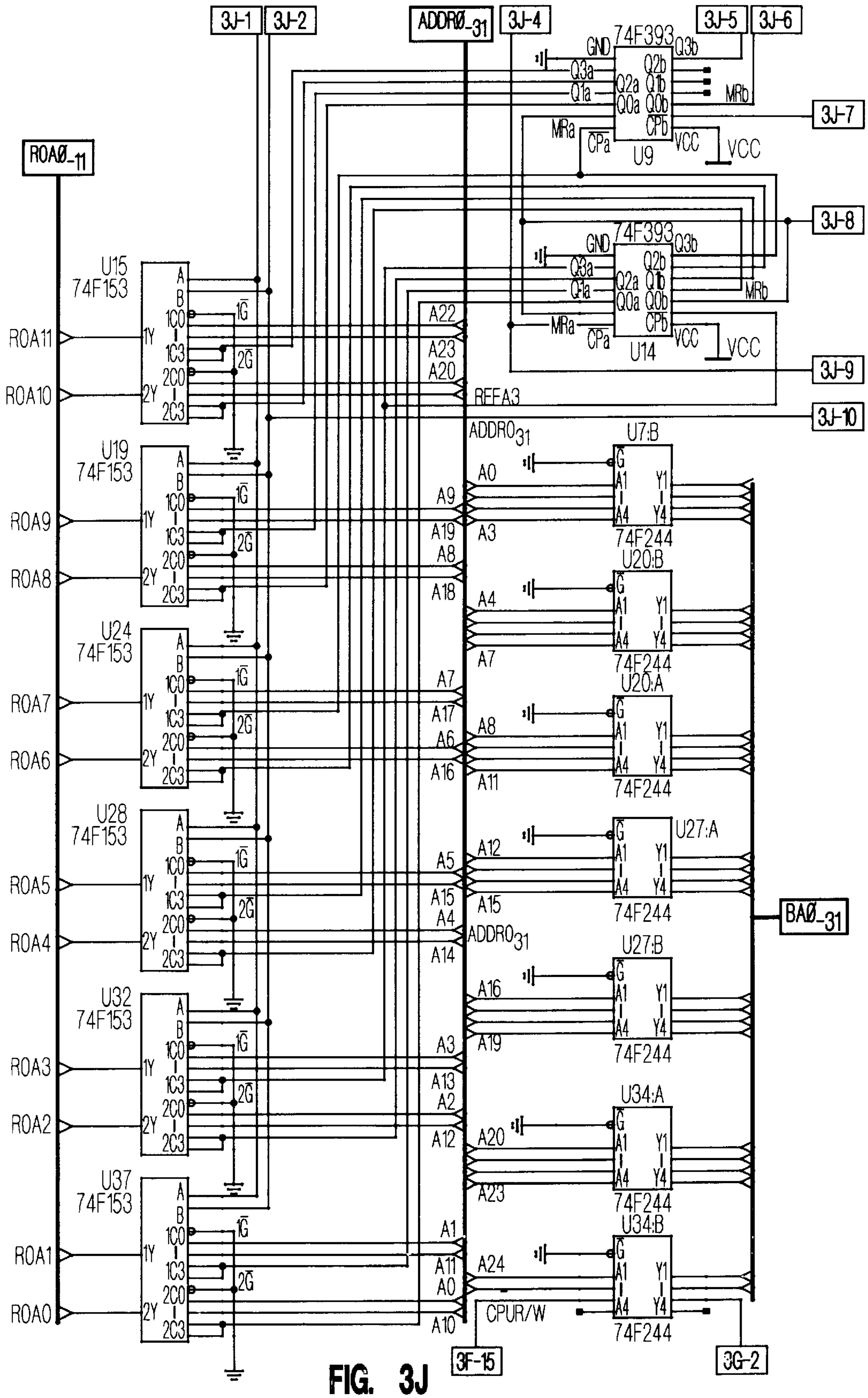
Figure 3K:
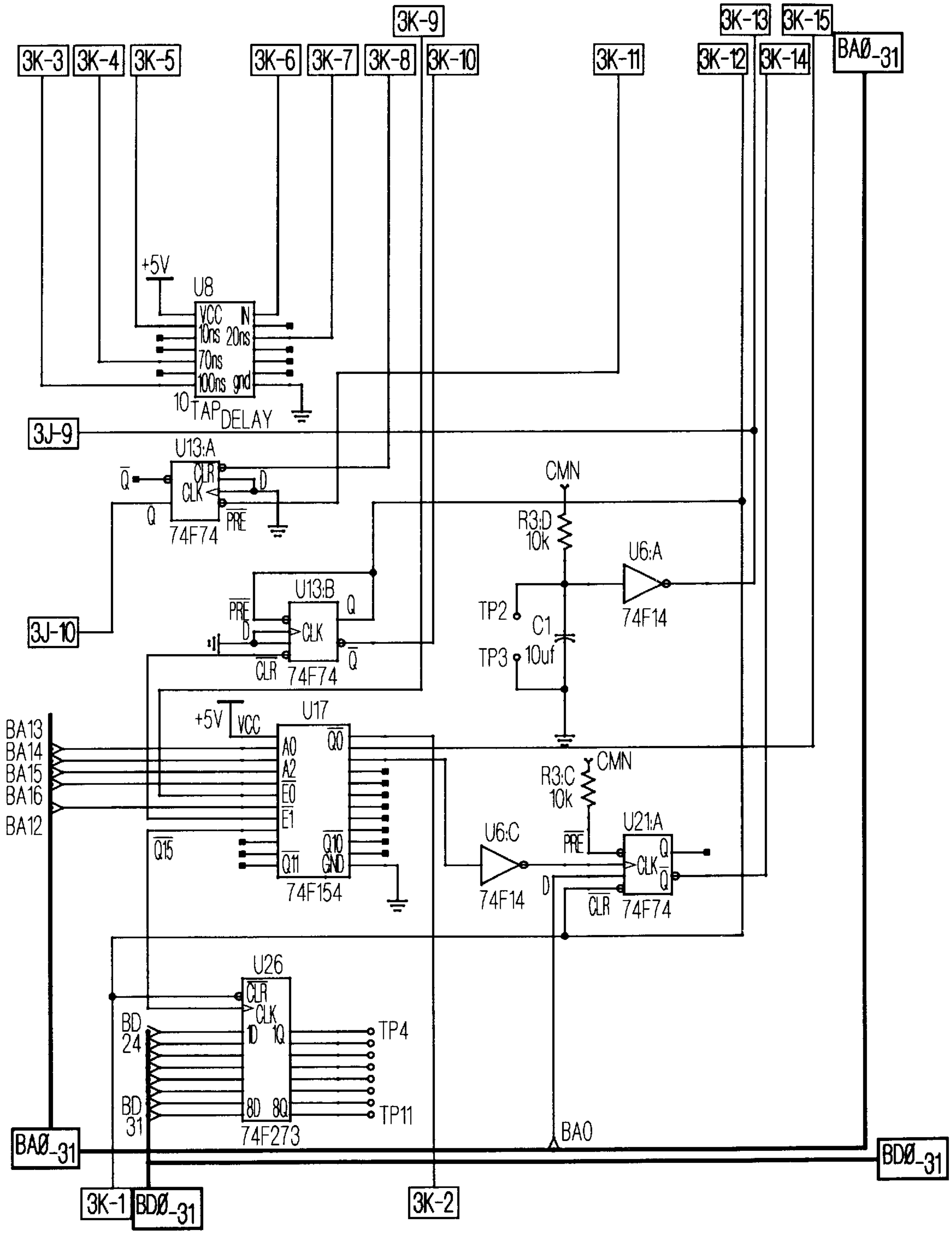
Figure 1:
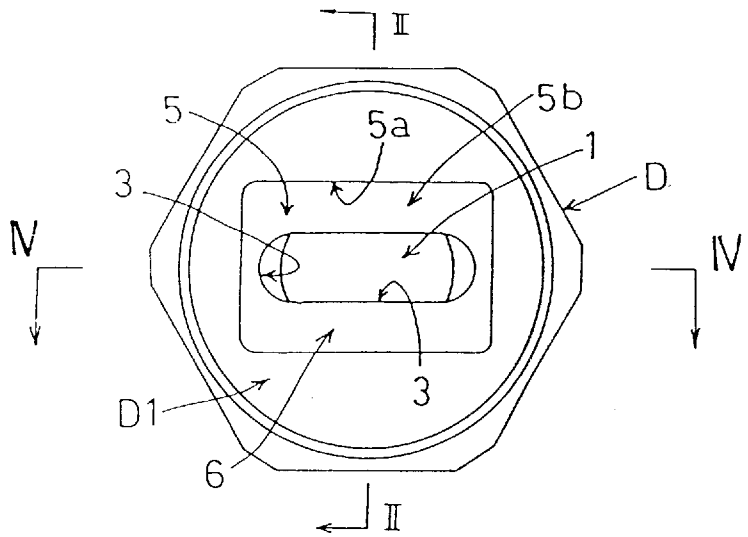
Figure 2:
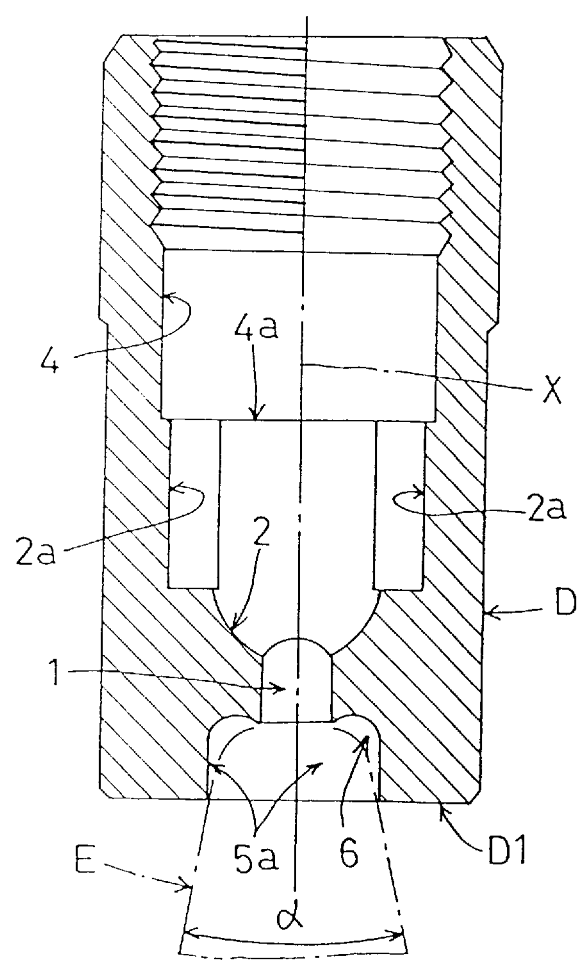
Figure 3M:
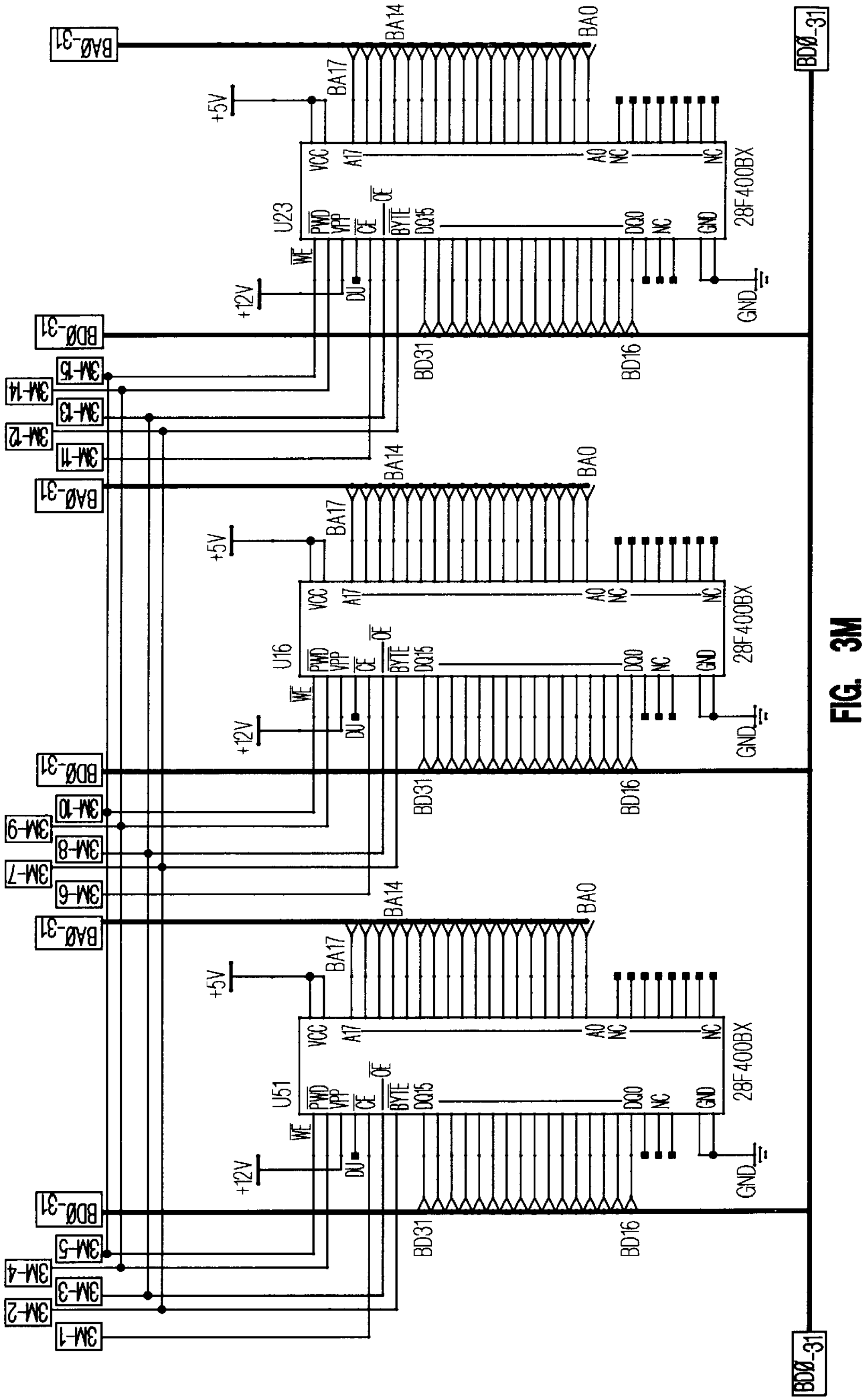
Figure 3N:
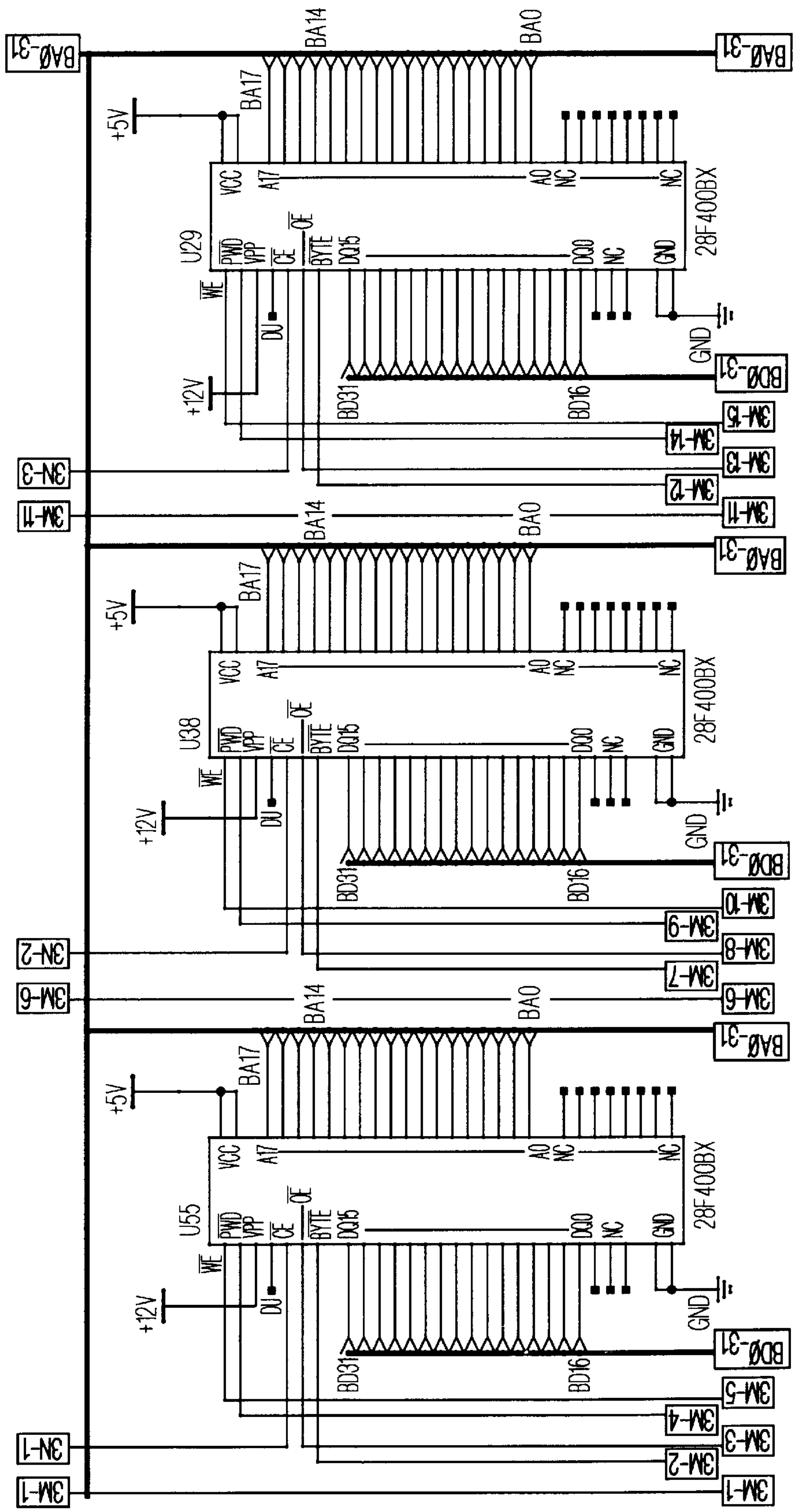
Figure 3P:
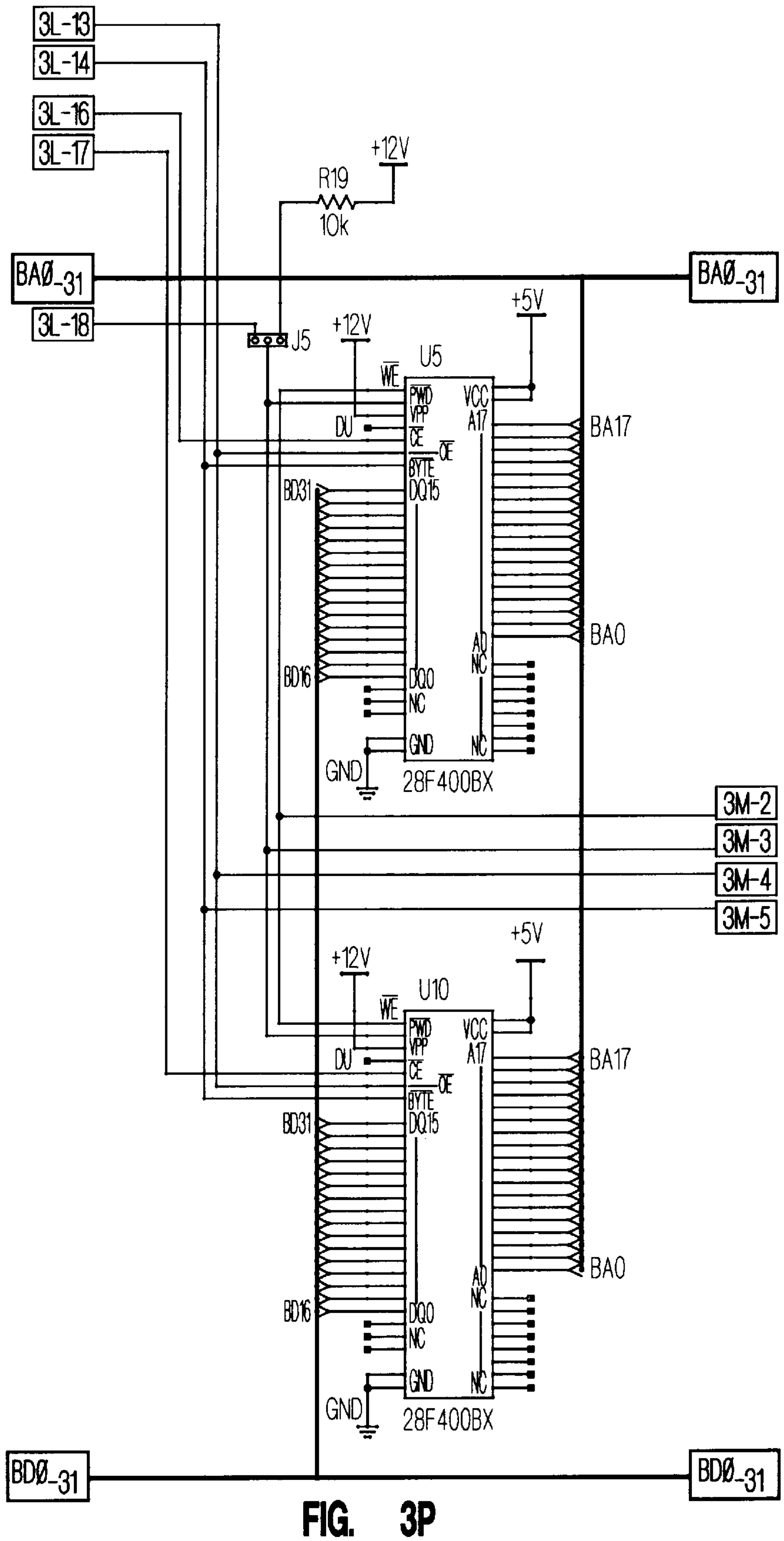
Figure 3Q:
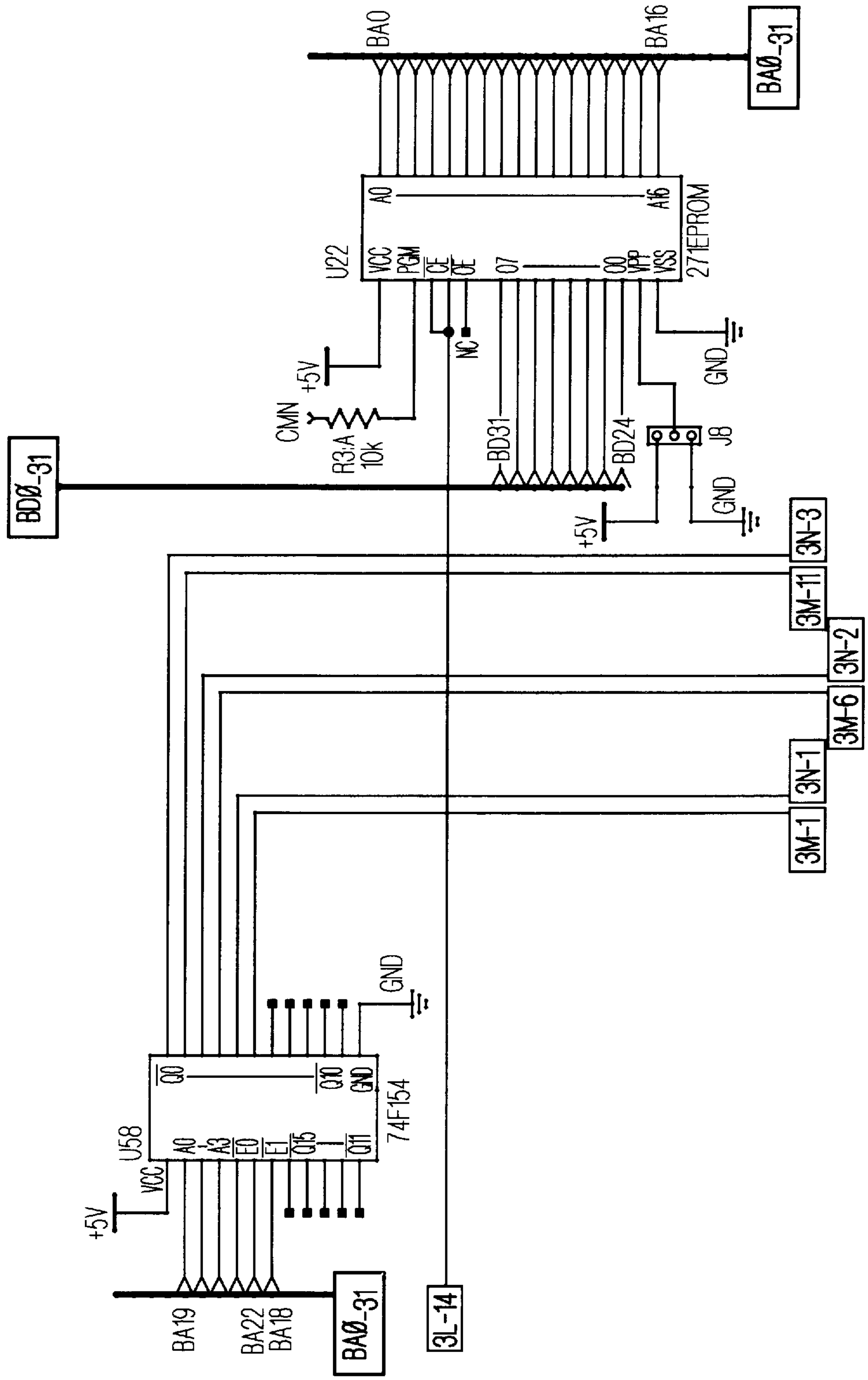
Figure 3R:
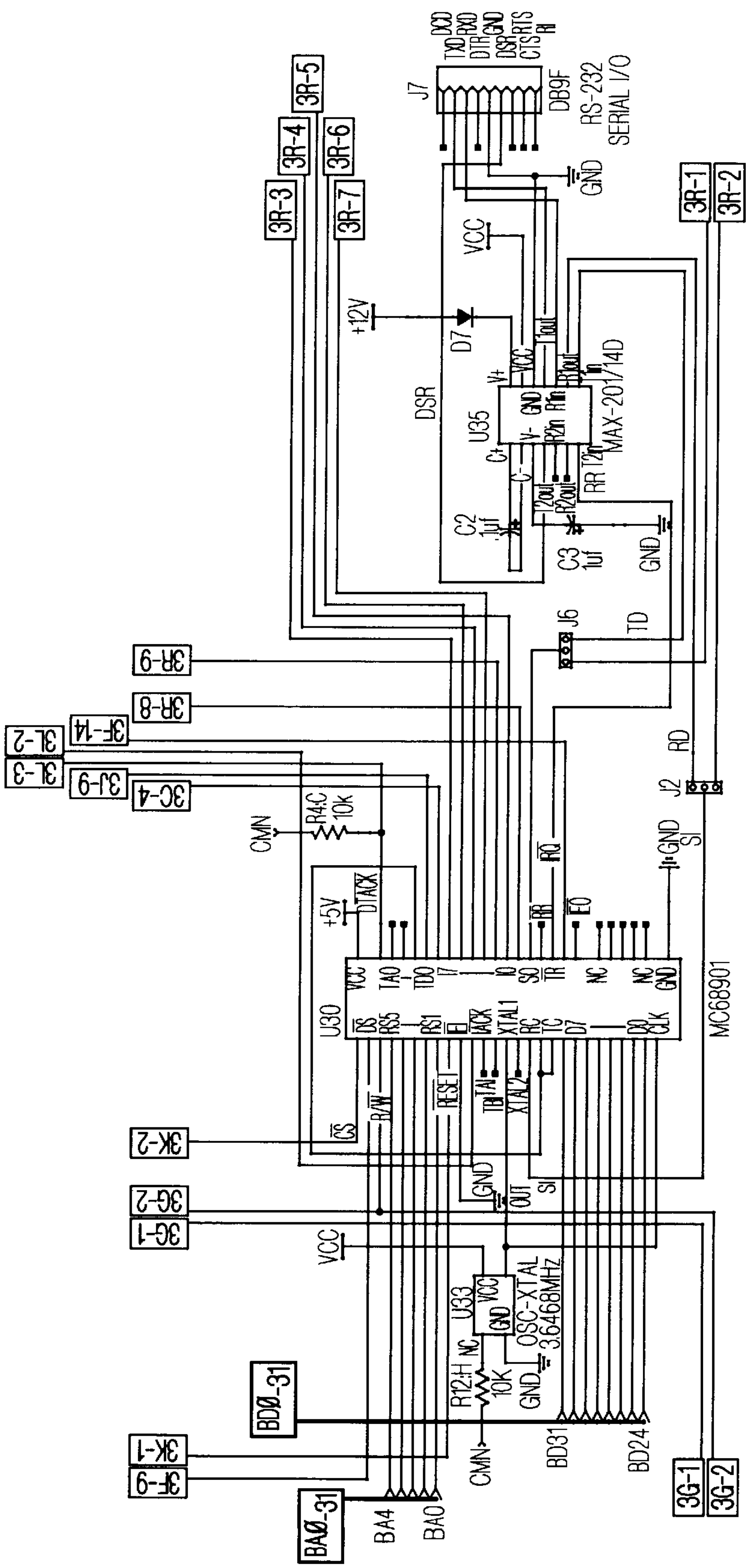
Figure 3S:
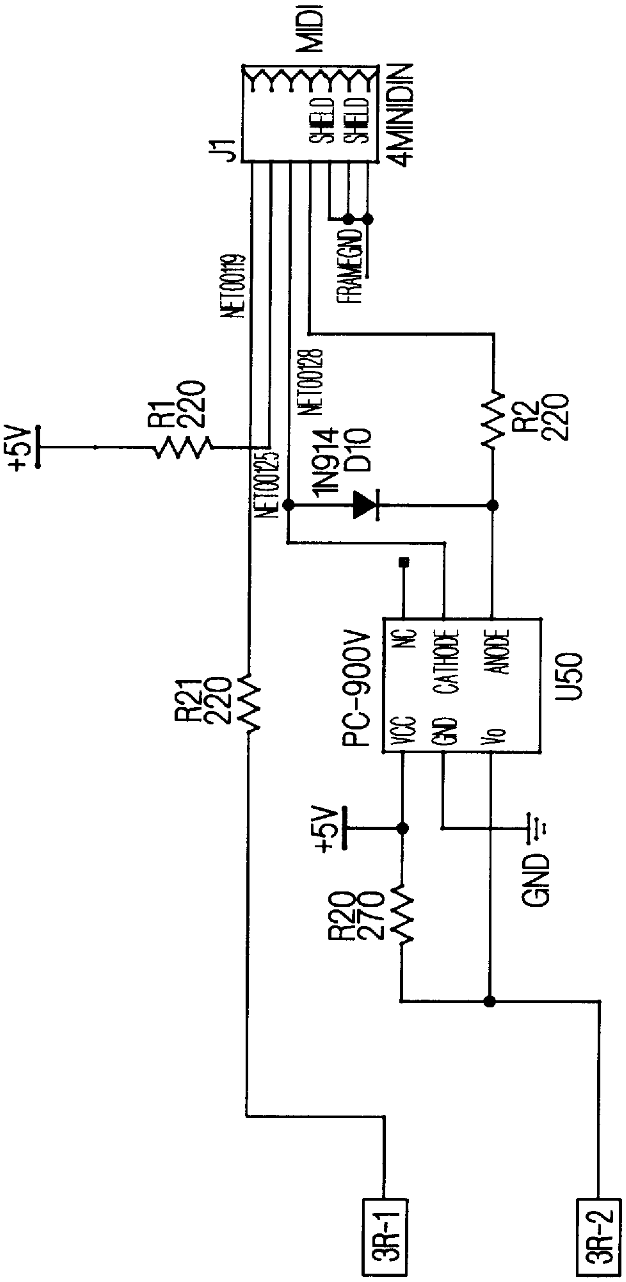
Figure 3T:
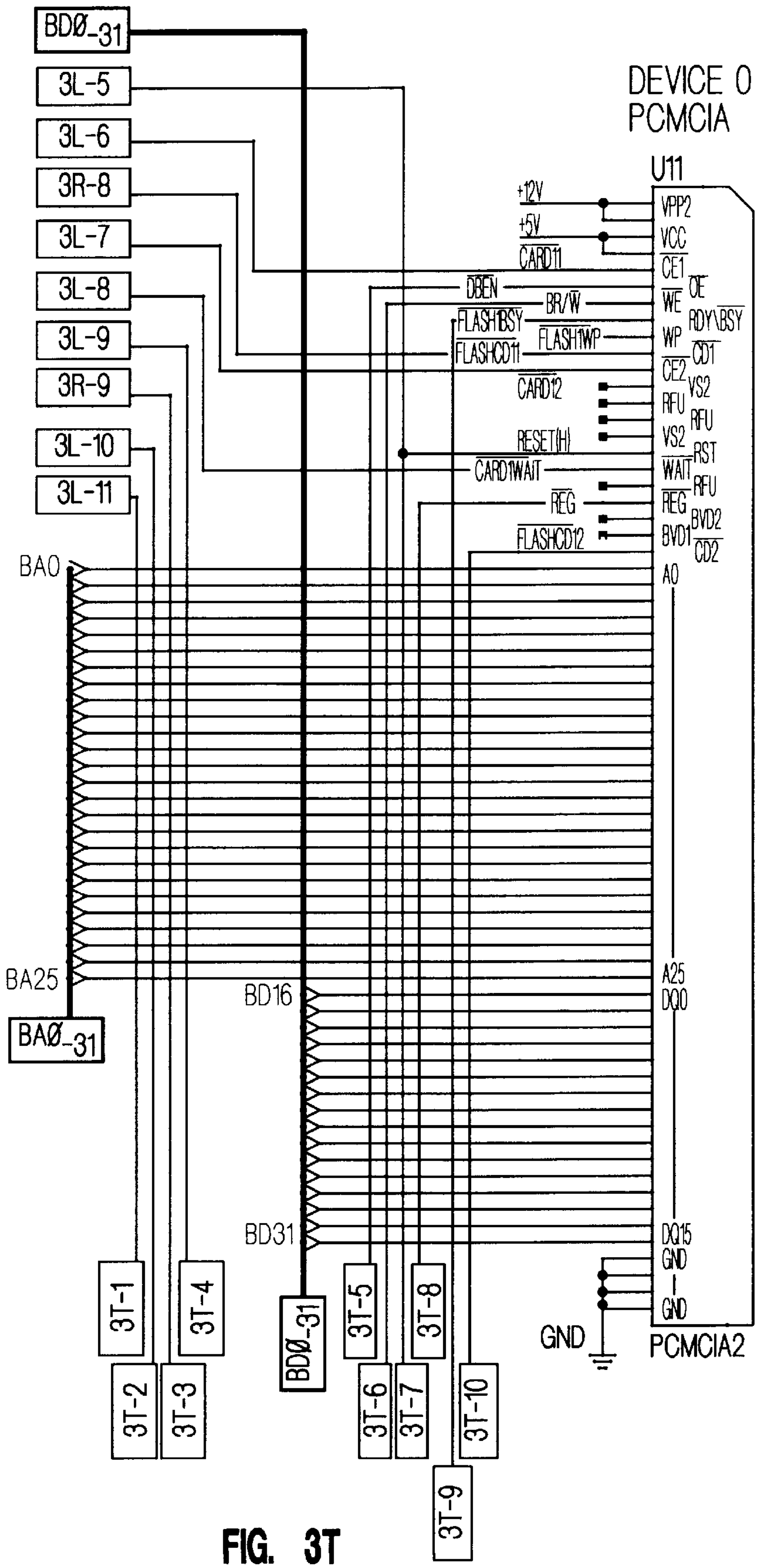
Figure 3U:
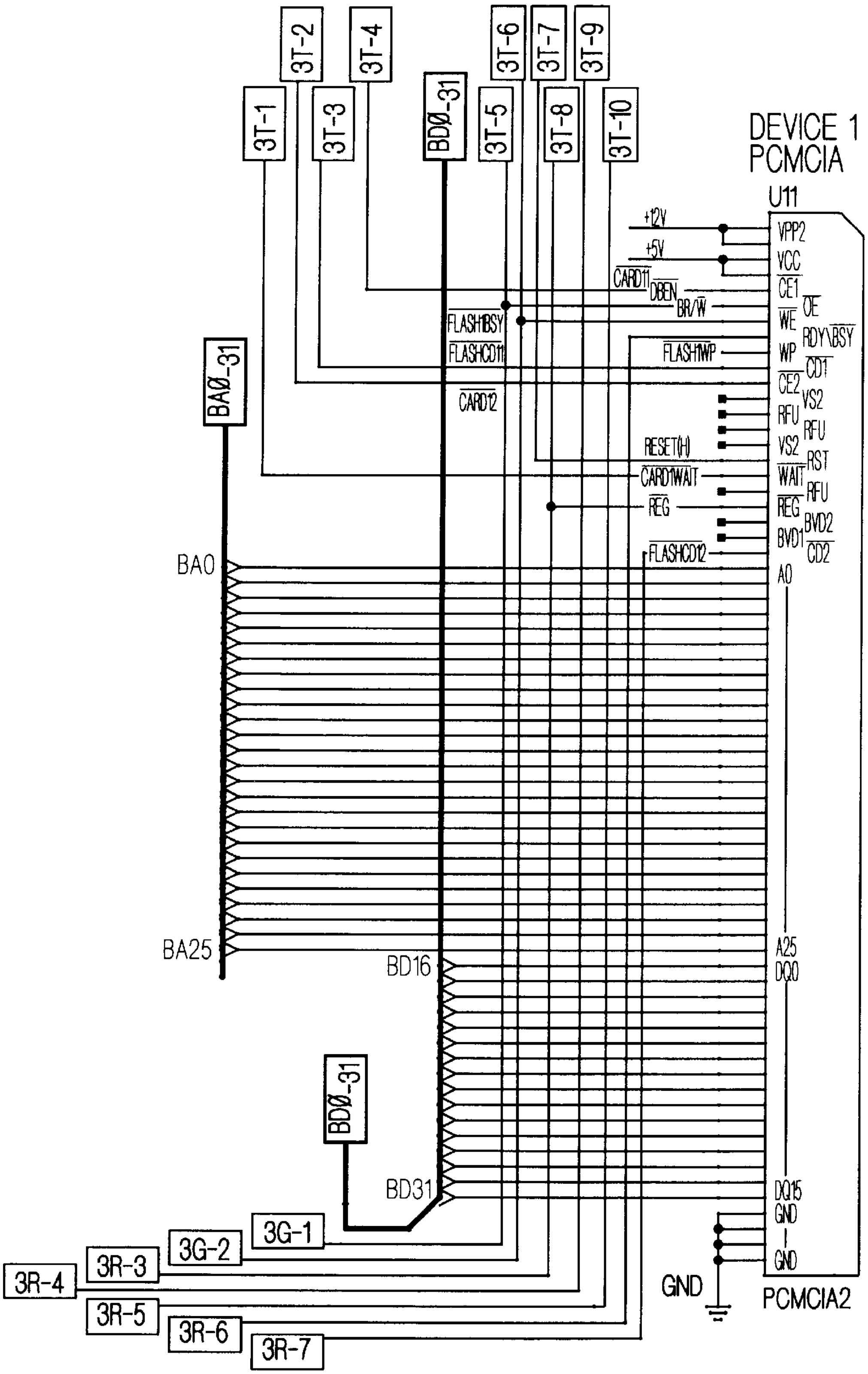
Figure 3V:
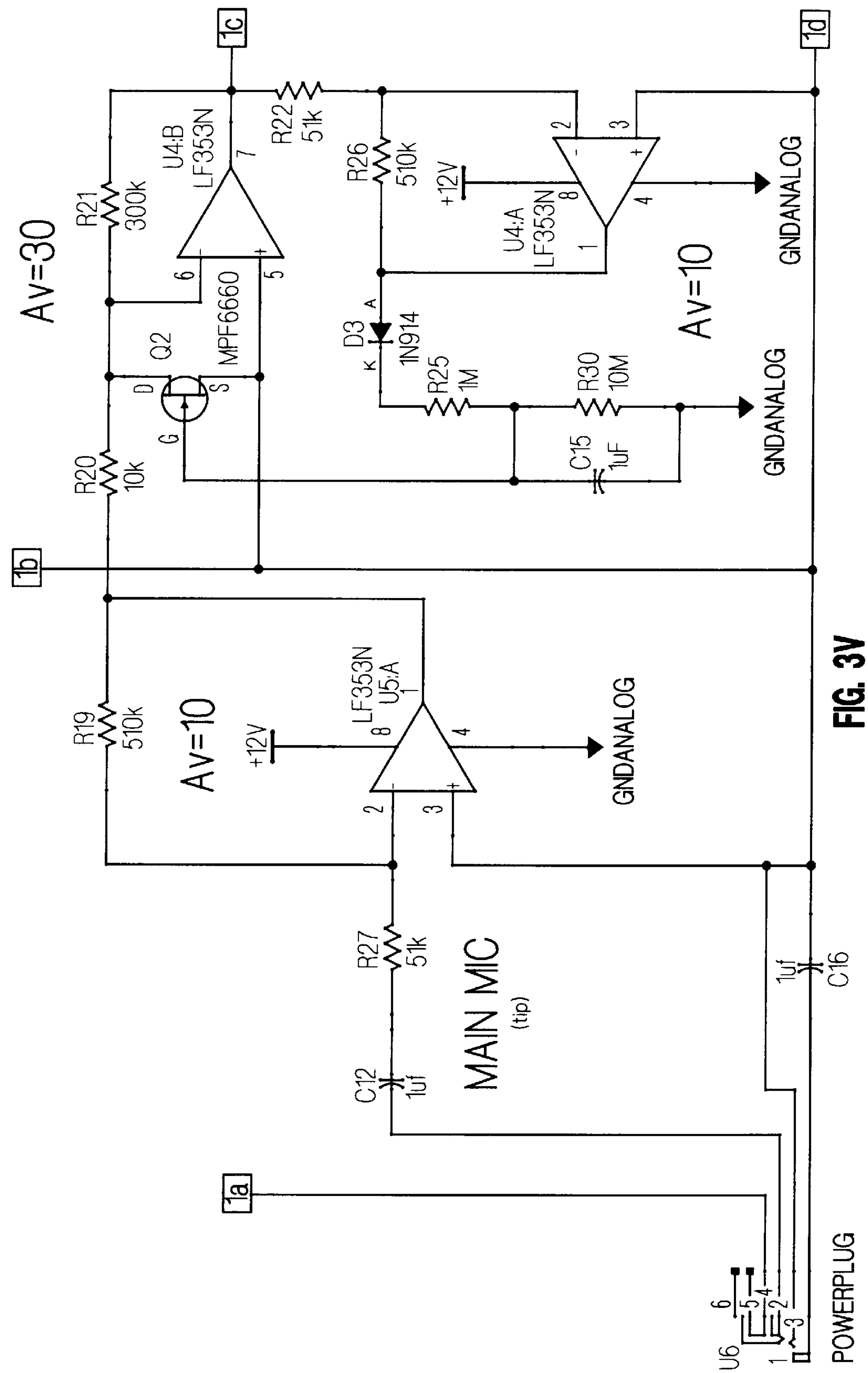
Figure 3W:
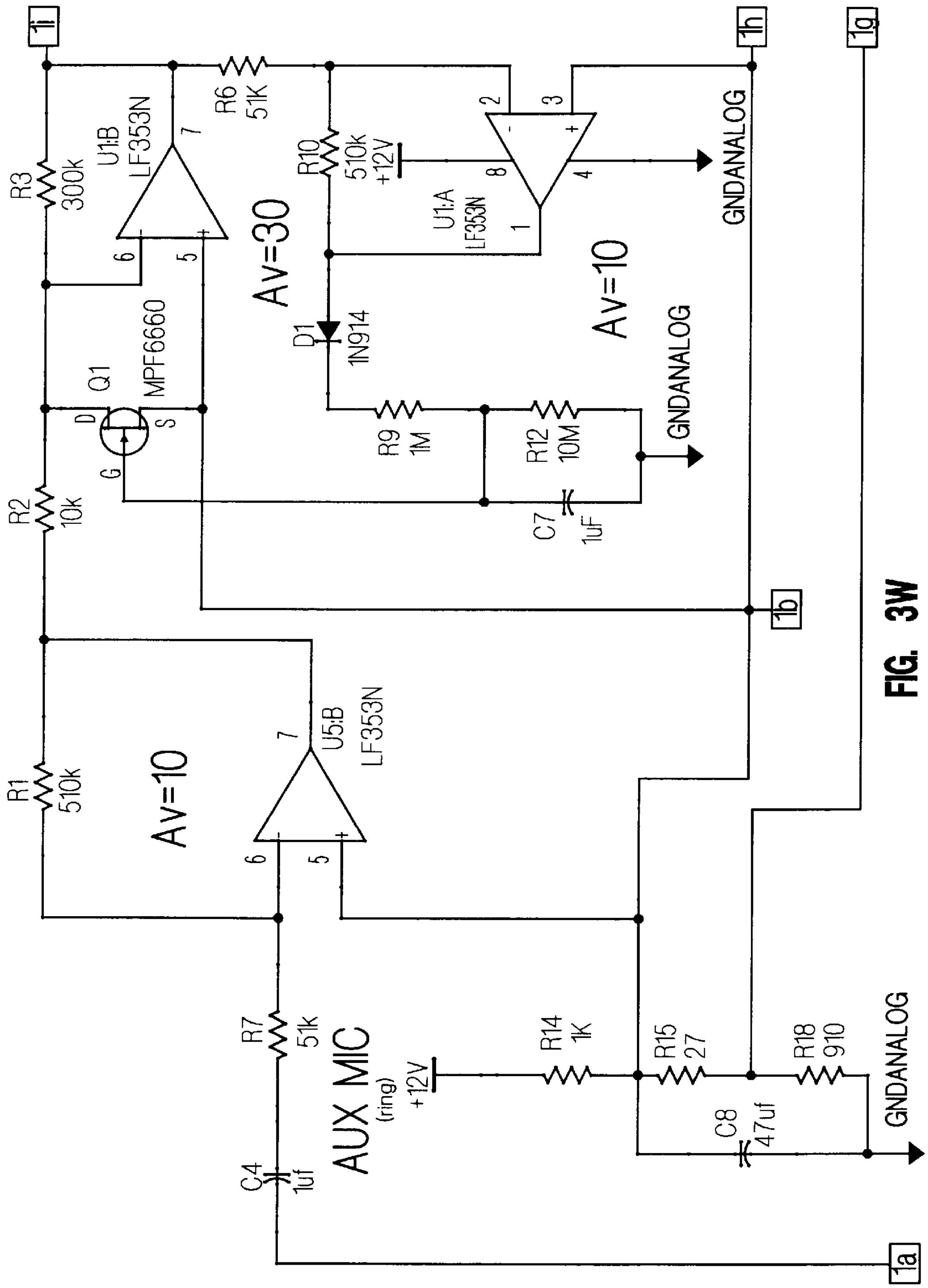
Figure 3X:
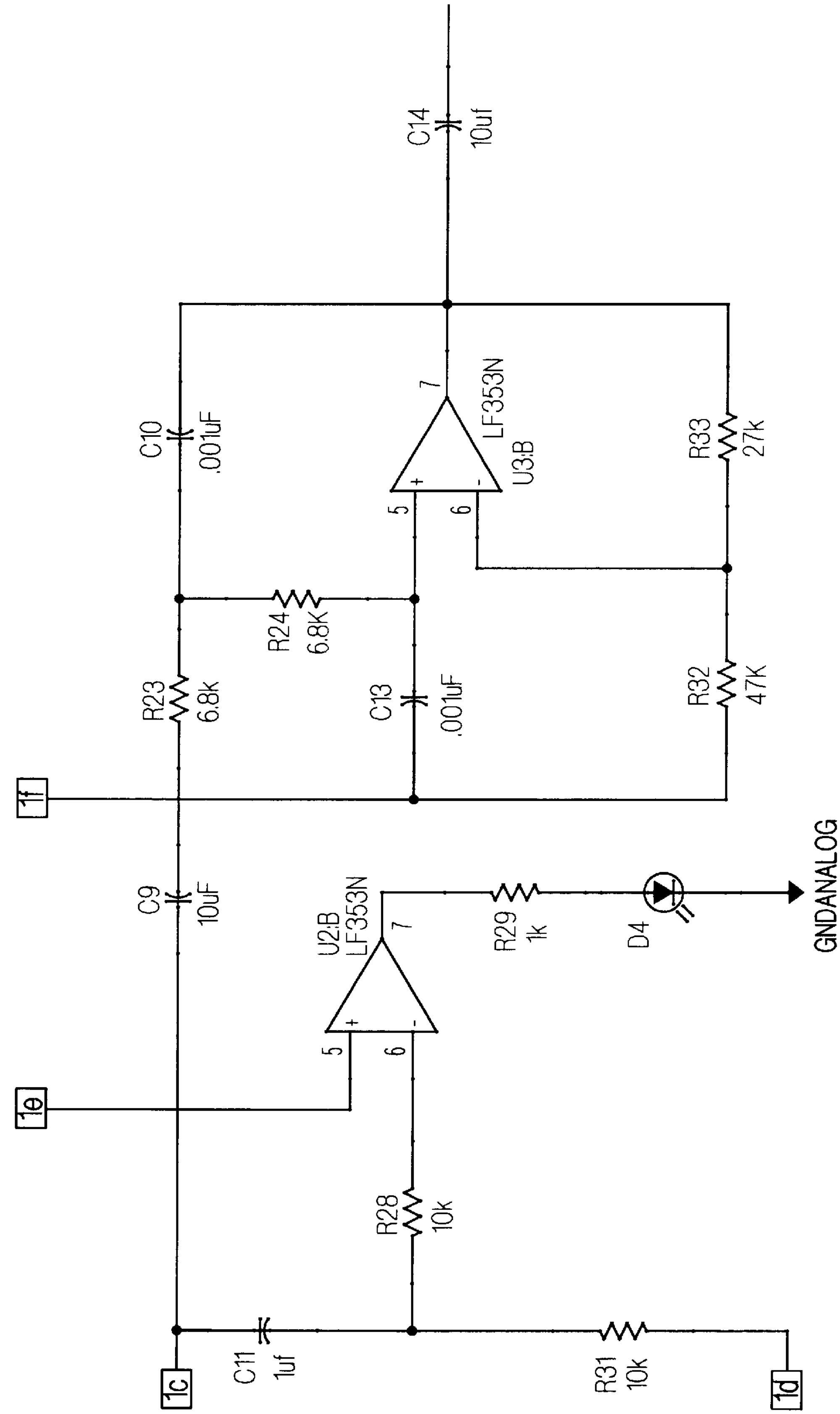
Figure 3Y:
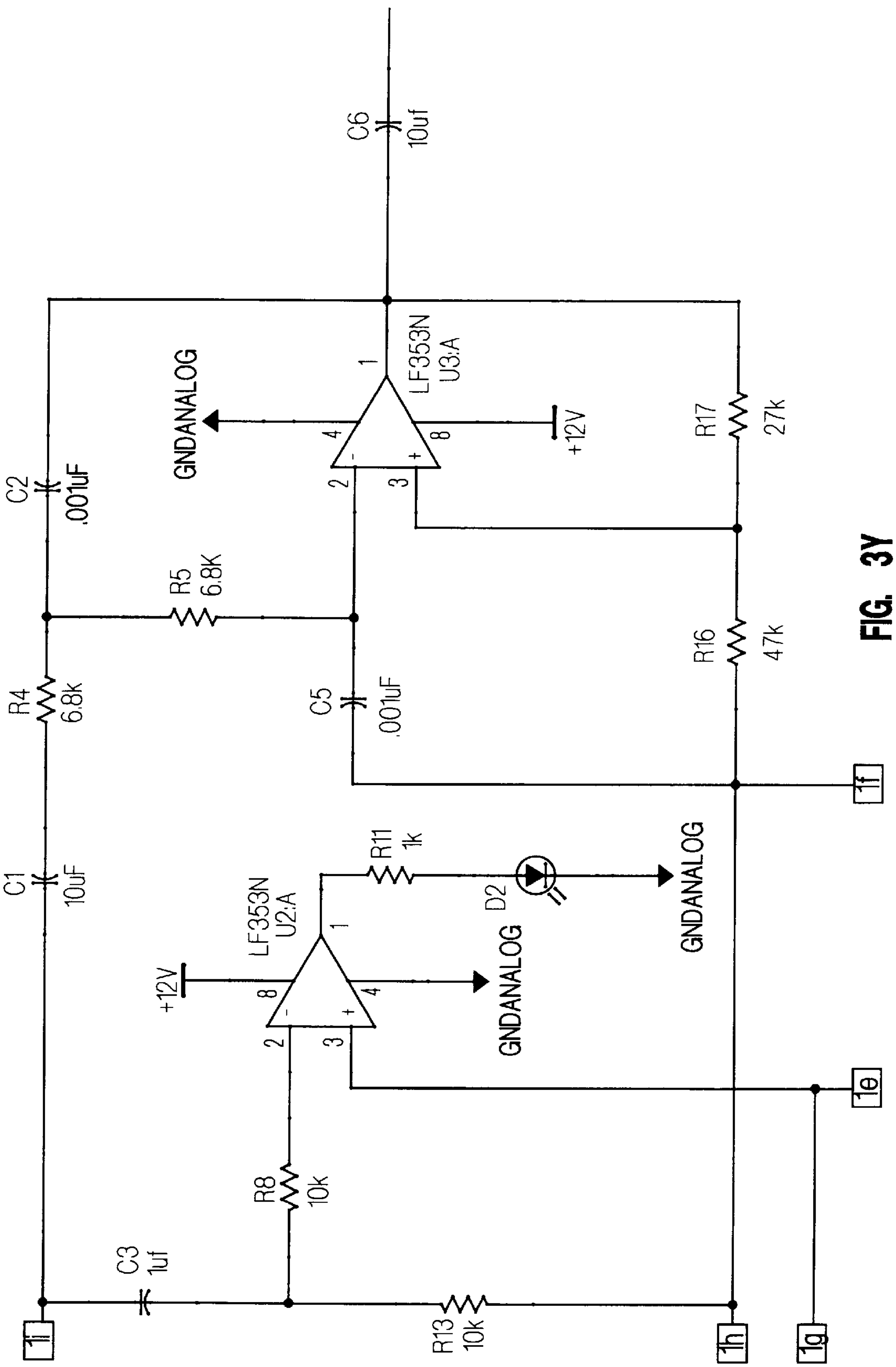

One example of an electronic circuit which has been constructed and used to implement the above described block diagram is illustrated in FIGS. 3A–3Y. These figures are a detailed electrical schematic diagram showing the interconnections, part number and/or value of each circuit element used. It should be noted that FIGS. 3A–3Y are included merely to show an example of one such circuit which has been used to implement the functional blocks described in FIG. 2. Other implementations could be designed that would also work satisfactorily.

II. The Method.

Figure 4:
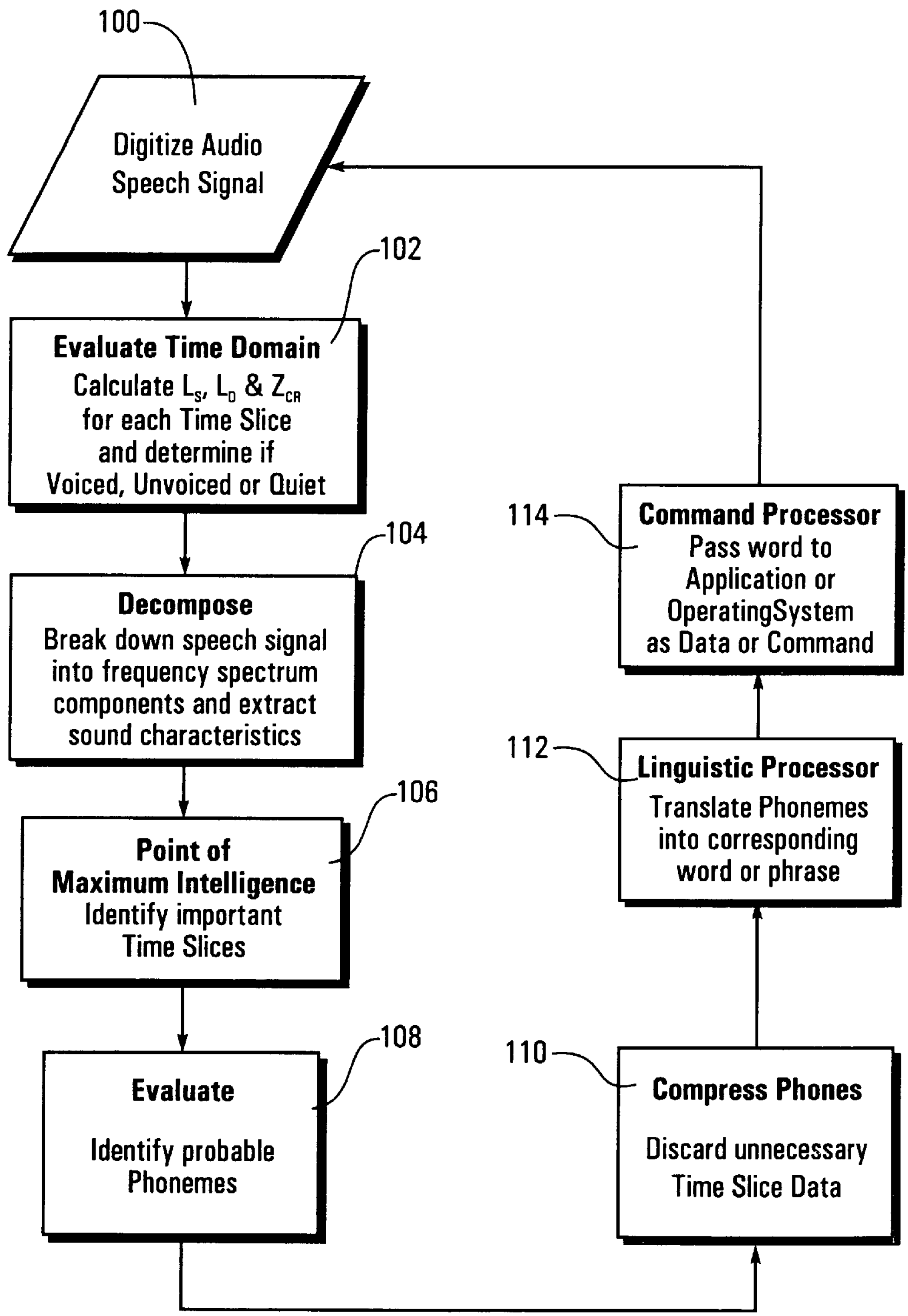
FIG. 4 is a functional flow-chart illustrating the overall program method of the present invention.

Referring now to FIG. 4, illustrated is a functional flow chart showing one presently preferred embodiment of the overall program method used by the present system. As is shown, the method allows the voice recognition system 10 to continuously receive an incoming speech signal, electronically process and manipulate that signal so as to generate the phonetic content of the signal, and then produce a word or stream of words that correspond to that phonetic content. Importantly, the method is not restricted to any one speaker, or group of speakers. Rather, it allows for the unrestricted recognition of continuous speech utterances from any speaker of a given language.

Following is a general description of the overall functions carried out by the present method. A more detailed description of the preferred program steps used to carry out these functions will follow. Referring first to the functional block indicated at 100, the audio processor 16 portion of the system receives the audio speech signal at microphone 12, and the A/D conversion circuit 34 digitizes the analog signal at a suitable sampling rate. The preferred sampling rate is 44.1 kHz, although other sampling rates could be used, as long as it complies with the Nyquist sampling rate so as to avoid aliasing problems. This digitized speech signal is then broken-up into successive "time segments." In the preferred embodiment, each of these time segments contains 10,240 data points, or 232 milliseconds of time domain data.

Each time segment of 10,240 data points is then passed to the portion of the algorithm labeled "Evaluate Time Domain," shown at numeral 102. This portion of the method further breaks the time segments up into successive "time slices." Each time slice contains 256 data points, or 5.8 milliseconds of time domain data. Various sound characteristics contained within each time slice are then extracted. Specifically, in the preferred embodiment the absolute average envelope amplitude, the absolute difference average, and the zero crossing rate for the portion of the speech signal contained within each time slice is calculated and stored in a corresponding data structure. From these various characteristics, it is then determined whether the particular sound contained within the time slice is quiet, voiced or unvoiced. This information is also stored in the time slice's corresponding data structure.

The next step in the overall algorithm is shown at 104 and is labeled "Decompose." In this portion of the program method, each time slice is broken down into individual component waveforms by successively filtering the time slice using a plurality of filter bands. From each of these filtered signals, the Decompose function directly extracts additional sound identifying characteristics by "measuring" each signal. Identifying characteristics include, for example, the fundamental frequency of the time slice if voiced; and the frequency and amplitude of each of the filtered signals. This information is also stored in each time slice's corresponding data structure.

The next step in the overall algorithm is at 106 and is labeled "Point of Maximum Intelligence." In this portion of the program, those time slices that contain sound data which is most pertinent to the identification of the sound(s) are identified as points of "maximum intelligence;" the other time slices are ignored. In addition to increasing the accuracy of subsequent phoneme identification, this function also reduces the amount of processing overhead required to identify the sound(s) contained within the time segment.

Having identified those time slices that are needed to identify the particular sound(s) contained within the time segment, the system then executes the program steps corresponding to the functional block 110 labeled "Evaluate." In this portion of the algorithm, all of the information contained within each time slice's corresponding data structure is analyzed, and up to five of the most probable phonetic sounds (i.e., phonemes) contained within the time slice are identified. Each possible sound is also assigned a probability level, and are ranked in that order. The identified sounds and their probabilities are then stored within the particular time slice's data structure. Each individual phoneme sound type is identified by way of a unique identifying number referred to as a "PASCII" value.

The next functional step in the overall program method is performed by the system at the functional block 110 labeled "Compress Phones." In this function, the time slices that do not correspond to "points of maximum intelligence" are discarded. Only those time slices which contain the data necessary to identify the particular sound are retained. Also, time slices which contain contiguous "quiet" sections are combined, thereby further reducing the overall number of time slices. Again, this step reduces the amount of processing that must occur and further facilitates real time sound recognition.

At this point in the algorithm, there remains a sequence of time slices, each of which has a corresponding data structure containing various sound characteristics culled from both the time domain and the frequency domain. Each structure also identifies the most probable phoneme sound type corresponding to those particular sound characteristics. This data is passed to the next step of the overall program method, shown at functional block 112 and labeled "Linguistic Processor." The Linguistic processor receives the data structures, and translates the sound stream (i.e., stream of phonemes) into the corresponding English letter, syllable, word or phrase. This translation is generally accomplished by performing a variety of linguistic processing functions that match the phonemic sequences against entries in the system lexicon. The presently preferred linguistic functions include a phonetic dictionary look-up, a context checking function and database, and a basic grammar checking function.

Once the particular word or phrase is identified, it is passed to the "Command Processor" portion of the algorithm, as shown at functional block 114. The Command processor determines whether the word or phrase constitutes text that should be passed as data to a higher level application, such as a wordprocessor, or whether it constitutes a command that is to be passed directly to the operating system or application command interface.

As has been noted in the above general description, a data structure is preferably maintained for each time slice of data (i e., 256 samples of digitized sound data; 5.8 milliseconds of sound) within system memory. This data structure is referred to herein as the "Higgins" structure, and its purpose is to dynamically store the various sound characteristics and data that can be used to identify the particular phoneme type contained within the corresponding time slice. Although other information could also be stored in the Higgins structure, TABLE I illustrates one preferred embodiment of the its contents. The data structure and its contents will be discussed in further detail below.

TABLE I

| VARIABLE NAME | CONTENTS |
|---|---|
| TYPE | Whether sound is voiced, unvoiced, quiet or Not processed. |
| LOCATION | Array location ofwhere Time Slice starts. |
| SIZE | Number of sample data points in Time Slice. |
| $L_S$ | Average amplitude of signal in time domain. |
| $f_o$ | Fundamental Frequency of signal. |
| FFREQ | Array containing the frequency of each filtered signal contained in tirne slice. |
| AMPL | Array containing the amplitude of each filtered signal. |
| $Z_{CR}$ | Zero Crossing Rate of signal in time domain. |
| PMI | Variable indicating maximum formant stability; value indicates duration. |
| sumSlope | Sum of absolute values of filtered signal slopes. |
| POSSIBLE PHONEMES | Array containing up to five most probable phonemes contained in time slice, including for each phoneme: confidence level, standard for relative amplitude, standard for $Z^{CR}$, standard for duration for phoneme. |

The various steps used to accomplish the method illustrated in FIG. 4 will now be discussed in more detail by making specific reference to one presently preferred embodiment of the invention. It should be appreciated that the particular program steps which are illustrated in the detailed flow charts contained in FIGS. 5 through 11 are intended merely as an example of the presently preferred embodiment and the presently understood best mode of implementing the overall functions which are represented by the flow chart of FIG. 4.

Figure 5A:
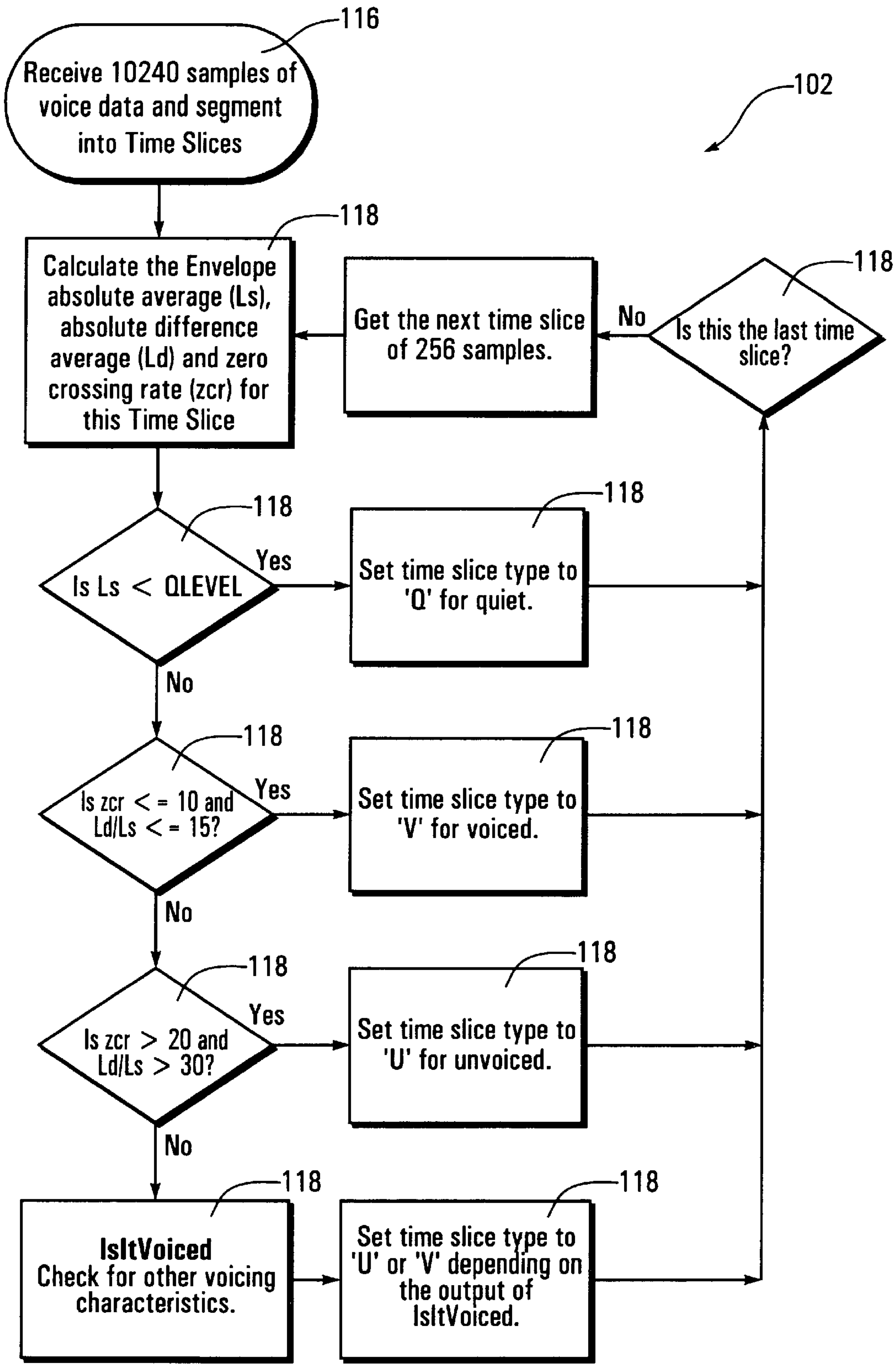
FIGS. 5A–5B is a flow-chart illustrating the program method used to implement one of the functional blocks of FIG. 4.

Referring first to FIG. 5A, the particular program steps corresponding to the "Evaluate Time Domain" function illustrated in functional block 102 of FIG. 4 are shown. As already noted, the Audio Processor 16 receives an audio speech signal from the microphone 12. The A/D conversion circuitry 34 then digitally samples that signal at a predetermined sampling rate, such as the 44.1 kHz rate used in the preferred embodiment. This time domain data is divided into separate, consecutive time segments of predetermined lengths. In the preferred embodiment, each time segment is 232 milliseconds in duration, and consists of 10,240 digitized data points. Each time segment is then passed, one at a time, to the Evaluate Time Domain function, as is shown at step 116 in FIG. 5A. Once received, the time segment is further segmented into a predetermined number of equal "slices" of time. In the preferred embodiment, there are forty of these "time slices" for each time segment, each of which are comprised of 256 data points, or 5.8 milliseconds of speech.

The digital sound processor 36 then enters a program loop, beginning with step 118. As is indicated at that step, for each time slice the processor 36 extracts various time-varying acoustic characteristics. For example, in the preferred embodiment the DSP 36 calculates the absolute average of the amplitude of the time slice signal ($L_S$), the absolute difference average ($L_D$) of the time slice signal and the zero crossing rate ($Z_{CR}$) of the time slice signal. The absolute average of the amplitude $L_S$ corresponds to the absolute value of the average of the amplitudes (represented as a line level signal voltage) of the data points contained within the time slice. The absolute difference average $L_D$ is the average amplitude difference between the data points in the time slice (i.e., calculated by taking the average of the differences between the absolute value of one data point's amplitude to the next data point's). The zero crossing rate $Z_{CR}$ is calculated by dividing the number of zero crossings that occur within the time slice by the number of data points (256) and multiplying the result by 100. The number of zero crossings is equal to the number of times the time domain data crosses the X-axis, whether that crossing be positive-to-negative or negative-to-positive.

The magnitudes of these various acoustical properties can be used to identify the general type of sound contained within each time slice. For instance, the energy of "voiced" speech sounds is generally found at lower frequencies than for "unvoiced" sounds, and the amplitude of unvoiced sounds is generally much lower than the amplitude of voiced sounds. These generalizations are true of all speakers, and general ranges have been identified by analyzing speech data taken from a wide variety of speakers (i.e., men, women, and children). By comparing the various acoustical properties to these predetermined ranges, the sound type can be determined, independent of the particular speaker.

Thus, based on the acoustical properties identified in the previous step, the DSP 36 next proceeds to that portion of the program loop that identifies what type of sound is contained within the particular time slice. In the preferred embodiment, this portion of the code determines, based on previously identified ranges obtained from test data, whether the sound contained within the time slice is "quiet," "voiced" or "unvoiced."

At step 120, the absolute average of the amplitude $L_S$ is first compared with a predetermined "quiet level" range, or "QLEVEL" (i.e., an amplitude magnitude level that corresponds to silence). In the preferred embodiment, QLEVEL is equal to 250, but the value can generally be anywhere between 200 and 500. It will be appreciated that the particular "quiet level" may vary depending on the application or environment (e.g., high level of background noise, high d.c. offset present in the A/D conversion or where the incoming signal is amplified to a different level), and thus may be a different value. If $L_S$ is less than QLEVEL, the sound contained within the time slice is deemed to be "quiet," and the processor 36 proceeds to step 122. At step 122, the DSP 36 begins to build the Higgins data structure for the current time slice within DSP data memory 42. Here, the processor 36 places an identifier "Q" into a "type" flag of the Higgins data structure for this time slice.

If however, $L_S$ is greater than QLEVEL, then the sound contained within the time slice is not quiet, and the processor 36 proceeds to step 124 to determine whether the sound is instead a "voiced" sound. To make this determination, the zero crossing rate $Z_{CR}$ is first compared with a predetermined crossing-rate value found to be indicative of a voiced sound for most speakers. A low zero-crossing rate implies a low frequency and, in the preferred embodiment, if it is less than or equal to about 10, the speech sound is probably voiced.

If the $Z_{CR}$ does fall below 10, another acoustical property of the sound is evaluated before the determination is made that the sound is voiced. This property is checked by calculating the ratio of $L_D$ to $L_S$, and then comparing that ratio to another predetermined value that corresponds to a cut-off point corresponding to voiced sounds in most speakers. In the preferred embodiment, if $L_D/L_S$ is less than or equal to about 15, then the signal is probably voiced. Thus, if at step 124 it is determined that $Z_{CR}$ is less than or equal to 10 and that $L_D/L_S$ is less than or equal to about 15, then the sound is deemed to be a voiced type of sound (e.g., the sounds /U/, /d/, /w/, /i/, /e/, etc.). If voiced, the processor 36 proceeds to step 126 and places an identifier "V" into the "type" flag of the Higgins data structure corresponding to that time slice.

If not voiced, then the processor 36 proceeds to program step 120 to determine if the sound is instead "unvoiced," again by comparing the properties identified at step 118 to ranges obtained from user-independent test data. To do so, processor 36 determines whether $Z_{CR}$ is greater than or equal to about 20 and whether $L_D/L_S$ is greater than or equal to about 30. If both conditions exist, the sound is considered to be an unvoiced type of sound (e.g., certain aspirated sounds). If unvoiced, the processor 36 proceeds to step 130 and places an identifier "U" into the "type" flag of the Higgins data structure for that particular time slice.

Figure 5B:
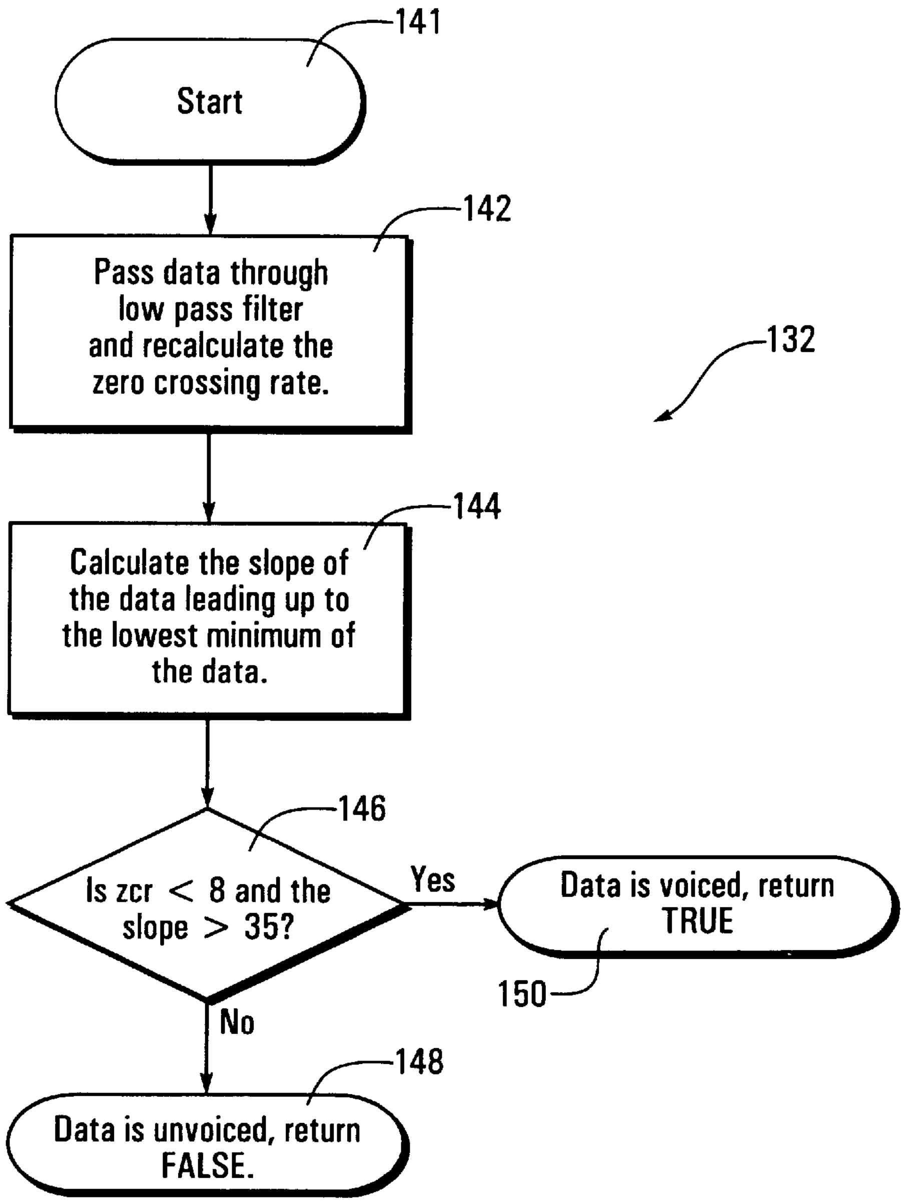

Some sounds will fall somewhere between the conditions checked for in steps 124 and 128 (i.e., $Z_{CR}$ falls somewhere between about 11 and 19, and $L_D/L_S$ falls somewhere between about 16 and 29) and other sound properties must be evaluated to determine whether the sound is voiced or unvoiced. This portion of the program method is performed, as is indicated at step 132, by executing another set of program steps referred to as "Is it Voiced." The programs steps corresponding to this function are illustrated in FIG. 5B, to which reference is now made.

After receiving the current time slice data at step 141, the processor proceeds to step 142, where a digital low pass filter is programmably implemented within the DSP 36. The speech signal contained within the current time slice is then passed through this filter. In the preferred embodiment, the filter removes frequencies above 3000 Hz, and the zero crossing rate, as discussed above, is recalculated. This is because certain voiced fricatives have high frequency noise components that tend to raise the zero crossing rate of the signal. For these types of sounds, elimination of the high frequency components will drop the $Z_{CR}$ to a level which corresponds to other voiced sounds. In contrast, if the sound is an unvoiced fricative, then the $Z_{CR}$ will remain largely unchanged and stay at a relatively high level, because the majority of the signal resides at higher frequencies.

Once the new $Z_{CR}$ has been calculated, program step 144 is performed to further evaluate whether the sound is a voiced or an unvoiced fricative. Here, the time slice's absolute minimum amplitude point is located. Once located, the processor 36 computes the slope (i.e., the first derivative) of the line defined between that point and another data point on the waveform that is located a predetermined distance from the minimum point. In the preferred embodiment, that predetermined distance is 50 data points, but other distance values could also be used. For a voiced fricative sound, the slope will be relatively high since the signal is periodic, and thus exhibits a fairly significant change in amplitude. In contrast, for an unvoiced fricative sound the slope will be relatively low because the signal is not periodic and, having been filtered, will be comprised primarily of random noise having a fairly constant amplitude.

Having calculated the $Z_{CR}$ and the slope, the processor 36 proceeds to step 146 and compares the magnitudes to predetermined values corresponding to the threshold of a voiced fricative for most speakers. In the preferred embodiment, if $Z_{CR}$ is less than about 8, and if the slope is greater than about 35, then the sound contained within the time slice is deemed to be voiced, and the corresponding "true" flag is set at step 150. Otherwise, the sound is considered unvoiced, and the "false" flag is set at step 148. Once the appropriate flag is set, the "Is it Voiced" program sequence returns to its calling routine at step 132, shown in FIG. 5A.

Referring again to FIG. 5A at step 134, based on the results of the previous step 132, the appropriate identifier "U" or "V" is placed into the "type" flag of the data structure for that particular time slice. Once it has been determined whether the speech sound contained within the particular time slice is voiced, unvoiced or quiet, and the Higgins data structure has been updated accordingly at steps 122, 126, 130 or 134, the DSP 36 proceeds to step 136 and determines whether the last of the 256 time slices for this particular time segment has been processed. If so, the DSP 36 returns to the main calling routine (illustrated in FIG. 4) as is indicated at step 140. Alternatively, the DSP 36 obtains the next time slice at step 138, and proceeds as described above.

Referring again to FIG. 4, once the "Evaluate Time Domain Parameters" function shown at functional block 102 has been completed, the "Decompose a Speech Signal" portion of the algorithm shown at functional block 104 is performed.

As will be appreciated from the following description, to accurately identify the sound(s) contained within the time segment, additional identifying characteristics must be culled from the signal. Such characteristics relate to the amplitude and frequency each of the various component signals that make up the complex waveform contained within the time slice. This information is obtained by successively filtering the time slice into its various component signals. Previously, this type of "decomposition" was usually accomplished by performing a Fast Fourier Transform on the sound signal. However, this standard approach is not adequate for evaluating user-independent speech in real time. For many sounds, accurate identification of the individual component frequencies is very difficult, if not impossible, due to the spectral leakage that is inherently present in the FFT's output. Also, because the formant signals contained in speech signals are amplitude modulated due to the glottal spectrum dampening and because most speech signals are non-periodic then, by definition, the FFT is an inadequate tool. However, such information is critical to accomplish user-independent speech recognition with the required level in confidence.

To avoid this problem, in the preferred embodiment of the Decompose a Speech Signal algorithm, a FFT is not performed. Instead, the DSP 36 filters the time slice signal into various component filtered signals. As will be described in further detail, frequency domain data can be extracted directly from each of these filtered signals. This data can then be used to determine the characteristics of the specific phoneme contained within the time slice.

Figure 6:
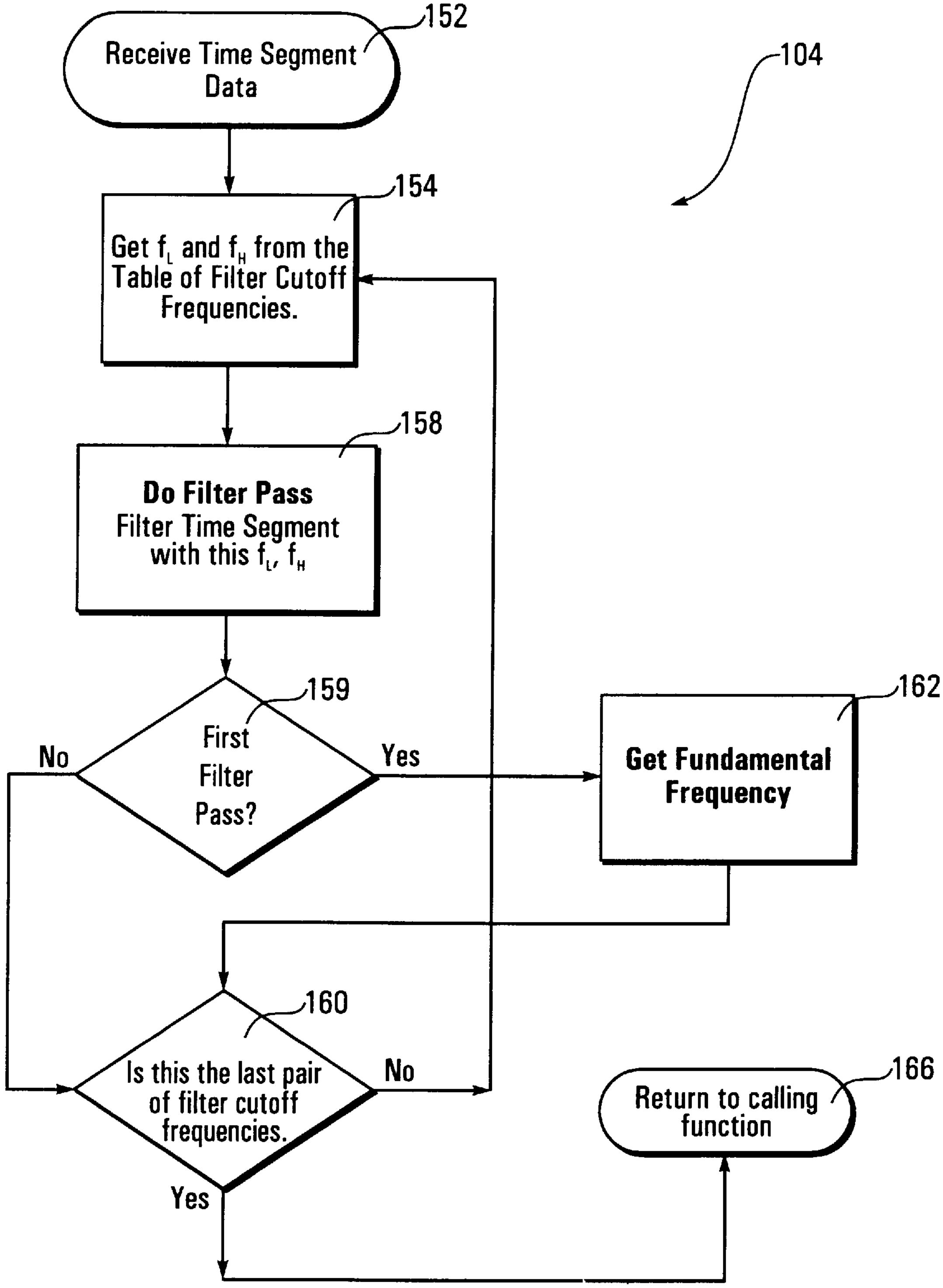
FIGS. 6–6D is a flow-chart illustrating the program method used to implement one of the functional blocks of FIG. 4.

By way of example and not limitation, the detailed program steps used to perform this particular function are shown in the flow chart illustrated in FIG. 6. Referring first to program step 152, the current time segment (10,240 data samples; 232 milliseconds in duration) is received. The program then enters a loop, beginning with step 154, wherein the speech signal contained within the current time segment is successively filtered into its individual component waveforms by using a set of digital bandpass filters having specific frequency bands. In the preferred embodiment, these frequency bands are precalculated, and stored in DSP program memory 40. At step 154, the processor 36 obtains the first filter band, designated as a low frequency ($f_L$) and a high frequency ($f_H$), from this table of predetermined filter cutoff frequencies. In the preferred embodiment, the filter cutoff frequencies are located at: 0 Hz, 250 Hz, 500 Hz, 1000 Hz, 1500 Hz, 2000 Hz, 2500 Hz, 3000 Hz, 3500 Hz, 4000 Hz, 4500 Hz, 5000 Hz, 6000 Hz, 7000 Hz, 8000 Hz, 9000 Hz, and 10,000 Hz. It will be appreciated that different or additional cutoff frequencies could also be used.

Thus, during the first pass through the loop beginning at step 154, $f_L$ will be set to 0 Hz, and $f_H$ to 250 Hz. The second pass through the loop will set $f_L$ to 250 Hz and $f_H$ to 500 Hz, and so on.

Having set the appropriate digital filter parameters, the processor 36 then proceeds to step 158, where the actual filtering of the time segment occurs. To do so, this step invokes another function referred to as "Do Filter Pass," which is shown in further detail in FIG. 6A and to which reference is now made.

At step 168 of function Do Filter Pass, the previously calculated filter parameters, as well as the time segment data is received (10,240 data points). At step 170, the coefficients for the filter are obtained from a predetermined table of coefficients that correspond to each of the different filter bands. Alternatively, the coefficients could be recalculated by the processor 36 for each new filter band.

Having set the filter coefficients, the processor 36 executes program step 172, where the current time segment is loaded into the digital filter. Optionally, rather than loading all data samples, the signal may be decimated and only every nth point loaded, where n is in the range of one to four. Before the signal is decimated, it should be low pass filtered down to a frequency less than or equal to the original sample rate divided by 2*n. At step 174, the filtering operation is performed on the current time segment data. The results of the filtering operation are written into corresponding time segment data locations within DSP data memory 42. Although any one of a variety of different digital filter implementations could be used to filter the data, in the preferred embodiment the digital bandpass filter is an IIR cascade-type filter with a Butterworth response.

Once the filtering operation is complete for the current filter band, the processor 36 proceeds to step 176 where the results of the filtering operation are evaluated. This is performed by the function referred to as "Evaluate Filtered Data," which is shown in further detail in FIG. 6B, to which reference is now made.

At step 182 of Evaluate Filtered Data, a time slice of the previously filtered time segment is received. Proceeding next to step 183, the amplitude of this filtered signal is calculated. The amplitude is calculated using the following equation:

$$\text{Amplitude} = \frac{\text{Max} - \text{Min}}{2}$$

where max = the highest amplitude value in the slice; and min = the lowest amplitude value in the time slice.

At step 184 the frequency of the filtered signal is measured. This is performed by a function called "Measure Frequency of a Filtered Signal," which is shown in further detail in FIG. 6C. Referring to that figure, at step 192 the filtered time slice data is received. At step 194, the processor 36 calculates the slope (i.e., the first derivative) of the filtered signal at each data point. This slope is calculated with reference to the line formed by the previous data point, the data point for which the slope is being calculated, and the data point following it, although other methods could also be used.

Proceeding next to step 196, each of the data point locations corresponding to a slope changing from a positive value to a negative value is located. Zero crossings are determined beginning at the maximum amplitude value in the filtered signal and proceeding for at least three zero crossings. The maximum amplitude value represents the closure of the vocal folds. Taking this frequency measurement after the close of the vocal folds insures the most accurate frequency measurement. At step 198 the average distance between these zero crossing points is calculated. This average distance is the average period size of the signal, and thus the average frequency of the signal contained within this particular time slice can be calculated by dividing the sample rate by this average period. At step 200, the frequency of the signal and the average period size is returned to the calling function "Evaluate Filtered Data." Processing then continues at step 184 in FIG. 6B.

Referring again to that figure, once the frequency of the signal has been determined, at step 186 it is determined whether that frequency falls within the cutoff frequencies of the current filter band. If so, step 188 is executed, wherein the frequency and the amplitude is stored in the "ffreq" and the "ampl" arrays of the time slice's corresponding Higgins data structure. If the frequency does not fall within the cutoff frequencies of the current filter band, then the frequency is discarded and step 190 is executed, thereby causing the DSP 36 to return to the calling function "Do Filter Pass." Processing then continues at step 176 in FIG. 6A.

Figure 6A:
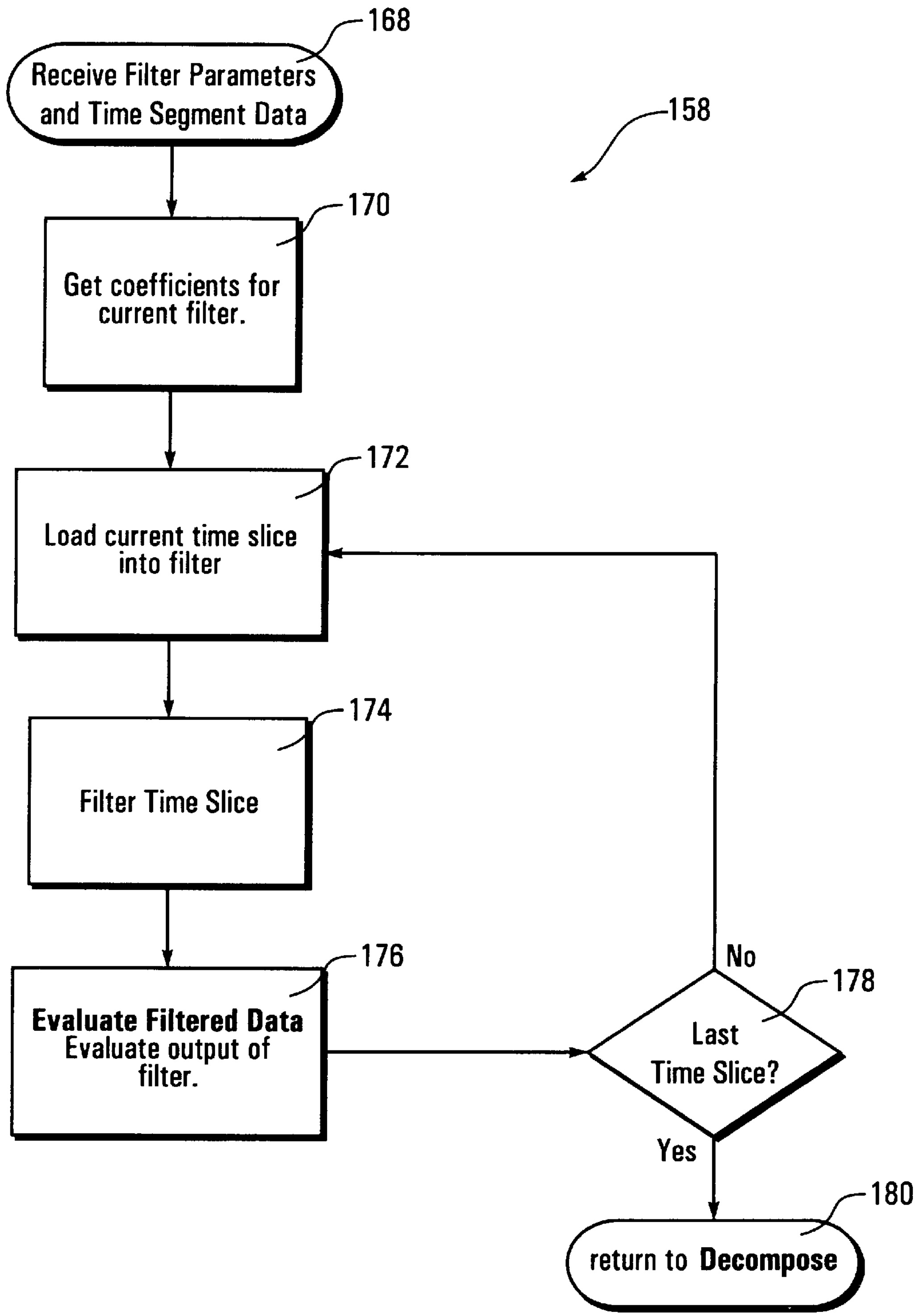
Figure 6B:
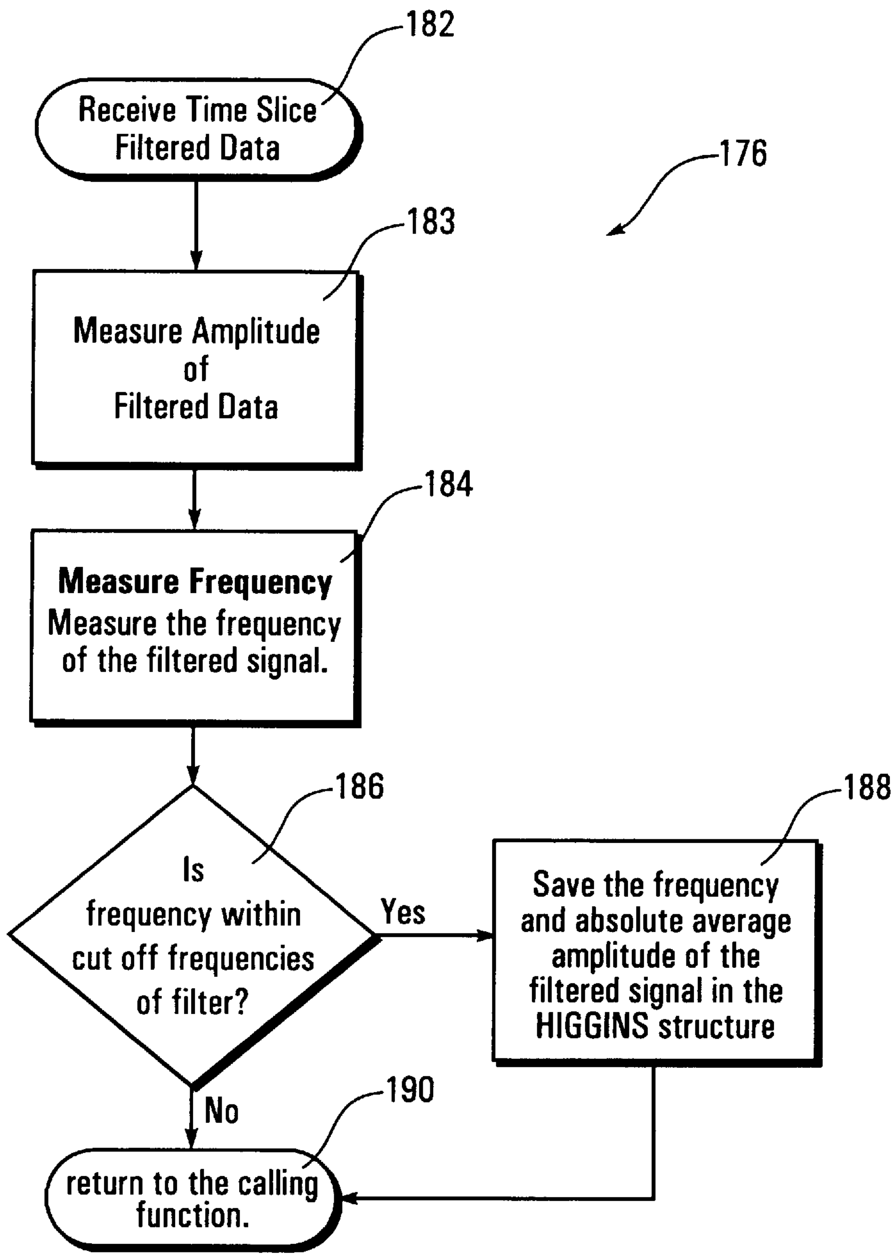
Figure 6C:
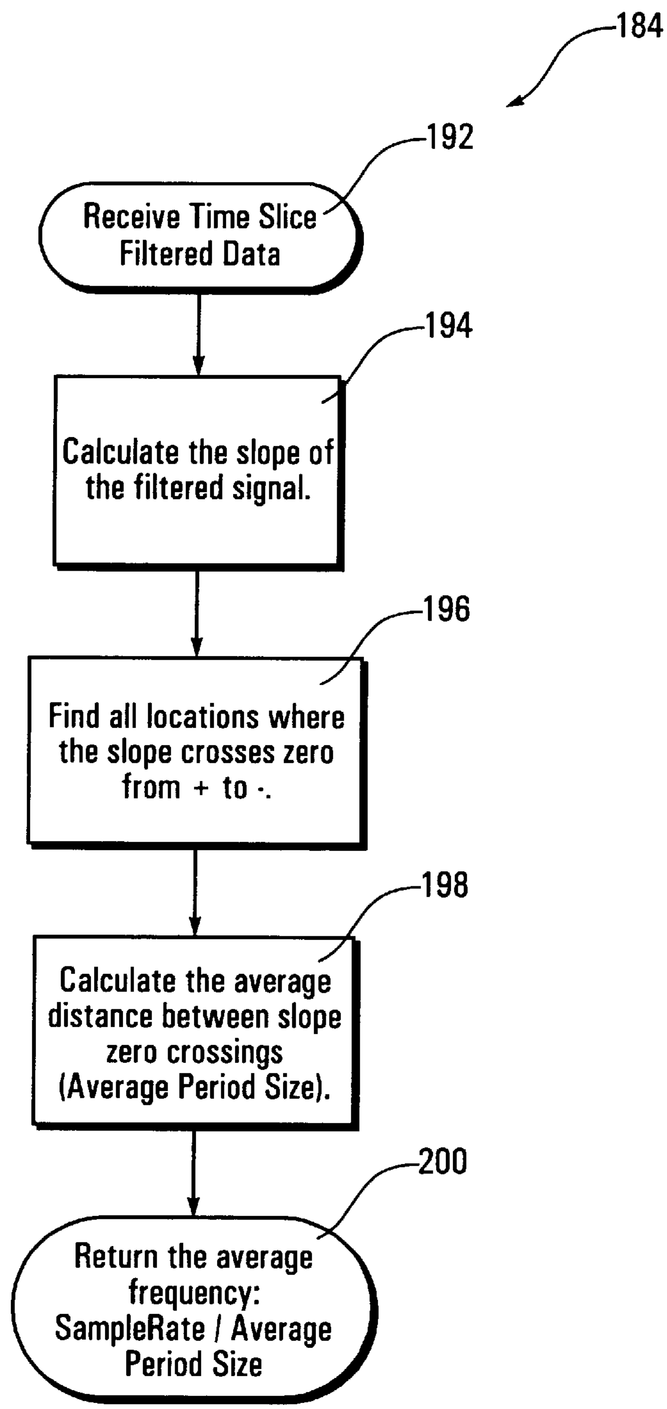

As is shown in FIG. 6A, once the "Evaluate Filter" Function has been performed, and the frequency and amplitude of the current frequency band has been determined, the DSP 36 proceeds next to program step 178. That step checks whether the last time slice has been processed. If not, then the program continues in the loop, and proceeds to program step 176 to again operate the current band filter on the next time slice, as previously described. If the last time slice has been filtered, then step 180 is performed and the processor 36 returns to the "Decompose a Speech Signal" function where processing continues at step 158 in FIG. 6.

Figure 6D:
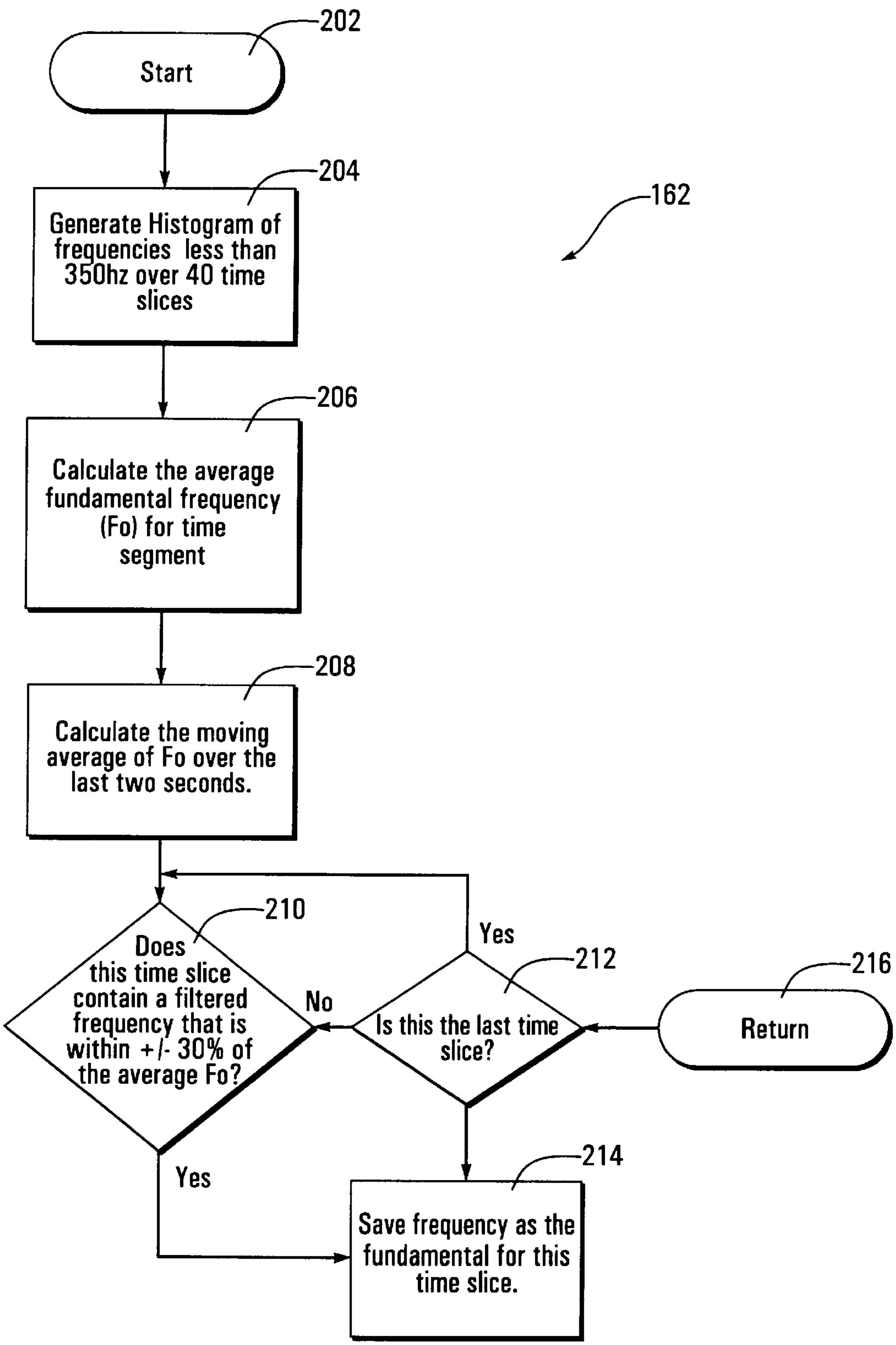

With continued reference to FIG. 6, the processor determines at step 159 if the first filter band has just been used for this time segment. If so, the next step in the process is shown at program step 162. There, a function referred to as "Get Fundamental Frequency" is performed, which is shown in further detail in FIG. 6D, and to which reference is now made.

Beginning at step 202 of that function, the data associated with the current time segment is received. Next, the processor 36 proceeds to program step 204 and identifies, by querying the contents of the respective "ffreq" array locations, which of the time slices have frequency components that are less than 350 Hz. This range of frequencies (0 through 350 Hz) was chosen because the fundamental frequency for most speakers falls somewhere within the range of 70 to 350 Hz. Limiting the search to this range insures that only fundamental frequencies will be located. When a time slice is located that does have a frequency that falls within this range, it is placed in a histogram type data structure. The histogram is broken up into "bins," which correspond to 50 hz blocks within the 0 to 350 Hz range.

Once this histogram has been built, the DSP 36 proceeds to step 206, and determines which bin in the histogram has the greatest number of frequencies located therein. The frequencies contained within that particular bin are then averaged, and the result is the Average Fundamental Frequency ($F_O$) for this particular time segment. This value is then stored in DSP data memory 42.

At step 208, the DSP 36 calculates the "moving" average of the average fundamental frequency, which is calculated to be equal to the average of the $F_O$'s calculated for the previous time segments. In the preferred embodiment, this moving average is calculated by keeping a running average of the previous eight time segment average fundamental frequencies, which corresponds to about two seconds of speech. This moving average can be used by the processor 36 to monitor trends in the speaker's voice, such as a change in volume, and pitch, or even a change in speaker.

Once the average fundamental frequency for the time segment and the moving average of the fundamental frequency has been calculated, the processor 36 then enters a loop to determine whether the individual time slices that make up the current time segment have a fundamental frequency $f_O$ component. This determination is made at step 210, wherein the processor 36, beginning with the first time slice, compares the time slice's various frequency components (previously identified and stored within the ffreq array in the corresponding data structure) to the average fundamental frequency $F_O$ identified in step 206. If one of the frequencies is within about 30% of that value, then that frequency is deemed to be a fundamental frequency of the time slice, and it is stored as a fundamental $f_O$ in the time slice Higgins data structure, as is indicated at program step 214. As is shown at step 212, this comparison is done for each time slice. At step 216, after each time slice has been checked, the DSP 36 returns to the Decompose a Speech Signal routine, and continues processing at step 162 in FIG. 6.

At step 160 in that figure, the processor 36 checks if the last pair of cutoff frequencies ($f_L$ and $f_H$) has yet been used.

If not, the processor 36 continues the loop at step 154, and obtains the next set of cutoff frequencies for the next filter band. The DSP 36 then continues the filtering process as described above until the last of the filter bands has been used to filter each time slice. Thus, each time segment will be filtered at each of the filter bands. When complete, the Higgins data structure for each time slice will have been updated with each a clear identification of the frequency, and its amplitude, contained within each of the various filter bands. Advantageously, the frequency data has thus far been obtained without utilizing an FFT approach, and the problems associated with that tool have thus been avoided.

Once the final pair of cutoff frequencies has been used at step 160, step 166 causes the DSP 36 to execute a return to the main program illustrated in FIG. 4. Having completed the Decompose a Speech Signal portion of the program method, there exists a Higgins Data structure for each time slice. Contained within that structure are various sound characteristics culled from both time domain data and frequency domain data. These characteristics can now be utilized to identify the particular sound, or phoneme, carried by the signal. In the preferred embodiment, the series of program steps used to implement this portion of the program method are stored within the host program memory 58, and are executed by the Host Sound Processor 54.

This first function performed by the host sound processor 54 is illustrated in the block labeled "Point of Maximum Intelligence" shown at item 106 in FIG. 4. In this function, the processor 54 evaluates which of the Higgins data structures are critical to the identification of the phoneme sounds contained within the time segment. This reduces the amount of processing needed to identify a phoneme, and insures that phonemes are accurately identified.

Figure 7:
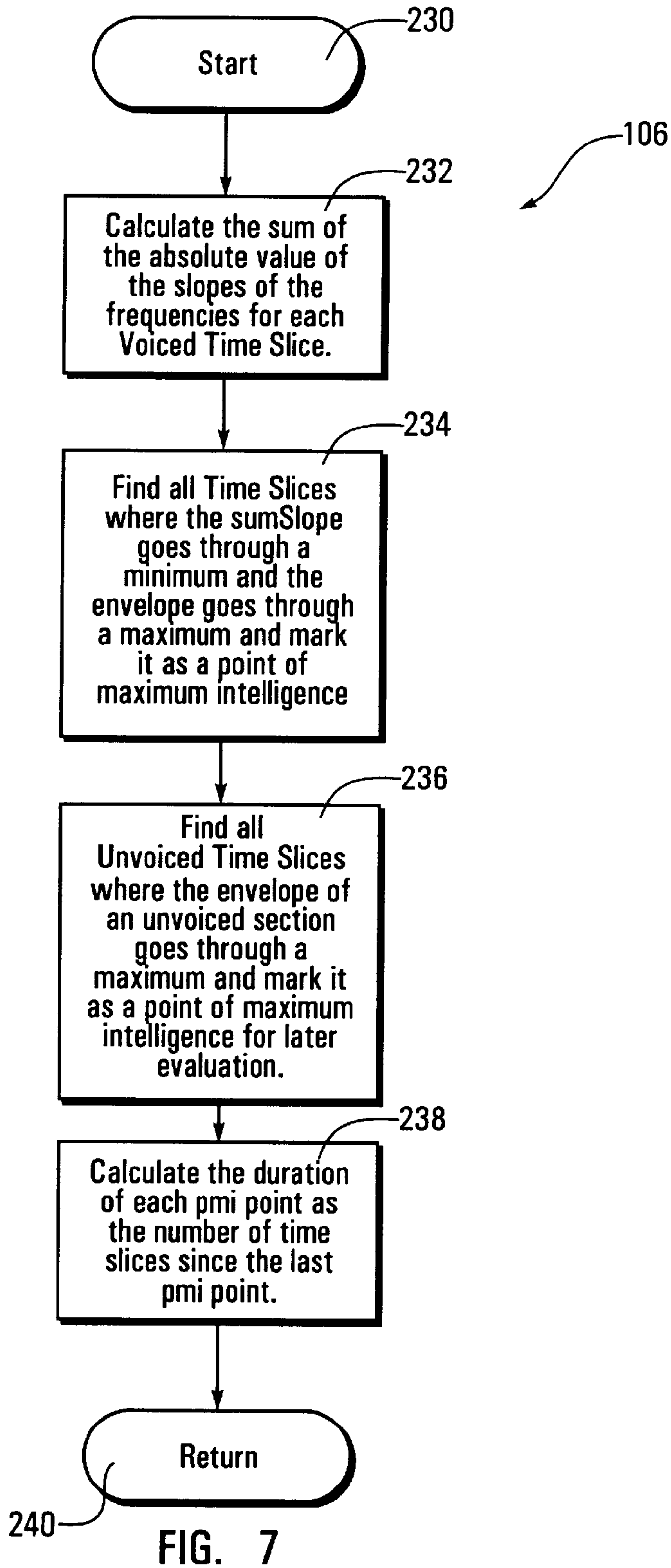
FIG. 7 is a flow-chart illustrating the program method used to implement one of the functional blocks of FIG. 4.

One example of the detailed program steps used to implement this function are shown in FIG. 7, to which reference is now made. The process begins at step 230, where the host sound processor 54 receives each of the Higgins Data Structures for the current time segment via the host interface 52, and stores them within host data memory 60. At step 232, for all time slices containing a voiced sound, the absolute value of the slope of each filtered signal frequency is calculated, and then summed. The slope of a particular filtered signal is preferably calculated with reference to the frequencies of the signals located in the immediately adjacent time slices Thus, for the filtered signal associated with the second frequency band, its slope is calculated by referencing its frequency with the corresponding filter signal frequencies in adjacent time slices (which are located in the second array location of the respective ffreq array). The sum of the absolute value of each filtered signal's slope for a time slice is then stored in the sumSlope variable of each applicable Higgins data structure.

The host processor 54 then proceeds to program step 234. At this step, a search is conducted for those time slices which have a sumSlope value going through a minimum and which also have an average amplitude $L_S$ that goes through a maximum. The time slices which satisfy both of these criteria are time slices where the formant frequencies are changing the least (i.e., minimum slope) and where the sound is at it highest average amplitude (i.e., highest $L_S$), and are thus determined to be the point at which the dynamic sound has most closely reached a static or target sound. Those time slices that satisfy both criteria are identified as "points of maximum intelligence," and the corresponding PMI variable within the Higgins data structure is filled with a PMI value. Other time slices contain frequency components that are merely leading up to this target sound, and thus contain information that is less relevant to the identification of the particular phoneme.

Having identified which "voiced" time slices should be considered "points of maximum intelligence," the same is done for all time slices containing an "unvoiced" sound. This is accomplished at step 236, where each unvoiced time slice having an average amplitude $L_S$ that goes through a maximum is identified as a "point of maximum intelligence." Again, the corresponding PMI variable within the appropriate Higgins data structure is filled with a PMI value.

The host processor 54 then proceeds to program step 238 wherein the "duration" of each time slice identified as a PMI point is determined by calculating the number of time slices that have occurred since the last PMI time slice occurred. This duration value is the actual PMI value that is placed within each time slice data structure that has been identified as being a "point of maximum intelligence." The host processor 54 then returns, as is indicated at step 240, to the main calling routine shown in FIG. 4.

Referring again to that figure, the next functional block performed is the "Evaluate" function, shown at 108. This function analyzes the sound characteristics of each of the time slices identified as points of maximum intelligence, and determines the most likely sounds that occur during these time slices. This is generally accomplished by comparing the measured sound characteristics (i.e., the contents of the Higgins structure) to a set of standard sound characteristics. The sound standards have been compiled by conducting tests on a cross-section of various individual speaker's sound patterns, identifying the characteristics of each of the sounds, and then formulating a table of standard sound characteristics for each of the forty or so phonemes which make up the given language.

Figure 8:
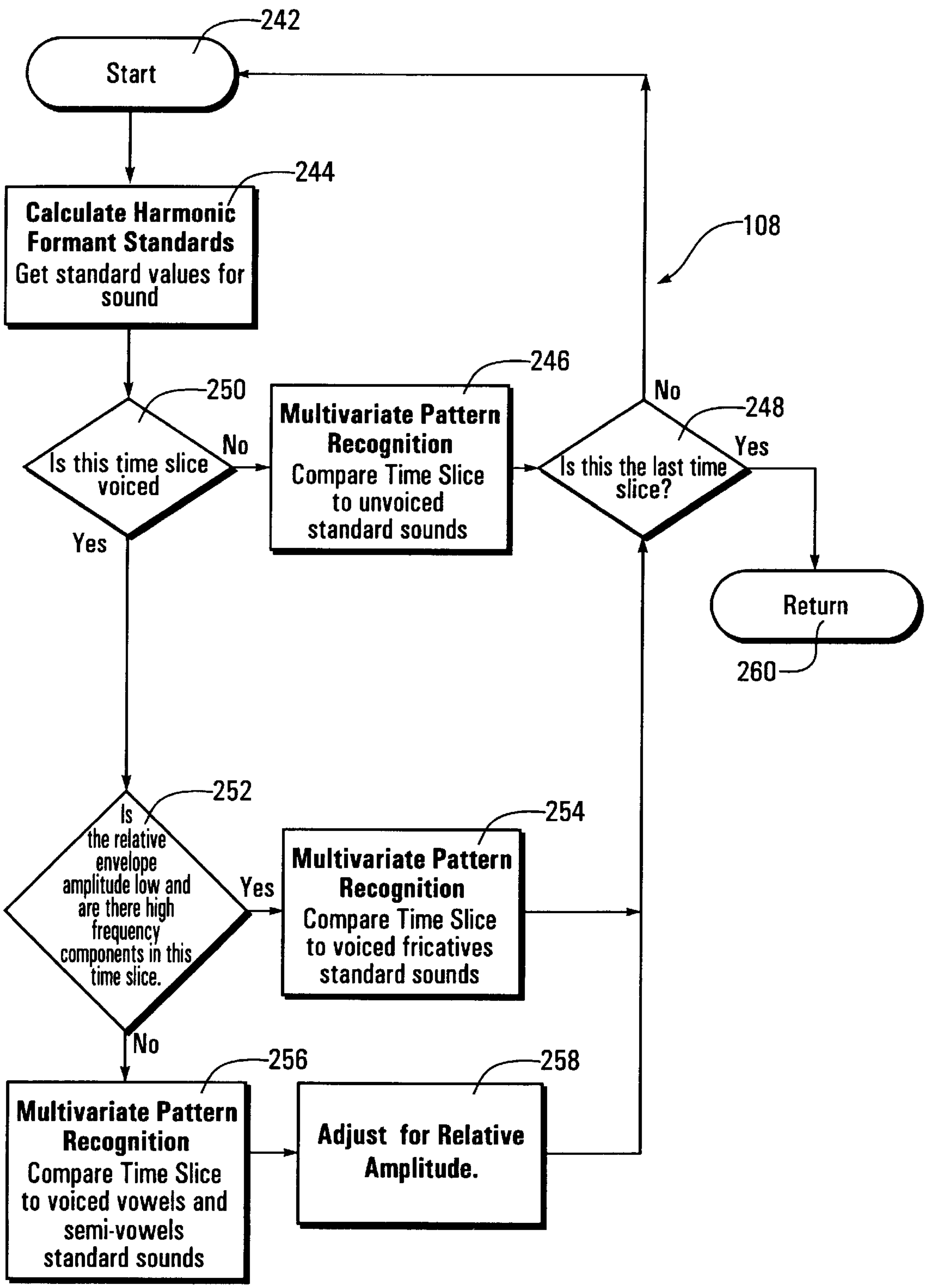
FIGS. 8–8D is a flow-chart illustrating the program method used to implement one of the functional blocks of FIG. 4.

Referring to FIG. 8, one example of the detailed program steps used to implement the Evaluate function are illustrated. Beginning at program step 242, each of the time slices identified as PMI points are received. At step 244, the host processor 54 executes a function referred to as "Calculate Harmonic Formant Standards."

The Calculate Harmonic Formant Standards function operates on the premise that the location of frequencies within any particular sound can be represented in terms of "half-steps." The term half-steps is typically used in the musical context, but it is also a helpful in the analysis of sounds. On a musical or chromatic scale, the frequency of the notes doubles every octave. Since there are twelve notes within an octave, the frequency of two notes are related by the formula:

$$\text{UPPER NOTE}=(\text{LOWER NOTE}) * 2^{n/12},$$

where n is the number of half-steps.

Given two frequencies (or notes), the number of half-steps between them is given by the equation:

$$S=\frac{12*\log\left(\frac{\text{Upper Frequency}}{\text{Lower Frequency}}\right)}{\text{Log}(2)}$$

Thus, the various frequencies within a particular sound can be thought of in terms of a musical scale by calculating the distance between each component frequency and the fundamental frequency in terms of half-steps. This notion is important because it has been found that for any given sound, the distance (i.e. the number of half-steps) between the fundamental frequency and the other component frequencies of the sound are very similar for all speakers—men, women and children.

The Calculate Harmonic Formant Standards function makes use of this phenomania by building a "standard" musical table for all sounds. Specifically, this table includes the relative location of each of the sound's frequency components in terms of their distance from a fundamental frequency, wherein the distance is designated as a number of half-steps. This is done for each phoneme sound. This standard musical table is derived from the signal characteristics that are present in each sound type (phoneme), which are obtained via sample data taken from a cross-section of speakers.

Specifically, voice samples were taken from a representative group of speakers whose fundamental frequencies cover a range of about 70 Hz to about 350 Hz. The voice samples are specifically chosen so that they include all of the forty or so phoneme sounds that make up the English language. Next, the time domain signal for each phoneme sound is2 evaluated, and all of the frequency components are extracted in the manner previously described in the Decompose function using the same frequency bands. Similarly, the amplitudes for each frequency component are also measured. From this data, the number of half steps between the particular phoneme sound's fundamental frequency and each of the sound's component frequencies is determined. This is done for all phoneme sound types. A separate x-y plot can then be prepared for each of the frequency bands for each sound. Each speaker's sample points are plotted, with the speaker's fundamental frequency (in half-steps) on the x-axis, and the distance between the measured band frequency and the fundamental frequency (in half-steps) on the y-axis. A linear regression is then performed on the resulting data, and a resulting "best fit line" drawn through the data points. An example of such a plot is shown in FIGS. 12A–12C, which illustrates the representative data points for the sound "Ah" (PASCII sound 024), for the first three frequency bands (shown as B1, B2 and B3).

Graphs of this type are prepared for all of the phoneme sound types, and the slope and the y-intercept equations for each frequency band for each sound are derived. The results are placed in a tabular format, one preferred example of which is shown in TABLE II in Appendix A. As is shown, this table contains a phoneme sound (indicated as a PASCII value) and, for each of the bandpass frequencies, the slope (m) and the y-intercept (b) of the resulting linear regression line. Also included in the table is the mean of the signal amplitudes for all speakers, divided by the corresponding $L_S$ value, at each particular frequency band. Alternatively, the median amplitude value may be used 21 instead.

Figure 12:
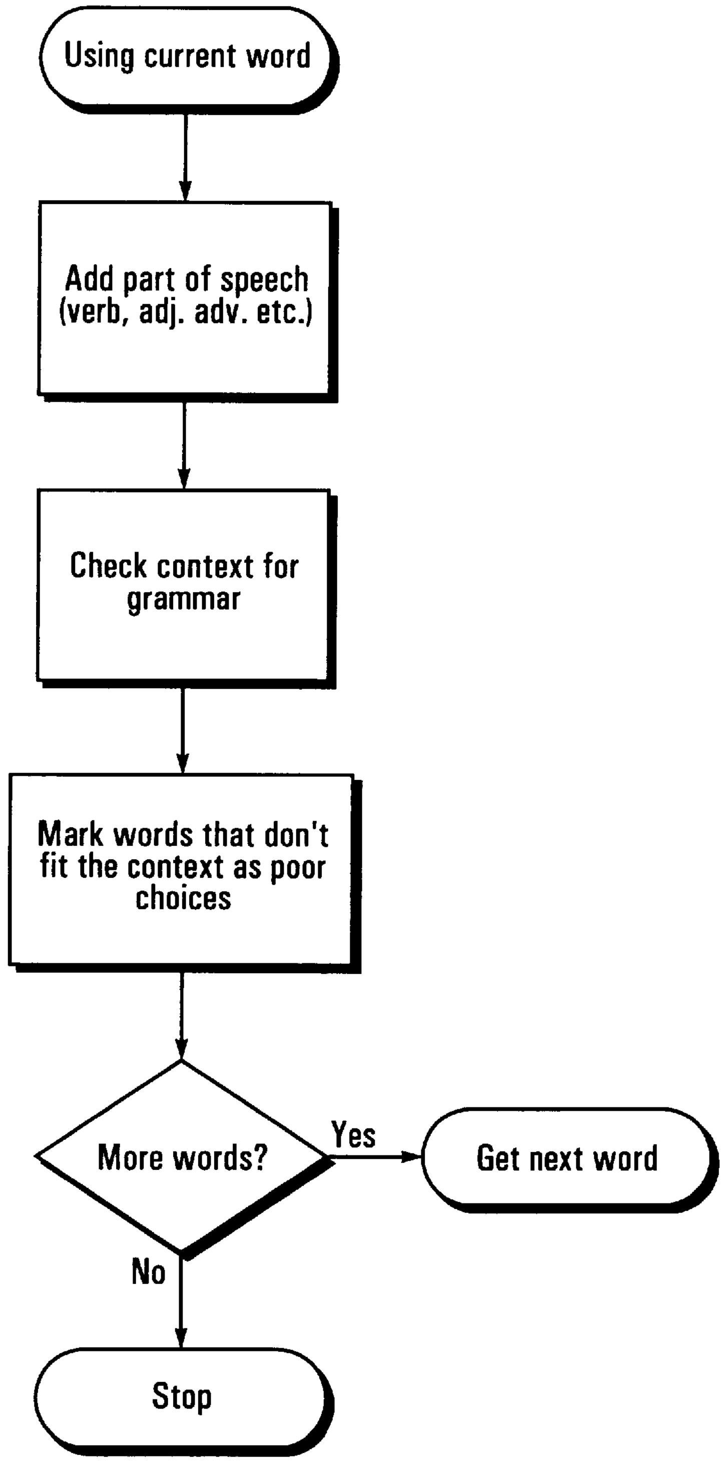
FIGS. 12A–12C are x--y plots of example standard sound data.
Figure 12A:
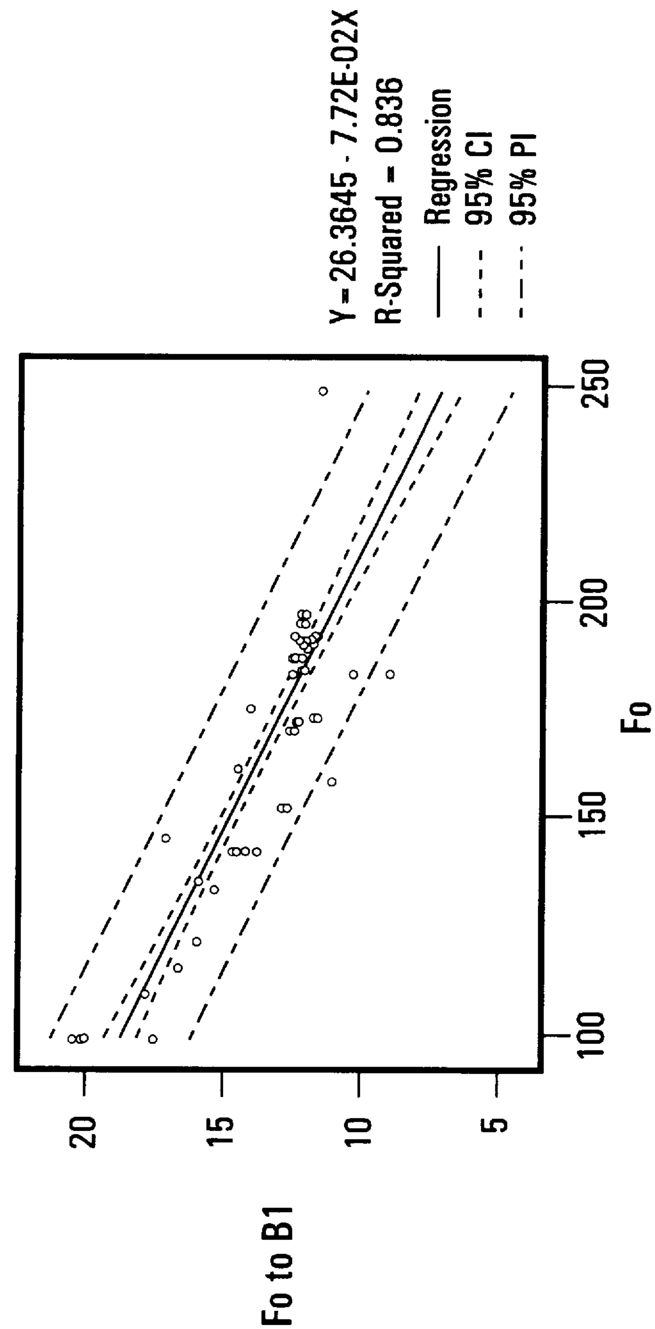
Figure 12B:
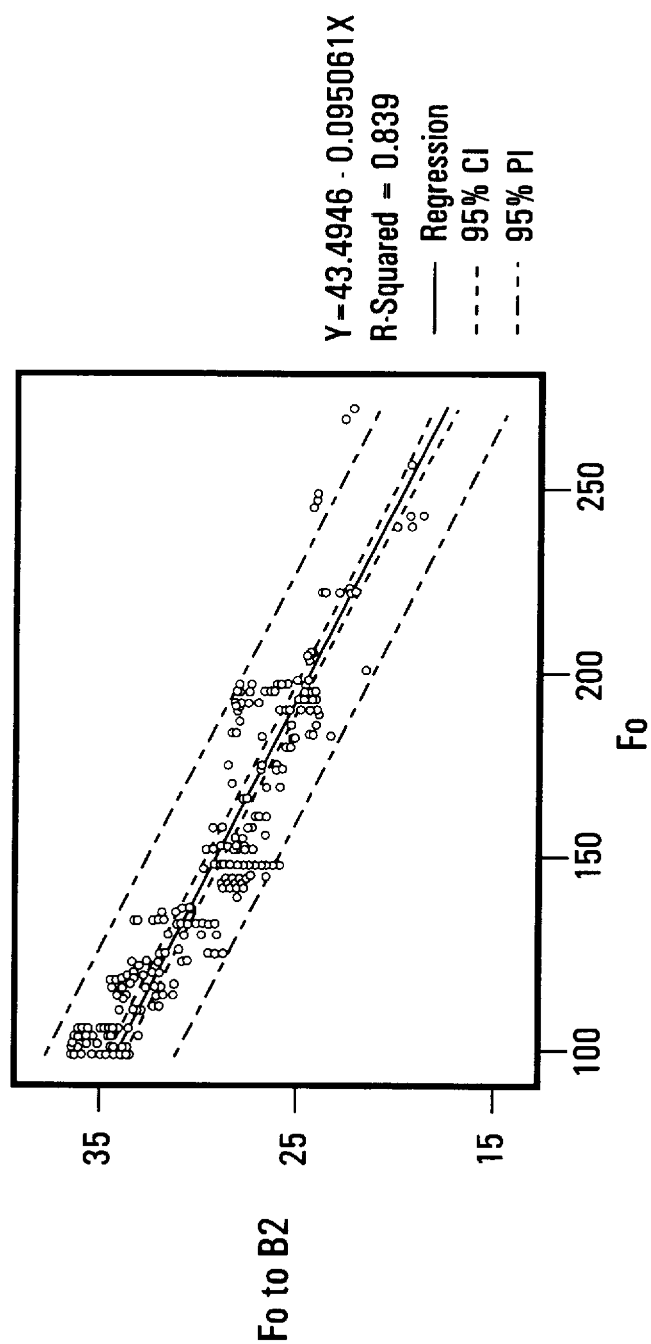
Figure 12C:
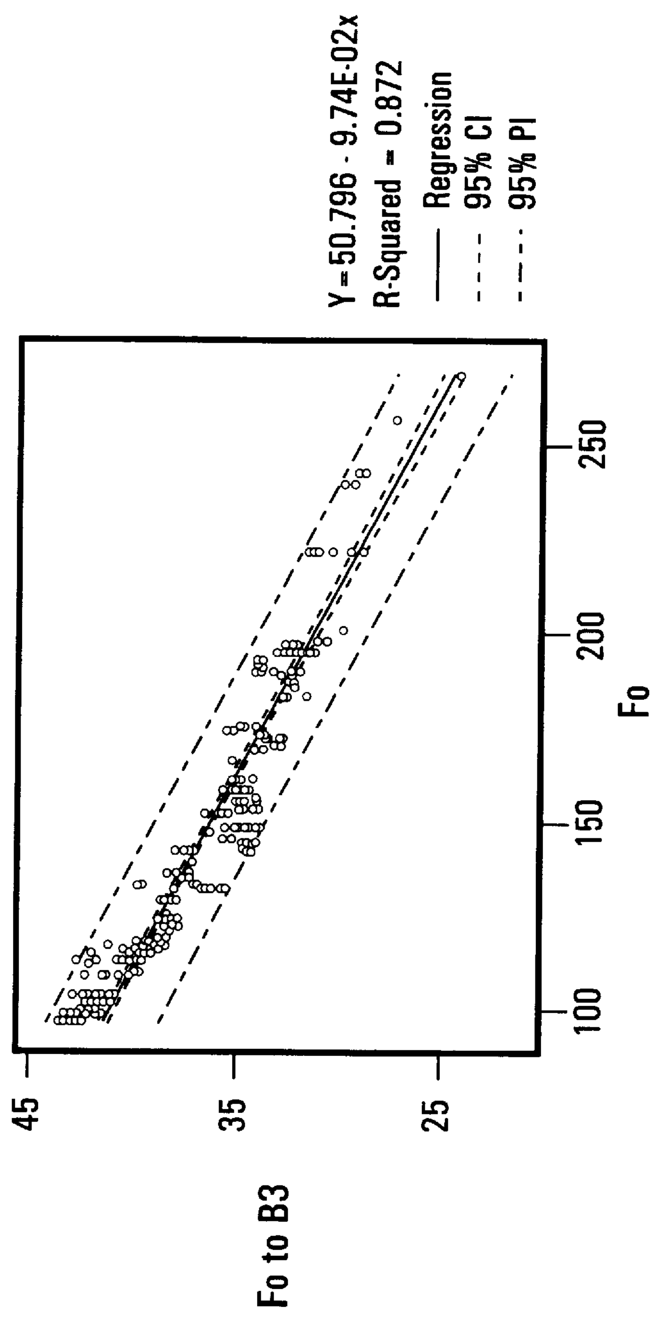

As can be seen from the graph in FIGS. 12A–12C, the data points for each of the speakers in the test group are tightly grouped about the regression line, regardless of the speaker's fundamental frequency. This same pattern exists for most all other sounds as well. Further, the pattern extends to speakers other than those used to generate the sample data. In fact, if the fundamental frequency and the frequency band locations (in half-steps) are known for any given sound generated by any given user, the corresponding sound type (phoneme) can be determined by comparison to these standard values.

The Calculate Harmonic Formant Standards function utilizes this standard sound equations data (TABLE II) to build a representative musical table containing the standard half-step distances for each sound. Importantly, it builds this standards table so that it is correlated to a specific fundamental frequency, and specifically, it uses the fundamental frequency of the time slice currently being evaluated. The function also builds a musical table for the current time slice's measured data (i.e., the Higgins structure $f_O$ and ffreq data). The time slice "measured" data is then compared to the sound "standard" data, and the closest match indicates the likely sound type (phoneme). Since what is being compared is essentially the relative half-step distances between the various frequency components and the fundamental frequency—which for any given sound are consistent for every speaker—the technique insures that the sound is recognized independently of the particular speaker.

Figure 8A:
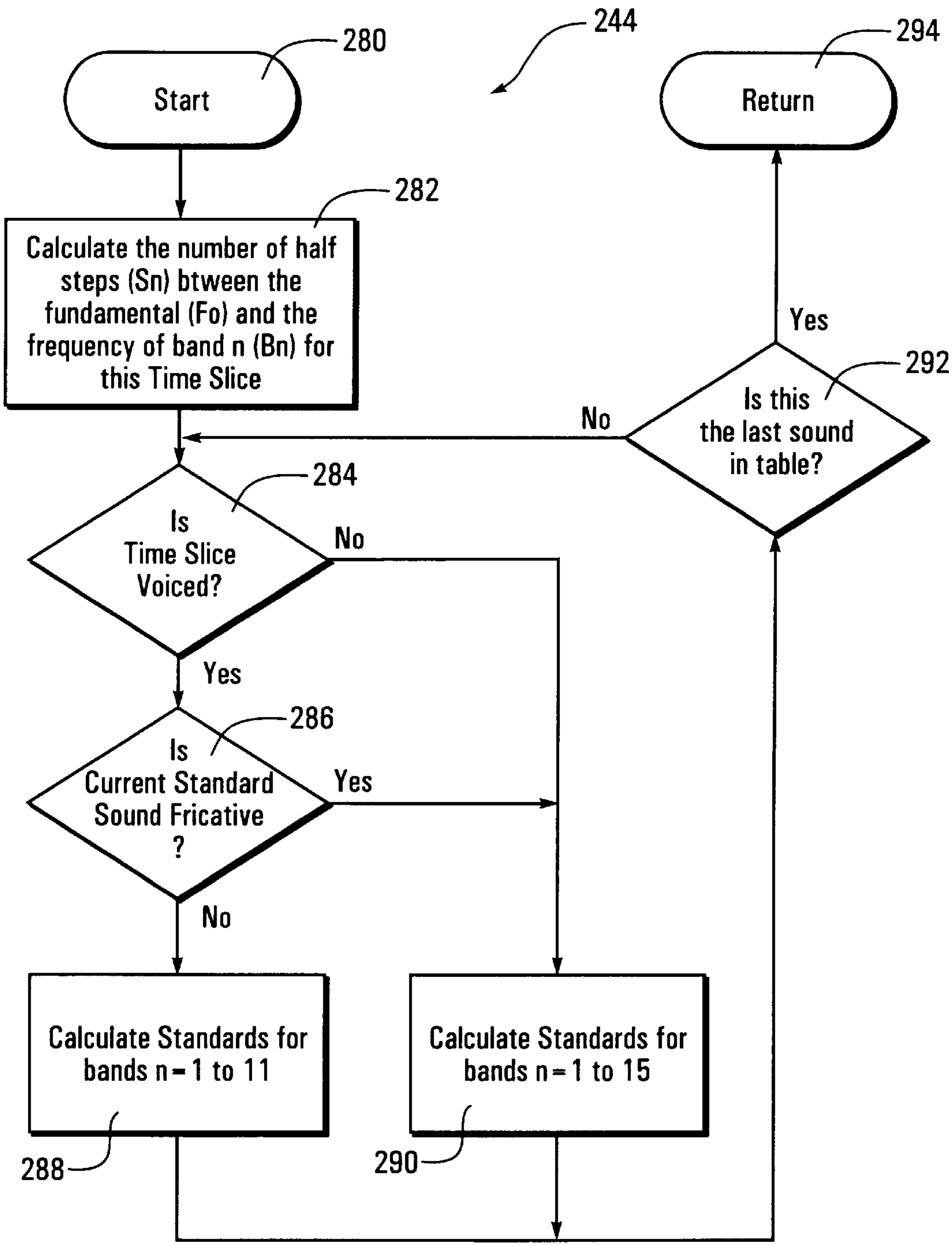

One example of the detailed program steps used to accomplish the "Calculate Harmonic Formant Standards" function is shown in FIG. 8A, to which reference is now made. Beginning at program step 280, the Higgins structure for the current time slice is received. Step 282 then converts that time slice into a musical scale. This is done by calculating the number half-steps each frequency component (identified in the "Decompose" function and stored in the ffreq array) is located from the fundamental frequency. These distances are calculated with the following equation:

$$S_N = \frac{12 * \log\left(\frac{f_N}{f_0}\right)}{60(\log(2))}$$

where N = 1 through 15, corresponding to each of the different frequencies calculated in the Decompose function and stored in the ffreq array for this time slice; and $f_0$ = the fundamental frequency for this time slice, also stored in the Higgins data structure. The value 60 is used to normalize the number of half-steps to an approximate maximum number of half-steps that occur.

The results of the calculation are stored by the host processor 54 as an array in the host processor data memory 60.

Having converted the time slice to the musical scale, the processor 54 next enters a loop to begin building the corresponding sound standards table, so it too is represented in the musical scale. Again, this is accomplished with the standard equations data (TABLE II), which is also stored as an array in host data memory 60.

Beginning at step 284, the host processor 54 obtains the standard equations data for a sound, and queries whether the current time slice contains a voiced sound. If not, the processor 54 proceeds to program step 290, where it calculates the number of half-steps each frequency component (for each of the frequency bands previously identified) is located from the fundamental frequency. The new "standards" are calculated relative to the fundamental frequency of the current time slice. The formula used to calculate these distance is:

$$S_{NST} = \frac{-m * f_0 + b}{60}$$

where m = the slope of the standard equation line previously identified; b = the y-intercept of the standard equation line previously identified; $f_0$ = fundamental frequency of the current time slice; and the value 60 is used to normalize the number of half-steps to an approximate maximum number of half-steps that occur.

This calculation is completed for all 15 of the frequency bands. Note that unvoiced sounds do not have a "fundamental" frequency stored in the data structure's $f_O$ variable. For purposes of program step 290, the frequency value identified in the first frequency band (i.e. contained in the first location of the ffreq array) is used as a "fundamental."

If at step 284 it is determined that the current time slice is voiced, the host sound processor 54 proceeds to program step 286 and queries whether the current standard sound is a fricative. If it is a fricative sound, then the processor 54 proceeds to step 290 to calculate the standards for all of the frequency bands (one through fifteen) in the manner described above.

If the current sound is not a fricative, the host processor 54 proceeds to step 288. At that step, the standards are calculated in the same manner as step 290, but only for the frequency bands 1 through 11.

After the completion of program step 288 or step 290, the processor 54 proceeds to step 292, where it queries whether the final standard sound in the table has been processed for this time slice. If not, the next sound and its associated slope and intercept data are obtained, and the loop beginning at step 284 is re-executed. If no sounds remain, then the new table of standard values, expressed in terms of the musical scale, is complete for the current time slice (which has also been converted to the musical scale). The host processor 54 exits the routine at step 294, and returns to the Evaluate function at step 244 in FIG. 8.

Referring again to that figure, the host processor 54 next executes program step 250 to query whether the current time slice is voiced. If not, the processor 54 executes program step 246, which executes a function referred to as "Multivariate Pattern Recognition." This function merely compares "standard" sound data with "measured"time slice data, and evaluates how closely the two sets of data correspond. In the preferred embodiment, the function is used to compare the frequency (expressed in half-steps) and amplitude components of each of the standard sounds to the frequency (also expressed in half-steps) and amplitude components of the current time slice. A close match indicates that the time slice contains that particular sound (phoneme).

Figure 8B:
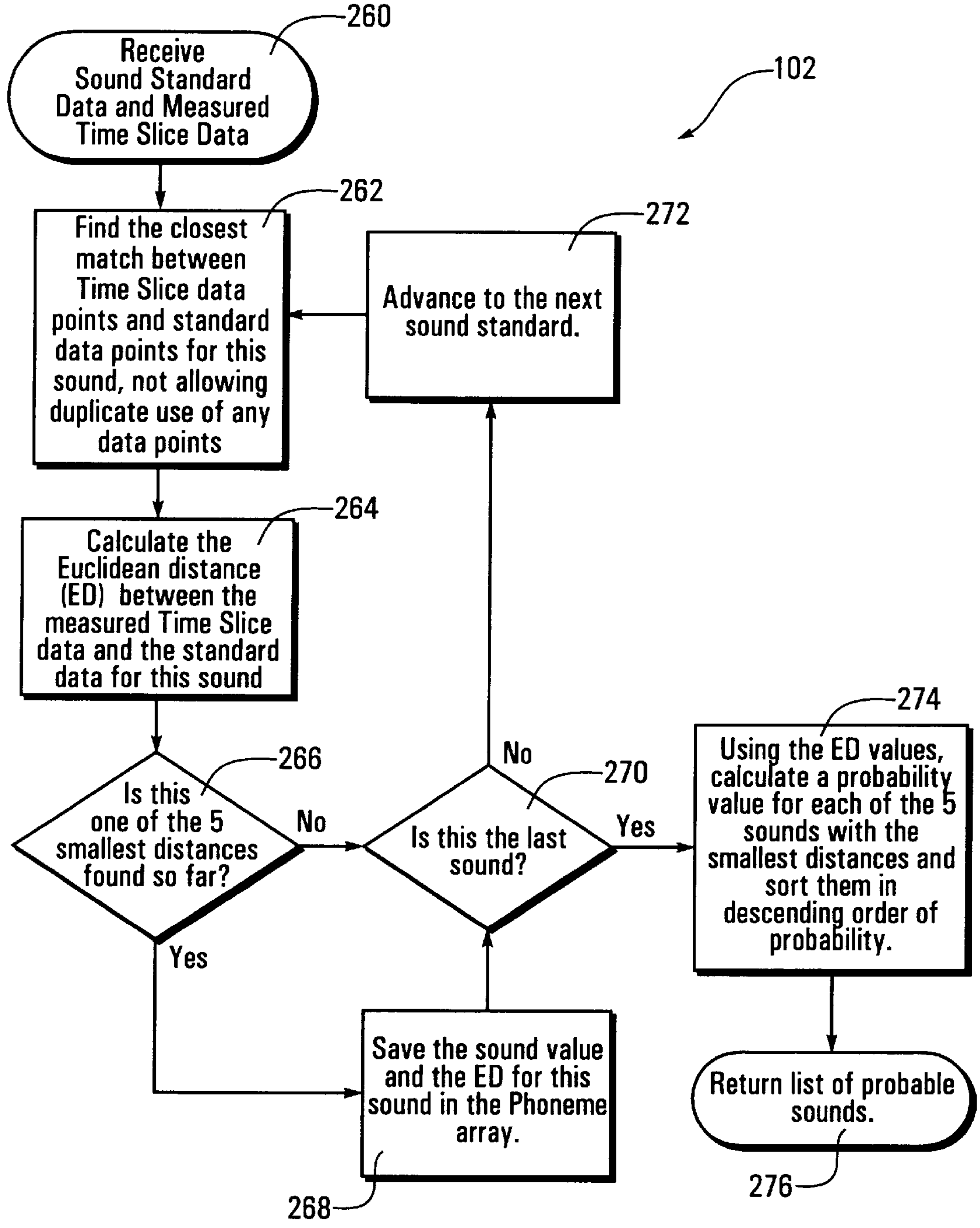

One example of the currently preferred set of program steps used to implement the "Multivariate Pattern Recognition" function is shown in the program flow chart of FIG. 8B, to which reference is now made. Beginning at step 260, an array containing the standard sound frequency component locations and their respective amplitudes, and an array containing the current time slice frequency component locations and their respective amplitudes, are received. Note that the frequency locations are expressed in terms of half-step distances from a fundamental frequency, calculated in the "Calculate Harmonic Formant Standards" function. The standard amplitude values are obtained from the test data previously described, examples of which are shown in TABLE II, and the amplitude components for each time slice are contained in the Higgins structure "amplitude" array, as previously described.

At step 262, the first sound standard contained in the standards array is compared to the corresponding time slice data. Specifically, each time slice frequency and amplitude "data point" is compared to each of the current sound standard frequency and amplitude "data points." The data points that match the closest are then determined.

Next, at program step 264, for the data points that match most closely, the Euclidean distance between the time slice data and the corresponding standard data is calculated. The Euclidean distance (ED) is calculated with the following equation:

$$ED = \sqrt{\sum_{i=1}^{i=n}\left[\left(\frac{\text{standard}(f_i) - \text{measured}(f_i)}{\text{measured}(f_i)}\right)^2 + \left(\frac{\text{standard}(a_i) - \text{measured}(a_i)}{\text{measured}(a_i)}\right)^2\right]}$$

Where n = the number of data points compared; "f" indicates frequency; and "a" indicates amplitude.

At program step 266, this distance is compared to the distances found for other sound standards. If it is one of the five smallest found thus far, the corresponding standard sound is saved in the Higgins structure in the POSSIBLE PHONEMES array at step 268. The processor then proceeds to step 270 to check if this was the last sound standard within the array and, if not, the next standard is obtained at program step 272. The same comparison loop is then performed for the next standard sound. If at step 266 it is found that the calculated Euclidean distance is not one of the five smallest distances already found, then the processor 54 discards that sound as a possibility, and proceeds to step 270 to check if this was the final standard sound within the array. If not, the next sound standard is obtained at program step 272, and the comparison loop is re-executed.

This loop continues to compare the current time slice data to standard sound data until it is determined at step 270 that there are no remaining sound standards for this particular time slice. At that point, step 274 is performed, where each of the sound possibilities previously identified (up to five) are prioritized in descending order of probability. The prioritization is based on the following equation:

$$\text{Probability} = \frac{\left(\frac{SM - ED}{SM}\right)}{\text{NUMBER of values} - 1}$$

where ED = Euclidean Distance calculated for this sound; SM = the sum of all EDs of identified sound possibilities.

The higher the probability value, the more likely that the corresponding sound is the sound contained within the time slice. Once the probabilities for each possible sound have been determined, the processor 54 proceeds to step 276, and returns to the calling routine Evaluate at step 246 in FIG. 8. The Higgins structure now contains an array of the most probable phonemes (up to five) corresponding to this particular time slice. Host Processor 54 then performs step 248 to determine if there is another time slice to evaluate. If there is, the processor 54 reenters the loop at step 242 to obtain the next time slice and continue processing. If no time slices remain, the processor 54 executes step 260 and returns to the main calling routine in FIG. 4.

If at step 250, it was instead determined that the current time slice contained a voiced sound, then the host sound processor 54 proceeds to program step 252. At this step, the host processor 54 determines whether the sound carried in the time slice is a voiced fricative, or if it is another type of voiced sound. This determination is made by inspecting the Relative Amplitude (RA) value and the frequency values contained in the ffreq array. If RA is relatively low, which in the preferred embodiment is any value less than about 65, and if there are any frequency components that are relatively high, which in the preferred embodiment is any frequency above about 6 kHz, then the sound is deemed a voiced fricative, and host 54 proceeds to program step 254. Otherwise, 54 proceeds to program step 256.

Program steps 254 and 256 both invoke the "Multivariate Pattern Recognition" routine, and both return a Higgins structure containing up to five possible sounds, as previously described. After completing program step 254, the host processor 54 will get the next time slice, as is indicated at step 248.

Figure 8C:
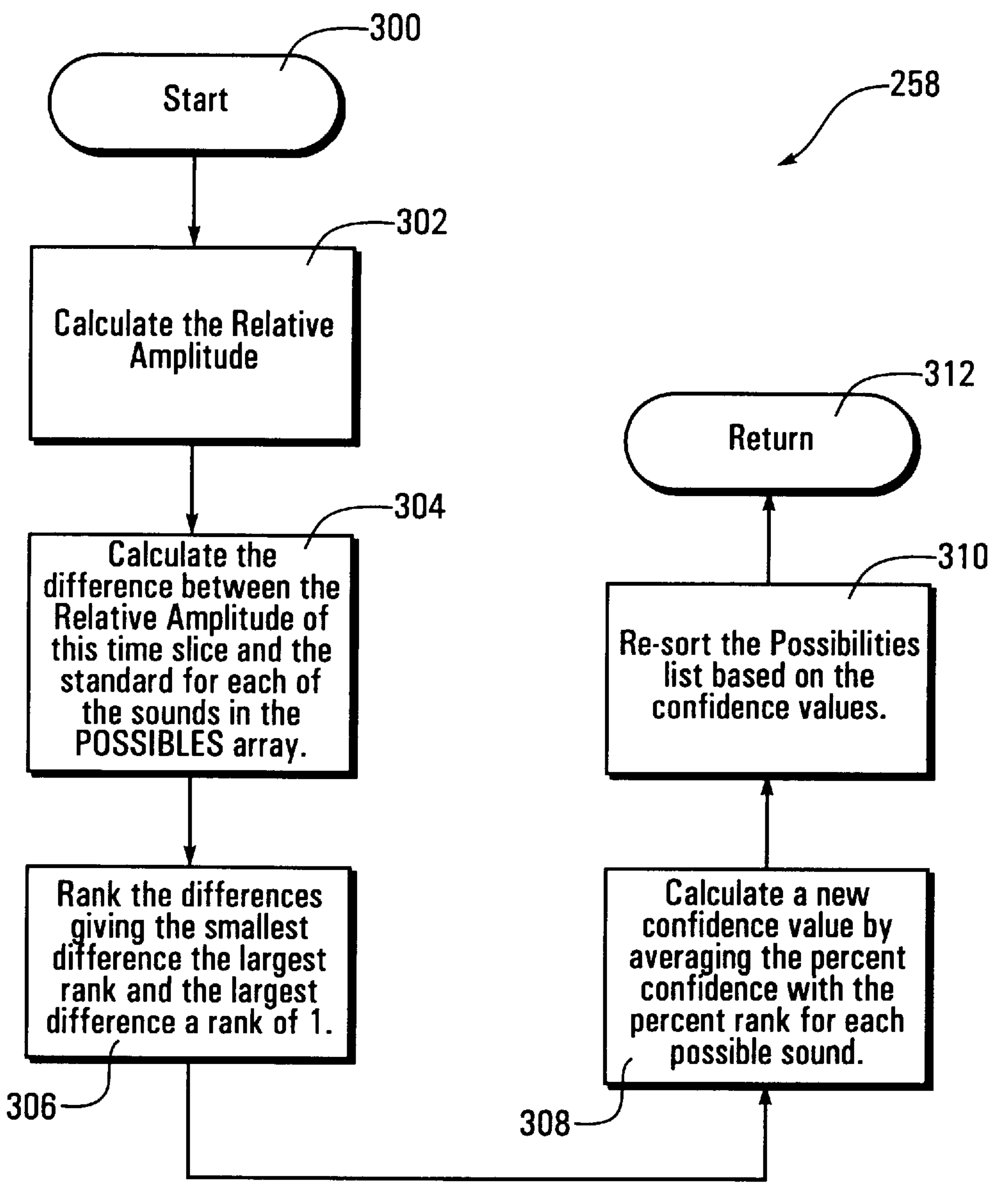

However, when program step 258 is completed, the host processor 54 will execute program step 258, which corresponds to a function referred to as "Adjust for Relative Amplitude." This function assigns new probability levels to each of the possible sounds previously identified by the "Multivariate Pattern Recognition" routine and stored in the Higgins data structure. This adjustment in probability is based on yet another comparison between the time slice data and standard sound data. One example of the presently preferred program steps needed to implement this function is shown in FIG. 8C, to which reference is now made.

Beginning at program step 300, the relative amplitude (RA) for the time slice is calculated using the following formula:

$$RA = \frac{L_s}{\text{MaxAmpl}}$$

where $L_s$ is the absolute average of the amplitude for this time slice stored in the Higgins Structure; and MaxAmpl is the "moving average" over the previous 2 seconds of the maximum $L_S$ for each time segment (10,240 data points) of data.

The host processor 54 then proceeds to program step 304 and calculates the difference between the standard relative amplitude calculated in step 300, and the standard relative amplitude for each of the probable sounds contained in the Higgins data structure. The standard amplitude data is comprised of average amplitudes obtained from a representative cross-sample of speakers, an example of which is shown in TABLE III in the appendix.

Next, at program step 306 the differences are ranked, with the smallest difference having the largest rank, and the largest difference having the smallest rank of one. Proceeding next to program step 308, new probability values for each of the probable sounds are calculated by averaging the previous confidence level with the new percent rank calculated in step 306. At program step 310, the probable sounds are then re-sorted, from most probable to least probable, based on the new confidence values calculated in step 308. At step 312, the host processor 54 returns to the calling routine "Evaluate" at program step 258 in FIG. 8.

Referring again to FIG. 8 having completed the Adjust for Relative Amplitude routine, the host sound processor proceeds to program step 248 and determines whether another time slice remains. If so, the processor 54 reenters the loop at step 242, and processes a new time slice in the same manner as described above. If not, the processor 54 executes step 260 and returns to the main calling routine in FIG. 4.

The next step performed by the sound recognition host processor 54 is shown at block 110 in FIG. 4 and is referred to as the "Compress Phones" function. As already discussed, this function discards those time slices in the current time segment that are not designated "points of maximum intelligence." In addition, it combines any contiguous time slices that represent "quiet" sounds. By eliminating the unnecessary time slices, all that remains are the time slices (and associated Higgins structure data) needed to identify the phonemes contained within the current time segment. This step further reduces overall processing requirements and insures that the system is capable of performing sound recognition in substantially real time.

Figure 9:
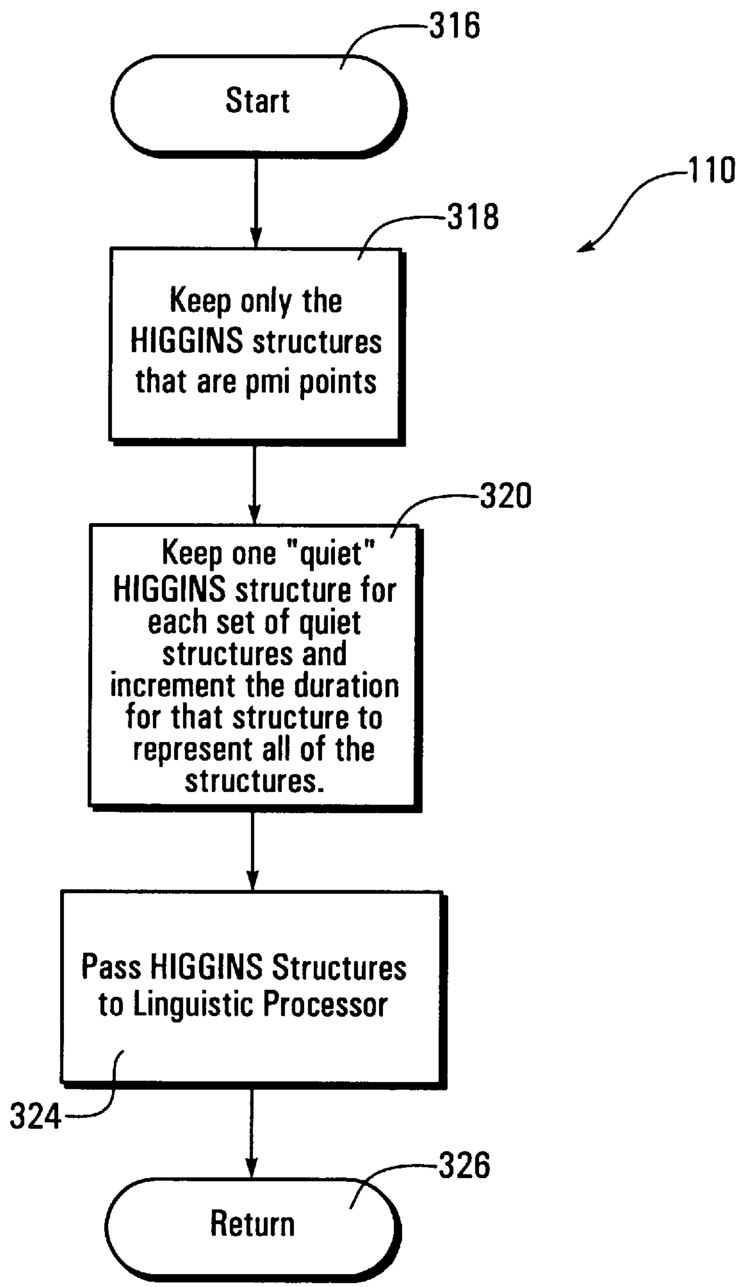
FIG. 9 is a flow-chart illustrating the program method used to implement one of the functional blocks of FIG. 4.

One presently preferred example of the detailed program steps used to implement the "Compress Phones" function is shown in FIG. 9, to which reference is now made. Beginning at program step 316, the host sound processor 54 receives the existing sequence of time slices and the associated Higgins data structures. At program step 318, processor 54 eliminates all Higgins structures that do not contain PMI points. Next, at program step 320 the processor 54 identifies contiguous data structures containing "quiet" sections, and reduces those contiguous sections into a single representative data structure. The PMI duration value in that single data structure is incremented so as to represent all of the contiguous "quiet" structures that were combined.

At this point, there exists in the host processor data memory 60 a continuous stream of Higgins data structures, each of which contains sound characteristic data and the possible phoneme(s) associated therewith. All unnecessary, irrelevant and/or redundant aspects of the time segment have been discarded so that the remaining data stream represents the "essence" of the incoming speech signal. Importantly, these essential characteristics have been culled from the speech signal in a manner that is not dependent on any one particular speaker. Further, they have been extracted in a manner such that the speech signal can be processed in substantially real time—that is, the input can be received and processed at normal rate of speech.

Having reduced the Higgins structure data, the Compress Phones function causes the sound recognition host processor 54 to place that data in host data memory 60 in program step 324. Proceeding next to program step 326, the host sound processor 54 returns to the main portion of the program method in FIG. 4.

As is shown in that figure, the next portion of the program method corresponds to the function referred to as the "Linguistic Processor." The Linguistic Processor is that portion of the method which further analyzes the Higgins structure data and, by applying a series of higher level linguistic processing techniques, identifies the word or phrase that is contained within the current time segment portion of the incoming speech signal.

Figure 10:
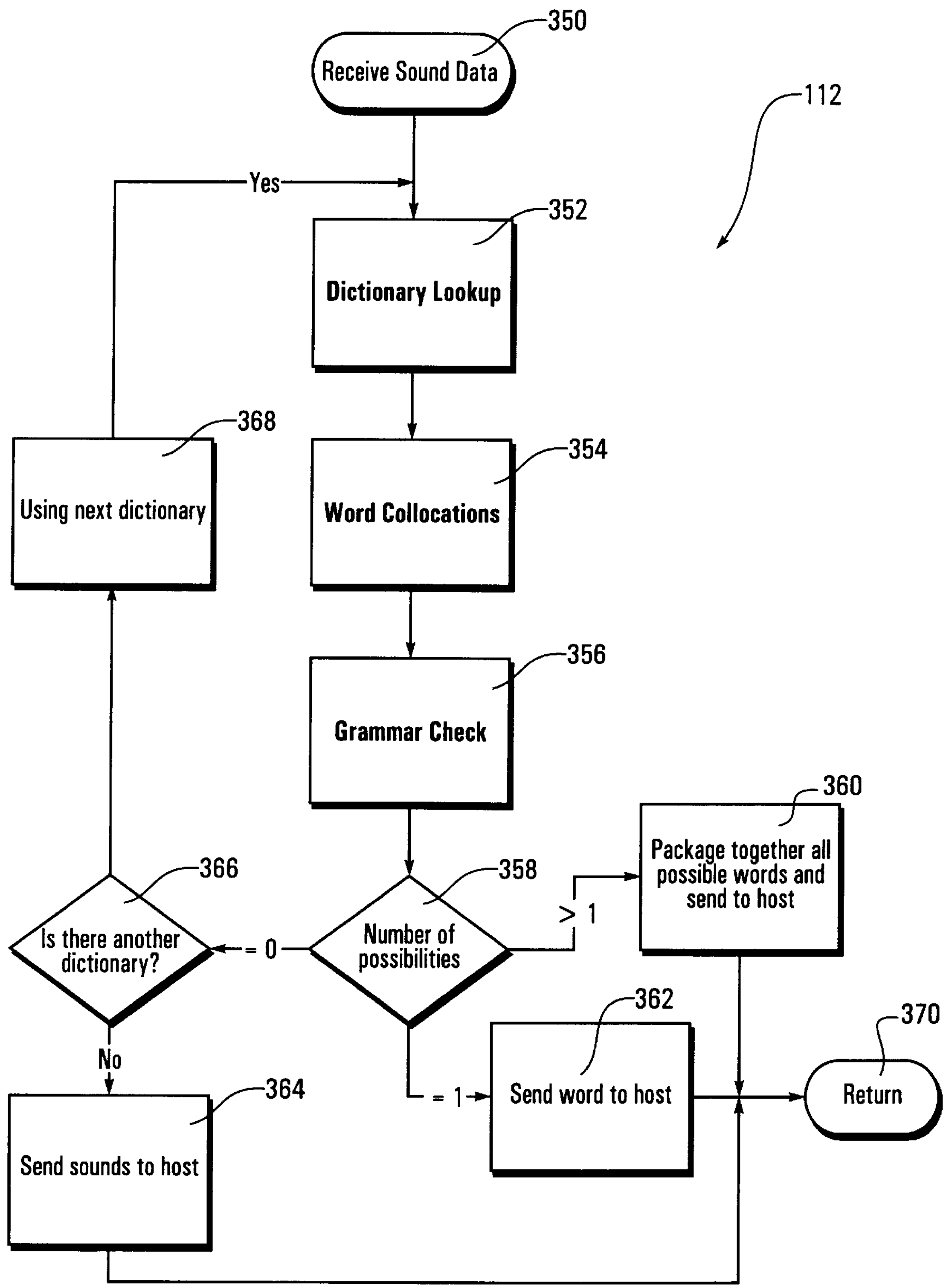
FIGS. 10–10C is a flow-chart illustrating the program method used to implement one of the functional blocks of FIG. 4.

Although alternative linguistic processing techniques and approaches could be used, one presently preferred set of program steps used to implement the Linguistic Processor is shown in the flow chart of FIG. 10. Beginning at program step 350 of that function, the host sound processor 54 receives the set of Higgins structure data created by the previously executed Compress Phones function. As already discussed, this data represents a stream of the possible phonemes contained in the current time segment portion of the incoming speech signal. At program step 352, the processor 54 passes this data to a function referred to as "Dictionary Lookup."

In one preferred embodiment, the Dictionary Lookup function utilizes a phonetic-English dictionary that contains the English spelling of a word along with its corresponding phonetic representation. The dictionary can thus be used to identify the English word that corresponds to a particular stream of phonemes. The dictionary is stored in a suitable database structured format, and is placed within the dictionary portion of computer memory 62. The phonetic dictionary can be logically separated into several separate dictionaries. For instance, in the preferred embodiment, the first dictionary contains a database of the most commonly used English words. Another dictionary may include a database that contains a more comprehensive Webster-like collection of words. Other dictionaries may be comprised of more specialized words, and may vary depending on the particular application. For instance, there may be a user defined dictionary, a medical dictionary, a legal dictionary, and so on.

All languages can be described in terms of a particular set of phonetic sounds. Thus, it will be appreciated that although the preferred embodiment utilizes an English word dictionary, any other phonetic to non-English language dictionary could be used.

Basically, Dictionary Lookup scans the appropriate dictionary to determine if the incoming sequence of sounds (as identified by the Higgins data structures) form a complete word, or the beginnings of a possible word. To do so, the sounds are placed into paths or "sequences" to help detect, by way of the phonetic dictionary, the beginning or end of possible words. Thus, as each phoneme sound is received, it is added to the end of a all non-completed "sequences." Each sequence is compared to the contents of the dictionary to determine if it leads to a possible word. When a valid word (or set of possible words) is identified, it is passed to the next functional block within the Linguistic Processor portion of the program for further analysis.

Figure 10A:
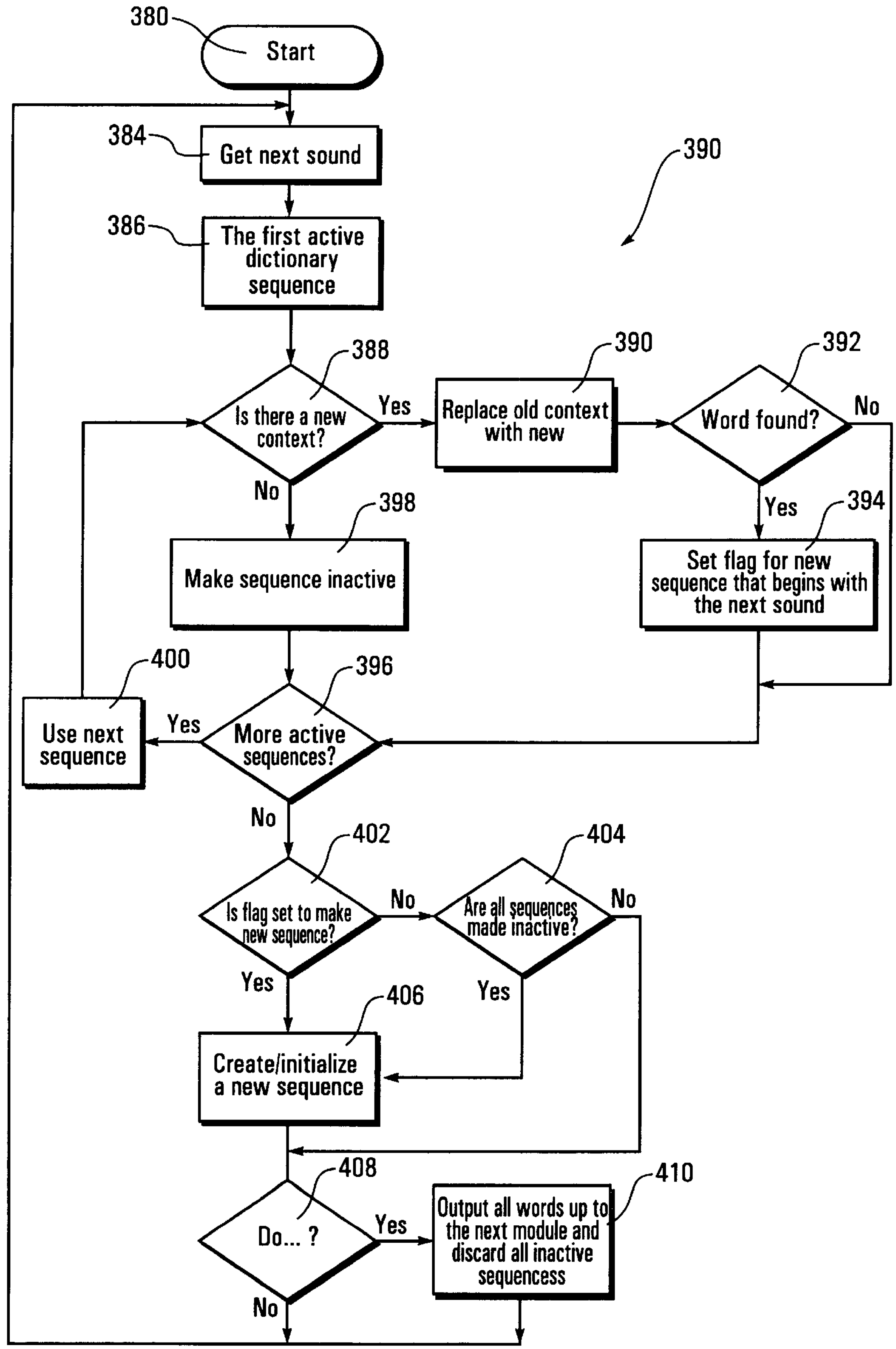

By way of example and not limitation, FIG. 10A illustrates one presently preferred set of program steps used to implement the Dictionary Lookup function. The function begins at program step 380, where it receives the current set of Higgins structures corresponding to the current time segment of speech. At program step 384, the host sound processor 54 obtains a phoneme sound (as represented in a Higgins structure) and proceeds to program step 386 where it positions a search pointer within the current dictionary that corresponds to the first active sequence. An "active" sequence is a sequence that could potentially form a word with the addition of a new sound or sounds. In contrast, a sequence is deemed "inactive" when it is determined that there is no possibility of forming a word with the addition of new sounds.

Thus, at program step 386 the new phonetic sound is appended to the first active sequence. At program step 388, the host processor 54 checks, by scanning the current dictionary contents, whether the current sequence either forms a word, or whether it could potentially form a word by appending another sound(s) to it. If so, the sequence is updated by appending to it the new phonetic sound at program step 390. Next, at program step 392, the host processor determines whether the current sequence forms a valid word. If it does, a 'new sequence' flag is set at program step 394, which indicates that a new sequence should be formed beginning with the very next sound. If a valid word is not yet formed, the processor 54 skips step 394, and proceeds directly to program step 396.

If at step 388 the host processor 54 instead determines, after scanning the dictionary database, that the current sequence would not ever lead to a valid word, even if additional sounds were appended, then the processor 54 proceeds to program step 398. At this step, this sequence is marked "inactive." The processor 54 then proceeds to program step 396.

At step 396, the processor 54 checks if there are any more active sequences to which the current sound should be appended. If so, the processor 54 will proceed to program step 400 and append the sound to this next active sequence. The processor 54 will then re-execute program step 388, and process this newly formed sequence in the same manner described above.

If at program step 396 it is instead determined that there are no remaining active sequences, then host sound processor 54 proceeds to program step 402. There, the 'new sequence' flag is queried to determine if it was set at program step 394, thereby indicating that the previous sound had created a valid word in combination with an active sequence. If set, the processor will proceed to program step 406 and create a new sequence, and then go to program step 408. If not set, the processor 54 will instead proceed to step 404, where it will determine whether all sequences are now inactive If they are, processor 54 will proceed immediately to program step 408, and if not, the processor 54 will instead proceed to step 406 where it will open a new sequence before proceeding to program step 408.

At program step 408, the host sound processor 54 evaluates whether a primary word has been completed, by querying whether all of the inactive sequences, and the first active sequence result in a common word break. If yes, the processor 54 will output all of the valid words that have been identified thus far to the main calling routine portion of the Linguistic Processor. The processor 54 will then discard all of the inactive sequences, and proceed to step 384 to obtain the next Higgins structure sound. If at step 408 it is instead determined that a primary word has not yet been finished, the processor 54 will proceed directly to program step 384 to obtain the next Higgins structure sound. Once a new sound is obtained at step 384, the host processor 54 proceeds directly to step 386 and continues the above described process.

As the Dictionary Lookup function extracts words from the Higgins structure data, there may certain word possibilities that have not yet been resolved. Thus, the Linguistic Processor may optionally include additional functions which further resolve the remaining word possibilities. One such optional function is referred to as the "Word Collocations" function, shown at block 354 in FIG. 10.

Figure 10B:
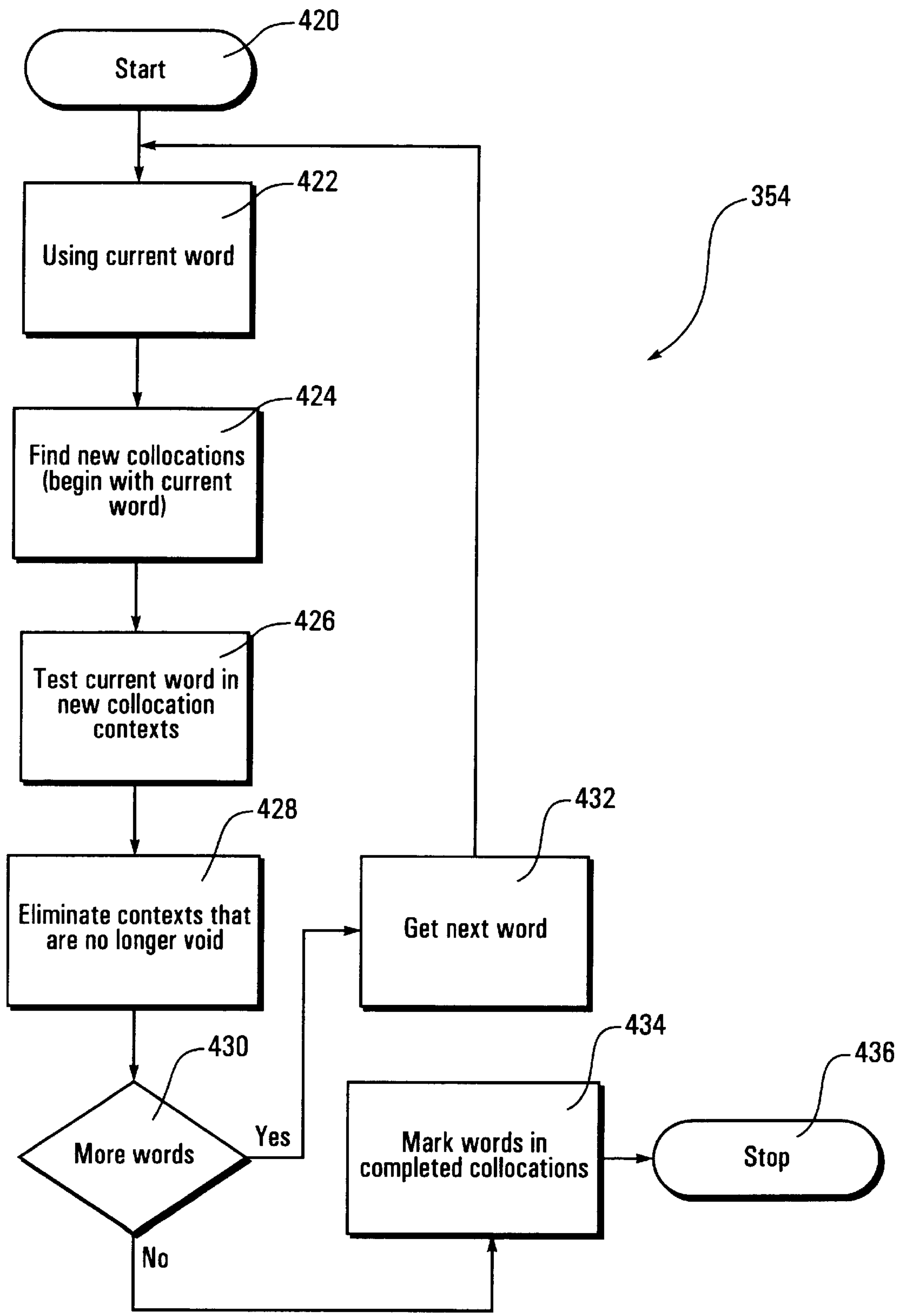

Generally, the Word Collocations function monitors the word possibilities that have been identified by the Dictionary Lookup function to see if they form a "common" word collocation. A set of these common word collocations are stored in a separate dictionary database within dictionary memory 64. In this way, certain word possibilities can be eliminated, or at least assigned lower confidence levels, because they do not fit within what is otherwise considered a common word collocation. One presently preferred example of the program steps used to implement this particular function are shown, by way of example and not limitation, in Figure 10B, to which reference is now made.

Beginning at program step 420, a set of word possibilities are received. Beginning with one of those words at step 422, the host sound processor 54 next proceeds to program step 424 where it obtains any collocation(s) that have been formed by preceding words. The existence of such collocations would be determined by continuously comparing words and phrases to the collocation dictionary contents. If such a collocation or collocations exist, then the current word possibility is tested to see if it fits within the collocation context. At step 428, those collocations which no longer apply are discarded. The processor 54 then proceeds to step 430 to determine if any word possibilities remain, and if so, the remaining word(s) is also tested within the collocation context beginning at program step 422.

Once this process has been applied to all word possibilities, the processor 54 identifies which word, or words, were found to "fit" within the collocation, before returning, via program step 436, to the main Linguistic Processor routine. Based on the results of the Collocation routine, certain of the remaining word possibilities can then be eliminated, or at least assigned a lower confidence level.

Another optional function that can be used to resolve remaining word possibilities is the "Grammar Check" function, shown at block 356 in FIG. 10. This function evaluates a word possibility by applying certain grammatical rules, and then determining whether the word complies with those rules. Words that do not grammatically fit can be eliminated as possibilities, or assigned lower confidence levels.

Figure 10C:
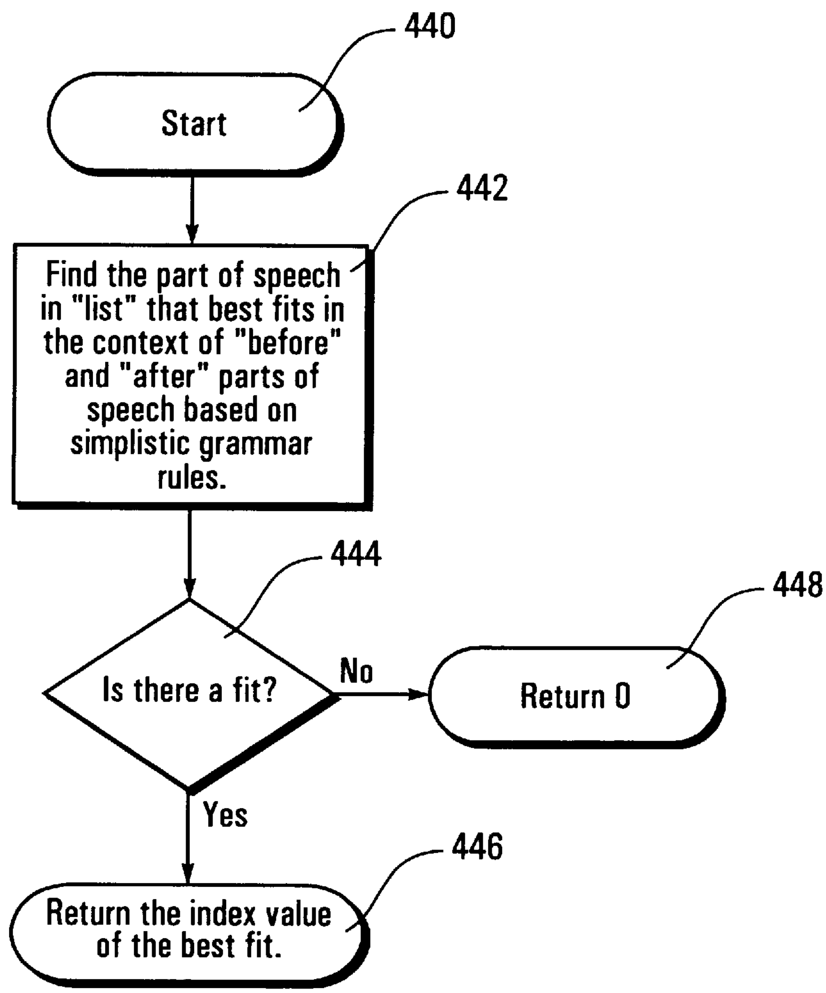

By way of example, the Grammar Check function can be implemented with the program steps that are shown in FIG. 10C. Thus, at step 440, a current word possibility along with a preceding word and a following word are received. Then at step 442, a set of grammar rules, stored in a portion of host sound processor memory, are queried to determine what "part of speech" would best fit in the grammatical context of the preceding word and the following word. If the current word possibility matches this "part of speech" at step 444, then that word is assigned a higher confidence level before returning to the Linguistic Processor at step 446. If the current word does not comply with the grammatical "best fit" at step 444, then it is assigned a low confidence level and returned to the main routine at step 446. Again, this confidence level can then be used to further eliminate remaining word possibilities.

Referring again to FIG. 10, having completed the various functions which identify the word content of the incoming speech signal, the Linguistic Processor function causes the host sound processor 54 to determine the number of word possibilities that still exist for any given series of Higgins structures.

If no word possibilities have yet been identified, then the processor 54 will determine, at program step 366, if there remains a phonetic dictionary database (i.e., a specialized dictionary, a user defined dictionary, etc.) that has not yet been searched. If so, the processor 54 will obtain the new dictionary at step 368, and then re-execute the searching algorithm beginning at program step 352. If however no dictionaries remain, then the corresponding unidentified series of phoneme sounds (the unidentified "word") will be sent directly to the Command Processor portion of the program method, which resides on Host computer 22.

If at program step 358 more than one word possibility still remains, the remaining words are all sent to the Command Processor. Similarly, if only one word possibility remains, that word is sent to the directly to the Command Processor portion of the algorithm. Having output the word, or possible words, program step 370 causes the host sound processor 54 to return to the main algorithm, shown on FIG. 4.

As words are extracted from the incoming speech signal by the Linguistic Processor, they are immediately passed to the next function in the overall program method referred to as the "Command Processor," shown at function block 114 in FIG. 4. In the preferred embodiment, the Command Processor is a series of program steps that are executed by a Host Computer 22, such as a standard desktop personal computer. As already noted, the host computer 22 receives the incoming words by way of a suitable communications medium, such as a standard RS-232 cable 24 and interface 66. The Command Processor then receives each word, and determines the manner by which it should be used on the host computer 22. For example, a spoken word may be input as text directly into an application, such as a wordprocessor document. Conversely, the spoken word may be passed as a command to the operating system or application.

Figure 11:
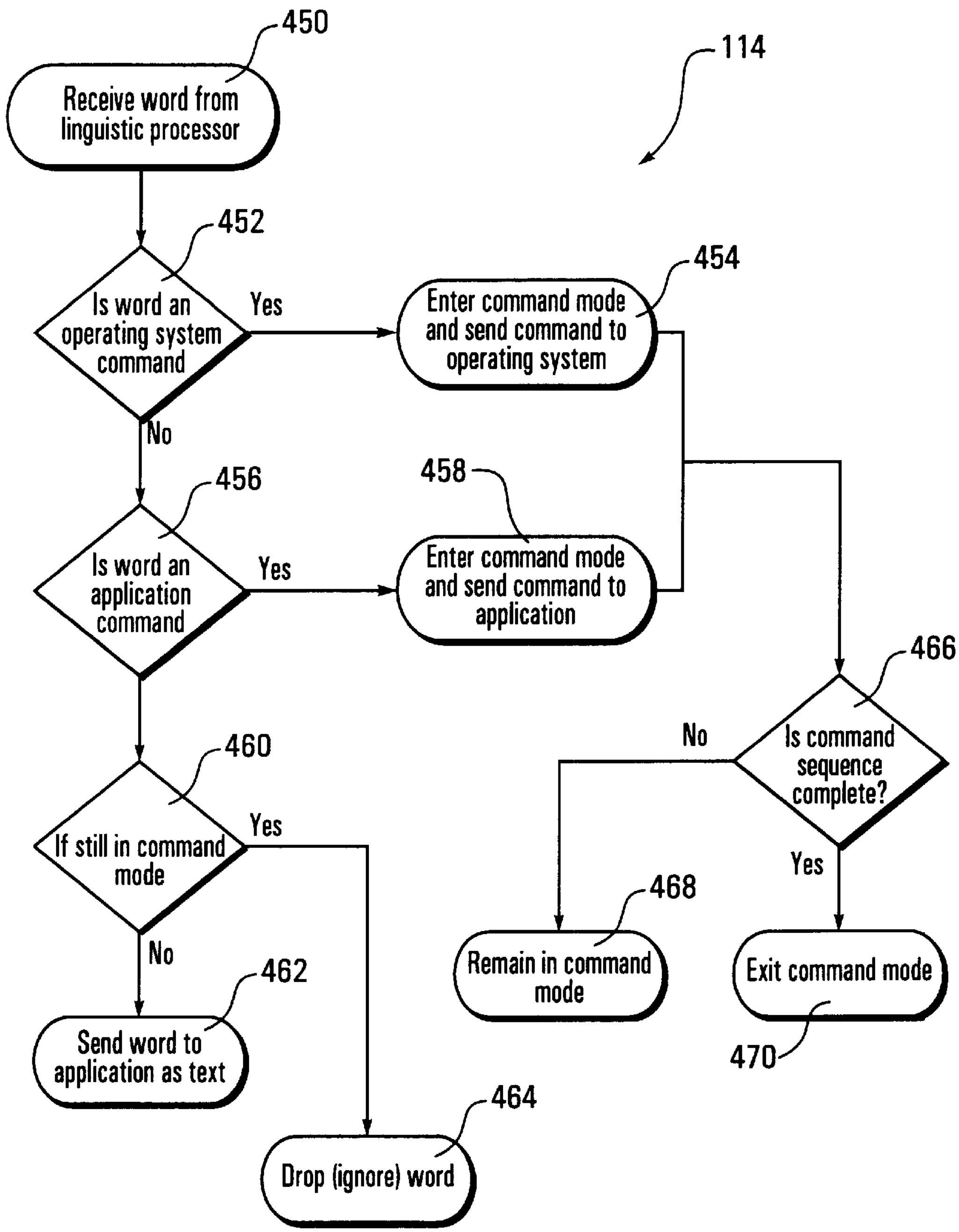
FIG. 11 is a flow-chart illustrating the program method used to implement one of the functional blocks of FIG. 4.

Referring next to FIG. 11, illustrated is one preferred example of the program steps used to implement the Command Processor function. To begin, program step 450 causes the host computer 22 to receive a word created by the Linguistic Processor portion of the algorithm. The host computer 22 then determines, at step 452, whether the word received is an operating system command. This is done by comparing the word to the contents of a definition file database, which defines all words that constitute operating system commands. If such a command word is received, it is passed directly to the host computer 22 operating system, as is shown at program step 454.

If the incoming word does not constitute an operating system command, step 456 is executed, where it is determined if the word is instead an application command, as for instance a command to a wordprocessor or spreadsheet. Again, this determination is made by comparing the word to another definition file database, which defines all words that constitute an application command. If the word is an application command word, then it is passed directly, at step 458, to the intended application.

If the incoming word is neither a operating system command, or an application command, then program step 460 is executed, where it is determined whether the Command Processor is still in a "command mode." If so, the word is discarded at step 464, and essentially ignored. However, if the Command Processor is not in a command mode, then the word will be sent directly to the current application as text.

Once a word is passed as a command to either the operating system or application at program steps 454 and 458, the host computer 22 proceeds to program step 466 to determine whether the particular command sequence is yet complete. If not, the algorithm remains in a "command mode," and continues to monitor incoming words so as to pass them as commands directly to the respective operating system or application. If the command sequence is complete at step 466, then the algorithm will exit the command mode at program step 470.

In this way, the Command Processor acts as a front-end to the operating system and/or to the applications that are executing on the host computer 22. As each new word is received, it is selectively directed to the appropriate computer resource. Operating in this manner, the system and method of the current invention act as a means for entering data and/or commands to a standard personal computer. As such, the system essentially replaces, or supplements other computer input devices, such as keyboards and pointing devices.

Attached hereto at Appendix B, and incorporated herein by reference, is an example of a computer program listing written in the "C" programming language, which serves to illustrate one way in which the method of the present invention was implemented to perform real-time, user-independent speech recognition. It should be recognized that the system and method of the present invention are not intended to be limited by the program listing contained in Appendix B, which is merely an illustrative example, and that the method could be implemented using virtually any other programming language other than "C."

III. Summary and Scope of the Invention

In summary, the system and method of the present invention for speech recognition provides a powerful and much needed tool for providing user independent speech recognition. Importantly, the system and method extracts only the essential components of an incoming speech signal. The system then isolates those components in a manner such that the underlying sound characteristics that are common to all speakers can be identified, and thereby used to accurately identify the phonetic make-up of the speech signal. This permits the system and method to recognize speech utterances from any speaker of a given language, without requiring the user to first "train" the system with specific voice characteristics.

Further, the system and method implements this user independent speech recognition in a manner such that it occurs in substantially "real time." As such, the user can speak at normal conversational speeds, and is not required to pause between each word.

Finally, the system utilizes various linguistic processing techniques to translate the identified phonetic sounds into a corresponding word or phrase, of any given language. Once the phonetic stream is identified, the system is capable of recognizing a large vocabulary of words and phrases.

While the system and method of the present invention has been described in the context of the presently preferred embodiment and the examples illustrated and described herein, the invention may be embodied in other specific ways or in other specific forms without departing from its spirit or essential characteristics. Therefore, the described embodiments and examples are to be considered in all respects only as illustrative and not restrictive. The scope of the invention is, therefore, indicated by the appended claims rather than by the foregoing description, and all changes which come within the meaning and range of equivalency of the claims are to be embraced within their scope.

TABLE II

APPENDIX A

| SOUND PASCII VALUE | FREQ. BAND # | SLOPE(m) | Y-INTERCEPT (b) | AMPLITUDE |
|---|---|---|---|---|
| 1 | 1 | 23.925 | 0.0639 | 0.73378 |
| 1 | 2 | 43.1006 | 0.116964 | 0.08242 |
| 1 | 3 | 54.5453 | 0.1132 | 0.01025 |
| 1 | 4 | 60.7934 | 0.111916 | 0.01257 |
| 1 | 5 | 62.7092 | 0.0989 | 0.06235 |
| 1 | 6 | 66.9046 | 0.105248 | 0.07415 |
| 1 | 7 | 68.9042 | 0.101159 | 0.098 |
| 1 | 8 | 70.9394 | 0.102078 | 0.05573 |
| 1 | 9 | 73.8657 | 0.103871 | 0.0297 |
| 1 | 10 | 76.6542 | 0.109661 | 0.01606 |
| 1 | 11 | 78.566 | 0.105545 | 0.02196 |
| 1 | 12 | 0 | 0 | 0 |
| 1 | 13 | 0 | 0 | 0 |
| 1 | 14 | 0 | 0 | 0 |
| 1 | 15 | 0 | 0 | 0 |
| 3 | 1 | 31.0818 | 0.0948 | 0.7639 |
| 3 | 2 | 37.6375 | 0.0787 | 0.2279 |
| 3 | 3 | 54.8824 | 0.115936 | 0.02602 |
| 3 | 4 | 59.882 | 0.103487 | 0.05287 |
| 3 | 5 | 61.8428 | 0.097235 | 0.11788 |
| 3 | 6 | 67.4577 | 0.107712 | 0.10825 |
| 3 | 7 | 69.8282 | 0.106478 | 0.04873 |
| 3 | 8 | 71.9363 | 0.104027 | 0.02985 |
| 3 | 9 | 74.1275 | 0.105246 | 0.02271 |
| 3 | 10 | 75.6143 | 0.102906 | 0.00936 |
| 3 | 11 | 79.3344 | 0.106665 | 0.01144 |
| 3 | 12 | 0 | 0 | 0 |
| 3 | 13 | 0 | 0 | 0 |
| 3 | 14 | 0 | 0 | 0 |
| 3 | 15 | 0 | 0 | 0 |
| 7 | 1 | 35.8081 | 0.117513 | 0.7151 |
| 7 | 3 | 55.9232 | 0.122236 | 0.05651 |
| 7 | 4 | 59.2746 | 0.105329 | 0.201 |
| 7 | 5 | 64.3502 | 0.111596 | 0.15908 |
| 7 | 6 | 66.8912 | 0.105726 | 0.10852 |
| 7 | 7 | 70.5895 | 0.110907 | 0.07466 |
| 7 | 8 | 72.3561 | 0.108349 | 0.03763 |
| 7 | 9 | 74.6623 | 0.108032 | 0.02601 |

TABLE II-continued

APPENDIX A

| SOUND PASCII VALUE | FREQ. BAND # | SLOPE(m) | Y-INTERCEPT (b) | AMPLITUDE |
|---|---|---|---|---|
| 7 | 10 | 76.825 | 0.11056 | 0.0184 |
| 7 | 11 | 79.5416 | 0.110216 | 0.02638 |
| 7 | 12 | 0 | 0 | 0 |
| 7 | 13 | 0 | 0 | 0 |
| 7 | 14 | 0 | 0 | 0 |
| 7 | 15 | 0 | 0 | 0 |
| 24 | 1 | 26.3645 | 0.0772 | 0.5820 |
| 24 | 2 | 43.4946 | 0.095061 | 0.71981 |
| 24 | 3 | 50.796 | 0.0974 | 0.46648 |
| 24 | 4 | 60.6949 | 0.122010 | 0.05332 |
| 24 | 5 | 65.2771 | 0.116403 | 0.03806 |
| 24 | 6 | 66.9481 | 0.106186 | 0.05735 |
| 24 | 7 | 71.0327 | 0.1114422 | 0.03654 |
| 24 | 8 | 72.5388 | 0.108871 | 0.03031 |
| 24 | 9 | 76.0082 | 0.116995 | 0.01378 |
| 24 | 10 | 77.3385 | 0.112669 | 0.017 |
| 24 | 11 | 78.6243 | 0.104959 | 0.01591 |
| 24 | 12 | 0 | 0 | 0 |
| 24 | 13 | 0 | 0 | 0 |
| 24 | 14 | 0 | 0 | 0 |
| 24 | 15 | 0 | 0 | 0 |
| 9 | 1 | 27.3808 | 0.0891 | 0.6873 |
| 9 | 2 | 46.0161 | 0.117744 | 0.6969 |
| 9 | 3 | 57.4503 | 0.132157 | 0.2288 |
| 9 | 4 | 59.863 | 0.113996 | 0.3164 |
| 9 | 5 | 67.1216 | 0.130564 | 0.16726 |
| 9 | 6 | 68.5702 | 0.119971 | 0.10475 |
| 9 | 7 | 72.1892 | 0.122477 | 0.04561 |
| 9 | 8 | 73.8496 | 0.11908 | 0.04229 |
| 9 | 9 | 77.1308 | 0.125179 | 0.02519 |
| 9 | 10 | 78.0586 | 0.118421 | 0.02961 |
| 9 | 11 | 81.6235 | 0.125473 | 0.02507 |
| 9 | 12 | 0 | 0 | 0 |
| 9 | 13 | 0 | 0 | 0 |
| 9 | 14 | 0 | 0 | 0 |
| 9 | 15 | 0 | 0 | 0 |
| 14 | 1 | 29.9976 | 0.0967 | 0.6035 |
| 14 | 2 | 40.7298 | 0.0901 | 0.73174 |
| 14 | 3 | 55.0417 | 0.117045 | 0.24344 |
| 14 | 4 | 58.4921 | 0.107211 | 0.10904 |
| 14 | 5 | 65.8377 | 0.119586 | 0.04517 |
| 14 | 6 | 65.9093 | 0.100399 | 0.05183 |
| 14 | 7 | 70.9514 | 0.113684 | 0.03564 |
| 14 | 8 | 72.519 | 0.107896 | 0.02398 |
| 14 | 9 | 75.3122 | 0.113199 | 0.01906 |
| 14 | 10 | 76.5463 | 0.108146 | 0.01425 |
| 14 | 11 | 79.4491 | 0.109836 | 0.01929 |
| 14 | 12 | 0 | 0 | 0 |
| 14 | 13 | 0 | 0 | 0 |
| 14 | 14 | 0 | 0 | 0 |
| 14 | 15 | 0 | 0 | 0 |
| 17 | 1 | 2.975 | 0.07694 | 0.4656 |
| 17 | 2 | 51.8834 | 0.148419 | 0.1327 |
| 17 | 3 | 50.9061 | 0.0955 | 0.06494 |
| 17 | 4 | 60.211 | 0.111777 | 0.01722 |
| 17 | 5 | 63.4817 | 0.10496 | 0.01704 |
| 17 | 6 | 67.1155 | 0.106036 | 0.01167 |
| 17 | 7 | 70.9826 | 0.112958 | 0.0102 |
| 17 | 8 | 71.1014 | 0.0997 | 0.00644 |
| 17 | 9 | 74.2932 | 0.106116 | 0.00498 |
| 17 | 10 | 76.5634 | 0.107109 | 0.0043 |
| 17 | 11 | 80.2467 | 0.0114159 | 0.00328 |
| 17 | 12 | 0 | 0 | 0 |
| 17 | 13 | 0 | 0 | 0 |
| 17 | 14 | 0 | 0 | 0 |
| 17 | 15 | 0 | 0 | 0 |
| 21 | 1 | 35.6987 | 0.118874 | 0.8169 |
| 21 | 2 | 42.9284 | 0.104448 | 0.6282 |
| 21 | 3 | 51.6091 | 0.106709 | 0.09954 |
| 21 | 4 | 59.6202 | 0.108802 | 0.01004 |
| 21 | 5 | 64.0317 | 0.107957 | 0.01519 |
| 21 | 6 | 66.9097 | 0.10484 | 0.01394 |
| 21 | 7 | 70.2666 | 0.107929 | 0.01664 |

TABLE II-continued

APPENDIX A

| SOUND PASCII VALUE | FREQ. BAND # | SLOPE(m) | Y-INTERCEPT (b) | AMPLITUDE |
|---|---|---|---|---|
| 21 | 8 | 71.7338 | 0.102196 | 0.01172 |
| 21 | 9 | 75.2727 | 0.1112 | 0.0042 |
| 21 | 10 | 76.7847 | 0.107923 | 0.00334 |
| 21 | 11 | 79.5333 | 0.109177 | 0.0076 |
| 21 | 12 | 0 | 0 | 0 |
| 21 | 13 | 0 | 0 | 0 |
| 21 | 14 | 0 | 0 | 0 |
| 21 | 15 | 0 | 0 | 0 |
| 26 | 1 | 94.161 | 0.346415 | 0.4687 |
| 26 | 2 | 28.8099 | 0.0448 | 0.8466 |
| 26 | 3 | 55.6297 | 0.107713 | 0.09751 |
| 26 | 4 | 40.9908 | 0.025 | 0.14443 |
| 26 | 5 | 63.7703 | 0.103867 | 0.08847 |
| 26 | 6 | 56.7514 | 0.0615 | 0.02578 |
| 26 | 7 | 64.7022 | 0.0792 | 0.02344 |
| 26 | 8 | 97.9576 | 0.22901 | 0.01238 |
| 26 | 9 | 66.7865 | 0.0708 | 0.00421 |
| 26 | 10 | 72.7685 | 0.087492 | 0.00633 |
| 26 | 11 | 74.6368 | 0.0865 | 0.00621 |
| 26 | 12 | 0 | 0 | 0 |
| 26 | 13 | 0 | 0 | 0 |
| 26 | 14 | 0 | 0 | 0 |
| 26 | 15 | 0 | 0 | 0 |
| 29 | 1 | 37.5589 | 0.13441 | 0.7303 |
| 29 | 2 | 29.1422 | 0.0426 | 0.6409 |
| 29 | 3 | 55.5325 | 0.11215 | 0.1421 |
| 29 | 4 | 56.7644 | 0.095904 | 0.18553 |
| 29 | 5 | 62.0948 | 0.103664 | 0.04658 |
| 29 | 6 | 66.5342 | 0.104791 | 0.01132 |
| 29 | 7 | 68.3164 | 0.0982 | 0.0095 |
| 29 | 8 | 71.9616 | 0.104908 | 0.01173 |
| 29 | 9 | 73.2931 | 0.100259 | 0.00455 |
| 29 | 10 | 75.6625 | 0.102199 | 0.00503 |
| 29 | 11 | 77.4381 | 0.0989 | 0.00525 |
| 29 | 12 | 0 | 0 | 0 |
| 29 | 13 | 0 | 0 | 0 |
| 29 | 14 | 0 | 0 | 0 |
| 29 | 15 | 0 | 0 | 0 |
| 31 | 1 | 24.0535 | 0.065356 | 0.59022 |
| 31 | 2 | 46.3754 | 0.123127 | 0.06093 |
| 31 | 3 | 50.9352 | 0.091369 | 0.04107 |
| 31 | 4 | 56.8214 | 0.0948 | 0.02801 |
| 31 | 5 | 60.8415 | 0.089737 | 0.0319 |
| 31 | 6 | 63.9034 | 0.0906 | 0.02579 |
| 31 | 7 | 66.7104 | 0.0894 | 0.01022 |
| 31 | 8 | 69.1107 | 0.0879 | 0.00956 |
| 31 | 9 | 71.9378 | 0.094015 | 0.00827 |
| 31 | 10 | 73.6224 | 0.0913 | 0.00389 |
| 31 | 11 | 77.2013 | 0.0941 | 0.00562 |
| 31 | 12 | 0 | 0 | 0 |
| 31 | 13 | 0 | 0 | 0 |
| 31 | 14 | 0 | 0 | 0 |
| 31 | 15 | 0 | 0 | 0 |
| 33 | 1 | 36.1683 | 0.136196 | 0.6386 |
| 33 | 2 | 40.7677 | 0.0997 | 0.08579 |
| 33 | 3 | 51.0809 | 0.0938 | 0.01947 |
| 33 | 4 | 57.2837 | 0.0961 | 0.02064 |
| 33 | 5 | 61.365 | 0.0925 | 0.02314 |
| 33 | 6 | 64.1689 | 0.0924 | 0.01728 |
| 33 | 7 | 67.4613 | 0.0944 | 0.00754 |
| 33 | 8 | 66.918 | 0.0806 | 0.00404 |
| 33 | 9 | 72.5547 | 0.0951 | 0.00525 |
| 33 | 10 | 74.3771 | 0.095119 | 0.00264 |
| 33 | 11 | 77.5436 | 0.0966 | 0.003 |
| 33 | 12 | 0 | 0 | 0 |
| 33 | 13 | 0 | 0 | 0 |
| 33 | 14 | 0 | 0 | 0 |
| 33 | 15 | 0 | 0 | 0 |
| 36 | 1 | 25.128 | 0.0677 | 0.6428 |
| 36 | 2 | 42.9834 | 0.110396 | 0.11144 |
| 36 | 3 | 50.5331 | 0.0918 | 0.04302 |
| 36 | 4 | 57.1574 | 0.0935 | 0.0187 |
| 36 | 5 | 60.3679 | 0.0872 | 0.03721 |

TABLE II-continued

APPENDIX A

| SOUND PASCII VALUE | FREQ. BAND # | SLOPE(m) | Y-INTERCEPT (b) | AMPLITUDE |
|---|---|---|---|---|
| 36 | 6 | 64.1232 | 0.0916 | 0.03611 |
| 36 | 7 | 67.7702 | 0.0953 | 0.01658 |
| 36 | 8 | 69.967 | 0.0934 | 0.013 |
| 36 | 9 | 71.8082 | 0.0916 | 0.00673 |
| 36 | 10 | 74.66 | 0.0975 | 0.00614 |
| 36 | 11 | 77.0475 | 0.0955 | 0.00722 |
| 36 | 12 | 0 | 0 | 0 |
| 36 | 13 | 0 | 0 | 0 |
| 36 | 14 | 0 | 0 | 0 |
| 36 | 15 | 0 | 0 | 0 |
| 90 | 1 | 34.559 | 0.117681 | 0.8455 |
| 90 | 2 | 45.7616 | 0.123735 | 0.6897 |
| 90 | 3 | 52.5577 | 0.110983 | 0.04924 |
| 90 | 4 | 60.4452 | 0.116582 | 0.0076 |
| 90 | 5 | 65.0779 | 0.113763 | 0.00872 |
| 90 | 6 | 66.9828 | 0.107816 | 0.0152 |
| 90 | 7 | 70.2725 | 0.108867 | 0.01176 |
| 90 | 8 | 72.0092 | 0.106249 | 0.01369 |
| 90 | 9 | 75.4537 | 0.113103 | 0.00705 |
| 90 | 10 | 76.8396 | 0.110225 | 0.00562 |
| 90 | 11 | 79.5101 | 0.110944 | 0.00961 |
| 90 | 12 | 0 | 0 | 0 |
| 90 | 13 | 0 | 0 | 0 |
| 90 | 14 | 0 | 0 | 0 |
| 90 | 15 | 0 | 0 | 0 |
| 94 | 1 | 33.01 | 0.10304 | 0.9353 |
| 94 | 2 | 19.5992 | 0.0222 | 0.6894 |
| 94 | 3 | 54.2337 | 0.102615 | 0.14631 |
| 94 | 4 | 58.7361 | 0.10G557 | 0.12756 |
| 94 | s | 62.8017 | 0.106312 | 0.02257 |
| 94 | 6 | 69.182 | 0.120343 | 0.02135 |
| 94 | 7 | 70.1864 | 0.108033 | 0.00881 |
| 94 | 8 | 71.856 | 0.105312 | 0.00561 |
| 94 | 9 | 75.8229 | 0.114387 | 0.00194 |
| 94 | 10 | 76.1835 | 0.10575 | 0.00151 |
| 94 | 11 | 79.8682 | 0.110951 | 0.00182 |
| 94 | 12 | 0 | 0 | 0 |
| 94 | 13 | 0 | 0 | 0 |
| 94 | 14 | 0 | 0 | 0 |
| 94 | 15 | 0 | 0 | 0 |
| 58 | 1 | 30.5155 | 0.104315 | 0.5317 |
| 58 | 2 | 41.1473 | 0.098 | 0.0945 |
| 58 | 3 | 52.6775 | 0.101027 | 0.05875 |
| 58 | 4 | 57.3355 | 0.0976 | 0.04413 |
| 58 | 5 | 61.881 | 0.0968 | 0.03921 |
| 58 | 6 | 65.1193 | 0.0969 | 0.03265 |
| 58 | 7 | 68.0574 | 0.0971 | 0.02773 |
| 58 | 8 | 69.5643 | 0.092299 | 0.02098 |
| 58 | 9 | 72.7544 | 0.0979 | 0.01637 |
| 58 | 10 | 74.551 | 0.096G85 | 0.01433 |
| 58 | 11 | 77.332 | 0.098928 | 0.01997 |
| 58 | 12 | 79.5717 | 0.095093 | 0.01385 |
| 58 | 13 | 82.1972 | 0.0959 | 0.01263 |
| 58 | 14 | 84.515 | 0.0962 | 0.01425 |
| 58 | 15 | 86.3601 | 0.0958 | 0.01486 |
| 60 | 1 | 29.8209 | 0.097751 | 0.5843 |
| 60 | 2 | 45.0992 | 0.117747 | 0.08934 |
| 60 | 3 | 54.3205 | 0.10593 | 0.08591 |
| 60 | 4 | 58.4529 | 0.1053 | 0.05837 |
| 60 | 5 | 4.9092 | 0.112361 | 0.04366 |
| 60 | 6 | 66.8778 | 0.107116 | 0.0514 |
| 60 | 7 | 71.3666 | 0.115105 | 0.03134 |
| 60 | 8 | 72.4539 | 0.107843 | 0.02406 |
| 60 | 9 | 74.8978 | 0.10941 | 0.01706 |
| 60 | 10 | 77.1449 | 0.110471 | 0.01527 |
| 60 | 11 | 79.5827 | 0.110523 | 0.02061 |
| 60 | 12 | 82.3536 | 0.110665 | 0.01226 |
| 60 | 13 | 84.722 | 0.108912 | 0.01252 |
| 60 | 14 | 86.9515 | 0.109566 | 0.01057 |
| 60 | 15 | 88.7968 | 0.10925 | 0.01331 |
| 62 | 1 | 30.3312 | 0.109582 | 0.566 |
| 62 | 2 | 39.1704 | 0.0809 | 0.05756 |
| 62 | 3 | 55.2685 | 0.113607 | 0.04723 |

TABLE II-continued

APPENDIX A

| SOUND PASCII VALUE | FREQ. BAND # | SLOPE(m) | Y-INTERCEPT (b) | AMPLITUDE |
|---|---|---|---|---|
| 62 | 4 | 58.3998 | 0.105309 | 0.02906 |
| 62 | 5 | 65.0247 | 0.113936 | 0.02563 |
| 62 | 6 | 66.6728 | 0.105247 | 0.02394 |
| 62 | 7 | 70.1915 | 0.108396 | 0.0195 |
| 62 | 8 | 72.2755 | 0.106131 | 0.02091 |
| 62 | 9 | 74.8135 | 0.10855 | 0.03041 |
| 62 | 10 | 76.3984 | 0.106234 | 0.03623 |
| 62 | 11 | 78.4797 | 0.103104 | 0.08269 |
| 62 | 12 | 81.142 | 0.104107 | 0.05008 |
| 62 | 13 | 84.3696 | 0.107884 | 0.03896 |
| 62 | 14 | 85.96 | 0.10425 | 0.03301 |
| 62 | 15 | 88.0833 | 0.15053 | 0.02503 |
| 66 | 1 | 24.9269 | 0.0789 | 0.6188 |
| 66 | 2 | 48.3858 | 0.135315 | 0.06155 |
| 66 | 3 | 54.5496 | 0.109284 | 0.02282 |
| 66 | 4 | 58.3009 | 0.100643 | 0.07583 |
| 66 | 5 | 64.9467 | 0.11328 | 0.1037 |
| 66 | 6 | 66.4737 | 0.103452 | 0.1555 |
| 66 | 7 | 69.2804 | 0.104905 | 0.1263 |
| 66 | 8 | 71.5304 | 0.103333 | 0.0981 |
| 66 | 9 | 73.733 | 0.103675 | 0.0839 |
| 66 | 10 | 76.5636 | 0.108794 | 0.06358 |
| 66 | 11 | 78.8226 | 0.107965 | 0.0813 |
| 66 | 12 | 81.1678 | 0.10551 | 0.03163 |
| 66 | 13 | 84.3501 | 0.108437 | 0.01738 |
| 66 | 14 | 86.1132 | 0.106013 | 0.01169 |
| 66 | 15 | 87.6284 | 0.103334 | 0.00849 |

TABLE III

RELATIVE AMPLITUDE STANDARDS

| PHONEME SOUND | PASCII VALUE | RELATIVE AMPLITUDE STANDARD |
|---|---|---|
| ah | 23 | 95 |
| uh | 22 | 95 |
| ah | 24 | 95 |
| 0 | 21 | 95 |
| a | 9 | 85 |
| u | 19 | 85 |
| er | 29 | 85 |
| e | 7 | 75 |
| A | 5 | 75 |
| oo | 17 | 75 |
| i | 3 | 75 |
| w | 85 | 75 |
| ee | 1 | 75 |
| r | 94 | 75 |
| y | 82 | 75 |
| 1 | 90 | 75 |
| sh | 65 | 65 |
| ng | 36 | 65 |
| ch | 116 | 55 |
| m | 31 | 55 |
| n | 33 | 50 |
| si | 66 | 50 |
| j | 115 | 50 |
| t | 41 | 40 |
| g | 48 | 40 |
| k | 47 | 40 |
| ~th | 60 | 40 |
| z | 62 | 40 |
| s | 61 | 35 |
| h | 76 | 35 |
| d | 42 | 30 |
| v | 58 | 30 |
| b | 40 | 30 |
| p | 39 | 25 |
| f | 57 | 25 |
| th | 59 | 20 |

APPENDIX B

```
/**************************************************
 *                    -- dspmain.c --
 *  Copyright Synergetics 1993, 1994
 *  Written by R. Brian Moncur
 *
 * Warning Confidential Material
 * Property of Synergetics
 * Copyright 1993, 1994 All Rights Reserved
 **************************************************/
#ifdef      __cplusplus
extern "C" {
#endif

#undef CRT

#include <windows.h>
#include <windowsx.h>
#include <mmsystem.h>
#include "dsp.h"
#include "dspeng.h"
#include "evaltd.h"
#include "higlist.h"
#include "bach.h"
#include "federatn.h"
#include "_federat.h"
#include "dsp-cpu.h"
#include "srengine.h"

#include "pascii.h"
#include "gender.h"
#include <errno.h>
#include <ctype.h>

/* 10240 + 5 * 256 */
#define     VBDATASIZE                                      (SEGSIZE * 10)

struct COMMANDLINE clo;                 /*  command line options  */
extern double AuditoryRange[NUM_AUDITORY];

/* Globals */
static MCI_WAVE_OPEN_PARMS     WaveParms;
static MCI_RECORD_PARMS                         RecordParms;
static MCI_WAVE_SET_PARMS               SetParms;
DWORD                                                   mciError;
HWND        hwndFed;
UINT        uDSPMsg;
HINSTANCE hInst;

int         *vb_data = NULL,            /*  Voiced data  */
                    SoundNumber,
                    PersonNumber,
                    TotalMicrobes = 0,
                    Microbes = 0,
                    ncalls = 0;

char        szSoundFileName[MAXPATH] = "sretemp.wav",
                    szRootDir[MAXPATH];

FILE        *fpRD;
int                         PortID;
APP_OPTS    AppOpts={SRC_MICHROPHONE, DEST_PORT, NULL, NULL, /*COM1*/1};


/*  Local Prototypes  */
void ProcessWaveFile(char *WaveFile);
void GiveFileToElrond(char *SoundFilePath);

// Stuff
struct DSPHIGGINS {
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        char      type;                       /* Whether it's Voiced, Unvoiced or
Quiet */
        int       loc;                        /* array location of where period starts
*/
        int            size;                  /* period size  */
        int            duration;              /* in milliseconds  */
        int            Ls;                    /* average amplitude  */
        int            Ld;                    /* average difference of amplitudes  */
        int            Fo;                    /* Fundamental frequency */
        int            ffreq[MAXFORMANTS];    /* Formant Frequencies */
        int            ampl[MAXFORMANTS];     /* amplitude of formant's */
        int            zcr;                   /* Zero Crossing Rate */
};

HWND hCPUWnd;

long FAR PASCAL MainWndProc(HWND hWnd, UINT msg, WPARAM     wParam, LPARAM lParam);
BOOL InitApplication(HANDLE hInstance);
BOOL InitInstance(HANDLE hInstance, int nCmdShow);

void Setup()
{
        if ( (vb_data = (int *)malloc(VBDATASIZE*sizeof(int))) == NULL )       {
                fprintf(stderr, "Out of memory while trying to malloc vb_data\n");
                exit(0);
        }
}

void Cleanup()
{
        if (vb_data) {
                free(vb_data);
                vb_data = NULL;
        }
}

/************************************************************************
        FUNCTION: WinMain(HANDLE, HANDLE, LPSTR, int)
        PURPOSE: calls initialization function, processes message loop
************************************************************************/
int PASCAL WinMain(HANDLE hInstance, HANDLE hPrevInstance, LPSTR lpCmdLine,
        int nCmdShow)
{
        MSG      msg;

        if (!hPrevInstance)
                if (!InitApplication(hInstance))
                        return (FALSE);

        if (!InitInstance(hInstance, nCmdShow))
                return (FALSE);

        while (GetMessage(&msg, NULL, NULL, NULL)) {
                TranslateMessage(&msg);
                DispatchMessage(&msg);
        }
        return (msg.wParam);
} // END OF WinMain()


/************************************************************************
        FUNCTION: InitApplication(HANDLE)
        PURPOSE: Initializes window data and registers window class
************************************************************************/
BOOL InitApplication(HANDLE hInstance)
{
        WNDCLASS  wc;

        wc.lpszClassName = "DSPMainClass";
        wc.style = CS_HREDRAW | CS_VREDRAW;
        wc.lpfnWndProc = MainWndProc;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        wc.cbClsExtra = 0;
        wc.cbWndExtra = 0;
        wc.hInstance = hInstance;
        wc.hIcon = LoadIcon(NULL, IDI_APPLICATION);
        wc.hCursor = LoadCursor(NULL, IDC_ARROW);
        wc.hbrBackground = GetStockObject(WHITE_BRUSH);
        wc.lpszMenuName =  MAKEINTRESOURCE(MENU_1);

        return (RegisterClass(&wc));
} // END OF InitApplication()


/*************************************************************************
        FUNCTION:  InitInstance(HANDLE, int)
        PURPOSE:  Saves instance handle and creates main window
*************************************************************************/
BOOL InitInstance(HANDLE hInstance, int nCmdShow)
{
        HWND hWnd;

        hInst = hInstance;

        hWnd = CreateWindow ("DSPMainClass", "DSP Main", WS_OVERLAPPEDWINDOW,
                CW_USEDEFAULT, CW_USEDEFAULT, CW_USEDEFAULT, CW_USEDEFAULT,
                NULL, NULL, hInstance, NULL);

        if (!hWnd)
                return (FALSE);

        ShowWindow(hWnd, SW_SHOW);
        UpdateWindow(hWnd);
        return (TRUE);
} // END OF InitInstance()


/*************************************************************************
        FUNCTION:  MainWndProc(HANDLE, int)
        PURPOSE:  Saves instance handle and creates main window
*************************************************************************/
long FAR PASCAL MainWndProc(HWND hWnd, UINT msg, WPARAM wParam, LPARAM lParam)
{
        static HCURSOR                          hSavCur;

         switch (msg)
         {
                case WM_CREATE:
                {
                        HMENU               hMenu;

                        hwndFed = hWnd;
#ifdef FROMFILE
                        g_fpPhonemeFile = (FILE *)NULL;
#endif
                        InitAppOpts();
                        OutputDebugString("\nProcessor Started\n");
                        LoadCursor(NULL, IDC_ARROW);
                        LoadCursor(NULL, IDC_WAIT);
                        hMenu = GetMenu(hWnd);
                        CheckMenuItem(hMenu,
                                IDM_SMICROPHONE+AppOpts.sourceID-SRC_MICHROPHONE,
                                MF_CHECKED);
                        CheckMenuItem(hMenu,
                                IDM_DWAVEFILE+AppOpts.DestID-DEST_WAVEFILE,
                                MF_CHECKED);
                        uDSPMsg = RegisterWindowMessage("DSPNotifyMessage");
                        hCPUWnd = (HWND)NULL;
                        hCPUWnd = FindWindow("CPUMainClass", NULL);
                        if(hCPUWnd == (HWND)NULL)
                                WinExec("cpu.exe", SW_SHOW);
                        hCPUWnd = FindWindow("CPUMainClass", NULL);
                        return 0;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
} // END OF WM_CREATE
case WM_DESTROY:
{
        HANDLE                  hTemp1, hTemp2;

        SaveAppOpts();
        hTemp1 = (HANDLE)NULL;
        hTemp2 = (HANDLE)NULL;
        hTemp1 = GlobalPtrHandle((LPVOID)AppOpts.szWaveFile);
        hTemp2 = GlobalPtrHandle((LPVOID)AppOpts.szPhonemeFile);
        hTemp1 = GlobalFree(hTemp1);
        hTemp2 = GlobalFree(hTemp2);
        mciError = mciSendCommand(WaveParms.wDeviceID, MCI_STOP,
                MCI_WAIT, (DWORD) &WaveParms);
        mciError = mciSendCommand(WaveParms.wDeviceID,
                MCI_CLOSE, MCI_WAIT, (DWORD) &WaveParms);
        PostMessage(hCPUWnd, WM_CLOSE, 0, 0L);
        PostQuitMessage(0);
        return 0;
}
case WM_COMMAND:
{
        switch(wParam)
        {
                case IDM_EXIT:
                {
                        DestroyWindow(hWnd);
                        return 0;
                } // END OF IDM_EXIT
                case IDM_START:
                {
                        if (wParam==IDM_START) {
                                InitSound();
                        }
                        // begins recording, then displays the RECORDING
dialog box
                        // to allow STOP to be pressed
                        // intentiaonally falls through to IDM_STOP
                        OutputDebugString("Recording ...\n");
                        if (AppOpts.sourceID <= SRC_MICHROPHONE)
                        {
                                mciError =
mciSendCommand(WaveParms.wDeviceID,
                                        MCI_RECORD, MCI_NOTIFY |
MCI_TO | MCI_FROM |
                                        MCI_RECORD_OVERWRITE, (DWORD)
&RecordParms);
                                DialogBoxParam(hInst,
MAKEINTRESOURCE(IDD_DIALOG1),
                                        hWnd, (DLGPROC)RecordDlgProc.
                                        (LPARAM)
MAKELONG(WaveParms.wDeviceID, 0));
                        }
                }
                case IDM_STOP:
                {
                        HANDLE                  hTemp;
                        LPVOID                  lpTemp;

                        TermSound();
                        OutputDebugString("Done Recording\n");
                        SetCursor(LoadCursor(NULL,IDC_WAIT));
                        if (AppOpts.sourceID <= SRC_WAVEFILE)
                        {
                                if (AppOpts.DestID == DEST_PHONEMEFILE)
                                {
#ifdef FROMFILE
                                        g_fpPhonemeFile =
fopen(AppOpts.szPhonemeFile, "w+t");
#endif
                                }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        if (AppOpts.DestID > DEST_WAVEFILE)
                                        {
                                                OutputDebugString("Giving file
to Elrond\n");
                                                GiveFileToElrond((char
*)AppOpts.szWaveFile);
                                        }
                                        if (AppOpts.DestID == DEST_PHONEMEFILE)
                                        {
#ifdef FROMFILE
                                                fclose(g_fpPhonemeFile);
                                                g_fpPhonemeFile = NULL;
#endif
                                        }
                                }
                                else
                                {
                                        hTemp = (HANDLE)NULL;
                                        hTemp  = GlobalAlloc(GPTR | GMEM_SHARE,
128);
                                        lpTemp = (LPVOID)GlobalLock(hTemp);
                                        lstrcpy(lpTemp,
(LPSTR)AppOpts.szPhonemeFile);
                                        SendMessage(hCPUWnd, uDSPMsg,
DSP_CPU_MSG_PHONEMEFILE, (LPARAM)lpTemp);
                                        lpTemp = (LPVOID)GlobalUnlock(hTemp);
                                        hTemp = GlobalFree(hTemp);
                                }
                                OutputDebugString("Closing process\n");
                                hSavCur = SetCursor(hSavCur);
                                return 0;
                        } // END OF IDM_STOP
                        case IDM_OPTIONS:
                        {
                                FARPROC   pOptionsDlgProc;

                                pOptionsDlgProc = MakeProcInstance(OptionsDlgProc,
hInst);
                                DialogBox(hInst, MAKEINTRESOURCE(IDD_OPTIONS),
                                        hWnd, pOptionsDlgProc);
                                FreeProcInstance(pOptionsDlgProc);
                                SaveAppOpts();
                                SendMessage(hCPUWnd, uDSPMsg,
DSP_CPU_MSG_INITOPTS, 0L);
                                return 0;
                        }
                        case IDM_SMICROPHONE:
                        case IDM_SWAVEFILE:
                        case IDM_SPHONEMEFILE:
                        {
                                HMENU                           hMenu;

                                hMenu = GetMenu(hWnd);
                                CheckMenuItem(hMenu,

AppOpts.sourceID+IDM_SMICROPHONE-SRC_MICHROPHONE,
                                        MF_UNCHECKED);
                                CheckMenuItem(hMenu, wParam, MF_CHECKED);
                                AppOpts.sourceID =
wParam-IDM_SMICROPHONE+SRC_MICHROPHONE;
                                return 0;
                        }
                        case IDM_DWAVEFILE:
                        case IDM_DPHONEMEFILE:
                        case IDM_DSCREEN:
                        case IDM_DIO:
                        {
                                HMENU                           hMenu;

                                hMenu = GetMenu(hWnd);
                                CheckMenuItem(hMenu,
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
AppOpts.DestID+IDM_DWAVEFILE-DEST_WAVEFILE,
                                        MF_UNCHECKED);
                                CheckMenuItem(hMenu, wParam, MF_CHECKED);
                                AppOpts.DestID =
wParam-IDM_DWAVEFILE+DEST_WAVEFILE;
                                return 0;
                        }
                        default:
                                return (DefWindowProc(hWnd, msg, wParam, lParam));
                } //switch wParam
            } // case WM_COMMAND
            default:
                    return(DefWindowProc(hWnd, msg, wParam, lParam));
        } // END OF switch(msg)
}

/************************************************************************
        FUNCTION: InitAppOpts
        PURPOSE:  Initialize the applications options.
************************************************************************/
void InitAppOpts(void)
{
        HANDLE                  hTemp1, hTemp2;

        hTemp1 = (HANDLE)NULL;
        hTemp2 = (HANDLE)NULL;
        hTemp1 = GlobalAlloc(GPTR, 80);
        hTemp2 = GlobalAlloc(GPTR, 80);
        AppOpts.szWaveFile = (char *)GlobalLock(hTemp1);
        AppOpts.szPhonemeFile = (char *)GlobalLock(hTemp2);
        AppOpts.sourceID = GetPrivateProfileInt ("Settings", "sourceID",
                SRC_MICHROPHONE, "dsp-cpu.ini");
        AppOpts.DestID = GetPrivateProfileInt ("Settings", "DestID",
                DEST_PORT, "dsp-cpu.ini");
        GetPrivateProfileString("Settings", "szWaveFile", "record.wav",
                (LPSTR)AppOpts.szWaveFile, 80, "dsp-cpu.ini");
        GetPrivateProfileString("Settings", "szPhonemeFile", "words",
                (LPSTR)AppOpts.szPhonemeFile, 80, "dsp-cpu.ini");
        AppOpts.Port = GetPrivateProfileInt ("Settings", "Port", 1/*COM1*/,
                "dsp-cpu.ini");
} // END OF InitAppOpts()

/************************************************************************
        FUNCTION: SaveAppOpts
        PURPOSE:  Save the applications options.
************************************************************************/
void SaveAppOpts(void)
{
 char intBuff[17];

        WritePrivateProfileString ("Settings", "sourceID",
                itoa(AppOpts.sourceID, intBuff, 10), "dsp-cpu.ini");
        WritePrivateProfileString ("Settings", "DestID",
                itoa(AppOpts.DestID, intBuff, 10), "dsp-cpu.ini");
        WritePrivateProfileString ("Settings", "szWaveFile",
                (LPSTR)AppOpts.szWaveFile, "dsp-cpu.ini");
        WritePrivateProfileString ("Settings", "szPhonemeFile",
                (LPSTR)AppOpts.szPhonemeFile, "dsp-cpu.ini");
        WritePrivateProfileString ("Settings", "Port",
                itoa(AppOpts.Port, intBuff, 10), "dsp-cpu.ini");
} // END OF SaveAppOpts()

/************************************************************************
        FUNCTION: OptionsDlgProc
        PURPOSE:  Set options these options could have already been retreived
        from the *.ini file, set by the command line, and/or altered by this
        dialog.
************************************************************************/
BOOL CALLBACK OptionsDlgProc(HWND hwndDlg, UINT msg, WPARAM wParam, LPARAM lParam)
{
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        int nCount;

        switch (msg) {
                case WM_INITDIALOG:
                        SetDlgItemText(hwndDlg, IDC_WAVEFILE, (LPSTR)AppOpts.szWaveFile);
                        SetDlgItemText(hwndDlg, IDC_PHONEMEFILE,
(LPSTR)AppOpts.szPhonemeFile);
                        SendDlgItemMessage(hwndDlg, IDC_PORT, CB_RESETCONTENT, 0, 0);
                        for (nCount=1;nCount<=4;nCount++)
                        {
                                char szCommName[8];
                                wsprintf(szCommName, "COM%d", nCount);
                                SendDlgItemMessage(hwndDlg, IDC_PORT, CB_ADDSTRING, 0,
                                        (LPARAM) szCommName);
                        }
                        SendDlgItemMessage(hwndDlg, IDC_PORT, CB_SETCURSEL, AppOpts.Port-1,
0);
                return TRUE;

                case WM_COMMAND:
                        switch (wParam) {
                                case IDOK: {
                                        /* save off options here */
                                        GetDlgItemText(hwndDlg, IDC_WAVEFILE,
(LPSTR)AppOpts.szWaveFile, 80);
                                        GetDlgItemText(hwndDlg, IDC_PHONEMEFILE,
                                                (LPSTR)AppOpts.szPhonemeFile, 80);
                                        AppOpts.Port = (int)SendDlgItemMessage(hwndDlg,
IDC_PORT,
                                                CB_GETCURSEL, 0, 0) + 1;
                                }       /* There is no break/return here on purpose */
                                case IDCANCEL:
                                        EndDialog(hwndDlg, wParam);
                                break;
                        }
                default:
                return FALSE;
        }
} // END OF OptionsDlgProc()


/*************************************************************************
        FUNCTION:       InitSound
        PURPOSE: Initialize the Sound stuff if needed
*************************************************************************/
int /*OK*/ InitSound(void)
{
        int     RetVal=1;
        char    Buff[255];

        if (AppOpts.sourceID <= SRC_MICHROPHONE) {
//      printf("\nremove  returned %d.", remove(AppOpts.szWaveFile));
                // Initialize all the MCI structures, open the WAVE_AUDIO device
                // and set it to 44100 samples/sec, 16 bits/sample, stereo
                memset(&WaveParms, 0, sizeof(MCI_WAVE_OPEN_PARMS));
                memset(&RecordParms, 0, sizeof(MCI_RECORD_PARMS));
                memset(&SetParms, 0, sizeof(MCI_SET_PARMS));
                RecordParms.dwCallback = (DWORD)hwndFed;
                RecordParms.dwTo = 60000L;              // Maximum record time set to 60 seconds
                RecordParms.dwFrom = 0;
                SetParms.dwCallback = (DWORD)hwndFed;
                SetParms.dwAudio = MCI_SET_AUDIO_ALL;
                SetParms.nChannels = 1;
                SetParms.nSamplesPerSec = (DWORD)44100L;
                SetParms.wBitsPerSample = 16;
                SetParms.wFormatTag = WAVE_FORMAT_PCM;
                WaveParms.dwCallback = (DWORD)hwndFed;
                WaveParms.wDeviceID = WAVE_MAPPER;
                WaveParms.lpstrElementName = "";
                WaveParms.dwBufferSeconds = 30;
                WaveParms.lpstrDeviceType = "waveaudio";
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                mciError = mciSendCommand(0, MCI_OPEN,
                        MCI_OPEN_ELEMENT | MCI_OPEN_TYPE,
                        (DWORD) &WaveParms);
                mciGetErrorString (mciError, Buff, 255);
                mciError = mciSendCommand(WaveParms.wDeviceID, MCI_SET,
                        MCI_WAVE_SET_BITSPERSAMPLE | MCI_WAVE_SET_CHANNELS |
                        MCI_WAVE_SET_SAMPLESPERSEC | MCI_WAVE_SET_FORMATTAG,
                        (DWORD) &SetParms
                );
                mciGetErrorString (mciError, Buff, 255);
        }
        return RetVal;
} // END OF InitSound()


/***********************************************************************
        FUNCTION:       TermSound
        PURPOSE: Undo InitSound.
***********************************************************************/
void TermSound(void) {
 MCI_SAVE_PARMS SaveParms;
 char     Buff[255];

        if (AppOpts.sourceID <= SRC_MICHROPHONE) {
                // Now that I'm using the RECORDING dialog box to get the STOP
                // message, this option means nothing from the menu
                mciError = mciSendCommand(
                        WaveParms.wDeviceID, MCI_STOP,
                        MCI_WAIT, (DWORD) &WaveParms
                );
                // saves recorded sound to "RECORD.WAV"
                // this should be made variable
                SaveParms.lpfilename = (char *)AppOpts.szWaveFile;
                mciError = mciSendCommand(
                        WaveParms.wDeviceID, MCI_SAVE, MCI_WAIT | MCI_SAVE_FILE,
                        (DWORD) &SaveParms
                );
                RecordParms.dwFrom = 0;
                // Plays back what was recorded
//      if (AppOpts.DestID <= DEST_WAVEFILE) {
                        mciError = mciSendCommand(
                                WaveParms.wDeviceID, MCI_PLAY, MCI_WAIT | MCI_FROM,
                                (DWORD) &RecordParms
                        );
//      }
                // Close and reopen WAV_AUDIO device to flush out
                // what we just saved
                mciError = mciSendCommand(
                        WaveParms.wDeviceID,
                        MCI_CLOSE, MCI_WAIT, (DWORD) &WaveParms
                );
                mciError = mciSendCommand(
                        0, MCI_OPEN,
                        MCI_OPEN_ELEMENT | MCI_OPEN_TYPE,
                        (DWORD) &WaveParms
                );
                mciGetErrorString (mciError, Buff, 255);
                WaveParms.lpstrElementName = "";
                mciError = mciSendCommand(
                        WaveParms.wDeviceID, MCI_SET,
                        MCI_WAVE_SET_BITSPERSAMPLE | MCI_WAVE_SET_CHANNELS |
                        MCI_WAVE_SET_SAMPLESPERSEC | MCI_WAVE_SET_FORMATTAG, (DWORD) &SetParms
                );
                mciGetErrorString (mciError, Buff, 255);
                // Close and reopen WAV_AUDIO device to flush out
                // what we just saved
                mciError = mciSendCommand(
                        WaveParms.wDeviceID,
                        MCI_CLOSE, MCI_WAIT, (DWORD) &WaveParms
                );
                mciGetErrorString (mciError, Buff, 255);
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        }
} // END OF TermSound()

/************************************************************************
        FUNCTION: RecordDlgProc(HANDLE, MSG, WPARAM, LPARAM)
        PURPOSE: processes Recording dialog box to allow STOP
 ************************************************************************/
BOOL FAR PASCAL __export RecordDlgProc(HWND hWnd,UINT message, UINT wParam, LONG lParam) {
 static UINT        uTimer;
 static WORD        wCounter = 0;
 char                       szBuffer[15];

        switch (message) {
                case WM_INITDIALOG:
                        // reset counter
                        wCounter = 0;
                        // set a 1/10 second timer
                        uTimer = SetTimer(hWnd, 16, 100, NULL);
                return TRUE;

                case WM_TIMER:
                        // every 1/10th second, update the counter on screen
                        itoa(++wCounter, szBuffer, 10);
                        SetDlgItemText(hWnd, IDC_COUNT, szBuffer);
                return TRUE;

                case WM_COMMAND:
                        EndDialog(hWnd, wParam);
                default:
                return FALSE;
        }
} // END OF RecordDlgProc()

/*****************************************************************
 *  ProcessWaveFile - Do Sound recognition on a given wave file.
 *****************************************************************/
void
ProcessWaveFile(char *WaveFile)
{
        struct HIGGINS      *pHiggins;
        int                         MaxAmpl;
        int                         numpts;
        FILE                        *fptr;

        int                                                        nCount;
        struct HIGGINS                              *thisHiggins;
        struct HIGGINS                              *pSREHList = (struct HIGGINS *)0;
        LPVOID                                              lpThisPtr, lpBigBuff;
        HANDLE                                              hBigBuff;

        if ((fptr = fopen( WaveFile,"rb")) == NULL)
        {
                printf("<%d> Couldn't open Wave File %s\n",
                        (int)fptr, WaveFile);
                return;
        }

#ifdef CRT
        if ( clo.debug )
                printf( "Reading file %s\n", WaveFile );
#endif

#ifdef CRT
        if ( clo.sound )
                playfile( WaveFile );

        printf( "\n\nTesting Person %d -- Sex: %c Age: %d -- Sound [%d] %s: ",
                                        PersonNumber,
                                        subject[PersonNumber].sex,
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                                subject[PersonNumber].age,
                                                SoundNumber,
                                                (SoundNumber < 128 ? pascii[SoundNumber] :
"Unknown") );
#endif

        Microbes = ncalls = 0;

        read_header(fptr);

        /* Seek to the start of the selected sound data */
        fseek(fptr, (clo.frameloc * sizeof(int)), SEEK_SET);

        /* Initialize the DSP stuff */
        if (dspInitialize()) {
                return;
        }

        /* Initialize the Sound Recognition Engine */
//      if (sreInitialize( LookAtHiggins )) {
//              return;
//      }

        SendMessage(hCPUWnd, uDSPMsg, DSP_CPU_MSG_BEGINFILE, 0L);

        /* Read 10240 into buffer */
        while ( (numpts = read_wav(fptr, pRawData)) != 0 ) {

                /* Send the raw data off to the routine which mimicks the DSP */
#ifdef HARDWARE
                dspProcessBuffer( pRawData, pFilteredData );
#else
                dspProcessBuffer( pRawData, pFilteredData, numpts );
#endif
                /* Convert from DSP higgins list to 68030 higgins list.  Things
                        are contained in the globals: pDSPHList and dspMaxAmpl. */
                pHiggins = pDSPHList;
                MaxAmpl = dspMaxAmpl;

                /* Send the Higgins structure and the MaxAmpl calculated on the DSP
                        to the 68030. */
                //sreProcessHiggins( pHiggins, MaxAmpl );
                SendMessage(hCPUWnd, uDSPMsg, DSP_CPU_MSG_MAXAMPL, (LPARAM)MAKELPARAM(0,
dspMaxAmpl));

                hBigBuff = (HANDLE)NULL;
                hBigBuff = GlobalAlloc(GPTR | GMEM_SHARE, sizeof(struct HIGGINS)*NumberOfNodes);
                lpBigBuff = (LPVOID)GlobalLock(hBigBuff);
                lpThisPtr = lpBigBuff;
                thisHiggins = pDSPHList;

                // run this routine in place PMI/Evaluate/Troi in DSPMAIN
//              for(nCount = 1; nCount <= NumberOfNodes; nCount++)

                while (thisHiggins->next != NULL)
                {
                        memcpy(lpThisPtr, thisHiggins, sizeof(struct HIGGINS));
                        thisHiggins = thisHiggins->next;
                        ((struct HIGGINS *)lpThisPtr)++;
                }

                SendMessage(hCPUWnd, uDSPMsg, DSP_CPU_MSG_NEWLIST, (LPARAM)lpBigBuff);
                lpBigBuff = (LPVOID)GlobalUnlock(hBigBuff);
                hBigBuff = GlobalFree(hBigBuff);

        }       /* End of While( read_wav)  */

        SendMessage(hCPUWnd, uDSPMsg, DSP_CPU_MSG_ENDOFFILE, (LPARAM)NULL);

//      sreCleanUp();
        dspCleanUp();
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
}

#if 0
/****************************************************************
 *  ProcessWaveFile - Do Sound recognition on a given wave file.
 ****************************************************************/
void
ProcessWaveFile(char *WaveFile)
{
        int
                numpts, firstTime;
        int
                nCount;
        int
                dspMaxAmpl;
        FILE
        *fptr;
        struct HIGGINS                          *thisHiggins;
        struct HIGGINS                          *pSREHList = (struct HIGGINS *)0;
        LPVOID                                                          lpThisPt.
lpBigBuff;
        HANDLE                                                          hBigBuff;

        if ((fptr = fopen(WaveFile,"rb")) == NULL)
        {
                printf("<%d> Couldn't open Wave File %s\n", (int)fptr, WaveFile);
                return;
        }
        Microbes = ncalls = 0;
        read_header(fptr);
        /* Create the HIGGINS doublely linked list; we'll reuse it for
                each chunk of data processed in sreProcessBuffer(). */
        if(CreateHigginsList(NumberOfNodes, &pSREHList) != ALL_OK)
        {
                return;                 /* Couldn't create the list. */
        }
        SendMessage(hCPUWnd, uDSPMsg, DSP_CPU_MSG_BEGINFILE, 0L);
        firstTime = 1;
        while((numpts = read_wav(fptr, vb_data)) != 0)
        {
                //  Frame data
                ncalls++;
                // Calculate Ls, Ld, zcr and the node type (Voiced, Unvoiced,
                // Quiet) for every node in the list and set the node location
                // and size.
                ClearHigginsList(pSREHList);
                dspMaxAmpl = 0;
                EvalTimeDomain(vb_data, numpts, pSREHList, &dspMaxAmpl);
                SendMessage(hCPUWnd, uDSPMsg, DSP_CPU_MSG_MAXAMPL, (LPARAM)MAKELPARAM(0,
dspMaxAmpl));
                firstTime = 0;
                // Run the Bach analysis on the voice data
#ifndef CHEAT
                Decompose(/*vb_data, pSREHList,*/ numpts);
#endif
                hBigBuff = (HANDLE)NULL;
                hBigBuff = GlobalAlloc(GPTR | GMEM_SHARE, sizeof(struct HIGGINS)*NumberOfNodes);
                lpBigBuff = (LPVOID)GlobalLock(hBigBuff);
                lpThisPtr = lpBigBuff;
                thisHiggins = pSREHList;
                // run this routine in place PMI/Evaluate/Troi in DSPMAIN
                for(nCount = 1; nCount <= NumberOfNodes; nCount++)
                {
                        memcpy(lpThisPtr, thisHiggins, sizeof(struct HIGGINS));
                        thisHiggins = thisHiggins->next;
                        ((struct HIGGINS *)lpThisPtr)++;
                }
                SendMessage(hCPUWnd, uDSPMsg, DSP_CPU_MSG_NEWLIST, (LPARAM)lpBigBuff);
                lpBigBuff = (LPVOID)GlobalUnlock(hBigBuff);
                hBigBuff = GlobalFree(hBigBuff);
        }       // END OF While(read_wav)
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        SendMessage(hCPUWnd, uDSPMsg, DSP_CPU_MSG_ENDOFFILE, (LPARAM)NULL);
        pSREHList = (struct HIGGINS *)0;
} // END OF ProcessWaveFile

#endif

void GiveFileToElrond(char *SoundFilePath)
{
        Setup();
        ProcessWaveFile(SoundFilePath);
        Cleanup();
}
#ifdef    __cplusplus
}
#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE****************************************************************
        FILE            : evaltd.c
        DESC            : Evaluate the time domain data
        TABS            : 4
        OWNER           : Brent Hale
        DATE CREATED: 5 Oct 1994

                                        Copyright Synergetics 1993, 1994

                                        Warning Confidential Material
                                        Property of Synergetics
                                        Copyright 1993, 1994 All Rights Reserved

        SYNOPSIS: This code will be on the DSP.
*END_HEADER*****************************************************************/

#include "synergy.h"
#include "dsp.h"
#include "evaltd.h"
#include "lstsqrs.h"
#include "dpfilter.h"
#include "errors.h"
#include "bach.h"

#ifdef  HARDWARE
/* Make the routine EvalTimeDomain callable from assembly. */
void EvalTimeDomain()__asm("evalTimeDomain");
#endif


/* PIsItVBuffer is a buffer we use when we call IsItVoiced(). We allocate
        it once in the init routine so that we don't have to call malloc more than
        once. */
static int          *pIsItVBuffer = (int *)0;

/*FUNCTION_HEADER**********************
NAME:           InitTimeDomain
DESC:           Initialize memory needs for the Evaluation of Time Domain Data.
IN:             none
OUT:            none
RETURN:     ALL_OK on success
                        OutOfMemory if can't get the memory.
NOTES:      By allocating the memory once, we can save a little bit of time.
*END_HEADER***************************/
int InitTimeDomain( void )
{
        if ((pIsItVBuffer = (int *)malloc(10240 * sizeof(int))) == (int *)0) {
                ErrorHandler( OutOfMemory, "In InitTimeDomain" );
                return OutOfMemory;
        }
        return ALL_OK;
}

/*FUNCTION_HEADER**********************
NAME:
DESC:
IN:
OUT:
RETURN:
NOTES:
*END_HEADER***************************/
void CleanUpTimeDomain( void )
{
        if (pIsItVBuffer) {
                free (pIsItVBuffer);
        }
}

#ifdef   MADE_IT_INLINE
/*FUNCTION_HEADER**********************
NAME:     NumberZeroCrossings
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
DESC:     return the number of times the data crosses zero.  Could
               be used for waves or windows.
IN:
OUT:
RETURN:
NOTES:
*END_HEADER***************************/
static int NumberZeroCrossings(int *data, int n)
{
          int i;
          int ncrossings=0;

          for ( i=1; i<n; i++ )
          {
                    if (      (data[i] >= 0) &&                      /*  crossing from - to +  */
                                        (data[i-1] <= 0) )
                              ncrossings++;

                    else if (           (data[i] <= 0) &&            /*  crossing from + to -  */
                                                  (data[i-1] >= 0) )
                              ncrossings++;
          }

          return ncrossings;
}
#endif

/**************************************************************
 *  IsItVoiced - Determine whether a questionable segment is
 *  voiced or not.
 **************************************************************/
#ifdef    HARDWARE
static int IsItVoiced(int *data)
#else
static int IsItVoiced(int *data, int n)
#endif
{
          int ncrossings=0;
          int i,
                    min,
                    minloc = 0,
                    stages = 7,
                    start, len;

          float slope;

          memcpy(pIsItVBuffer, data, (DATASIZE * sizeof(int)) );

          /*  filter out frequencies above 3000 hz  */
          DoublePassFilter(pIsItVBuffer, DATASIZE, stages);

          /* DATASIZE will be 10240 when on the HARDWARE and 'n' otherwise */
          for ( i=0, min=0; i < DATASIZE; i++ )
          {
                    /* Find the min and check slopes,
                              periodic data should have steep slopes. */
                    if ( pIsItVBuffer[i] < min )
                    {
                              min = pIsItVBuffer[i];
                              minloc = i;
                    }


                    /*  Smooth and recheck the number of zero crossings.  */
                    if (      (pIsItVBuffer[i] >= 0) &&                /*  crossing from -
to +  */
                                        (pIsItVBuffer[i-1] <= 0) )
                              ncrossings++;

                    else if (           (pIsItVBuffer[i] <= 0) &&      /*  crossing from +
to -  */
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        (pIsItVBuffer[i-1] >= 0) )
                        ncrossings++;
        }

        ncrossings = ncrossings * 100 / DATASIZE;

        if ( i > (DATASIZE / 2) )
        {
                if ( (minloc - 50) < 0 )
                        start = 0;
                else
                        start = minloc - 50;

                if ( (DATASIZE - minloc) < 50 )
                        len = DATASIZE - minloc;
                else
                        len = 50;

                slope = LeastSquares(&pIsItVBuffer[start], len, SLOPE);
        }
        else
        {
                if ( (DATASIZE - minloc) < 50 )
                        len = DATASIZE - minloc;
                else
                        len = 50;
                slope = LeastSquares(&pIsItVBuffer[minloc], len, SLOPE);
        }

        if ( ncrossings < 8 && fabs(slope) > 35 )
                return TRUE;
        else
                return FALSE;
}

/*FUNCTION_HEADER**********************
NAME:   EvalTimeDomain
DESC:   Calculate Ls, Ld, and type (Voiced, Unvoiced, etc )
IN:             *vdata - wave data buffer.
                numpts - number of values in the buffer
                *pHiggins - ptr to a higgins node to start evaluating.
                startingLoc - Beginning location value to put in frame->loc.
OUT:
RETURN:
NOTES:
*END_HEADER***************************/
#ifdef  HARDWARE
void EvalTimeDomain(int *data, DSP_HIGGINS *pHiggins, int *pMaxAmpl)
#else
void EvalTimeDomain(int *data, int n, DSP_HIGGINS *pHiggins, int *pMaxAmpl)
#endif
{
        static int dspMaxAmpl = 0;
        static int m = 0;
        DSP_HIGGINS *frame = pHiggins;
        int     i=0, j=0,
                        maxLs = 0,
                        zcr,
                        Qs;
        int     max, maxloc,
                        min, minloc;

        long Ls, Ld;

        if ( DATASIZE < SAMPLESIZE ) {
                *pMaxAmpl = 0;
                return;
        }

        while ( frame != NULL &&
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

08/781625

```
                    j < DATASIZE )
        {
                Ls = Ld = zcr = 0;
                max = maxloc = min = minloc = 0;
                for ( i = j; i < j + NODELENGTH; i++ )
                {
                        /*  Find the absolute max and min for plosive detection.  */
                        if ( data[i] > max )
                        {
                                max = data[i];
                                maxloc = i;
                        }
                        else if ( data[i] < min )
                        {
                                min = data[i];
                                minloc = i;
                        }

                        /* Calculate the sumation of the absolute value */
                        Ls += abs(data[i]);

                        /* Calculate the sumation of the absolute value of the difference:
                                How quickly data is changing from point to point */
                        if ( i < (DATASIZE - 1) )
                                Ld += abs(data[i+1] - data[i]);

                        /* Calculate the number of zero crossings. */
                        if ( i > 0 )
                        {
                                if (      (data[i] >= 0) &&
        /*  crossing from - to +  */
                                                (data[i-1] <= 0) )
                                        zcr++;

                                else if (         (data[i] <= 0) &&             /*
crossing from + to -  */
                                                                (data[i-1] >= 0) )
                                        zcr++;
                        }
                }

                /*  Percent number of zero crossings  */
                zcr = (int)(((long)zcr * 100) / NODELENGTH);

                Ls /= NODELENGTH;
                Ld /= NODELENGTH;

                /* maxLs is used towards calculating MaxAmpl */
                if ( Ls > maxLs )
                        maxLs = (int)Ls;

                if ( Ls > 0 )
                        Qs = (int)((float)Ld / (float)Ls * 50.0);
                else
                        Qs = 0;

                if ( Ls < QLEVEL )                                      /*  Found a quiet
section   */
                {
                        if ( max > (QLEVEL * 3) &&
                                (min * -1) > (QLEVEL * 3) &&
                                (minloc - maxloc) > 0 &&
                                (minloc - maxloc) < 50 )
                        {
                                frame->type = 'U';                      /*  Its a plosive
*/
                                frame->Fo = maxloc;
                                frame->FoAmpl = minloc;
                        }
                        else
                                frame->type = 'Q';
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
			}

			/* Does it have any high frequency components in it? */
			else if ( zcr <= 10 &&					/*  Found a voiced
section   */
							Qs <= 15 )
				frame->type = 'V';

			else if ( zcr > 20 &&					/*  Found an
unvoiced section    */
							Qs > 30 )
			{
				frame->type = 'U';
				if ( max > (Ls * 3) &&			/*  max and min have to 3X Ls
*/
					(min * -1) > (Ls * 3) &&
					(minloc - maxloc) > 0 &&	/*  the min always follows the
max  */
					(minloc - maxloc) < 50 )		/*  the min and max
are within 50 of each other  */
				{
					frame->Fo = maxloc;
					frame->FoAmpl = minloc;
				}
			}

			/* Hopefully we don't fall into this else too often. */
			else
				/*  Unvoiced or a Fricative   */
			{
				if ( IsItVoiced(&data[j], NODELENGTH) == TRUE )
					frame->type = 'V';
				else
					frame->type = 'U';
			}

			frame->Ls = (int)Ls;

			frame = frame->next;
			j += NODELENGTH;
		}	/*  end of while  */

		/*  Check voiced / unvoiced designations  */
		frame = pBiggins;
		while( frame != NULL )
		{
			if ( frame->type == NULL )	/* assign any leftovers at the end to Q */
				frame->type = 'N';

			if ( frame->type == 'Q' || frame->type == 'N' )
			{
				frame = frame->next;
				continue;
			}

			if ( frame->prev != NULL && frame->next != NULL &&
				frame->type != frame->next->type &&
				frame->type != frame->prev->type )
			{
				if ( frame->type == 'V' &&
					frame->next->type == 'U' &&
					frame->prev->type == 'U' )
					frame->type = 'U';

				else if ( frame->type == 'U' &&
							frame->next->type == 'V' &&
							frame->prev->type == 'V' )
					frame->type = 'V';
			}

			/*  Smooth Ls while we are at it  */
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
			if ( frame->prev == NULL )
				frame->Ls = (int)(((long)frame->Ls + (long)frame->next->Ls) / 2);
			else if ( frame->next == NULL )
				frame->Ls = (int)(((long)frame->Ls + (long)frame->prev->Ls) / 2);
			else
				frame->Ls = (int)(((long)frame->prev->Ls + (long)frame->Ls +
(long)frame->next->Ls) / 3);

			frame = frame->next;
		}

		/*  Calculate the moving average of the maximum Ls of each 10K section  */
		dspMaxAmpl = (int)((( (long)dspMaxAmpl * m ) + (long)maxLs) / (m + 1));
		if ( m < 7 )
			m++;

		*pMaxAmpl = dspMaxAmpl;
		return;
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/************************************************
 *                  -- bach.c --
 *  Copywrite Synergetics 1993, 1994
 *
 * Warning Confidential Material
 * Property of Synergetics
 * Copyright 1993, 1994 All Rights Reserved
 ************************************************/
#include  "synergy.h"
#include "bach.h"
#include "dspeng.h"
#include  "filtcoef.h"

#define   MIN_BANDFILTER      100              /* minimum band height for a filter pass */
#define   MAX_BANDFILTER      350              /* maximum band height for a filter pass */
#define   MIN_POINTS_PER_PERIOD 10

/* external Variables */
extern struct COMMANDLINE clo;

int bachFilters[NFILTERS+1] = {0, 250, 500, 1000, 1500, 2000, 2500, 3000, 3500,
                               4000, 4500, 5000, 6000, 7000, 8000, 9000, 10000};


/*FUNCTION_HEADER*********************
NAME:               Decompose
DESC:               Take a 10240 chunk of raw Data, filter and evaluate it
IN:                 *pRawData - A ptr to the Raw Data
                            *pFilteredData - A ptr to a buffer to store the filtered data in.
                            n - Number of Raw Data points to be processed.  (On the HARDWARE,
                                                this number will always be 10240)
OUT:
RETURN:
NOTES:    This code shall be in C on the DSP chip
*END_HEADER***************************/
#ifdef    HARDWARE
void Decompose( void )
#else
void Decompose( int n )
#endif
{
        static    int       Fo = 0;
        static    int       FoAmpl = 0;
        int i,
                  filter,            /* bandpass filter center              */
                  fl,                         /* bandpass filter lower cutoff  */
                  fh;                         /* bandpass filter high cutoff          */
        int firstFl = 0;

        /* *********** This is the loop that filters the data ************  */
        for ( i = 0; i < NFILTERS; i++ )
        {
                if ( i == 1 )
                {
                        if ( Fo )
                                fl = (int)((((float)Fo + 25.0) / 50.0) + 0.5) * 50;
                        else if ( firstFl )
                                fl = firstFl;
                        else
                                fl = 150;

                        if ( fl > 350 )             /*  This is just a safety net  */
                                fl = 350;
                }
                else
                        fl = bachFilters[i];

                /* Start low and work up */
                if (fl == 0)
                {
                        if ( Fo )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        fh = (int)((((float)Fo + 25.0) / 50.0) + 0.5) * 50;
                                else
                                        fh = 150;

                                if ( fh > 350 )                 /*  This is just a safety net  */
                                        fh = 350;
                        }
                        else
                                fh = bachFilters[i+1];

                        filter = (fl + fh) / 2;
#ifdef   HARDWARE
                        DoFilterPass( fl, fh, filter );
#else
                        DoFilterPass( fl, fh, filter, DATASIZE );
#endif
                        /*  We need to bump up the low pass filter until Fo gets started  */
                        if (i == 0 && !Fo )
                                firstFl = FindFo(fl, fh, filter, DATASIZE);

                }                       /* end of for loop */

                /*  Pull out the fundamental frequency and check for mislabeled
                        voiced fricatives. Must do it in Decompose rather than in
                        dspProcessBuffer since Fo and FoAmpl are static to this routine
                        and are used in EvaluateFilter() */
                GetFundamental( pDSPHList, &Fo, &FoAmpl );
}

/*FUNCTION_HEADER**********************
NAME:     DoFilterPass
DESC:     Try and find a formant freq for the filter band given
IN:
OUT:
RETURN:   0 if the lowpass filter was NOT bumped up.
                non-zero if it was.  The # returned will be the number to use as the
                        fl for the next pass.
                For all other filter bands this should return 0.
NOTES:    This could potentially be called recursively when it finds a complex
                wave in the band given.
*END_HEADER****************************/
#ifdef   HARDWARE
int DoFilterPass(int fl, int fh, int filterCenter )
#else
int DoFilterPass(int fl, int fh, int filterCenter, int n )
#endif
{
        COEFF     *pCoeff;
        int       filterNum;
        int ln = 4,                                             /* Filter order of each
section  */
                  ns = 2,                                       /* number of sections in each
cascade  */
                  error;                                /* error indicator from called functions
*/

        float     avg;                          /* average of |data|
                  */

        filterNum = GetPtr2Coeff( filterCenter );

#ifdef DEBUG_FILTER
        if (pCoeff->filterCenter != filterCenter)
                printf("\n\nINDEX GENERATOR HOSED UP!!!\n\n");

#ifndef NOCLO
        if ( clo.debug )
        {
                printf("\n\nfl,fh: (%d,%d)  FC: %d,\t  Length: %d",
                                        fl, fh, filterCenter, FilterLength);
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                printf("\tFor Locations: ");
                for (i = 0; i < numPairs; i++) {
                        printf("(%d-%d) ", pStartingLocs[i], pEndingLocs[i] );
                }
                printf("\n");
        }
#endif
#endif

#ifdef  HARDWARE
        /* On hardware the filterNumber will signal how many points to skip.  It
                will always take the Raw Input from pRawData and always put it in
                pFilteredData. */
        DoFilter( filterNum );

        EvaluateFilter(DATASIZE / pCoeff->pointsToSkip, pCoeff, fl, fh,
                 filterNum < 5 ? 0 : filterNum < 10 ? 1 : filterNum - 8);
#else
        pCoeff = &coeffTable[filterNum];

        /*  Load data to be filtered and calculate average  */
        avg = LoadInput(pRawData, 0, DATASIZE, pFilteredData, pCoeff->pointsToSkip);

        /*  Filter data using a cascade type IIR filter,
                 the filtered data will be returned in pFilteredData  */
        if (avg) {
                error = spcflt(pCoeff->b, pCoeff->a, ln, ns, pFilteredData,
                                                DATASIZE / pCoeff->pointsToSkip,
                                                pCoeff->lastInput, pCoeff->lastOutput);
                if ( error > 0 )
                        ErrorHandler( Filter, "in DoFilterPass" );
        }
        else {
                memset ( pFilteredData, 0, RAWDATASIZE * sizeof(float));
                memset ( pCoeff->lastOutput, 0, 8 * sizeof(float));
                memset ( pCoeff->lastInput, 0, 10 * sizeof(float));
        }

        if (avg > QLEVEL) {
                /* Check to see if anything is in this bandpass filter*/
                EvaluateFilter(DATASIZE / pCoeff->pointsToSkip, pCoeff, fl, fh,
                        filterNum < 5 ? 0 : filterNum < 10 ? 1 : filterNum - 8);
        }
#endif

        return 0;
}

/*FUNCTION_HEADER**********************
NAME:   FindFo
DESC:   Try and find which low pass filter to use for the fundamental
IN:
OUT:
RETURN: The last fh used.
NOTES:  This should only be called until The average Fo is established
                and we know which low pass filter to use.
*END_HEADER****************************/
int FindFo(int fl, int fh, int filter, int n)
{
        int foundFo = 0;
        int tmpFo;
        int tmpFoAmpl;
        DSP_HIGGINS *frame;

        /*  Count the number of voiced nodes in the DSP_HIGGINS list  */
        for(frame = pDSPHList; frame != NULL && frame->type != 'N'; frame = frame->next)
        {
                if (frame->type == 'V' )
                        foundFo++;
        }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

Docket No.: 13217.2

```
        if ( foundFo > 10 )
                FoHistogram( pDSPHList, &tmpFo, &tmpFoAmpl );
        else
                return 0;

        /*  Bump up the low pass filter cutoff until the fundamental is found  */
        if ( tmpFo == 0 )
        {
                fh += 50;
                foundFo = 0;
                while (! foundFo)
                {
#ifdef    HARDWARE
                        DoFilterPass( fl, fh, filter );
#else
                        DoFilterPass( fl, fh, filter, n );
#endif
                        FoHistogram( pDSPHList, &tmpFo, &tmpFoAmpl );

                        if ( tmpFo == 0 )
                        {
                                if ( fh < 350 )
                                        fh += 50;          /*  Bump up the low pass and
try again  */
                                else
                                        return 0;          /*  No more low pass filters
left  */
                        }
                        else
                                break;                            /*  Yeah! We found
it  */
                }
        }

        return fh;

}
```

Docket No.: 13217

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/***********************************************
 *                    -- filter.c --
 *  Copywrite Synergetics 1993, 1994
 *
 * Warning Confidential Material
 * Property of Synergetics
 * Copyright 1993, 1994 All Rights Reserved
 ***********************************************/
#include "filter.h"

/*****************************************************************
 * SPCFLT - Cascade-Form IIR Digital Filter     11/13/85
 * FILTERS N-POINT DATA SEQUENCE IN PLACE USING ARRAY X
 * TRANSFER FUNCTION IS COMPOSED OF NS SECTIONS IN CASCADE WITH
 *       MTH STAGE TRANSFER FUNCTION
 *            B(0,M)+B(1,M)*Z**(-1)+......+B(LS,M)*Z**(-LS)
 *     H(Z) = -----------------------------------------
 *               1+A(1,M)*Z**(-1)+.......+A(LS,M)*Z**(-LS)
 * PX RETAINS PAST VALUES OF INPUT X
 * PY RETAINS PAST VALUES OF OUTPUT Y
 * IERROR=0     NO ERRORS DETECTED
 *     1 - NS  OUTPUT AT STAGE [IERROR] EXCEEDS 1.E10
 *  b[] - coefficients for each section
 *  a[] - coefficients for each section
 *  ls - order of sections
 *  ns - number of sections in filter
 *  x[n] - data array (input and output)
 *  n - number of samples in x
 *  px - retains past inputs for each section
 *  py - retains past outputs for each section
 *****************************************************************/
int
spcflt(   float *b, float *a, int ls, int ns, float *x, int n,
                             float *px, float *py)
{
    /* Local variables */
           int  k,
                             m,
                             ll,
                             b_diml,
                             a_diml,
                             px_diml,
                             py_diml;

/*         static long cnt; */

           b_diml = ls + 1;
    a_diml = ls;
    px_diml = ls + 1;
    py_diml = ls;

          for (m = 0 ; m < ns ; ++m)
          {
                   for (k = 0 ; k < n ; ++k)
                   {
                             px[m * px_diml] = x[k];
                             x[k] = b[m * b_diml] * px[m * px_diml];

                             for (ll = 1 ; ll <= ls ; ++ll)
                             {
                                      x[k] = x[k] + b[ll + m * b_diml] * px[ll + m * px_diml]
                                               - a[ll - 1 + m * a_diml] * py[ll - 1 + m *
py_diml];

/*                                    cnt++; */
                             }

                             if (fabs(x[k]) > BIG)
                                      return m;

                             for (ll = ls ; ll >= 2 ; --ll)
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                {
                                        px[11 + m * px_dim1] = px[11 - 1 + m * px_dim1];
                                        py[11 - 1 + m * py_dim1] = py[11 - 2 + m * py_dim1];
                                }

                                 px[m * px_dim1 + 1] = px[m * px_dim1];
                                 py[m * py_dim1] = x[k];
                        }
        }

/*      printf("\n%ld", cnt); */

        return 0;
} /* spcflt */

/**********************************************************************
 * GenerateCoefficients
 *                      fl - low frequency cutoff
 *                      fh - high frequency cutofff
 *                      samples - samples going into filter
 *                      b - return for numerator coefficients
 *                      a - return for denominator coefficients
 **********************************************************************/
int
GenerateCoefficients(int iband, float fln, float fhn, int ln, int ns, float *b, float *a)
{
        int     error;

        /* LOWPASS ANALOG TO BANDPASS DIGITAL SCALED IN FREQUENCY */

        /*  Generate coefficients.  */
        error = spiird(iband, ns, ln, fln, fhn, b, a);

        if (error != 0)
                ErrorHandler( Coefficients, "in GenerateCoefficients" );

/* #define SHOWCOEF */
#ifdef SHOWCOEF
{
        extern long NewSampleRate;
        FILE *fptr;
        int i;

        if ( (fptr = fopen("coeff.dat", "a")) == NULL )
                ErrorHandler( FileOpen, "coeff.dat" );

        if (fln == fhn) {                       /* LowPass. */
                fprintf(fptr, "\t{ %d,\n", (int)((fhn/2.0*(float)NewSampleRate) + 0.5) );
        }
        else {
                fprintf(fptr, "\t{ %d,\n", (int)(((fln+fhn)/2.0*(float)NewSampleRate) + 0.5) );
        }

        fprintf(fptr, "\t\t{ ");
        for (i = 0 ; i < (ln * ns); ++i)
                fprintf(fptr, "%12.15f, ", a[i]);
        fprintf(fptr, "},\n");

        fprintf(fptr, "\t\t{ ");
        for (i = 0 ; i < ((ln+1) * ns) ; ++i)
                fprintf(fptr, "%12.15f, ", b[i]);
        fprintf(fptr, "},\n");

        fprintf(fptr, "\t\t{ ");
        for (i = 0 ; i < (ln * ns); ++i)
                fprintf(fptr, "0.0, ");
        fprintf(fptr, "},\n");

        fprintf(fptr, "\t\t{ ");
        for (i = 0 ; i < ((ln+1) * ns) ; ++i)
                fprintf(fptr, "0.0, ");
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        fprintf(fptr, "}},\n\n");

        fclose( fptr );
}
#endif

        return error;

}

int
spiird(int iband, int ns, int ls, float fln, float fhn, float *b, float *a)
{
        int     error = 0,
                        k,                      /*  section number  */
                        b_dim1,         /*  dimension size of b  */
                        a_dim1,         /*  dimension size of a  */
                        tmp_int;

        float *work,
                        *c,     /*  analog denominator coefficients   */
                        *d;     /*  analog numerator coefficients     */


        if ( ns <= 0 ||
                    iband < LOWPASS ||
                    iband > STOPBAND )
                return 6;

        if ( fln <= 0 || fhn >= 0.5 )
                return 7;

        if (    (iband == BANDPASS || iband == STOPBAND) &&
                        fln >= fhn )
                return 7;

        b_dim1 = ls + 1;
        a_dim1 = ls;

        if ( (c = (float *)calloc(b_dim1 , sizeof(float))) == NULL )
                ErrorHandler( OutOfMemory, "in spiird" );

        if ( (d = (float *)calloc(b_dim1 , sizeof(float))) == NULL )
                ErrorHandler( OutOfMemory, "in spiird" );

        if ( (work = (float *)calloc((b_dim1 * b_dim1) , sizeof(float))) == NULL )
                ErrorHandler( OutOfMemory, "in spiird" );

        for (k = 1 ; k <= ns ; ++k)
        {
                /*  Order of low-pass H(s)  */
                tmp_int = ns * 2;               /*  Why isn't this (ls * ns) ?  */

                /*  generate analog coefficients  */
                error = spbwcf(tmp_int, k, b_dim1, d, c);

                if (error != 0)
                {
                        free( c );
                        free( d );
                        free( work );
                        return error;
                }

                /*  Transform analog coefficients to digital coefficients  */
                error = spfblt(d, c, ls, iband, fln, fhn, &b[(k - 1) * b_dim1],
                          &a[(k - 1) * a_dim1], work);

                if (error != 0)
                {
                        free( c );
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                        free( d );
                        free( work );
                        return error;
                }
        }

        free( c );
        free( d );
        free( work );
        return error;
} /* spiird */

int
spfblt( float *d, float *c, int ln, int iband, float fln, float fhn,
                float *b, float *a, float *work)
{
        int      error;
        int work_dim1, tmp_int, i, k, l, m, zero_func, ll, mm, ls;
        float tmpc, tmpd, w, w1, w2, w02, tmp;

        /*  Make sure that d and c are not all zeros  */
        zero_func = TRUE;
        for (i = ln ; i >= 0 && zero_func ; --i)
        {
                if (c[i] != 0.0 || d[i] != 0.0)
                        zero_func = FALSE;
        }

        if ( zero_func )
                return 1;

        work_dim1 = ln + 1;

        m = i + 1;
        w1 = (float) tan(PI * fln);
        l = m * 2;

        if ( iband > HIGHPASS )
        {
                w2 = (float) tan(PI * fhn);
                w = w2 - w1;
                w02 = w1 * w2;
        }

        if (l > ln)
                return 3;


        switch (iband)
        {
                /* SCALING S/W1 FOR LOWPASS,HIGHPASS */
                case LOWPASS:

                        for (mm = 0 ; mm <= m ; ++mm)
                        {
                                d[mm] /= pow(w1, mm);
                                c[mm] /= pow(w1, mm);
                        }

                        break;

                /* SUBSTITUTION OF 1/S TO GENERATE HIGHPASS (HP,BS) */
                case HIGHPASS:

                        for (mm = 0 ; mm <= (m / 2) ; ++mm)
                        {
                                tmp = d[mm];
                                d[mm] = d[m - mm];
                                d[m - mm] = tmp;
                                tmp = c[mm];
                                c[mm] = c[m - mm];
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                c[m - mm] = tmp;
        }

        /* SCALING S/W1 FOR LOWPASS,HIGHPASS */

        for (mm = 0 ; mm <= m ; ++mm)
        {
                d[mm] /= pow(w1, mm);
                c[mm] /= pow(w1, mm);
        }

        break;

/* SUBSTITUTION OF (S**2+W0**2)/(W*S)  BANDPASS,BANDSTOP */
case BANDPASS:

        for (ll = 0 ; ll <= l ; ++ll)
        {
                work[ll] = 0.0;
                work[ll + work_diml] = 0.0;
        }

        for (mm = 0 ; mm <= m ; ++mm)
        {
                tmp_int = m - mm;
                tmpd = d[mm] * pow(w, tmp_int);
                tmpc = c[mm] * pow(w, tmp_int);

                for (k = 0 ; k <= mm ; ++k)
                {
                        ls = m + mm - (k * 2);
                        tmp_int = mm - k;
                        tmp = spbfct(mm,mm) / (spbfct(k,k)
                                 * spbfct(tmp_int,tmp_int));
                        work[ls] += tmpd * pow(w02, k) * tmp;
                        work[ls + work_diml] += tmpc * pow(w02, k) * tmp;
                }
        }

        for (ll = 0 ; ll <= l ; ++ll)
        {
                d[ll] = work[ll];
                c[ll] = work[ll + work_diml];
        }

        break;

/* SUBSTITUTION OF 1/S TO GENERATE HIGHPASS (HP,BS) */
case STOPBAND:

        for (mm = 0 ; mm <= (m / 2) ; ++mm)
        {
                tmp = d[mm];
                d[mm] = d[m - mm];
                d[m - mm] = tmp;
                tmp = c[mm];
                c[mm] = c[m - mm];
                c[m - mm] = tmp;
        }

        /* SUBSTITUTION OF (S**2+W0**2)/(W*S)  BANDPASS,BANDSTOP */

        for (ll = 0 ; ll <= l ; ++ll)
        {
                work[ll] = 0.0;
                work[ll + work_diml] = 0.0;
        }

        for (mm = 0 ; mm <= m ; ++mm)
        {
                tmp_int = m - mm;
```

Docket No.: 132!7.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        tmpd = d[mm] * pow(w, tmp_int);
                                        tmpc = c[mm] * pow(w, tmp_int);

                                        for (k = 0 ; k <= mm ; ++k)
                                        {
                                                ls = m + mm - (k * 2);
                                                tmp_int = mm - k;
                                                tmp = spbfct(mm,mm) / (spbfct(k,k)
                                                                * spbfct(tmp_int,tmp_int));
                                                work[ls] += tmpd * pow(w02, k) * tmp;
                                                work[ls + work_dim1] += tmpc * pow(w02, k) * tmp;
                                        }
                                }

                                for (ll = 0 ; ll <= l ; ++ll)
                                {
                                        d[ll] = work[ll];
                                        c[ll] = work[ll + work_dim1];
                                }

                                break;

                }       /*  end of switch  */


                error = spbiln(d, c, ln, b, a, work);

                return error;

} /* spfblt */


/**********************************************************************
 * SPBWCF - Signal Processing Butterworth Coefficients    11/13/85
 * GENERATES KTH SECTION COEFFICIENTS FOR LTH ORDER NORMALIZED
 *       LOWPASS BUTTERWORTH FILTER
 * SECOND ORDER SECTIONS: K<=(L+1)/2
 * ODD ORDER L:  FINAL SECTION WILL CONTAIN 1ST ORDER POLE
 * LN DEFINES COEFFICIENT ARRAY SIZE
 * ANALOG COEFFICIENTS ARE RETURNED IN D AND C
 * IERROR=0      NO ERRORS DETECTED
 *       1       INVALID FILTER ORDER L
 *       2       INVALID SECTION NUMBER K
 **********************************************************************/
int
spbwcf(int l, int k, int ln, float *d, float *c)
{
        /* Local variables */
        int i;
        float tmp;

        /*  Total order (ln * ns) must be greater than zero  */
        if (l <= 0)
                return 1;

        if ( k <= 0 ||
                  k > ((l + 1) / 2) )
                return 2;

        d[0] = c[0] = 1.0;
        for (i = 1 ; i < ln ; ++i)    /* RBM:  changed i <= ln to i < ln so it doesn't overrun the
array */
        {
                d[i] = 0.0;
                c[i] = 0.0;
        }

        tmp = (float) k - (l + 1.0) / 2.0;

        if (tmp == 0.0)
                c[l] = 1.0;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        else
        {
                c[1] = (float) (-2.0 * cos((double) ((k * 2) + 1 - 1)
                                        * PI / (double) (1 * 2)));
                c[2] = 1.0;
        }

        return 0;

} /* spbwcf */

int
spbiln(float *d, float *c, int ln, float *b, float *a, float *work )
{
        /* Local variables */
        int i, j, l, zero_func, work_dim1;
        float scale, tmp;
        double atmp;

        zero_func = TRUE;
        for (i = ln ; i >= 0 && zero_func ; --i)
        {
                if (c[i] != 0.0 || d[i] != 0.0)
                        zero_func = FALSE;
        }

        if ( zero_func )
                return 1;

        work_dim1 = ln + 1;

        l = i + 1;
        for (j = 0 ; j <= l ; ++j)
                work[j * work_dim1] = 1.0;

        tmp = 1.0;
        for (i = 1 ; i <= l ; ++i)
        {
                tmp = tmp * (float) (l - i + 1) / (float) i;
                work[i] = tmp;
        }

        for (i = 1 ; i <= l ; ++i)
        {
                for (j = 1 ; j <= l ; ++j)
                {
                        work[i + j * work_dim1] = work[i + (j - 1) * work_dim1]
                                                - work[i - 1 + j * work_dim1]
                                                - work[i - 1 + (j - 1) * work_dim1];
                }
        }

        for (i = l ; i >= 0 ; --i)
        {
                b[i] = 0.0;
                atmp = 0.0;

                for (j = 0 ; j <= l ; ++j)
                {
                        b[i] += work[i + j * work_dim1] * d[j];
                        atmp += (double) work[i + j * work_dim1] * c[j];
                }

                scale = (double) atmp;

                if (i != 0)
                        a[i - 1] = (double) atmp;
        }

        if (scale == 0.0)
                return 2;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        b[0] /= scale;
        for (i = 1 ; i <= 1 ; ++i)
        {
                b[i] /= scale;
                a[i - 1] /= scale;
        }

        /*  pad the remainder of the array with zeros  */
        if (1 < ln)
        {
                for (i = 1 + 1 ; i <= ln ; ++i)
                {
                        b[i] = 0.0;
                        a[i - 1] = 0.0;
                }
        }

         return 0;

} /* spbiln */

/*****************************************************************
 * SPBFCT - Computes factorial    11/14/85
 * GENERATES (I1)!/(I1-I2)!=I1*(I1-1)*...*(I1-I2+1).
 * NOTE: 0!=1 AND SPBFCT(I,I)=SPBFCT(I,I-1)=I!.
 *****************************************************************/
double
spbfct(int i1, int i2)
{
        /* Local variables */
        int i;
        double ret_val;

        ret_val = 0.0;
        if ( i1 < 0 ||
                  i2 < 0 ||
                  i2 > i1)
                return(ret_val);

        ret_val = 1.0;
        for (i = i1 ; i >= (i1 - i2 + 1) ; --i)
                ret_val *= (double) i;

        return(ret_val);

} /* spbfct */
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE*************************************************************
	FILE		: getfo.c
	DESC		: Routine to pull the Fundamental out of the data.
	TABS		: 3
	OWNER		: Brent Hale
	DATE CREATED: 31 Oct 1994

					Copyright Synergetics 1993, 1994

					Warning Confidential Material
					Property of Synergetics
					Copyright 1993, 1994 All Rights Reserved

	SYNOPSIS: The code will reside on the DSP since we need Fo to decide
					which low pass filters we can do without.
*END_HEADER*****************************************************************/

#include "bach.h"

#ifdef	HARDWARE
void GetFundamental()__asm("getFundamental");
#endif

#define NBINS 6

/**************************************************************************
 * FoHistogram - Create a histogram of the data in ffreq[0] for this
 * 10K section of data.  Find the highest peak in the histogram and return
 * the average of the frequencies in that bin.  Return 0 if there are less
 * than 4 values in the bin.
 **************************************************************************/
void FoHistogram( DSP_HIGGINS *frmstart, int *Fo, int *FoAmpl )
{
	DSP_HIGGINS *frame = frmstart;
	int i,
		max,
		maxloc,
		histogram[NBINS],
		binAverage[NBINS],
		amplAverage[NBINS],
		bins[NBINS] = {100, 150, 200, 250, 300, 350},
		minFo = 70;

	memset( histogram, 0, NBINS * sizeof(int) );
	memset( binAverage, 0, NBINS * sizeof(int) );
	memset( amplAverage, 0, NBINS * sizeof(int) );

	while ( frame != NULL )
	{
		if ( frame->type != 'V' )
		{
			frame = frame->next;
			continue;
		}

		if ( frame->ffreq[0] < bins[NBINS-1] )
		{
			for ( i = 0; i < NBINS; i++ )
			{
				if ( frame->ffreq[0] > minFo &&
						frame->ffreq[0] <= bins[i] )
				{
					histogram[i]++;
					binAverage[i] += frame->ffreq[0];
					amplAverage[i] += frame->ampl[0];
					break;
				}

			}
		}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                frame = frame->next;
        }

        for ( i = max = 0; i < NBINS; i++ )
        {
                if ( histogram[i] > 0 ) {
                        binAverage[i] /= histogram[i];
                        amplAverage[i] /= histogram[i];
                }

                if ( histogram[i] > max )
                {
                        max = histogram[i];
                        maxloc = i;
                }
        }

        if ( max > 10 ) {
                *Fo = binAverage[maxloc];
                *FoAmpl = amplAverage[maxloc];
        }
        else {
                *Fo = 0;
                *FoAmpl = 0;
        }

        return;
}

/************************************************************
 * GetFundamental - Check ffreq[0] for a valid fundamental
 * frequency and set Fo to that value.  If ffreq[0] is not
 * valid then set frame->Fo to the moving average Fo.
 ************************************************************/
void GetFundamental( DSP_HIGGINS *frmstart, int *Fo, int *FoAmpl )
{
        static int nFo = 0;

        int histogramFo,
            histogramAmpl;

        DSP_HIGGINS *frame = frmstart;

        FoHistogram( frmstart, &histogramFo, &histogramAmpl );
        if ( histogramFo > 0 )
        {
                *Fo = ((*Fo * nFo) + histogramFo) / (nFo + 1);    /* calc moving average */
                *FoAmpl = ((*FoAmpl * nFo) + histogramAmpl) / (nFo + 1);    /* calc moving
average */
                if ( nFo < 7 )
                        nFo++;
        }

        while (frame != NULL)
        {
                if ( frame->type == 'V' )
                {
                        /* Save the Fundamental Frequency */
                        if ( frame->ffreq[0]          > (*Fo * 0.7) &&
                             frame->ffreq[0]   < (*Fo * 1.3) )
                        {
                                frame->Fo = frame->ffreq[0];
                                frame->FoAmpl = frame->ampl[0];
                        }

                        /* Didn't find Fo in the filter so stuff the average */
                        else if ( *Fo && !frame->Fo )
                        {
                                frame->Fo = *Fo;
                                frame->FoAmpl = *FoAmpl;
                        }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                    else
                    {
                            frame->Fo = frame->ffreq[0];
                            frame->FoAmpl = frame->ampl[0];
                    }

                    frame->ffreq[0] = frame->ampl[0] = 0;
            }

            frame = frame->next;
        }
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE****************************************************************
FILE                         : gender.c
DESC                         : Person information we have for the vbss files.
TABS                         : 3
OWNER                        : Brent Hale
DATE CREATED: been around a long time.  I just moved it from a .h into
                                              a .h so that it would shut up the compiler.

Copyright Synergetics 1993, 1994

Warning Confidential Material
Property of Synergetics
Copyright 1993, 1994 All Rights Reserved

SYNOPSIS            :
*END_HEADER******************************************************************/

#include  "gender.h"

struct person subject[ 263 ] =
{{0, 'N'},
 {26, 'M'}, {16, 'F'}, {23, 'F'}, {78, 'F'}, {79, 'M'}, {27, 'F'}, {56, 'F'},
 {40, 'M'}, {42, 'F'}, {25, 'M'}, {21, 'M'}, {43, 'M'}, {52, 'M'}, {35, 'M'},
 {34, 'M'}, {29, 'M'}, {40, 'F'}, {40, 'F'}, {41, 'F'}, {45, 'F'}, {49, 'M'},
 {43, 'F'}, {46, 'M'}, {41, 'M'}, {41, 'M'}, {51, 'M'}, {45, 'F'}, {17, 'M'},
 {42, 'M'}, {16, 'M'}, {45, 'M'}, {42, 'F'}, {43, 'M'}, {43, 'F'}, {16, 'M'},
 {12, 'F'}, {14, 'M'}, {49, 'M'}, {15, 'F'}, {45, 'M'}, {40, 'F'}, { 4, 'M'},
 {52, 'M'}, {42, 'M'}, {40, 'F'}, {34, 'F'}, {12, 'M'}, { 8, 'M'}, {32, 'M'},
 {29, 'F'}, {10, 'M'}, { 8, 'F'}, {11, 'F'}, {32, 'F'}, {35, 'M'}, {10, 'F'},
 {10, 'F'}, {10, 'F'}, {11, 'F'}, {11, 'F'}, {11, 'F'}, {11, 'F'}, {10, 'F'},
 {11, 'F'}, {10, 'F'}, {11, 'F'}, {10, 'M'}, {10, 'M'}, {11, 'M'}, {10, 'M'},
 {10, 'M'}, {10, 'M'}, {11, 'M'}, {10, 'M'}, {11, 'M'}, {10, 'M'}, {11, 'M'},
 {11, 'M'}, {10, 'M'}, {11, 'M'}, {11, 'F'}, {10, 'F'}, {10, 'M'}, {11, 'M'},
 {11, 'M'}, {11, 'M'}, {11, 'M'}, {10, 'M'}, {11, 'M'}, {11, 'F'}, {11, 'F'},
 {11, 'F'}, {11, 'F'}, {10, 'M'}, {11, 'F'}, {10, 'M'}, {11, 'M'}, {10, 'F'},
 {11, 'F'}, {10, 'M'}, {10, 'M'}, {10, 'F'}, {11, 'F'}, {22, 'M'}, {27, 'M'},
 {30, 'F'}, {23, 'M'}, {19, 'F'}, {25, 'M'}, {19, 'M'}, {21, 'M'}, {19, 'M'},
 {19, 'M'}, {17, 'M'}, {22, 'M'}, {21, 'M'}, {21, 'M'}, {21, 'M'}, {22, 'M'},
 {21, 'F'}, {23, 'M'}, {18, 'F'}, {38, 'F'}, {19, 'F'}, {31, 'F'}, {50, 'M'},
 {57, 'M'}, {24, 'F'}, {22, 'M'}, {25, 'M'}, {27, 'F'}, {28, 'F'}, {19, 'F'},
 {22, 'M'}, {22, 'M'}, {19, 'F'}, {21, 'F'}, {22, 'M'}, {33, 'F'}, {22, 'M'},
 {23, 'M'}, {20, 'F'}, {36, 'M'}, {19, 'F'}, {34, 'F'}, {18, 'F'}, {24, 'M'},
 {27, 'M'}, {20, 'M'}, {25, 'M'}, {23, 'M'}, {21, 'M'}, {26, 'M'}, {24, 'M'},
 {18, 'F'}, {18, 'M'}, {19, 'F'}, {33, 'M'}, {19, 'F'}, {23, 'M'}, {21, 'M'},
 {31, 'F'}, {35, 'M'}, {21, 'M'}, {24, 'F'}, {51, 'F'}, {24, 'F'}, {35, 'M'},
 {23, 'M'}, {28, 'M'}, {18, 'F'}, {24, 'F'}, {23, 'M'}, {41, 'F'}, {19, 'F'},
 {19, 'M'}, {18, 'F'}, {14, 'M'}, {18, 'F'}, {24, 'F'}, {21, 'F'}, {20, 'F'},
 {21, 'M'}, {20, 'F'}, {22, 'M'}, {17, 'F'}, {24, 'M'}, {21, 'F'}, {23, 'F'},
 {32, 'F'}, {18, 'F'}, {17, 'M'}, {26, 'M'}, {17, 'F'}, {18, 'F'}, {21, 'M'},
 {22, 'M'}, {23, 'M'}, {19, 'M'}, {23, 'M'}, {28, 'F'}, {18, 'F'}, {22, 'F'},
 {24, 'F'}, {18, 'F'}, {21, 'F'}, {24, 'M'}, {20, 'F'}, {22, 'M'}, {23, 'M'},
 {20, 'F'}, {21, 'M'}, {24, 'M'}, {21, 'F'}, {22, 'M'}, {21, 'M'}, {21, 'F'},
 {25, 'M'}, {25, 'M'}, {23, 'M'}, {22, 'M'}, {23, 'M'}, {21, 'M'}, {21, 'M'},
 {19, 'F'}, {21, 'M'}, {21, 'M'}, {21, 'M'}, {38, 'F'}, {26, 'F'}, {21, 'F'},
 {21, 'M'}, {19, 'F'}, {27, 'F'}, {21, 'M'}, {22, 'F'}, {19, 'F'}, {24, 'M'},
 {21, 'F'}, {21, 'M'}, {29, 'M'}, {22, 'M'}, {25, 'M'}, {19, 'F'}, {25, 'F'},
 {16, 'F'}, {22, 'M'}, {18, 'F'}, {21, 'M'}, {22, 'F'}, {14, 'M'}, {49, 'F'},
 {40, 'M'}, {45, 'F'}, {48, 'M'}, {12, 'F'}, {12, 'M'}, {13, 'F'}, {11, 'M'},
 {11, 'F'}, {11, 'M'}, {11, 'F'} };
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE****************************************************************
        FILE            : evalfilt.c
        DESC            : The C routines to Evaluate the Filtered data
        TABS            : 3
        OWNER           : Brent Hale
        DATE CREATED: 31 Oct 1994

                                        Copyright Synergetics 1993, 1994

                                        Warning Confidential Material
                                        Property of Synergetics
                                        Copyright 1993, 1994 All Rights Reserved

        SYNOPSIS: Broken out from bach.c.

                                This code will reside on the DSP and be in C.
*END_HEADER*******************************************************************/
#include "bach.h"
#include "errors.h"
#include "measuref.h"
#include "dspeng.h"
#include "lstsqrs.h"

#ifdef  HARDWARE
/* Make the routine EvalTimeDomain callable from assembly. */
int EvaluateFilter()__asm("evalutateFilter");
#endif

/* Set it up according to:
        Sxy     xy - (x * y / n)
        ----    = ---------------
        Sxx        xsqr - (x * x / n)

        And since n is always 3 for this macro:
                n = 3
                x = 3
                y = summation of the three data points
                xy = summation of data[i] * i
                xsqr = summation of i * i or 5 (ie. 0 + 1 + 4)
*/
#define DLEASTSQUARES3SLOPE( d1, d2, d3 )        \
                ((d2 + (d3 * 2.0)) - (d1 + d2 + d3)) / (5.0 - 3.0)

/*FUNCTION_HEADER**********************
NAME:   EvaluateFilter
DESC:   Check the filtered data first to see if there
                is a signal found in this bandpass.  If there is a wave then
                the average amplitude should be comparable to the average of
                the unfiltered signal.  If there is a signal in the filtered
                data then measure the frequency of that signal.
IN:
OUT:
RETURN: COMPLEX - if the signal found in the band pass appears to be complex.
                SIMPLE - if we only found one signal, we completed the whole combine
                                pass.  Found frequency has been saved in the HIGGINS list.
NOTES:
*END_HEADER***************************/
void
EvaluateFilter(int n, COEFF *pCoeff, int fl, int fh, int filternumber)
{
        int     i, j,
                        Freq = 0;
        int     decimated256;
        int     decFilterLen;
        int     periodSize;
        int     offset;

        float AfterAvg;

        DSP_HIGGINS *frame;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

Docket No.: 13217.2

```
		/* Calculate the average amplitude for each 256 section.  This becomes
			our After Average. */
		decimated256 = (int)((float)256 / (float)pCoeff->pointsToSkip + 0.5);

		for (i = offset = 0, frame = pDSPHList;
				frame != NULL , offset + decimated256 < n;
				offset += decimated256, frame = frame->next)
		{
			if ( frame->type == 'Q' )
				continue;
			for (i = AfterAvg = 0; i < decimated256; i++ )
			{
				 AfterAvg += fabs(pFilteredData[offset + i]);
			}
			frame->ampl[filternumber] = AfterAvg / i;
		}

#ifdef	OutputFilterData
		OutputFilteredData();
#endif

		/* Convert the filtered data to slope data.  This was normally done in
			MeasureFreq(), but has been moved out so that we can save on the
			function calls and just do the whole 9 yards all at once. */
		/*  Calculate the slope of the data  */
		for ( i = 0; i < (n - 2); i++ ) {
			pFilteredData[i] = DLEASTSQUARES3SLOPE( pFilteredData[i], pFilteredData[i+1],
pFilteredData[i+2] );
#ifdef	TESTING_MACRO
			f1test = DLEASTSQUARES3SLOPE( pFilteredData[i], pFilteredData[i+1],
pFilteredData[i+2] );
			f1test = ((pFilteredData[i]*0.0) + (pFilteredData[i+1]*1.0) +
(pFilteredData[i+2]*2.0));
			f2test = (pFilteredData[i] + pFilteredData[i+1] + pFilteredData[i+2]);
			f3test = (3.0 * (pFilteredData[i] + pFilteredData[i+1] + pFilteredData[i+2]) /
3);


			Sxy = f1test - f3test;
			Sxx = 5 - (3 * 3 / 3);
			f1test = Sxy / Sxx;
			f2test = dLeastSquares(&pFilteredData[i], 3, SLOPE);
			if (f1test != f2test && ((f1test - f2test) > 0.000000001))
				printf(".");
			pFilteredData[i] = dLeastSquares(&pFilteredData[i], 3, SLOPE);
#endif
		}

		/* calc slope over two points for n - 2 */
		pFilteredData[i] = pFilteredData[i+1] - pFilteredData[i];

		/* copy previous value for last slope value */
		pFilteredData[i+1] = pFilteredData[i];

		/* pFilteredData now contains slope information and not filtered Data */

		/*  Calc the decimated Filter Length over 3 periods  */
		decFilterLen = pCoeff->effectiveSampleRate / pCoeff->filterCenter * 3;
		frame = pDSPHList;
		for (i = j = 0; frame && i < n; i += decimated256, j++, frame = frame->next) {
			if (frame->type == 'Q') {
				continue;
		/* No reason to do quiets */
			}

			/*  Ignore the fact that it may be complex.  If we assume that a complex
				signal can not have more than two frequencies in it for a given band
				pass filter, then only one will be within the filter cutoff
frequencies.  */
			if (i + decFilterLen <= n) {			/* Will I overrun the buffer?
*/
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                MeasureFreq( &pFilteredData[i], decimated256, decFilterLen,
                                                                        fl, fh,
pCoeff->effectiveSampleRate, &Freq );
                        }
                        else {
                                MeasureFreq( &pFilteredData[i], decimated256, decFilterLen,
                                                                        fl, fh,
pCoeff->effectiveSampleRate, &Freq );
                        }

                        /* put Freq in the current frame->ffreq[filternumber] */
                        /* Is the frequency within the limits of the bandpass? */
                        if ( Freq <= fh && Freq >= fl )
                        {
                                frame->ffreq[filternumber] = Freq;
                                if ( frame->type == 'V' && Freq )
                                {
                                        periodSize = (int)(SAMPLERATE / Freq);
                                        /*  If the period size is greater than the NODELENGTH then
adjust for it. */
                                        if ( periodSize > NODELENGTH &&
                                                    frame->next != NULL )
                                        {
                                                frame->ampl[filternumber] =
(int)((((long)frame->ampl[filternumber] * (long)NODELENGTH) +

((long)frame->next->ampl[filternumber] * (long)(periodSize - NODELENGTH))) /

periodSize);
                                        }
                                }
                        }
                        else
                                frame->ffreq[filternumber] = frame->ampl[filternumber] = 0;
        }

        return;
}


#ifdef    OutputFilterData
OutputFilteredData()
{
        FILE      *fptr;
        char      fdataFile[80];
        static    cFilterCenter = 0;
        int                 i;

        /* Create a file of the type fdo<filternumber>.dat */
        sprintf( fdataFile, "\\dump\\fdo%05d.dat", FilterCenter );

        if (cFilterCenter != FilterCenter)
        {
                if ((fptr = fopen( fdataFile, "w" )) == NULL)
                        ErrorHandler( FileOpen, fdataFile );
                /* Name the column for minitab */
                fprintf(fptr, "%5d\n", FilterCenter );
                cFilterCenter = FilterCenter;
        }
        else
                if ((fptr = fopen( fdataFile, "a" )) == NULL)
                        ErrorHandler( FileOpen, fdataFile );

        for (i = 0; i < n; i++)
                fprintf(fptr, "%f\n", pFilteredData[i] );

        fclose( fptr );
}
#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

Docket No.: 13217.2

```
/************************************************
 *                 -- elrond.c --
 *  Copyright Synergetics 1993, 1994
 *  Written by R. Brian Moncur
 *
 * Warning Confidential Material
 * Property of Synergetics
 * Copyright 1993, 1994 All Rights Reserved
 *
 *       This used to be the old dsp.c but so as to avoid confusion
 *       with the dsp code, we've renamed it to elrond.c.
 ***********************************************/
/* #include <mmsystem.h>      */
/* The following are from mmsystem.h.  There are non-ANSI comments in mmsystem.h
         which prevents me from just including mmsystem.h now that we are trying to
         be totally ANSI compliant. */

#include <errno.h>

#include "dsp.h"
#include "dspeng.h"
#include "higlist.h"
#include  "cloption.h"
#include  "wavio.h"
#include  "pmi.h"
#include  "srengine.h"
#include  "errors.h"

#ifdef    CRT
#include  "version.h"
#include "pascii.h"
#include "gender.h"                    /* generates a warning but since it goes away for
release version we didn't want to add then remove it from the project. */
#include  "pascii.h"
#include  "playfile.h"
#endif

/*#ifdef FEDERATION */
/*#include "troi.h" */
/*#endif */

extern double AuditoryRange[NUM_AUDITORY];

/* Globals */
struct COMMANDLINE clo;              /*  command line options  */
int       SoundNumber,
                   PersonNumber,
                   TotalMicrobes = 0,
                   Microbes = 0,
                   ncalls = 0,
                   fHotMic = FALSE;            /* Flag to see if the Microphone is the input
device */

char      szSoundFileName[MAXPATH] = "sretemp.wav",
                   szRootDir[MAXPATH],
                   DumpPath[81];
FILE      *fpRD;


/*  Local Prototypes  */
void GetDumpPath(void);
FILE *CheckSoundFile(FILE *fptr);
void PrintAQL(struct HIGGINS *frame);
void GetInputFile(void);
void ProcessWaveFile(char *WaveFile);
char *GetWaveFile(void);
void StuffHigginsToDisk(struct HIGGINS *frmstart);

int CheckLinkedList(struct HIGGINS *fs);

#ifdef    OUTPUT_MINIMUMS
```

Docket No.: 132:7.:

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```c
FILE      *minfptr;
#endif

/* 10240 */
#define   VBDATASIZE                                        (SEGSIZE * 10)

#ifndef FEDERATION
void
Setup( void )
{
#ifdef    OUTPUT_MINIMUMS
          /* Open up the file to output the Points of Maximum Intelligence */
          if ((minfptr = SetupOutputFile( "minimums.dat" )) == NULL) {
                    exit(1);
          }
          /* Name the columns for minitab */
          fprintf(minfptr, "Loc\tSlope\n");
#endif
}

void
Cleanup( void )
{
#ifdef    OUTPUT_MINIMUMS
          fclose( minfptr );
#endif
}


/*************************************************************/
int
main(int argc, char **argv)
{

          char drive[MAXDRIVE],
                         dir[MAXDIR],
                         file[MAXFILE],
                         ext[MAXEXT];

#ifdef CRT
          clrscr();

          printf("\n/*************************************************");
          printf("\n *        -- %s --", szVerName );
          printf("\n *                 Version %d.%d.%d", rmj, rmm, rup);
          printf("\n *");
          printf("\n *  Copyright Synergetics 1993, 1994");
          printf("\n *");
          printf("\n * Warning Confidential Material");
          printf("\n * Property of Synergetics");
          printf("\n * Copyright 1993, 1994 All Rights Reserved");
          printf("\n *************************************************/\n");
#endif

                         /* Find the Directory that the EXE resides in. */
          strcpy( szRootDir, argv[0]);
          fnsplit( szRootDir, drive, dir, file, ext );
          fnmerge( szRootDir, drive, dir, NULL, NULL );

          chdir( szRootDir );

          InitCommandlineOptions(&clo);
          if ( argc > 1 )
                    GetCommandlineOptions(&clo, argc, argv);

          if ( clo.testmode || clo.aql )
                    GetDumpPath();

          Setup();

          /*  Find the actual input Wave filename and path and process the file  */
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        GetInputFile();

        /*  Do some clean up before exiting  */
        if ( clo.testmode )
        {
                if ( fpRD )
                        fclose(fpRD);
        }

        if ( clo.inputpath != NULL )
        {
                free( clo.inputpath );
                clo.inputpath = NULL;
        }
        fprintf(stdout, "\n\nAll Wave file processing is DONE!!!!!\n");

        Cleanup();

        exit(0);
        return 0;
}
#endif


/****************************************************************
 * PrintAQL - Print out the data for AQL determination.  File
 * formant is:
 * Person Sound Pascii Prob Pascii Prob Pascii Prob Pascii Prob Pascii Prob
 ****************************************************************/
void
PrintAQL(struct HIGGINS *frame)
{
        FILE *pFile;
        char filename[128];
        int i;

        sprintf(filename, "%s\\AQL.dat", DumpPath);

        if ( (pFile = fopen(filename, "a")) == NULL )
        {
                fprintf(stderr, "Can't open file %s\n", filename);
                return;
        }

        fprintf(pFile, " %d\t%d", PersonNumber, SoundNumber);

        for ( i=0; i< 5; i++)
                fprintf(pFile, "\t%d\t%4.2f", frame->pascii[i].p, frame->pascii[i].c);

        fprintf(pFile, "\n");

        fclose(pFile);
}

void
GetDumpPath(void)
{
        int  i, flags;
        char drive[MAXDRIVE];
        char dir[MAXDIR];
        char file[MAXFILE];
        char ext[MAXEXT];
        char filename[81],
             *c;

        printf("Ruler output is active.\n\n");

        if ( clo.dumpmaglyn )
                printf("Maglyn Microbe output is active.\n"
                       "The Maglyn Microbe Files are named after the sound file\n"
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                        "with the extension of the microbe number.  I.E. \"SS001032.5\"\n\n"
);

        if ( clo.outputpath == NULL )
        {
                printf("Press Return for default output (Path & Ruler Filename)\n");
                printf("                                (\"C:\\DUMP\\RULERS.DAT\")\n");

                printf("\nEnter Output Path: ");

                fgets( DumpPath, sizeof(DumpPath), stdin );

                if ( DumpPath[0] == '\n' )
                        strcpy( DumpPath, "c:\\dump\\rulers.dat" );

                while ( (c = strstr(DumpPath, "\n")) != NULL )
                        *c = '\0';
        }
        else                                            /* Get the command line path */
                strcpy(DumpPath, clo.outputpath);

                                                        /* split the path into its
individual components */
        flags = fnsplit( DumpPath, drive, dir, file, ext );

                                                        /* Merge just the path */
        fnmerge( DumpPath, drive, dir, NULL, NULL );

        for (i=0; DumpPath[i] != 0 ; i++);
        DumpPath[i-1] = 0;

                                                        /* Make sure the path is
valid. Try to create it if not */
        if ( mkdir( DumpPath ) == -1 )
        {
                if ( errno != EACCES )
                {
                        printf( "(Error: Path not found)  While attempting to create Dump
Directory %s\n",
                                                DumpPath );
                        exit(0);
                }
        }
                                                /* if a file name was not entered use
the default */
        if( !(flags & FILENAME) )
                fnmerge( filename, drive, dir, "rulers", "dat" );
        else
                fnmerge( filename, drive, dir, file, ext );

        if (( fpRD = fopen( filename, "w+b" )) == NULL )
        {
                printf( "<%d> Couldn't open Ruler Dump file %s\n", (int)fpRD, filename );
                exit(0);
        }

}

/*****************************************
 *  CheckLinkedList - Make sure that all of
 *  the list pointers are pointing to the
 *  right place.  This is a debug routine
 *****************************************/
int
CheckLinkedList(struct HIGGINS *fs)
{
        struct HIGGINS *frame;

        frame = fs;

        printf("\n");
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
while ( frame != NULL )
{
        if ( frame->prev == NULL && frame != fs )
                return 0;

        if ( frame->next != NULL )
        {
                if ( frame->next->prev != frame )
                        return 0;
        }

        if ( frame->prev != NULL )
                if ( frame->prev->next != frame )
                        return 0;

/*
        The overlapping nodes we have set to negative loc's so this now
        doesn't make for a hosed linked list.
        if ( frame->loc < 0 )
                return 0;
*/
        if (frame->type == 'N') {
                printf( "N" );
        }
        else if ( frame->type == 'U' )
                printf( "u" );
        else
                printf("%c", frame->type);

        frame = frame->next;
}
printf("\n");
return 1;
}
/***********************************************************************
 * GetInputFile - Get the input wave file, handle ps and vbss options as
 * well as wildcard options and then process the resulting wave files.
 ***********************************************************************/
void
GetInputFile(void)
{
        char    sound[4] = "\0\0\0\0",
                        person[4] = "\0\0\0\0",
                        tmp[4] = "\0\0\0\0",
                        drive[MAXDRIVE],
                        dir[MAXDIR],
                        file[MAXFILE],
                        ext[MAXEXT],
                        SoundFilePath[MAXBUFFER];

        int     i, j;

        struct ffblk ffblk;

        drive[MAXDRIVE-1] = '\0';
        dir[MAXDIR-1] = '\0';
        file[MAXFILE-1] = '\0';
        ext[MAXEXT-1] = '\0';

        if ( clo.inputpath != NULL )
                fnsplit( clo.inputpath, drive, dir, file, ext );

        else
        {
                clo.inputpath = GetWaveFile();
                fnsplit( clo.inputpath, drive, dir, file, ext );
        }

        if ( strstr(ext, "WAV") == NULL &&      /* Input file must be a wave file */
                        strstr(ext, "wav") == NULL )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        ErrorHandler( BadInputFile, clo.inputpath );

/*  Process  non-ps and non-vbss files  */
if ( toupper(*file) != 'P' &&
                strstr(file, "VBSS") == NULL &&
                strstr(file, "vbss") == NULL )
{
        clo.vbssFlag = 1;
        fnmerge( SoundFilePath, drive, dir, file, ext );

        if ( findfirst( SoundFilePath, &ffblk, 0 ) != 0 )
                return;

        do
        {
                ProcessWaveFile(SoundFilePath);

        } while ( findnext(&ffblk) == 0 );

        return;

}

/*  Process PS files  */
else if ( toupper(*file) == 'P' )
{
        if ( strlen(file) == 8 )
        {
                strncpy(sound, &file[2], 3);
                strncpy(person, &file[5], 3);
        }

        else if ( strlen(file) == 6 )
        {
                strncpy(sound, &file[2], 3);
                strcpy(person, "???");

        }

        else
        {
                strcpy(sound, "???");
                strcpy(person, "???");
        }

        if ( clo.pnflag == ALL && clo.snflag == ALL )
        {
                sprintf(file, "P?%3s%3s", sound, person);

                fnmerge( SoundFilePath, drive, dir, file, ext );

                if ( findfirst( SoundFilePath, &ffblk, 0 ) != 0 )
                        return;

                do
                {
                        strncpy( file, ffblk.ff_name, 8 );

                        strncpy(tmp, &file[2], 3);
                        SoundNumber = atoi(tmp);
                        strncpy(tmp, &file[5], 3);
                        PersonNumber = atoi(tmp);
                        fnmerge( SoundFilePath, drive, dir, file, ext );

                        ProcessWaveFile(SoundFilePath);

                } while ( findnext(&ffblk) == 0 );
        }

        else if ( clo.pnflag == ALL && clo.snflag == SOME )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
{
        for ( i = 0; i < MAX_SOUNDS && clo.soundnumbers[i] != 0; i++ )
        {
                sprintf(file, "P?%03d%s", clo.soundnumbers[i], person);
                fnmerge( SoundFilePath, drive, dir, file, ext );

                if ( findfirst( SoundFilePath, &ffblk, 0 ) != 0 )
                        return;

                do
                {
                        strncpy( file, ffblk.ff_name, 8 );

                        strncpy(tmp, &file[2], 3);
                        SoundNumber = atoi(tmp);
                        strncpy(tmp, &file[5], 3);
                        PersonNumber = atoi(tmp);
                        fnmerge( SoundFilePath, drive, dir, file, ext );

                        ProcessWaveFile(SoundFilePath);

                } while ( findnext(&ffblk) == 0 );
        }

}
else if ( clo.pnflag == SOME && clo.snflag == ALL )
{
        for ( i = 0; i < MAX_PERSONS && clo.personnumbers[i] != 0; i++ )
        {
                sprintf(file, "P?%s%03d", sound, clo.personnumbers[i]);
                fnmerge( SoundFilePath, drive, dir, file, ext );

                if ( findfirst( SoundFilePath, &ffblk, 0 ) != 0 )
                        return;

                do
                {
                        strncpy( file, ffblk.ff_name, 8 );

                        strncpy(tmp, &file[2], 3);
                        SoundNumber = atoi(tmp);
                        strncpy(tmp, &file[5], 3);
                        PersonNumber = atoi(tmp);
                        fnmerge( SoundFilePath, drive, dir, file, ext );

                        ProcessWaveFile(SoundFilePath);

                } while ( findnext(&ffblk) == 0 );
        }

}
else if ( clo.pnflag == SOME && clo.snflag == SOME )
{
        for ( i = 0; i < MAX_PERSONS && clo.personnumbers[i] != 0; i++ )
        {
                for ( j = 0; j < MAX_SOUNDS && clo.soundnumbers[j] != 0; j++
)
                {
                        sprintf(file, "P?%03d%03d", clo.soundnumbers[j],
clo.personnumbers[i]);
                        fnmerge( SoundFilePath, drive, dir, file, ext );
                        if ( findfirst( SoundFilePath, &ffblk, 0 ) != 0 )
                                return;

                        strncpy( file, ffblk.ff_name, 8 );
                        strncpy(tmp, &file[2], 3);
                        SoundNumber = atoi(tmp);
                        strncpy(tmp, &file[5], 3);
                        PersonNumber = atoi(tmp);
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        fnmerge( SoundFilePath, drive, dir, file, ext );

                                        ProcessWaveFile(SoundFilePath);

                                }
                        }

                }

                return;
}               /*  End of PS file processing  */

/*  Process VBSS files  */
else if ( strstr(file, "VBSS") ||
                                strstr(file, "vbss") )
{
        clo.vbssFlag = 1;

        if ( strlen(file) == 8 )
                strncpy(person, &file[5], 3);

        else
                strcpy(person, "???");

        if ( clo.pnflag == ALL && clo.snflag == ALL )
        {
                sprintf(file, "VBSS0%3s", person);
                fnmerge( SoundFilePath, drive, dir, file, ext );

                if ( findfirst( SoundFilePath, &ffblk, 0 ) != 0 )
                        return;

                do
                {
                        strncpy( file, ffblk.ff_name, 8 );

                        strncpy(tmp, &file[5], 3);
                        PersonNumber = atoi(tmp);
                        fnmerge( SoundFilePath, drive, dir, file, ext );

                        ProcessWaveFile(SoundFilePath);

                } while ( findnext(&ffblk) == 0 );

        }

        else if ( clo.pnflag == ALL && clo.snflag == SOME )
        {
                sprintf(file, "VBSS0%3s", person);
                fnmerge( SoundFilePath, drive, dir, file, ext );

                if ( findfirst( SoundFilePath, &ffblk, 0 ) != 0 )
                        return;

                do
                {
                        strncpy( file, ffblk.ff_name, 8 );
                        fnmerge( SoundFilePath, drive, dir, file, ext );
                        strncpy(tmp, &file[5], 3);
                        PersonNumber = atoi(tmp);

                        for ( i = 0; i < MAX_SOUNDS && clo.soundnumbers[i] != 0; i++
)
                        {
                                SoundNumber = clo.soundnumbers[i];
                                while ( GetVBSSInfo() )
                                        ProcessWaveFile(SoundFilePath);
                        }

                } while ( findnext(&ffblk) == 0 );
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                }
                else if ( clo.pnflag == SOME && clo.snflag == ALL )
                {
                        for ( i = 0; i < MAX_PERSONS && clo.personnumbers[i] != 0; i++ )
                        {
                                sprintf(file, "VBSS0%03d", clo.personnumbers[i]);
                                PersonNumber = clo.personnumbers[i];
                                fnmerge( SoundFilePath, drive, dir, file, ext );

                                ProcessWaveFile(SoundFilePath);
                        }

                }
                else if ( clo.pnflag == SOME && clo.snflag == SOME )
                {
                        for ( i = 0; i < MAX_PERSONS && clo.personnumbers[i] != 0; i++ )
                        {
                                sprintf(file, "VBSS0%03d", clo.personnumbers[i]);
                                PersonNumber = clo.personnumbers[i];
                                fnmerge( SoundFilePath, drive, dir, file, ext );

                                for ( j = 0; j < MAX_SOUNDS && clo.soundnumbers[j] != 0; j++
)
                                {
                                        SoundNumber = clo.soundnumbers[j];
                                        while ( GetVBSSInfo() )
                                                ProcessWaveFile(SoundFilePath);
                                }

                        }

                }

                return;
        }       /*  End of VBSS file processing  */

}
/*FUNCTION_HEADER**********************
NAME:           TempConvertDSP2030
DESC:           Convert between the dsp's higgins list and the 68030's.
IN:
OUT:
RETURN:
NOTES:
*END_HEADER***************************/
void TempConvertDSP2030( DSP_HIGGINS *pDSPHList, int dspMaxAmpl, struct HIGGINS *pHiggins, int
*pMaxAmpl )
{
        DSP_HIGGINS                     *pDSPNode;
        struct HIGGINS          *pNode;
        int                                     i;

        /* Take care of the easy stuff first */
        *pMaxAmpl = dspMaxAmpl;

        pDSPNode = pDSPHList;
        pNode = pHiggins;
        for (i = 0; i < NumberOfNodes && pDSPNode && pNode; i++) {
                CPY_SHARED_HIGGINS( pNode, pDSPNode );
                pNode->loc = i * 256;                                   /* for old time sake
*/
                pDSPNode = pDSPNode->next;
                pNode = pNode->next;
        }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
}

/*FUNCTION_HEADER**********************
NAME:           LookAtHiggins
DESC:           The event handler for the Sound Recognition engine.
IN:             *pCompressedList - ptr to a HIGGINS list with only the pmi and quiet
                        nodes in it.
                *pHiggins - ptr to a filled in higgins list.
                maxAmpl - The value to go in the global MaxAmpl on our side.
OUT:            none
RETURN:   none
NOTES:    *pHiggins is needed only for debugging.
*END_HEADER***************************/
void LookAtHiggins( struct HIGGINS *pCompressedList, struct HIGGINS   *pHiggins )
{
        struct HIGGINS      *frame = NULL;
        int         i, flag, rowcnt = 0;

        if ( clo.testmode )
        {
                printf("\nDecomposed the signal for:\n");
                if ( !CheckLinkedList( pHiggins ) )
                        printf("Linked list is hosed\n");
        }

#ifdef CRT
        if ( clo.testmode )
        {
                if ( !clo.higgout && !clo.aql )
                        PrintFrmnts( pHiggins );
/*                      WavFileInfoOut( pHiggins ); */
        }
        if ( clo.aql )
                PrintAQL( pHiggins );
        if(clo.higgout)
                StuffHigginsToDisk( pHiggins );                 /* Ouch! that must hurt! */
#endif

#define   SHOW_PHONS
#ifdef    SHOW_PHONS
          printf("\n\nWe found:\n");
          /* Only process the compressed list */
#ifdef    PMIS_ONLY
          frame = pCompressedList;
#else
          frame = pCompressedList;              /* to shut up compiler */
          frame = pHiggins;
#endif
          rowcnt = 0;
          while (frame != NULL && frame->type != 'N') {
                  rowcnt++;
#ifdef    PMIS_ONLY
                  if (! frame->pmi ) {
                          frame = frame->next;
                          continue;
                  }
#endif

                  for (flag = i = 0; i < MAX_POSSIBILITIES; i++) {
                          if ((frame->pascii[i].p != UNKNOWN_PATH) &&
                                          (frame->pascii[i].p != 0)) {

                                  if (i != 0)
                                          printf("\t");
                                  printf("#%d", frame->pascii[i].p );
                                  printf(" %s", pascii[frame->pascii[i].p] );
                                  printf(" %d\%", (int)frame->pascii[i].c );
                                  flag++;
                          }
                  }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
		if (flag)
			printf("\n");

		if (rowcnt >= 23) {
#ifdef	NOT_NOW
			printf("Press Any Key To Continue...");
			getchar();
#endif
			rowcnt = 0;
		}

		frame = frame->next;
	}
#endif

#ifdef FEDERATION
	GiveToTroi(&pCompressedList);
#endif

}

/******************************************************************
 *  ProcessWaveFile - Do Sound recognition on a given wave file.
 ******************************************************************/
void
ProcessWaveFile(char *WaveFile)
{
	int			MaxAmpl;
	int			numpts;
	FILE			*fptr;

#ifdef CRT
	if ((fptr = fopen( WaveFile,"rb")) == NULL)
	{
		printf("<%d> Couldn't open Wave File %s\n",
			(int)fptr, WaveFile);
		return;
	}

	if ( clo.debug )
		printf( "Reading file %s\n", WaveFile );
#endif

#ifdef CRT
	if ( clo.sound )
		playfile( WaveFile );

	printf( "\n\nTesting Person %d -- Sex: %c Age: %d -- Sound [%d] %s: ",
					PersonNumber,
					subject[PersonNumber].sex,
					subject[PersonNumber].age,
					SoundNumber,
					(SoundNumber < 128 ? pascii[SoundNumber] :
"Unknown") );
#endif

	Microbes = ncalls = 0;

	read_header(fptr);

	/* Seek to the start of the selected sound data */
	fseek(fptr, (clo.frameloc * sizeof(int)), SEEK_SET);

	/* These will already be setup on the DSP.  They will point at different
		areas in memory depending on which buffer is being worked on.  Therefore
		they should be passed to Decompose. */
	if ((pRawData = (int *)calloc(RAWDATASIZE, sizeof(int))) == NULL ) {
		ErrorHandler( OutOfMemory, "in dspInitialize on pRawData" );
		return;
	}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
	/* Initialize Memory for the filtered data */
	if ((pFilteredData = (float *)calloc(RAWDATASIZE, sizeof(float))) == NULL ) {
		ErrorHandler( OutOfMemory, "in dspInitialize: on pFilteredData" );
		return;
	}

	/* Initialize the DSP stuff, telling it where it should put the
		filtered data: ie where Bach can have a scratch area. */
	if (dspInitialize( pFilteredData )) {
		return;
	}

	/* Initialize the Sound Recognition Engine */
	if (sreInitialize( LookAtHiggins )) {
		return;
	}

	/* Read 10240 into buffer */
	while ( (numpts = read_wav(fptr, pRawData)) != 0 ) {

		/* Send the raw data off to the routine which mimicks the DSP */
		dspProcessBuffer( pRawData, numpts );

		/* Convert from DSP higgins list to 68030 higgins list.  Things
			are contained in the globals: pDSPHList and dspMaxAmpl. */
		TempConvertDSP2030( pDSPHList, dspMaxAmpl, pSREHList, &MaxAmpl );

		/* Send the Higgins structure and the MaxAmpl calculated on the DSP
			to the 68030. */
		sreProcessHiggins( pSREHList, MaxAmpl );

	}	/* End of While( read_wav)  */

	sreCleanUp();
	dspCleanUp();
	if (pRawData) {
		free( pRawData );
	}
	if (pFilteredData) {
		free( pFilteredData );
	}
}


/****************************************************************
 *  GetWaveFile - Get a wave filename interactively or create
 *  one using the microphone.
 ****************************************************************/
char *
GetWaveFile(void)
{
	char	*c,
			*WaveFile;

	if ( (WaveFile = (char *)malloc(MAXBUFFER)) == NULL )
		ErrorHandler( OutOfMemory, "in GetWaveFile" );

	/*  If an input file name is not input on the command line
	 *  then get it interactively.  */
	if ( !fHotMic )
	{
		printf("\nEnter the file spec to the sound files.\n"
				"(Wild cards are supported -- I.E. G:\VOICE\SS*.WAV )\n"
				"(Press <ENTER> to create a wave file)\n");
		printf("\nInput file: ");

		gets(WaveFile);

		while ( (c = strstr(WaveFile, "\n")) != NULL )
			*c = '\0';
	}
```

Docket No.: 13717.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        if ( fHotMic || WaveFile[0] == '\0')
        {
                fHotMic = TRUE;
#if defined(DOS)
                strcpy(WaveFile, "c:\\sretemp.wav");
                spawnlp(P_WAIT, "pas.exe", "pas.exe", "set", "volume", "to", "0", NULL);
                spawnlp(P_WAIT, "pas.exe", "pas.exe", "set", "mic", "to", "100", NULL);
                remove(WaveFile);

                printf("\nPress a key to start recording, then press  [Esc] to stop.\n");
                getch();
                spawnlp(P_WAIT, "recfile.exe", "recfile.exe", WaveFile, "16 r44100 -M", NULL);
                printf("\n\tProcessing, please wait . . .\n");
                spawnlp(P_WAIT, "pas.exe", "pas.exe", "set", "mic", "to", "0", NULL);
                spawnlp(P_WAIT, "pas.exe", "pas.exe", "set", "volume", "to", "100", NULL);
#endif
        }

        return WaveFile;
}

#ifdef FEDERATION
void GiveFileToElrond (char huge *SoundFilePath) {
        if ( (vb_data = (int *)malloc(VBDATASIZE*sizeof(int))) == NULL )      {
                fprintf(stderr, "Out of memory while trying to malloc vb_data\n");
                exit(0);
        }

        InitCommandlineOptions(&clo);
        clo.sound = FALSE;
        clo.testmode = FALSE;
        ProcessWaveFile(SoundFilePath);

        if (vb_data != NULL) {
                        free(vb_data);
                        vb_data = NULL;
        }
        if (clo.inputpath != NULL)
        {
                free(clo.inputpath);
                clo.inputpath = NULL;
        }
        }
#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE***************************************************************
        FILE            : dspinit.c
        DESC            : Initialization and Cleanup routines for routines on the DSP
        TABS            : 3
        OWNER           : Brent Hale
        DATE CREATED: 27 Oct 1994

                                        Copyright Synergetics 1993, 1994

                                        Warning Confidential Material
                                        Property of Synergetics
                                        Copyright 1993, 1994 All Rights Reserved

        SYNOPSIS: Initializes things on the DSP side.
*END_HEADER*******************************************************************/

#include  "synergy.h"
#include  "dspeng.h"
#include  "dsp.h"
#include  "evaltd.h"
#include  "errors.h"

/***************************** Global Data *********************************/
GLOBAL int                              *pRawData = (float *)0;
GLOBAL float                    *pFilteredData = (float *)0;
GLOBAL DSP_HIGGINS  *pDSPHList = (DSP_HIGGINS *)0;
GLOBAL int                              dspMaxAmpl = 0;

/*FUNCTION_HEADER**********************
NAME:           dspInitialize
DESC:           Initialize memory for use on the DSP.
IN:             none
OUT:            none
RETURN: ALL_OK on success.
                        non-zero on failure.
NOTES:  Initializes everything on the DSP side.
*END_HEADER***************************/
int dspInitialize( float *pOutputBuffer )
{
        pFilteredData = pOutputBuffer;

        /* Create the Higgins List for use while on the DSP */
        if (CreateDSPHigginsList( NumberOfNodes, &pDSPHList ) != ALL_OK) {
                return 1;               /* Couldn't create the list. */
        }

        /* Initialize memory in evaltd.c */
        InitTimeDomain();

        return ALL_OK;
}

/*FUNCTION_HEADER**********************
NAME:           dspCleanUp
DESC:           Clean up any memory issues in the Sound Recognition Engine
IN:             none
OUT:            none
RETURN: none
NOTES:
*END_HEADER***************************/
void dspCleanUp( void )
{
        if (pRawData) {
                free( pRawData );
                pRawData = (int *)0;
        }

        if (pFilteredData) {
                free( pFilteredData );
                pFilteredData = (int *)0;
        }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
            CleanUpTimeDomain();

            FreeDSPHigginsList( pDSPHList );
            pDSPHList = (struct HIGGINS *)0;
    }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE****************************************************************
FILE                    : dsphig.c
DESC                    : Routines to create the higgins structure on the DSP chip.
TABS                    : 3
OWNER                   : Brent Hale
DATE CREATED: 4 Oct 1994

Copyright Synergetics 1993, 1994

Warning Confidential Material
Property of Synergetics
Copyright 1993, 1994 All Rights Reserved

SYNOPSIS          :
*END_HEADER*******************************************************************/

#include  <stdlib.h>
#include  "dsphig.h"
#include  "errors.h"

/*FUNCTION_HEADER**********************
NAME:             CreateDSPHigginsList
DESC:             Create a list numOfNodes long and return it
IN:               numOfNodes - number of nodes to have in the list
OUT:              **hdrNode - ptr ptr to return the beginning of the list back in.
RETURN:   ALL_OK if the list was created alright.
                        OutOfMemory if I couldn't get the memory needed.
NOTES:    On the DSP, we want this list to be continous in memory to
                        facilitate the writing of it across to the 68030 so it has to be
                        different code than the 68030's creation of the higgins list.
*END_HEADER***************************/
int CreateDSPHigginsList( int numOfNodes, DSP_HIGGINS **hdrNode )
{
        int                             i;

        *hdrNode = (DSP_HIGGINS *)calloc( numOfNodes, sizeof(DSP_HIGGINS));
        if (*hdrNode == NULL) {
                ErrorHandler( OutOfMemory, "In CreateDSPHigginsList" );
                return OutOfMemory;
        }

        /* Now hook up the ptrs */
        (*hdrNode)->next = (*hdrNode)+1;
        for (i = 1; i < numOfNodes-1; i++ ) {
                ((*hdrNode)+i)->next = (*hdrNode)+i+1;
                ((*hdrNode)+i)->prev = (*hdrNode)+i-1;
        }
        ((*hdrNode)+i)->prev = (*hdrNode)+i-1;

        return ALL_OK;
}


/*FUNCTION_HEADER**********************
NAME:             FreeDSPHigginsList
DESC:             Free the memory used for the DSP higgins list.
IN:               *hdrNode - ptr to a node to begin deleting at
OUT:
RETURN:
NOTES:
*END_HEADER***************************/
void FreeDSPHigginsList( DSP_HIGGINS *hdrNode )
{
        /* Make sure its not null */
        if ( hdrNode != NULL ) {
                free( hdrNode );
        }
}

/*FUNCTION_HEADER**********************
NAME:             ClearDSPHigginsList
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
DESC:           Clear the values in the nodes.
IN:             *hdrNode - ptr ptr to the header of the linked list.
OUT:
RETURN:   None
NOTES:
*END_HEADER***************************/
void ClearDSPHigginsList( DSP_HIGGINS *hdrNode )
{
        DSP_HIGGINS *pNode;

        /* Initialize the 40 nodes that we will be over writing */
        pNode = hdrNode;
        while (pNode != NULL) {
                /* Macro declared in dsphig._h to zero out only the shared portion
                        of the DSP_HIGGINS structure.  Since the only other fields are the
                        *next and *prev ptrs (which I want to remain intack) this works
                        great.  */
                CLEAR_SHARED_HIGGINS( pNode );

                pNode = pNode->next;
        }
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE****************************************************************
        FILE            : dspeng.c
        DESC            : Routine used on the DSP to process the Input data.
        TABS            : 3
        OWNER           : Brent Hale
        DATE CREATED: 27 Oct 1994

                                        Copyright Synergetics 1993, 1994

                                        Warning Confidential Material
                                        Property of Synergetics
                                        Copyright 1993, 1994 All Rights Reserved

        SYNOPSIS:
*END_HEADER*******************************************************************/

#include "dspeng.h"
#include "bach.h"
#include "evaltd.h"
#include "dsphig.h"

/***************************** Externs *************************************/

/*FUNCTION_HEADER**********************
NAME:           dspProcessBuffer
DESC:           Processes one chunk of data through the DSP based code.
IN:             *pBuffer - ptr to data to be processed (Wav information)
                        numpts - The number of data elements pointed to by pBuffer.
OUT:            **pHiggins - ptr ptr to return the ptr to the higgins list

RETURN: ALL_OK - on success
                        error # - on failure.
NOTES:
                        The higgins list initialized in CreateHigginsList() gets setup
                        with the processed information and is returned in **pHiggins.

                        This routine mimicks what will be happening on the DSP.  It will
                        be used during when debugging without the DSP.
*END_HEADER***************************/
#ifdef  HARDWARE
int dspProcessBuffer( int *pInput )
#else
int dspProcessBuffer( int *pInput, int numpts )
#endif
{
        /* Only when we are on HARDWARE should this assignment
                do anything meaningful. */
        pRawData = pInput;

        /* Clear out the Higgins List */
        ClearDSPHigginsList( pDSPHList );

        /* Calculate Ls, Ld, zcr and the node type (Voiced, Unvoiced,
                Quiet) for every node in the list and set the node location
                and size.  This will be in C on the DSP. */
#ifdef  HARDWARE
        EvalTimeDomain( pRawData, pDSPHList, &dspMaxAmpl );
#else
        EvalTimeDomain( pRawData, numpts, pDSPHList, &dspMaxAmpl );
#endif

        /* Run the Bach analysis on the voice data.  This needs to be
                broken up.  The filtering will be done in assembly.  EvaluateFilter()
                will be in C. */
#ifdef  HARDWARE
        Decompose();
#else
        Decompose( numpts );
#endif

        return ALL_OK;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

}

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/************************************************
 *                -- io.c --
 *  Copywrite Synergetics 1993
 *  Written by R. Brian Moncur
 *
 *  Date:  12/15/93
 *  Version:  0.1
 ************************************************/

#include  <io.h>

#include "dsp.h"
#include  "errors.h"
#include  "bach.h"
#include "wavio.h"
#include "dspeng.h"

unsigned char hdr[44];

#ifndef NOCLO
extern struct COMMANDLINE clo;
#endif

extern int          SoundNumber,
                                        PersonNumber,
                                        MaxAmpl;

extern char DumpPath[];

/*  Local Prototypes  */
int file_exists(char *filename);

/***********************************************************
 *  FindNextNumber - Increment past a number in the buffer
 *  and up to the next number.
 ***********************************************************/
int
FindNextNumber(char **buffer)
{

        while(    (**buffer != '\n') &&                    /*  Don't go past the end of line  */
                                        (**buffer != '#') &&                    /*  Don't read a
comment section  */
                                        !isspace(**buffer) )                    /*  Increment past
the current number  */
                  (*buffer)++;

        while(    (**buffer != '\n') &&
                                        (**buffer != '#') &&
                                        isspace(**buffer) )          /*  Increment to the next
number  */
                  (*buffer)++;

        if ( isdigit(**buffer) || **buffer == '.' )
                  return 1;
        else
                  return 0;

}

/************************************************
 *  read_header: Read a wav file header
 ************************************************/
void
read_header(FILE *fptr)
{
         fread(&hdr[0], sizeof(hdr[0]), 44, fptr);
}

/************************************************
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
 *  read_wav: Read a wav file
 ************************************************/
int
read_wav(FILE *fptr, int *pBuffer)
{
        int n=0,
                num;

#ifndef NOCLO
        clo.curbuffloc = clo.frameloc;

        if ( clo.framesize )
        {
                if ( clo.frameloc == 0 )      /*  Close the file and stop if you're done  */
                {
                        fclose(fptr);
                        return(0);
                }

                if ( clo.framesize <= (SEGSIZE * 10) )  /*  Don't try to read more than 10240
samples  */
                        num = (int)clo.framesize;
                else
                        num = SEGSIZE * 10;

                if ( clo.framesize > (SEGSIZE * 10) )
                {
                        clo.framesize -= num;
                        clo.frameloc += num;
                }
                else
                        clo.frameloc = 0;
        }
        else
        {
                num = SEGSIZE * 10;
                clo.frameloc += num;
        }
#else
        num = SEGSIZE *10;
#endif

        n = fread(pBuffer, sizeof(int), num, fptr);

        if ( n == 0 )
                fclose(fptr);

#ifndef NOCLO
        if ( clo.debug )
                printf("\n\n=======================\n%d data points read\n", n);
#endif

        return n;
}


#ifdef   CRT
/************************************************
 *  OutputTimeDomain - Given the time domain data
 *  and a frame structure.  Write the time data for
 *  that frame to a file.
 ************************************************/
void
OutputTimeDomain(int *data, int loc, int size)
{

        FILE *pFile;
        char filename[128];
        int i;
        static int count;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
		sprintf(filename, "%s\\td%03d%03d.%03d", DumpPath, SoundNumber, PersonNumber, count++);

		if ( (pFile = fopen(filename, "w")) == NULL )
		{
			fprintf(stderr, "Can't open file %s\n", filename);
			return;
		}

		for ( i = loc; i < (loc + size); i++ )
			fprintf(pFile, "%d\n", data[i]);

		fclose(pFile);

}
#endif

#ifdef	CRT
/**********************************************************
 WavFileInfoOut
 Desc:	Outputs the Wave file info in ASCII form.  Does this by Microbe.
 In:		HIGGINS FrameStart
 Out:
 Ret:
***********************************************************/
void WavFileInfoOut(struct HIGGINS *FrameStart)
{

		struct HIGGINS *Higgins;

		if(clo.wavout)
		{
			Higgins = FrameStart;		/* Set to start of list */

			if(DumpPath[0] == 0)
			{
				strcpy(DumpPath, "c:\\dump");
			}

			while(Higgins)		/* As long as we have valid structs */
			{
				/* Now we output the info */
				OutputTimeDomain(pRawData, Higgins->loc, Higgins->size);
				Higgins = Higgins->next;
			}
		}

}
#endif

#ifndef NOCLO
/****************************************************
 *  GetVBSSInfo -
 ****************************************************/
int
GetVBSSInfo(void)
{
		static FILE *fptr;
		char filename[MAXBUFFER],
			*string,
			*pstr;

		if ( (string = (char *)malloc(MAXBUFFER + 1)) == NULL )
			ErrorHandler( OutOfMemory, "in GetVBSSInfo" );

		/*  Don't reopen the file if it is already open  */
		if ( fptr == NULL )
		{
			if ( file_exists("word_loc.txt") )				/*  check
default location  */
				strcpy(filename, "word_loc.txt");
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
			else if ( file_exists("c:\\word_loc.txt") )	/*  check root  */
				strcpy(filename, "c:\\word_loc.txt");

			else if ( file_exists("c:\\dev\\dict\\word_loc.txt") )
				strcpy(filename, "c:\\dev\\dict\\word_loc.txt");

			else
				ErrorHandler( FileOpen, "in GetVBSSInfo" );


			if ( (fptr = fopen(filename,"r")) == NULL )
				ErrorHandler( FileOpen, filename );
		}

		/*  read through the file until we find the person and sound we want  */
		while ( fgets(string, MAXBUFFER, fptr) != NULL )
		{
			pstr = string;				/*  store pointer to beginning of string
*/
			while (isspace(*pstr)) /* Skip over any white space.  2 digit person numbers
will kill us otherwise.  FindNextNumber assumes that you're already on a number. */
				pstr++;

			if ( atoi(pstr) == PersonNumber )
			{
				FindNextNumber(&pstr);
				if ( atoi(pstr) == SoundNumber )
				{
					FindNextNumber(&pstr);
					clo.frameloc = atol(pstr);

					FindNextNumber(&pstr);
					clo.framesize = atol(pstr);

					free( string );
					return 1;
				}
			}
		}

		free( string );
		fclose( fptr );
		fptr = NULL;

		return 0;
}
#endif

#ifdef	CRT
/****************************************************************************************
 Find Sound
 This function will return the PASCII value for the the person and location.
 in:	int Person Number, long Location in vbss file.
 Out:
 Return:  int PASCII value if found or word number.

****************************************************************************************/

int FindSound(int Person, long Location)
{
		FILE *fHandle;
		char filename[MAXBUFFER];
		char buffer[256];
		int wn = 0, sn, pn, i, j, c, iBytes, flag, BuffLen;
		long locStart, locEnd;

		if ( file_exists("word_loc.txt") )				/*  check default
location  */
			strcpy(filename, "word_loc.txt");

		else if ( file_exists("c:\\word_loc.txt") )	/*  check root  */
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                strcpy(filename, "c:\\word_loc.txt");

        else if ( file_exists("c:\\dev\\elrond\\word_loc.txt") )
                strcpy(filename, "c:\\dev\\elrond\\word_loc.txt");

        else
        {
                strcpy(filename, "word_loc.txt");
                ErrorHandler( FileOpen, filename );
        }

        fHandle = fopen(filename, "r");

        if(!fHandle)
                ErrorHandler( FileOpen, filename );

        /* Now we start parsing the file looking for the person number. */

        c = 0;

        while(1)  /* Read data into the buffer */
        {
                iBytes = fread(buffer + c, sizeof(char), 256 - c, fHandle);
                flag = 0;


                BuffLen = c + iBytes;

                /* first we check for leading white space */
                for(i = 0; (buffer[i] == ' ') || (buffer[i] == '\t'); i++);

                /* Now we look for the person number */

                for(; (buffer[i] != ' ') && (buffer[i] != '\t'); i++);      /* search for spa.e
just after person number.*/

                buffer[i] = 0;       /* Null terminate it.*/

                pn = atoi(buffer);  /* Convert it to an int */

                if(pn == Person)     /* Do they match? */
                {
                        /* Yes they do */
                        i++;      /* skip the null */

                        /* Now scan forward until we find a non white space char. */
                        for(;buffer[i] == ' '; i++);

                        j = i;     /* mark start of the sound number */

                        for(;(buffer[i] != ' ') && buffer[i] != '\t'; i++);         /* scan to
end of number */

                        buffer[i++] = 0;     /* Null terminate it */

                        sn = atoi(buffer + j);         /* get the sound number */

                        for(;(buffer[i] == ' ') || (buffer[i] == '\t'); i++); /* scan til non
white space */

                        j = i;

                        for(;(buffer[i] != ' ') && buffer[i] != '\t'; i++);         /* scan t·
end of number */

                        buffer[i++] = 0;     /* Null terminate it */

                        locStart = atol(buffer + j);  /* get location */

                        for(;buffer[i] == ' '; i++); /* scan til non white space */
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                        j = i;

                        for(;(buffer[i] != ' ') && (buffer[i] != 10) && (buffer[i] != '\t');
i++);   /* scan to end of number */

                        if (buffer[i] == 10)
                        {
                                flag = 1;
                        }
                        buffer[i] = 0;      /* Null terminate it */

                        locEnd = atol(buffer + j) + locStart;   /* get end of sound */

                        if((Location >= locStart) && (Location <= locEnd))          /* is the
location within the range? */
                        {
                                /* Yep it is */
                                if(sn > 200)        /* did we find it in a word? */
                                {
                                        wn = sn;
                                }
                                else
                                {
                                        fclose(fHandle);
                                        return(sn);
                                }
                        }
                }

                if(flag)
                        buffer[i] = 10;

                /* now scan for the end of the line */

                for(;buffer[i] != 10 && i < BuffLen; i++);


                i++;      /* skip the line feed */
                if(i < BuffLen)
                {
                        c = BuffLen - i;
                        memmove(buffer, buffer + i, c);
                }
                else
                {
                        break;    /* at end of file */
                }
        }

        fclose(fHandle);
        return(wn);
}
#endif

/**************************************************/
int
file_exists(char *filename)
{
        return (access(filename, 0) == 0);
}

#ifdef    CRT
/****************************************************************
 *  PrintFrmnts - Print formants to a file.
 ****************************************************************/
void PrintFrmnts( struct HIGGINS *frmstart )
{
        static char FrmtMode = 'w';
        static int          firstTime = 1;
        int        i,
                        soundnumber;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
char        filename[128],
                FrmntFileName[13] = "formants.dat\0";

struct HIGGINS      *frame;

FILE        *fptr = NULL;

/*  Write out the formants list formants.dat  */
sprintf( filename, "%s\\%s\0", DumpPath, FrmntFileName );

if ( FrmtMode == 'w' )
{
        fptr = fopen( filename, "w" );
        FrmtMode = 'a';
        fprintf( fptr, "Person Sound Loc Size LS SumSlope PMI Max V/u FoAmpl Fo ");

        for ( i = 0; i < NFILTERS; i++) {
                fprintf( fptr, "F%d ", i );
        }
        for ( i = 0; i < NFILTERS; i++) {
                fprintf( fptr, "A%d ", i );
        }

        fprintf( fptr, "P1 P1c P2 P2c P3 P3c P4 P4c P5 P5c");

        fprintf( fptr, "\n");
}
else
        fptr = fopen( filename, "a" );


if ( fptr == NULL )
{
        fprintf( stderr, "Error opening %s", FrmntFileName );
        exit(0);
}

frame = frmstart;

/* Take care of first row in the formants.dat file so that minitab
        doesn't think that all the columns are alpha columns */
if (firstTime)
{
        if ( SoundNumber == 0 || SoundNumber > 127 )
                soundnumber = FindSound( PersonNumber, GetFileLocation( frame->loc ));
        else
                soundnumber = SoundNumber;
        fprintf( fptr, "%3d %3d %3lu %3d %5d %5d %5d %5d %5c %5d %5d",
                                                PersonNumber,
                                                soundnumber,
                                                GetFileLocation( frame->loc ),
                                                frame->size,
                                                frame->Ls,
                                                frame->sumSlope,
                                                frame->pmi,
                                                MaxAmpl,
                                                frame->type,
                                                frame->FoAmpl,
                                                frame->Fo );


        for ( i = 0; i < NFILTERS; i++) {
                fprintf( fptr, " %5d", frame->ffreq[i] );
        }
        for ( i = 0; i < NFILTERS; i++) {
                fprintf( fptr, " %5d", frame->ampl[i] );
        }

        for (i = 0; i < MAX_POSSIBILITIES; i++) {
                fprintf( fptr, " %5d %5d", frame->pascii[i].p, (int)frame->pascii[i].c
);
        }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                fprintf( fptr, "\n" );
                frame = frame->next;
        }

        while ( frame != NULL && frame->type != 'N' )
        {
#ifdef  DONT_DO_QUIETS
                if ( frame->type == 'Q' )
                {
                        frame = frame->next;
                        continue;
                }
#endif

                if ( SoundNumber == 0 || SoundNumber > 127 )
                        soundnumber = FindSound( PersonNumber, GetFileLocation( frame->loc ));
                else
                        soundnumber = SoundNumber;
                fprintf( fptr, "%3d %3d %3lu %3d %5d %5d %5d %5d %5c %5d %5d",
                                                        PersonNumber,
                                                        soundnumber,
                                                        GetFileLocation( frame->loc ),
                                                        frame->size,
                                                        frame->Ls,
                                                        frame->sumSlope,
                                                        frame->pmi,
                                                        MaxAmpl,
                                                        frame->type,
                                                        frame->FoAmpl,
                                                        frame->Fo );

                for ( i = 0; i < NFILTERS; i++)
                {
                        if (frame->ffreq[i])
                                fprintf( fptr, " %5d", frame->ffreq[i] );
                        else
                                fprintf( fptr, " %5s", "*" );
                }

                for ( i = 0; i < NFILTERS; i++ )
                {
                        if (frame->ampl[i])
                                fprintf( fptr, " %5d", frame->ampl[i] );
                        else
                                fprintf( fptr, " %5s", "*" );

                }

                for (i = 0; i < MAX_POSSIBILITIES; i++) {
                        if (frame->pascii[i].p == UNKNOWN_PATH ) {
                                fprintf( fptr, " %5c %5c", '*', '*' );
                        }
                        else {
                                fprintf( fptr, " %5d %5d", frame->pascii[i].p,
(int)frame->pascii[i].c );
                        }
                }

                fprintf( fptr, "\n" );
                frame = frame->next;
        }

        fclose(fptr);
        firstTime = 0;
}
#endif

#ifdef  SPECTRUM
/*FUNCTION_HEADER**********************
NAME:   OutputSpectrumData
DESC:   Write out to a file the spectrum data
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
IN:             *pHiggins - ptr to the head of the higgins list
OUT:
RETURN:
NOTES:
*END_HEADER****************************/
void OutputSpectrumData( struct HIGGINS *frmstart )
{
        static char FrmtMode = 'w';
        static int          timeIndex = 0;
        int       i;
        char      filename[128],
                  SpectFileName[13] = "specto.dat\0";
        int       filterCenter;

        struct HIGGINS      *frame;

        FILE      *fptr = NULL;

        /*  Write out the formants list formants.dat  */
        if ( clo.testmode  )
        {
                sprintf( filename, "%s\\%s\0", DumpPath, SpectFileName );

                if ( FrmtMode == 'w' )
                {
                        fptr = fopen( filename, "w" );
                        FrmtMode = 'a';                                  /* Will append from
now on */

                        /* Write the first line out to the file */
                        fprintf( fptr, "Time FC       Avg\n");
                }
                else
                        fptr = fopen( filename, "a" );

                if ( fptr == NULL )
                {
                        fprintf( stderr, "Error opening %s", SpectFileName );
                        exit(0);
                }

                frame = frmstart;

                /* Take care of first row in the formants.dat file so that minitab
                        doesn't think that all the columns are alpha columns */
                while (  frame != NULL && frame->type != 'N') {
                        /* Don't do the overlapping nodes */
                        if (frame->loc >= 0) {
                                filterCenter = 0;

                                for ( i = 0; i < 52; i++) {
                                        fprintf( fptr, "%5d %6d %6d\n", timeIndex,
filterCenter, frame->pSpectrum[i] );
                                        if (filterCenter < 1600)
                                                filterCenter += 100;
                                        else
                                                filterCenter += 200;
                                }

                                timeIndex++;
                        }
                        frame = frame->next;
                }
                fclose(fptr);
        }
}
#endif

#ifdef    CRT
/*FUNCTION_HEADER**********************
NAME:     SetupOutputFile
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
DESC:     Open a file and get it ready to write out to.
IN:                *pFilename - file name to open in the dump directory
OUT:
RETURN:
NOTES:    The calling routine is responsible for closing the file.
                   The file name should be just the 8.3 filename.  It will
                   go in the DumpPath c:\dump.
*END_HEADER***************************/
FILE *SetupOutputFile( char *pFilename )
{
          char      filename[128];

          FILE      *fptr = NULL;

          sprintf( filename, "%s\\%s\0", DumpPath, pFilename );

          fptr = fopen( filename, "w" );

          if ( fptr == NULL )
          {
                    fprintf( stderr, "Error opening %s", pFilename );
          }

          return fptr;
}
#endif
#ifndef NOCLO
/*FUNCTION_HEADER**********************
NAME:              GetFileLocation
DESC:              Return the absolute file position given a Higgins frame->loc.
IN:                A frame->loc value.
OUT:
RETURN:
NOTES:    There will be times when the current frame is quiet and the location
                             for that frame will be zero.  Rather than return curbuffloc lets
                             just return the previous file position.
*END_HEADER**************************/
long GetFileLocation( int loc )
{
          long      retval = 0;

          retval = ((long)clo.curbuffloc + (long)loc);
          return retval;
}
#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

Docket No.: 13217.2

```
/*************************************************
 *                -- measuref.c --
 * Warning Confidential Material
 * Property of Synergetics
 * Copyright 1993, 1994 All Rights Reserved
 *
 *  Written by R. Brian Moncur
 *************************************************/
#include "measuref.h"
#include "filter.h"
#include "bach.h"
#include  "lstsqrs.h"


/*FUNCTION_HEADER*********************
NAME:     MeasureFreq
DESC:     Measure the frequency of a filtered signal.  The
               frequency is measured by computing the slope of the signal and
               then finding the average distance between zero crossings of the
               slope data.
IN:       *pSlopeData - Slope data of the frequency to be measured.
               n - number of data samples
               bpfreq - Filter center (Band Pass Frequency)
               fl, fh - Low and High Frequency of the band pass
               SampleRate - SAMPLERATE 44100
OUT:      *pFreq - The calculated frequency.
RETURN:   SIMPLE - if the frequency is a single wave.
               COMPLEX - if the frequency is a complex wave.  We will still try to compute
                         the frequency of the lowest wave.
               FREQ_NOT_FOUND - if no frequency was found.
NOTES:
               1 - Count the minimums
               2 - Count the maximums
               3 - Look at the slope zero crossing in relation to the filter height.
*END_HEADER**************************/
int MeasureFreq(float *pSlopeData, int decimated256, int decFilterLen,
                                                            int fl, int fh, long
SampleRate, int *pFreq)
{
          int i,
               retval = SIMPLE,                                        /* Assume a single
wave */
               NumberOfPeriods = 0,
               kickOutEarly = 0,
               n,
               ulim,
          /* Upper limit for period size */
               llim;
          /* lower limit for period size */

          float m, b,
                    AvgPeriodSize = 0,
                    crossing = 0,
                    lastcrossing = 0;

          if ( fl > 0 )
               ulim  = (int)(SampleRate / fl) + 1;
          else
               ulim = 800;

          llim  = (int)(SampleRate / fh) - 1;

          if (decimated256 < decFilterLen) {
               kickOutEarly = 1;
          }

          /*  Find the slope zero crossings  */
          n = (decimated256 > decFilterLen) ? decimated256 : decFilterLen;
          for ( i = 0; i < (n - 3); i++ ) {
               if (      pSlopeData[i] <= 0  &&
                              pSlopeData[i+1] > 0  ) {
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                        /*  Crossed through 0 with a negative slope  */
                        m = pSlopeData[i+1] - pSlopeData[i];
                        b = pSlopeData[i] - (m * i);

                        if (      m == 0 )
                                continue;

                        /*  The period begins/ends at the zero crossing  */
                        crossing = (-b / m);

                        if ( lastcrossing == 0 ) {
                                lastcrossing = crossing;
                                continue;
                        }

                        if ( (crossing - lastcrossing) > llim &&
                                  (crossing - lastcrossing) < ulim )
                        {
                                AvgPeriodSize += crossing - lastcrossing;
                                NumberOfPeriods++;
                                if (kickOutEarly) {
                                        break;
                                }
                        }
                        else if ((crossing - lastcrossing) < llim ) {
                                continue;
                        }

                        lastcrossing = crossing;
                }
        }

        if ( NumberOfPeriods > 0 )
                AvgPeriodSize /= NumberOfPeriods;

        if ( AvgPeriodSize > 0 )
                *pFreq = (int)((float)SampleRate / AvgPeriodSize);
        else {
                *pFreq = 0;                                     /* Couldn't
calculate the frequency */
                retval = FREQ_NOT_FOUND;
        }

        return retval;
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE*************************************************************
        FILE            :
        DESC            :
        TABS            : 4
        OWNER           : Brent Hale
        DATE CREATED:

                                        Copyright Synergetics 1993, 1994

                                        Warning Confidential Material
                                        Property of Synergetics
                                        Copyright 1993, 1994 All Rights Reserved

        SYNOPSIS:
*END_HEADER*****************************************************************/

#include "filtcoef.h"

/* There are 74 precalculated coefficients */
COEFF   coeffTable[NUMOFCOEF] = {
        { 75,   14700,  3,
                { -1.948125481605530, 0.952136337757111, 0.000000000000000, 0.000000000000000,
-1.884350180625916, 0.888229727745056, 0.000000000000000, 0.000000000000000, },
                { 0.001002718228847, 0.002005436457694, 0.001002718228847, 0.000000000000000,
0.000000000000000, 0.000969892484136, 0.001939784968272, 0.000969892484136, 0.000000000000000,
0.000000000000000, },
                { 0.0, 0.0, 0.0, 0.0, 0.0, 0.0, 0.0, 0.0, },
                { 0.0, 0.0, 0.0, 0.0, 0.0, 0.0, 0.0, 0.0, 0.0, 0.0, }},

        { 100,  14700,  3,
                { -1.929647207260132, 0.936719477176666, 0.000000000000000, 0.000000000000000,
-1.847001194953918, 0.853770554065704, 0.000000000000000, 0.000000000000000, },
                { 0.001768061309122, 0.003536122618243, 0.001768061309122, 0.000000000000000,
0.000000000000000, 0.001692335936241, 0.003384671872482, 0.001692335936241, 0.000000000000000,
0.000000000000000, },
                { 0.0, 0.0, 0.0, 0.0, 0.0, 0.0, 0.0, 0.0, },
                { 0.0, 0.0, 0.0, 0.0, 0.0, 0.0, 0.0, 0.0, 0.0, 0.0, }},

        { 125,  14700,  3,
                { -1.910611629486084, 0.921571791172028, 0.000000000000000, 0.000000000000000,
-1.810221910476685, 0.820606291294098, 0.000000000000000, 0.000000000000000, },
                { 0.002740049501881, 0.005480099003762, 0.002740049501881, 0.00000000000000C
0.000000000000000, 0.002596078673378, 0.005192157346755, 0.002596078673378, 0.000000000000000,
0.000000000000000, },
                { 0.0, 0.0, 0.0, 0.0, 0.0, 0.0, 0.0, 0.0, },
                { 0.0, 0.0, 0.0, 0.0, 0.0, 0.0, 0.0, 0.0, 0.0, 0.0, }},

        { 150,  14700,  3,
                { -1.891039252281189, 0.906693160533905, 0.000000000000000, 0.000000000000000,
-1.773994803428650, 0.788679838180542, 0.000000000000000, 0.000000000000000, },
                { 0.003913481254131, 0.007826962508261, 0.003913481254131, 0.000000000000000,
0.000000000000000, 0.003671259153634, 0.007342518307269, 0.003671259153634, 0.000000000000000,
0.000000000000000, },
                { 0.0, 0.0, 0.0, 0.0, 0.0, 0.0, 0.0, 0.0, },
                { 0.0, 0.0, 0.0, 0.0, 0.0, 0.0, 0.0, 0.0, 0.0, 0.0, }},

        { 175,  14700,  3,
                { -1.870950222015381, 0.892083227634430, 0.000000000000000, 0.000000000000000,
-1.738302469253540, 0.757937192916870, 0.000000000000000, 0.000000000000000, },
                { 0.005283251404762, 0.010566502809525, 0.005283251404762, 0.000000000000000,
0.000000000000000, 0.004908676259220, 0.009817352518439, 0.004908676259220, 0.000000000000000,
0.000000000000000, },
                { 0.0, 0.0, 0.0, 0.0, 0.0, 0.0, 0.0, 0.0, },
                { 0.0, 0.0, 0.0, 0.0, 0.0, 0.0, 0.0, 0.0, 0.0, 0.0, }},

        { 325,  14700,  3,
                { -3.792726993560791, 5.436556816101074, -3.493631601333618, 0.849858880043030,
-3.619908809661865, 4.914775371551514, -2.967130899429321, 0.672316014766693, },
                { 0.010521072894335, 0.000000000000000, -0.021042145788670, 0.000000000000000,
0.010521072894335, 0.009511297568679, 0.000000000000000, -0.019022595137358, 0.000000000000000,
0.009511297568679, },
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                { 0.0, 0.0, 0.0, 0.0, 0.0, 0.0, 0.0, 0.0, },
                { 0.0, 0.0, 0.0, 0.0, 0.0, 0.0, 0.0, 0.0, 0.0, 0.0, }},

        { 350,  14700,  3,
                { -3.804107666015625, 5.473835468292236, -3.533234834671021, 0.863666772842407,
-3.644322872161865, 4.992543220520020, -3.047876834869385, 0.699802160263062, },
                { 0.008591895923018, 0.000000000000000, -0.017183791846037, 0.000000000000000,
0.008591895923018, 0.007836445234716, 0.000000000000000, -0.015672890469432, 0.000000000000000,
0.007836445234716, },
                { 0.0, 0.0, 0.0, 0.0, 0.0, 0.0, 0.0, 0.0, },
                { 0.0, 0.0, 0.0, 0.0, 0.0, 0.0, 0.0, 0.0, 0.0, 0.0, }},

        { 375,  14700,  3,
                { -3.814939498901367, 5.510186195373535, -3.572671890258789, 0.877741217613220,
-3.669059038162231, 5.071734905242920, -3.130712747573853, 0.728327393531799, },
                { 0.006844355724752, 0.000000000000000, -0.013688711449504, 0.000000000000000,
0.006844355724752, 0.006299743428826, 0.000000000000000, -0.012599486857653, 0.000000000000000,
0.006299743428826, },
                { 0.0, 0.0, 0.0, 0.0, 0.0, 0.0, 0.0, 0.0, },
                { 0.0, 0.0, 0.0, 0.0, 0.0, 0.0, 0.0, 0.0, 0.0, 0.0, }},

        { 400,  14700,  3,
                { -3.825207710266113, 5.545574665069580, -3.611924648284912, 0.892083108425140,
-3.694127798080444, 5.152401924133301, -3.215723037719727, 0.757937192916870, },
                { 0.005283250473440, 0.000000000000000, -0.010566500946879, 0.000000000000000,
0.005283250473440, 0.004908675793558, 0.000000000000000, -0.009817351587117, 0.000000000000000,
0.004908675793558, },
                { 0.0, 0.0, 0.0, 0.0, 0.0, 0.0, 0.0, 0.0, },
                { 0.0, 0.0, 0.0, 0.0, 0.0, 0.0, 0.0, 0.0, 0.0, 0.0, }},

        { 425,  14700,  3,
                { -3.834894657135010, 5.579965591430664, -3.650973558425903, 0.906693220138550,
-3.719538688659668, 5.234597206115723, -3.302996873855591, 0.788679838180542, },
                { 0.003913480322808, 0.000000000000000, -0.007826960645616, 0.000000000000000,
0.003913480322808, 0.003671258455142, 0.000000000000000, -0.007342516910285, 0.000000000000000,
0.003671258455142, },
                { 0.0, 0.0, 0.0, 0.0, 0.0, 0.0, 0.0, 0.0, },
                { 0.0, 0.0, 0.0, 0.0, 0.0, 0.0, 0.0, 0.0, 0.0, 0.0, }},

        { 750,  14700,  3,
                { -3.584583520889282, 5.001218318939209, -3.220480680465698, 0.810024142265320,
-3.387049674987793, 4.408949851989746, -2.612125873565674, 0.595672369003296, },
                { 0.017352050170302, 0.000000000000000, -0.034704100340605, 0.000000000000000,
0.017352050170302, 0.015297137200832, 0.000000000000000, -0.030594274401665, 0.000000000000000,
0.015297137200832, },
                { 0.0, 0.0, 0.0, 0.0, 0.0, 0.0, 0.0, 0.0, },
                { 0.0, 0.0, 0.0, 0.0, 0.0, 0.0, 0.0, 0.0, 0.0, 0.0, }},

        { 1250,  14700,  3,
                { -3.250611543655396, 4.421947479248047, -2.920431852340698, 0.810024142265320,
-3.071481704711914, 3.898279190063477, -2.368756532669067, 0.595672249794006, },
                { 0.017352055758238, 0.000000000000000, -0.034704111516476, 0.000000000000000,
0.017352055758238, 0.015297140926123, 0.000000000000000, -0.030594281852245, 0.000000000000000,
0.015297140926123, },
                { 0.0, 0.0, 0.0, 0.0, 0.0, 0.0, 0.0, 0.0, },
                { 0.0, 0.0, 0.0, 0.0, 0.0, 0.0, 0.0, 0.0, 0.0, 0.0, }},

        { 1750,  14700,  3,
                { -2.768736839294434, 3.685903310775757, -2.487503528594971, 0.810024142265320,
-2.616161346435547, 3.249400615692139, -2.017609357833862, 0.595672309398651, },
                { 0.017352053895593, 0.000000000000000, -0.034704107791185, 0.000000000000000
0.017352053895593, 0.015297139994800, 0.000000000000000, -0.030594279989600, 0.000000000000000,
0.015297139994800, },
                { 0.0, 0.0, 0.0, 0.0, 0.0, 0.0, 0.0, 0.0, },
                { 0.0, 0.0, 0.0, 0.0, 0.0, 0.0, 0.0, 0.0, 0.0, 0.0, }},

        { 2250,  14700,  3,
                { -2.160884618759155, 2.925521135330200, -1.941393613815308, 0.810024201869965,
-2.041805982589722, 2.579066991806030, -1.574660897254944, 0.595672488212585, },
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                    { 0.017352044582367, 0.000000000000000, -0.034704089164734, 0.000000000000000,
0.017352044582367, 0.015297133475542, 0.000000000000000, -0.030594266951084, 0.000000000000000,
0.015297133475542, },
                    { 0.0, 0.0, 0.0, 0.0, 0.0, 0.0, 0.0, 0.0, },
                    { 0.0, 0.0, 0.0, 0.0, 0.0, 0.0, 0.0, 0.0, 0.0, 0.0, }},

        { 2750,   14700,    3,
                    { -1.454712033271790, 2.277616262435913, -1.306950211524963, 0.810024142265320,
-1.374547958374023, 2.007889986038208, -1.060064911842346, 0.595672369003296, },
                    { 0.017352052032948, 0.000000000000000, -0.034704104065895, 0.000000000000000,
0.017352052032948, 0.015297138132155, 0.000000000000000, -0.030594276264310, 0.000000000000000,
0.015297138132155, },
                    { 0.0, 0.0, 0.0, 0.0, 0.0, 0.0, 0.0, 0.0, },
                    { 0.0, 0.0, 0.0, 0.0, 0.0, 0.0, 0.0, 0.0, 0.0, 0.0, }},

        { 3250,   22050,    2,
                    { -2.315433740615845, 3.185883283615112, -2.156493663787842, 0.86832857131958,
-2.221030473709106, 2.914524316787720, -1.869998455047607, 0.709192872047424, },
                    { 0.007988967932761, 0.000000000000000, -0.015977935865521, 0.000000000000000
0.007988967932761, 0.007308504544199, 0.000000000000000, -0.014617009088397, 0.000000000000000,
0.007308504544199, },
                    { 0.0, 0.0, 0.0, 0.0, 0.0, 0.0, 0.0, 0.0, },
                    { 0.0, 0.0, 0.0, 0.0, 0.0, 0.0, 0.0, 0.0, 0.0, 0.0, }},

        { 3750,   22050,    2,
                    { -1.854697465896606, 2.702252626419067, -1.727384090423584, 0.868328630924225,
-1.779078841209412, 2.472086906433105, -1.497897028923035, 0.709192872047424, },
                    { 0.007988965138793, 0.000000000000000, -0.015977930277586, 0.000000000000000,
0.007988965138793, 0.007308501284570, 0.000000000000000, -0.014617002569139, 0.000000000000000,
0.007308501284570, },
                    { 0.0, 0.0, 0.0, 0.0, 0.0, 0.0, 0.0, 0.0, },
                    { 0.0, 0.0, 0.0, 0.0, 0.0, 0.0, 0.0, 0.0, 0.0, 0.0, }},

        { 4250,   22050,    2,
                    { -1.356375455856323, 2.299468994140625, -1.263268828392029, 0.868328571319580,
-1.301074266433716, 2.103610754013062, -1.095440626144409, 0.709192931652069, },
                    { 0.007988965138793, 0.000000000000000, -0.015977930277586, 0.000000000000000,
0.007988965138793, 0.007308501750231, 0.000000000000000, -0.014617003500462, 0.000000000000000,
0.007308501750231, },
                    { 0.0, 0.0, 0.0, 0.0, 0.0, 0.0, 0.0, 0.0, },
                    { 0.0, 0.0, 0.0, 0.0, 0.0, 0.0, 0.0, 0.0, 0.0, 0.0, }},

        { 4750,   22050,    2,
                    { -0.830566704273224, 2.010017156600952, -0.773553490638733, 0.86832857131958,
-0.796703398227692, 1.838812947273254, -0.670785129070282, 0.709192872047424, },
                    { 0.007988967932761, 0.000000000000000, -0.015977935865521, 0.000000000000000
0.007988967932761, 0.007308503612876, 0.000000000000000, -0.014617007225752, 0.000000000000000,
0.007308503612876, },
                    { 0.0, 0.0, 0.0, 0.0, 0.0, 0.0, 0.0, 0.0, },
                    { 0.0, 0.0, 0.0, 0.0, 0.0, 0.0, 0.0, 0.0, 0.0, 0.0, }},

        { 5500,   (unsigned int)44100L,        1,
                    { -2.741556882858276, 3.746477603912354, -2.574519872665405, 0.882492125034332,
-2.640286922454834, 3.459062099456787, -2.267960548400879, 0.738074541091919, },
                    { 0.006303029600531, 0.000000000000000, -0.012606059201062, 0.000000000000000,
0.006303029600531, 0.005819485057145, 0.000000000000000, -0.011638970114291, 0.000000000000000,
0.005819485057145, },
                    { 0.0, 0.0, 0.0, 0.0, 0.0, 0.0, 0.0, 0.0, },
                    { 0.0, 0.0, 0.0, 0.0, 0.0, 0.0, 0.0, 0.0, 0.0, 0.0, }},

        { 6500,   (unsigned int)44100L,        1,
                    { -2.325876474380493, 3.217020988464355, -2.184165954589844, 0.882492184638977,
-2.239961385726929, 2.970223188400269, -1.924087762832642, 0.738074481487274, },
                    { 0.006303031463176, 0.000000000000000, -0.012606062926352, 0.000000000000000,
0.006303031463176, 0.005819486919791, 0.000000000000000, -0.011638973839581, 0.000000000000000,
0.005819486919791, },
                    { 0.0, 0.0, 0.0, 0.0, 0.0, 0.0, 0.0, 0.0, },
                    { 0.0, 0.0, 0.0, 0.0, 0.0, 0.0, 0.0, 0.0, 0.0, 0.0, }},

        { 7500,   (unsigned int)44100L,        1,
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
			{ -1.863062262535095, 2.729723930358887, -1.749549865722656, 0.882492184638977,
-1.794242978096008, 2.520309925079346, -1.541223406791687, 0.738074481487274, },
			{ 0.006303032860160, 0.000000000000000, -0.012606065720320, 0.000000000000000,
0.006303032860160, 0.005819487851113, 0.000000000000000, -0.011638975702226, 0.000000000000000,
0.005819487851113, },
			{ 0.0, 0.0, 0.0, 0.0, 0.0, 0.0, 0.0, 0.0, },
			{ 0.0, 0.0, 0.0, 0.0, 0.0, 0.0, 0.0, 0.0, 0.0, 0.0, }},

	{ 8500,	(unsigned int)44100L,		1,
			{ -1.362493038177490, 2.323887348175049, -1.279479384422302, 0.882492184638977,
-1.312164187431335, 2.145607471466064, -1.127126097679138, 0.738074481487274, },
			{ 0.006303030997515, 0.000000000000000, -0.012606061995029, 0.000000000000000,
0.006303030997515, 0.005819485988468, 0.000000000000000, -0.011638971976936, 0.000000000000000,
0.005819485988468, },
			{ 0.0, 0.0, 0.0, 0.0, 0.0, 0.0, 0.0, 0.0, },
			{ 0.0, 0.0, 0.0, 0.0, 0.0, 0.0, 0.0, 0.0, 0.0, 0.0, }},

	{ 9500,	(unsigned int)44100L,		1,
			{ -0.834312677383423, 2.032240629196167, -0.783479869365692, 0.882492125034332,
-0.803494155406952, 1.876334905624390, -0.690187454223633, 0.738074481487274, },
			{ 0.006303031928837, 0.000000000000000, -0.012606063857675, 0.000000000000000,
0.006303031928837, 0.005819487385452, 0.000000000000000, -0.011638974770904, 0.000000000000000,
0.005819487385452, },
			{ 0.0, 0.0, 0.0, 0.0, 0.0, 0.0, 0.0, 0.0, },
			{ 0.0, 0.0, 0.0, 0.0, 0.0, 0.0, 0.0, 0.0, 0.0, 0.0, }},
};


/*FUNCTION_HEADER**********************
NAME:		GetPtr2Coeff
DESC:		Get a ptr into the coeffTable for the correct set of parameters.
IN:		fc - The filter Center of the bandpass we're on.
OUT:
RETURN:	An index into the coeffTable for the filter Center given.
NOTES:
*END_HEADER***************************/
int GetPtr2Coeff( int fc )
{
	int	index = -1;

	if (fc < 200) {
		index = (fc / 25) - 3;
	}

	else if (fc < 500) {
		index = (fc / 25) - 8;
	}

	else if (fc < 5000) {
		index = 10;
		index += (fc - 750) / 500;
	}

	else {		/* 5000 < fc < 10000 */
		index = NUMOFCOEF + ((int)(fc / 1000) - 10);
	}

#ifdef	DEBUG
	printf(" index = %d for fc = %d ", index, coeffTable[index].filterCenter );
#endif

	return index;
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE****************************************************************
        FILE            : overlap.c
        DESC            : Contains the routines to handle the overlap area in Bach.
        TABS            : 3
        OWNER           : Brent Hale
        DATE CREATED: 25 Oct 1994

                                        Copyright Synergetics 1993, 1994

                                        Warning Confidential Material
                                        Property of Synergetics
                                        Copyright 1993, 1994 All Rights Reserved

        SYNOPSIS:
*END_HEADER*****************************************************************/

#include  "synergy.h"
#include  "bach.h"


GLOBAL int          *pOverlapData = (int *)0;

/*FUNCTION_HEADER**********************
NAME:           SaveOverlapData
DESC:           Save some of this data for possible use on the next pass.
IN:             *pData - ptr to begininng of 10240 buffer of data.
OUT:            none
RETURN:   none
NOTES:
*END_HEADER***************************/
void      SaveOverlapData( int *pData )
{
        if (pOverlapData) {
                memmove( pOverlapData, pData + 10240 - OverlapDataSize, OverlapDataSize );
        }
}


/**********************************************************************
 * LoadInput - Load the time domain samples into the buffer OutData.
 * Decimate the signal by skipping every PointsToSkip to reduce the
 * amount of time needed to filter.
 **********************************************************************/
int
LoadInput( int *InData, int begOffset, int n, float *OutData, int PointsToSkip )
{
        int i, j = 0;
        int       *srcPtr;
        long      avg = 0;


        /* If we have a negative beginning offset, then we need to copy the first
                portion from the overlap area */
        if (begOffset < 0) {
                srcPtr = pOverlapData + OverlapDataSize + begOffset;
                n = n + begOffset;
                for ( i = j = 0; i < abs(begOffset); i += PointsToSkip, j++ ) {
                        OutData[j] = srcPtr[i];
                        avg += abs(srcPtr[i]);
                }
                srcPtr = InData;
        }
        else {
                srcPtr = InData + begOffset;
        }

        for ( i = 0; i < n; i += PointsToSkip, j++ ) {
                OutData[j] = srcPtr[i];
                avg += abs(srcPtr[i]);
        }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        if (j > 0)
                avg = avg / j;

        return (int)avg;
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/************************************************
 *                -- spgain.c --
 *  Copywrite Synergetics 1993, 1994
 *
 * Warning Confidential Material
 * Property of Synergetics
 * Copyright 1993, 1994 All Rights Reserved
 ************************************************/
#include "gencoeff.h"
#include "spgain.h"

/*******************************************************************
 * OutputSPGain - Compute the complex gain of a system and output the
 * gain.
 * INPUT - b, a - the digital coefficients
 *                    ns - number of stages for a cascade filter
 *                    ln - order of each stage
 *                    fln - normalized low frequency
 *                    fhn - normalized high frequency
 *******************************************************************/
#define NGAIN 500
void
OutputSPGain(float *b, float *a, int ns, int ln, float fln, float fhn, long SampleRate )
{
        int i, j,
            FilterCenter;
        static int counter;
        float *ampl,
                  freq;
        char filename[128];

        FILE      *fptr;

        if ((ampl = (float *)calloc(NGAIN, sizeof(float))) == NULL )
                ErrorHandler( OutOfMemory, "in OutputSPGain" );

        FilterCenter = (int)((fln + fhn)/2 * (float)SampleRate);

        /*  Calculate the complex gain of a linear system  */
        for ( i = 0; i < NGAIN; i++ )
        {
                ampl[i] = 1;
                for ( j = 0; j < ns; j++ )
                        ampl[i] *= c_abs(spgain(&b[j*(ln+1)], &a[j*ln],
                                        ln, ln, ((float)i / NGAIN * 0.5) ));
        }

        /*  Print the gain data to file SPG<FilterCenter>.dat (counter is easier
                to load into minitab)  */
        sprintf(filename, "SPG%05d.dat", counter++);
        if ( (fptr = fopen(filename, "w")) != NULL )
        {
                for ( i = 0; i < NGAIN; i++ )
                {
                        freq = ((float)i / NGAIN * 0.5 * (float)SampleRate);
                        if ( freq >= (FilterCenter - 1000) &&
                                freq <= (FilterCenter + 1000) )
                                fprintf(fptr, "%8.2f\t%f\n", freq, ampl[i]);
                }

                fclose( fptr );
        }
        else
                ErrorHandler( FileOpen, filename);

        free( ampl );
        return;
}

/*******************************************************************
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
 * SPGAIN     11/13/85
 * THIS FUNCTION COMPUTES THE COMPLEX GAIN OF ANY CAUSAL LINEAR
 * SYSTEM IN DIRECT FORM.  FOR A PARALLEL SYSTEM, JUST TREAT EACH
 * SECTION AS DIRECT AND ADD THE RESULTS.  FOR A CASCADE SYSTEM,
 * TREAT EACH SECTION AS DIRECT AND MULTIPLY THE RESULTS TOGETHER.
 * YOU MUST SPECIFY:  DIMENSION B(0:LB),A(1:LA); COMPLEX GAIN.
 * THE LINEAR SYSTEM IS ASSUMED TO HAVE THE TRANSFER FUNCTION
 *
 *       B(0)+B(1)*Z**(-1)+B(2)*Z**(-2)+...+B(LB)*Z**(-LB)
 *  H(Z)=-------------------------------------------------
 *       1.0+A(1)*Z**(-1)+A(2)*Z**(-2)+...+A(LA)*Z**(-LA)
 * FOR AN FIR SYSTEM, USE LA=1 AND A(1)=0.  DO NOT USE LA=0.
 * FREQ=FREQUENCY IN HZ-S, I.E., SAMPLING FREQUENCY=1.0.
 * NOTE: COMPUTATION IS LIMITED BY "SMALL" AND "BIG" BELOW.
 ********************************************************************/
COMPLEX
spgain(float *b, float *a, int lb, int la, float freq)
{

        /* Local variables */
        int i;
        COMPLEX asum, bsum, ret_val, tmp_complex1, tmp_complex2, z1;
        float tmp_float;

        tmp_complex1.re = 0.0;
        tmp_complex1.im = (float) (-2.0 * PI * freq);
        z1 = cexp(tmp_complex1);

        bsum.re = 0.0;
        bsum.im = 0.0;

        if (lb > 0)
        {
                for (i = lb ; i >= 1 ; --i)
                {
                        tmp_float = (bsum.re + b[i]) * z1.re - bsum.im * z1.im;
                        bsum.im = (bsum.re + b[i]) * z1.im + bsum.im * z1.re;
                        bsum.re = tmp_float;
                }
        }

        asum.re = 0.0;
        asum.im = 0.0;
        for (i = la - 1 ; i >= 0 ; --i)
        {
                tmp_float = (asum.re + a[i]) * z1.re - asum.im * z1.im;
                asum.im = (asum.re + a[i]) * z1.im + asum.im * z1.re;
                asum.re = tmp_float;
        }

        tmp_complex1.re = 1.0 + asum.re;
        tmp_complex1.im = asum.im;
        if (c_abs(tmp_complex1) < SMALL)
        {
                ret_val.re = BIG;
                ret_val.im = 0.0;
        }
        else
        {
                tmp_complex1.re = b[0] + bsum.re;
                tmp_complex1.im = bsum.im;
                tmp_complex2.re = 1.0 + asum.re;
                tmp_complex2.im = asum.im;

                ret_val = cdiv(tmp_complex1, tmp_complex2);
        }

        return(ret_val);
} /* spgain */
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/***********************************************
 *                  -- gencoeff.c --
 *  Copywrite Synergetics 1993, 1994
 *
 * Warning Confidential Material
 * Property of Synergetics
 * Copyright 1993, 1994 All Rights Reserved
 ***********************************************/
#include "gencoeff.h"
#include "spgain.h"

#define NLOWPASS 5
#define NBANDPASS 19

/*  Global variables  */
long LowPassFilters[NLOWPASS][4] =
{
        {0, 150, 14700, 3},
        {0, 200, 14700, 3},
        {0, 250, 14700, 3},
        {0, 300, 14700, 3},
        {0, 350, 14700, 3}
};

long BandPassFilters[NBANDPASS][4] =
{
        { 150,   500, 14700, 3},
        { 200,   500, 14700, 3},
        { 250,   500, 14700, 3},
        { 300,   500, 14700, 3},
        { 350,   500, 14700, 3},
        { 500,  1000, 14700, 3},
        {1000,  1500, 14700, 3},
        {1500,  2000, 14700, 3},
        {2000,  2500, 14700, 3},
        {2500,  3000, 14700, 3},
        {3000,  3500, 22050, 2},
        {3500,  4000, 22050, 2},
        {4000,  4500, 22050, 2},
        {4500,  5000, 22050, 2},
        {5000,  6000, 44100L, 3},
        {6000,  7000, 44100L, 3},
        {7000,  8000, 44100L, 3},
        {8000,  9000, 44100L, 3},
        {9000, 10000, 44100L, 3}
};

void
main( void )
{
        float b[10], a[8], fln, fhn;
        int i,
                errors = 0,
                overlap = 75,
                filter,
                ln = 4,          /*  ln has to be at least 2X ns  */
                ns = 2;

        for ( i = 0; i < NLOWPASS; i++ )
        {
                fln = 0;
                fhn = (float)LowPassFilters[i][1] / (float)LowPassFilters[i][2];
                errors = GenerateCoefficients(LOWPASS, fhn, fhn, ln, ns, b, a,
LowPassFilters[i][2]);
                if ( errors > 0 )
                        printf( "There has been an error in GenerateCoefficients\n");
                OutputSPGain(b, a, ns, ln, fln, fhn, LowPassFilters[i][2]);
        }
        for ( i = 0; i < NBANDPASS; i++ )
        {
/*      Calculate the overlap as a percent of the band width
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
			overlap = (BandPassFilters[i][1] - BandPassFilters[i][0]) / 10 * 3;
			if ( overlap < 75 )
				overlap = 75;
*/
			if ( (BandPassFilters[i][0] - overlap) < 0 )
				overlap = (int)BandPassFilters[i][0];
			fln = (float)(BandPassFilters[i][0] - overlap) / (float)BandPassFilters[i][2];
			fhn = (float)(BandPassFilters[i][1] + overlap) / (float)BandPassFilters[i][2];
			filter = ((fln + fhn) / 2 * BandPassFilters[i][2]) + 0.5;
			printf("Filter: %d\n", filter);
			errors = GenerateCoefficients(BANDPASS, fln, fhn, ln, ns, b, a,
BandPassFilters[i][2]);
			if ( errors > 0 )
				printf( "There has been an error in GenerateCoefficients\n");
			OutputSPGain(b, a, ns, ln, fln, fhn, BandPassFilters[i][2]);
		}

}


/*********************************************************************
 * GenerateCoefficients
 *			fl - low frequency cutoff
 *			fh - high frequency cutofff
 *			samples - samples going into filter
 *			b - return for numerator coefficients
 *			a - return for denominator coefficients
 *********************************************************************/
int
GenerateCoefficients(int iband, float fln, float fhn, int ln, int ns, float *b, float *a, long
SampleRate)
{
	FILE *fptr;
	int i;
	int	error;

	/* LOWPASS ANALOG TO BANDPASS DIGITAL SCALED IN FREQUENCY */

	/*  Generate coefficients.  */
	error = spiird(iband, ns, ln, fln, fhn, b, a);

	if (error != 0)
		ErrorHandler( Coefficients, "in GenerateCoefficients" );

	if ( (fptr = fopen("coeff.dat", "a")) == NULL )
		ErrorHandler( FileOpen, "coeff.dat" );

	if (fln == fhn) {				/* LowPass. */
		fprintf(fptr, "\t{ %d,\n", (int)((fhn/2.0*(float)SampleRate) + 0.5) );
	}
	else {
		fprintf(fptr, "\t{ %d,\n", (int)(((fln+fhn)/2.0*(float)SampleRate) + 0.5) );
	}

	fprintf(fptr, "\t\t{ ");
	for (i = 0 ; i < (ln * ns); ++i)
		fprintf(fptr, "%12.15f, ", a[i]);
	fprintf(fptr, "},\n");

	fprintf(fptr, "\t\t{ ");
	for (i = 0 ; i < ((ln+1) * ns) ; ++i)
		fprintf(fptr, "%12.15f, ", b[i]);
	fprintf(fptr, "},\n");

	fprintf(fptr, "\t\t{ ");
	for (i = 0 ; i < (ln * ns); ++i)
		fprintf(fptr, "0.0, ");
	fprintf(fptr, "},\n");

	fprintf(fptr, "\t\t{ ");
	for (i = 0 ; i < ((ln+1) * ns) ; ++i)
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                fprintf(fptr, "0.0, ");
        fprintf(fptr, "}},\n\n");

        fclose( fptr );

        return error;

}

int
spiird(int iband, int ns, int ls, float fln, float fhn, float *b, float *a)
{
         int      error = 0,
                  k,                        /*  section number  */
                  b_diml,           /*  dimension size of b  */
                  a_diml,           /*  dimension size of a  */
                  tmp_int;

         float work[100],
                  c[10],    /*  analog denominator coefficients    */
                  d[10];    /*  analog numerator coefficients      */


        if ( ns <= 0 ||
                iband < LOWPASS ||
                iband > STOPBAND )
                return 6;

        if ( fln <= 0 || fhn >= 0.5 )
                return 7;

        if (    (iband == BANDPASS || iband == STOPBAND) &&
                        fln >= fhn )
                return 7;

        b_diml = ls + 1;
        a_diml = ls;

/*
        if ( (c = (float *)calloc(b_diml , sizeof(float))) == NULL )
                ErrorHandler( OutOfMemory, "in spiird" );

        if ( (d = (float *)calloc(b_diml , sizeof(float))) == NULL )
                ErrorHandler( OutOfMemory, "in spiird" );

        if ( (work = (float *)calloc((b_diml * b_diml) , sizeof(float))) == NULL )
                ErrorHandler( OutOfMemory, "in spiird" );
*/
        for (k = 1 ; k <= ns ; ++k)
        {
                /*  Order of low-pass H(s)  */
                tmp_int = ns * 2;               /*  Why isn't this (ls * ns) ?  */

                /*  generate analog coefficients  */
                error = spbwcf(tmp_int, k, b_diml, d, c);

                if (error != 0)
                {
                /*
                        free( c );
                        free( d );
                        free( work );
                */
                        return error;
                }

                /*  Transform analog coefficients to digital coefficients  */
                error = spfblt(d, c, ls, iband, fln, fhn, &b[(k - 1) * b_diml],
                        &a[(k - 1) * a_diml], work);

                if (error != 0)
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                        {
                        /*
                                free( c );
                                free( d );
                                free( work );
                        */
                                return error;
                        }
                }

/*
                free( c );
                free( d );
                free( work );
*/
                return error;
} /* spiird */

int
spfblt( float *d, float *c, int ln, int iband, float fln, float fhn,
                        float *b, float *a, float *work)
{
                int             error;
                int work_dim1, tmp_int, i, k, l, m, zero_func, ll, mm, ls;
                float tmpc, tmpd, w, w1, w2, w02, tmp;

                /*  Make sure that d and c are not all zeros  */
                zero_func = TRUE;
                for (i = ln ; i >= 0 && zero_func ; --i)
                {
                        if (c[i] != 0.0 || d[i] != 0.0)
                                zero_func = FALSE;
                }

                if ( zero_func )
                        return 1;

                work_dim1 = ln + 1;

                m = i + 1;
                w1 = (float) tan(PI * fln);
                l = m * 2;

                if ( iband > HIGHPASS )
                {
                        w2 = (float) tan(PI * fhn);
                        w = w2 - w1;
                        w02 = w1 * w2;
                }

/*  Lets allow this for now
                if (l > ln)
                        return 3;
*/


                switch (iband)
                {
                        /* SCALING S/W1 FOR LOWPASS,HIGHPASS */
                        case LOWPASS:

                                for (mm = 0 ; mm <= m ; ++mm)
                                {
                                        d[mm] /= pow(w1, mm);
                                        c[mm] /= pow(w1, mm);
                                }

                                break;

                        /* SUBSTITUTION OF 1/S TO GENERATE HIGHPASS (HP,BS) */
                        case HIGHPASS:
```

Docket No.: 13.17

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        for (mm = 0 ; mm <= (m / 2) ; ++mm)
        {
                tmp = d[mm];
                d[mm] = d[m - mm];
                d[m - mm] = tmp;
                tmp = c[mm];
                c[mm] = c[m - mm];
                c[m - mm] = tmp;
        }

        /* SCALING S/W1 FOR LOWPASS,HIGHPASS */

        for (mm = 0 ; mm <= m ; ++mm)
        {
                d[mm] /= pow(w1, mm);
                c[mm] /= pow(w1, mm);
        }

        break;

/* SUBSTITUTION OF (S**2+W0**2)/(W*S)  BANDPASS,BANDSTOP */
case BANDPASS:

        for (ll = 0 ; ll <= l ; ++ll)
        {
                work[ll] = 0.0;
                work[ll + work_dim1] = 0.0;
        }

        for (mm = 0 ; mm <= m ; ++mm)
        {
                tmp_int = m - mm;
                tmpd = d[mm] * pow(w, tmp_int);
                tmpc = c[mm] * pow(w, tmp_int);

                for (k = 0 ; k <= mm ; ++k)
                {
                        ls = m + mm - (k * 2);
                        tmp_int = mm - k;
                        tmp = spbfct(mm,mm) / (spbfct(k,k)
                                    * spbfct(tmp_int,tmp_int));
                        work[ls] += tmpd * pow(w02, k) * tmp;
                        work[ls + work_dim1] += tmpc * pow(w02, k) * tmp;
                }
        }

        for (ll = 0 ; ll <= l ; ++ll)
        {
                d[ll] = work[ll];
                c[ll] = work[ll + work_dim1];
        }

        break;

/* SUBSTITUTION OF 1/S TO GENERATE HIGHPASS (HP,BS) */
case STOPBAND:

        for (mm = 0 ; mm <= (m / 2) ; ++mm)
        {
                tmp = d[mm];
                d[mm] = d[m - mm];
                d[m - mm] = tmp;
                tmp = c[mm];
                c[mm] = c[m - mm];
                c[m - mm] = tmp;
        }

        /* SUBSTITUTION OF (S**2+W0**2)/(W*S)  BANDPASS,BANDSTOP */

        for (ll = 0 ; ll <= l ; ++ll)
        {
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                    work[ll] = 0.0;
                    work[ll + work_diml] = 0.0;
                }

                for (mm = 0 ; mm <= m ; ++mm)
                {
                    tmp_int = m - mm;
                    tmpd = d[mm] * pow(w, tmp_int);
                    tmpc = c[mm] * pow(w, tmp_int);

                    for (k = 0 ; k <= mm ; ++k)
                    {
                        ls = m + mm - (k * 2);
                        tmp_int = mm - k;
                        tmp = spbfct(mm,mm) / (spbfct(k,k)
                                    * spbfct(tmp_int,tmp_int ));
                        work[ls] += tmpd * pow(w02, k) * tmp;
                        work[ls + work_diml] += tmpc * pow(w02, k) * tmp;
                    }
                }

                for (ll = 0 ; ll <= l ; ++ll)
                {
                    d[ll] = work[ll];
                    c[ll] = work[ll + work_diml];
                }

                break;

        }       /*  end of switch  */


        error = spbiln(d, c, ln, b, a, work);

        return error;

} /* spfblt */


/*****************************************************************
 * SPBWCF - Signal Processing Butterworth Coefficients    11/13/85
 * GENERATES KTH SECTION COEFFICIENTS FOR LTH ORDER NORMALIZED
 *       LOWPASS BUTTERWORTH FILTER
 * SECOND ORDER SECTIONS: K<=(L+1)/2
 * ODD ORDER L:  FINAL SECTION WILL CONTAIN 1ST ORDER POLE
 * LN DEFINES COEFFICIENT ARRAY SIZE
 * ANALOG COEFFICIENTS ARE RETURNED IN D AND C
 * IERROR=0       NO ERRORS DETECTED
 *        1       INVALID FILTER ORDER L
 *        2       INVALID SECTION NUMBER K
 *****************************************************************/
int
spbwcf(int l, int k, int ln, float *d, float *c)
{
        /* Local variables */
        int i;
        float tmp;

        /*  Total order (ln * ns) must be greater than zero  */
        if (l <= 0)
                return 1;

        if ( k <= 0 ||
                  k > ((l + 1) / 2) )
                return 2;

        d[0] = c[0] = 1.0;
        for (i = 1 ; i < ln ; ++i)    /* RBM:  changed i <= ln to i < ln so it doesn't overrun the
array */
        {
                d[i] = 0.0;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                c[i] = 0.0;
        }

        tmp = (float) k - (l + 1.0) / 2.0;

        if (tmp == 0.0)
                c[1] = 1.0;
        else
        {
                c[1] = (float) (-2.0 * cos((double) ((k * 2) + l - 1)
                                  * PI / (double) (l * 2)));
                c[2] = 1.0;
        }

        return 0;

} /* spbwcf */

int
spbiln(float *d, float *c, int ln, float *b, float *a, float *work )
{
        /* Local variables */
        int i, j, l, zero_func, work_dim1;
        float scale, tmp;
        double atmp;

        zero_func = TRUE;
        for (i = ln ; i >= 0 && zero_func ; --i)
        {
                if (c[i] != 0.0 || d[i] != 0.0)
                        zero_func = FALSE;
        }

        if ( zero_func )
                return 1;

        work_dim1 = ln + 1;

        l = i + 1;
        for (j = 0 ; j <= l ; ++j)
                work[j * work_dim1] = 1.0;

        tmp = 1.0;
        for (i = 1 ; i <= l ; ++i)
        {
                tmp = tmp * (float) (l - i + 1) / (float) i;
                work[i] = tmp;
        }

        for (i = 1 ; i <= l ; ++i)
        {
                for (j = 1 ; j <= l ; ++j)
                {
                        work[i + j * work_dim1] = work[i + (j - 1) * work_dim1]
                                                  - work[i - 1 + j * work_dim1]
                                                  - work[i - 1 + (j - 1) * work_dim1];
                }
        }

        for (i = l ; i >= 0 ; --i)
        {
                b[i] = 0.0;
                atmp = 0.0;

                for (j = 0 ; j <= l ; ++j)
                {
                        b[i] += work[i + j * work_dim1] * d[j];
                        atmp += (double) work[i + j * work_dim1] * c[j];
                }

                scale = (double) atmp;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                if (i != 0)
                        a[i - 1] = (double) atmp;
        }

        if (scale == 0.0)
                return 2;

        b[0] /= scale;
        for (i = 1 ; i <= l ; ++i)
        {
                b[i] /= scale;
                a[i - 1] /= scale;
        }

        /*  pad the remainder of the array with zeros  */
        if (l < ln)
        {
                for (i = l + 1 ; i <= ln ; ++i)
                {
                        b[i] = 0.0;
                        a[i - 1] = 0.0;
                }
        }

         return 0;

} /* spbiln */

/**************************************************************
 * SPBFCT - Computes factorial    11/14/85
 * GENERATES (I1)!/(I1-I2)!=I1*(I1-1)*...*(I1-I2+1).
 * NOTE: 0!=1 AND SPBFCT(I,I)=SPBFCT(I,I-1)=I!.
 **************************************************************/
double
spbfct(int i1, int i2)
{
        /* Local variables */
        int i;
        double ret_val;

        ret_val = 0.0;
        if ( i1 < 0 ||
             i2 < 0 ||
             i2 > i1)
            return(ret_val);

        ret_val = 1.0;
        for (i = i1 ; i >= (i1 - i2 + 1) ; --i)
                ret_val *= (double) i;

        return(ret_val);

} /* spbfct */
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE****************************************************************
        FILE                : pascii.c
        DESC                : The PASCII table
        TABS                : 4
        OWNER               : Brent Hale
        DATE CREATED:

                                            Copyright Synergetics 1993, 1994

                                            Warning Confidential Material
                                            Property of Synergetics
                                            Copyright 1993, 1994 All Rights Reserved

        SYNOPSIS:
*END_HEADER*****************************************************************/

char pascii[127][5] = {
        {"\\ \\"},          {"\\ee\\"},                 {""},
{"\\i\\"},          {""},                       /*  0 - 4   */

        {"\\aa\\"},         {""},                                   {"\\e\\"},
{""},                       {"\\ae\\"},         /*  5 - 9   */

        {""},                       {""},                   {""},           {""},
        {"\\a\\"},          /*  10 - 14  */

        {""},                       {""},                   {"\\oo\\"},     {""},
                {"\\u\\"},          /*  15 - 19  */

        {""},                       {"\\o\\"},              {"\\u\\"},
{"\\aw\\"},         {"\\ah\\"},         /*  20 - 24  */

        {""},                       {"\\i\\"},              {"\\ow\\"},
{"\\oy\\"},         {"\\er\\"},         /*  25 - 29  */

        {""},               {"\\m\\"},              {""},           {"\\n\\"},
        {""},       /*  30 - 34  */

        {""},               {"\\ng\\"},     {""},           {""},           {"\\p\\'},
        /*  35 - 39  */

        {"\\b\\"},          {"\\t\\"},              {"\\d\\"},      {""},
        {""},       /*  40 - 44  */

        {""},               {"\\k\\"},              {"\\c\\"},      {"\\g\\"},
                {""},       /*  45 - 49  */

        {""},               {""},                   {""},                   {""},
                {""},       /*  50 - 54  */

        {""},               {"\\\\"},               {"\\f\\"},      {"\\v\\"},
        {"\\th\\"},         /*  55 - 59  */

        {"\\t-\\"},         {"\\s\\"},              {"\\z\\"},      {""},
        {""},       /*  60 - 64  */

        {"\\sh\\"},         {"\\si\\"},     {""},           {""},           {""},
        /*  65 - 69  */

        {""},               {""},                   {""},
{"\\wh\\"},         {""},       /*  70 - 74  */

        {""},               {"\\h\\"},              {""},           {""},
        {""},       /*  75 - 79  */

        {""},               {""},                   {"\\y\\"},      {""},
        {""},       /*  80 - 84  */

        {"\\w\\"},          {""},                   {""},           {""},
        {""},       /*  85 - 89  */
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        {"\\ll\\"},     {""},               {""},       {""},
        {"\\r\\"},      /*  90 - 94  */

        {""},           {""},               {""},       {""},
        {""},    /*  95 - 99  */

        {""},           {""},               {""},       {""},
        {""},    /* 100 - 104 */

        {""},           {""},               {""},       {""},
        {""},    /* 105 - 109 */

        {""},           {""},               {""},       {""},
        {""},    /* 110 - 114 */

        {"\\j\\"},      {"\\ch\\"},     {""},       {""},       {""},
        /* 115 - 119 */

        {""},           {""},               {""},       {""},
        {""},           /* 120 - 124 */

        {""},           {"\\_\\"}
                                                            /* 125 -
127 */
};
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/***********************************************
 *                  -- cloption.c --
 *  Copywrite Synergetics 1993, 1994
 *  Written by R. Brian Moncur
 *
 * Warning Confidential Material
 * Property of Synergetics
 * Copyright 1993, 1994 All Rights Reserved
 ***********************************************/
#include "dsp.h"
#include  "cloption.h"

void
InitCommandlineOptions(struct COMMANDLINE *clo)
{
        int i;

        clo->inputpath = NULL;                          /*  -i    */
        clo->debug = FALSE;                                      /*  -d    */
        clo->sound = TRUE;              /*  -so          */
        clo->spectogram = FALSE;                        /*        -sg */
        clo->outputwaves = FALSE;       /*  -ow */
        clo->outputtext = FALSE;        /*  -ot */
        clo->framesize = FALSE;                                  /*  -fz */
        clo->frameloc = FALSE;                                   /*  -fl */
        clo->testmode = FALSE;          /*  -t */
        clo->dumpmaglyn = FALSE;        /*  -m */
        clo->dumpframe = FALSE;         /*  -f */
        clo->dumpwindow = FALSE;        /*  -w */
        clo->outputpath = NULL;         /*  -o */
        clo->reject_bad_samples = FALSE;       /*  -bs */
        clo->aql = FALSE;                                                 /*  -a */
        clo->stdFormant = FALSE;                        /*  -sf */

        clo->snflag = ALL;              /*  -sn */
        memset(clo->soundnumbers, 0, 50);

        clo->pnflag = ALL;              /*  -pn */
        memset(clo->personnumbers, 0, 100);

        clo->rulerflag = NONE;           /*  -r */

        for ( i = 0; i < NUMBER_OF_RULERS; i++ )
                clo->rulers[i] = i +1;

}

/*FUNCTION_HEADER*********************
NAME:   GetCLONumbers
DESC:   Read in a series of numbers from the command line and save them
IN:             *i - current argument in argv to begin at.
                argc - Total number of argv's
                argv - command line aruments
                *numbers - array to store the numbers in.
                maxNumbers - maximum number of numbers *numbers can hold.
OUT:    *numbers with the command line numbers in it.
RETURN: None
NOTES:  This picks off numbers from the command line for the following options:
                        [-pn # # # ...]                          person numbers
                        [-sn # # # ...]                          sound numbers
                        [-r # # # ...]                           ruler numbers
*END_HEADER**************************/
static void GetCLONumbers( int *i, int argc, char **argv, int *numbers, int maxNumbers)
{
        int      j;

        j=0;
        while ( j < maxNumbers &&
                        *i < argc &&
                        (numbers[j] = atoi(argv[*i])) != NULL ) {
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                j++;                                    /* Do it here rather than in
the */
                (*i)++;                                 /*  loop so we don't inc too
far */
        }

        (*i)--;                                         /* The 'for' loop around this
will inc it again. */
                                                                /* so *i should
point to the last argument handled */
/*  Why was this there??? */
/*      if ( i < argc ) */
/*              i -=2;      Went too far  */
}

void
GetCommandlineOptions(struct COMMANDLINE *clo, int argc, char **argv)
{
        int i;

        for ( i=1; i < argc; i++ )
        {
                if ( strstr(argv[i], "-i") )  /*  Get input path  */
                {
                        clo->inputpath = (char *)malloc( strlen(argv[i+1])+1 );
                        strcpy(clo->inputpath, argv[i+1]);
                        i++;  /*  advance past input path string  */
                }
                else if ( strstr(argv[i], "-d") )       /*  turn debug mode on  */
                        clo->debug = TRUE;

                else if ( strstr(argv[i], "-a") )       /*  turn AQL printing on  */
                        clo->aql = TRUE;

                else if ( strstr(argv[i], "-so") )      /*  turn sound mode off  */
                        clo->sound = FALSE;

                else if ( strstr(argv[i], "-sg") )      /*  turn spectogram mode on  */
                        clo->spectogram = TRUE;

                else if ( strstr(argv[i], "-ow") )      /*  Output wave files  */
                        clo->outputwaves = TRUE;

                else if ( strstr(argv[i], "-ot") )      /*  Output wave text info  */
                        clo->outputtext = TRUE;

                else if ( strstr(argv[i], "-o") )       /*  Get output path  */
                {
                        clo->outputpath = (char *)malloc( strlen(argv[i+1])+1 );
                        strcpy(clo->outputpath, argv[i+1]);
                        i++;  /*  advance past input path string  */
                }

                else if (strstr(argv[i], "-wav") ) /* Output wave file info for each microbe */
                        clo->wavout = TRUE;

                else if(strstr(argv[i], "-hig") ) /* OUtput higgins structures to disk */
                        clo->higgout = TRUE;

                else if ( strstr(argv[i], "-bs") )      /*  Turn on Bad Sample Rejection */
                        clo->reject_bad_samples = TRUE;

                else if ( strstr(argv[i], "-sf") )      /*  Turn on output of standardized
formants  */
                        clo->stdFormant = TRUE;

                else if ( strstr(argv[i], "-pn") )      /*  Get list of person numbers to use
*/
                {
                        clo->pnflag = SOME;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

Docket No.: 13217.2

```
                        i++;                                        /* Start
looking at the first # */
                        /* Get all the sound numbers on the command line */
                        GetCLONumbers( &i, argc, argv, clo->personnumbers, MAX_PERSONS);
                }

                else if ( strstr(argv[i], "-fl") )      /*  Get Frame location  */
                {
                        i++;
                        if ( !(clo->frameloc = atoi(argv[i])) )
                        {
                                fprintf(stderr, "Invalid value for frame location\n");
                                exit(0);
                        }

                }

                else if ( strstr(argv[i], "-fz") )      /*  Get Frame size  */
                {
                        i++;
                        if ( !(clo->framesize = atoi(argv[i])) )
                        {
                                fprintf(stderr, "Invalid value for frame size\n");
                                exit(0);
                        }

                }

                else if ( strstr(argv[i], "-t") )       /*  Turn test mode on  */
                        clo->testmode = TRUE;

                else if ( strstr(argv[i], "-m") )       /*  Dump Maglyn data  */
                {
                        clo->dumpmaglyn = TRUE;
                        clo->testmode = TRUE;
                }
                else if ( strstr(argv[i], "-f") )       /*  Dump ruler data for frames  */
                {
                        clo->dumpframe = TRUE;
                        clo->testmode = TRUE;
                }
                else if ( strstr(argv[i], "-w") )       /*  Dump ruler data for windows */
                {
                        clo->dumpwindow = TRUE;
                        clo->testmode = TRUE;
                }
                else if ( strstr(argv[i], "-sn") )      /*  Get list of sound numbers to use  */
                {
                        clo->snflag = SOME;

                        i++;                                        /* Start
looking at the first # */
                        /* Get all the sound numbers on the command line */
                        GetCLONumbers( &i, argc, argv, clo->soundnumbers, MAX_SOUNDS );
                }

                else if ( strstr(argv[i], "-r") )       /*  Get list of rulers to output  */
                {
                        clo->rulerflag = SOME;
                        clo->testmode = TRUE;

                        /*  Clear array  */
                        memset( clo->rulers, 0, NUMBER_OF_RULERS * sizeof(int));

                        i++;                                        /* Start
looking at the first # */
                        /* Get all the sound numbers on the command line */
                        GetCLONumbers( &i, argc, argv, clo->rulers, NUMBER_OF_RULERS);
                }

                else
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                {
                        fprintf(stderr, "Invalid command line option %s\n", argv[i]);
                }
        }
    }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*H_HEADER_FILE*****************************************************************
FILE                          : gender.h
DESC                          : Prototype for gender.c
TABS                          : 3
OWNER                         : Brent Hale
DATE CREATED: 4 Oct 1994

Copyright Synergetics 1993, 1994

Warning Confidential Material
Property of Synergetics
Copyright 1993, 1994 All Rights Reserved

SYNOPSIS            :
*END_HEADER*******************************************************************/
#ifndef   GENDER_H
#define   GENDER_H

struct person {
          int age;
          char sex;
};

extern struct person subject[ 263 ];

#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*H_HEADER_FILE*****************************************************************
        FILE            : evaltd.h
        DESC            : prototypes for evaltd.c
        TABS            : 4
        OWNER           : Brant Hale
        DATE CREATED: 5 Oct 1994

                                        Copyright Synergetics 1993, 1994

                                        Warning Confidential Material
                                        Property of Synergetics
                                        Copyright 1993, 1994 All Rights Reserved

        SYNOPSIS:

*END_HEADER*********************************************************************/

#ifndef  EVALTD_H
#define  EVALTD_H

#include  "dsphig.h"


int InitTimeDomain( void );
void CleanUpTimeDomain( void );

#ifdef   HARDWARE
void EvalTimeDomain(int *data, DSP_HIGGINS *pHiggins, int *pMaxAmpl);
#else
void EvalTimeDomain(int *data, int n, DSP_HIGGINS *pHiggins, int *pMaxAmpl);
#endif

#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*H_HEADER_FILE*************************************************************
FILE                    : dsphig.h
DESC                    : definitions for the HIGGINS structure while on the DSP
TABS                    : 3
OWNER                   : Brent Hale
DATE CREATED: 4 Oct 1994

Copyright Synergetics 1993, 1994

Warning Confidential Material
Property of Synergetics
Copyright 1993, 1994 All Rights Reserved

SYNOPSIS        :
*END_HEADER****************************************************************/
#ifndef   DSPHIG_H
#define   DSPHIG_H

#include  "higlist._h"

typedef struct dsp_higgins {
         /* The SHARED_HIGGINS macro which defines the identical section for both
                  the dsp's and 68030's HIGGINS structure is defined in higlist._h. */
         SHARED_HIGGINS                          /* Macro for type, Ls, Fo, FoAmpl,
ffreq, and ampl */

         struct dsp_higgins  *next;
         struct dsp_higgins  *prev;
} DSP_HIGGINS;


int CreateDSPHigginsList( int numOfNodes, DSP_HIGGINS **hdrNode );
void FreeDSPHigginsList( DSP_HIGGINS *hdrNode );
void ClearDSPHigginsList( DSP_HIGGINS *hdrNode );

#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*H_HEADER_FILE*****************************************************************
        FILE            : dspeng.h
        DESC            : Prototypes for the DSP functions
        TABS            : 3
        OWNER           : Brent Hale
        DATE CREATED: 27 Oct 1994

                                        Copyright Synergetics 1993, 1994

                                        Warning Confidential Material
                                        Property of Synergetics
                                        Copyright 1993, 1994 All Rights Reserved

        SYNOPSIS:

*END_HEADER*********************************************************************/

#ifndef  DSPENG_H
#define  DSPENG_H

#include  "dsphig.h"

/* from dspinit.c */
extern int                              *pRawData;
extern float                    *pFilteredData;
extern DSP_HIGGINS  *pDSPHList;
extern int                              dspMaxAmpl;

/* defined in dspinit.c */
int dspInitialize( float *pOutputBuffer );
void dspCleanUp( void );

/* defined in dspeng.c */
#ifdef   HARDWARE
int dspProcessBuffer( int *pInput );
#else
int dspProcessBuffer( int *pInput, int numpts );
#endif

#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

Docket No.: 13217.2

```
/***********************************************
 *                    -- bach.h --
 *  Copywrite Synergetics 1993, 1994
 *
 * Warning Confidential Material
 * Property of Synergetics
 * Copyright 1993, 1994 All Rights Reserved
 ***********************************************/
#ifndef BACH_H
#define BACH_H

#include <stdio.h>
#include <stdlib.h>
#include <conio.h>
#include <string.h>
#include <mem.h>
#include "filter.h"
#include "errors.h"
#include "measuref.h"
#include "dsp.h"
#include "filtcoef.h"
#include "dsphig.h"                              /* for NFILTERS */


#define   FREQ_NOT_FOUND              0
#define   SIMPLE                            1
#define   COMPLEX                           2

#define   OverlapDataSize     (2048)
#define   FILTERLENGTH                256
#define   MAXLOCATIONS                45

/* On the hardware we will always be working with 10240.  If we can compile
         with a constant in our loops, the compiler can optimize the loop slightly
         for a bit better performance.  4.11.9 pg 4-18. */
#ifdef    HARDWARE
#define   DATASIZE  10240
#else
#define   DATASIZE  n
#endif


extern int bachFilters[NFILTERS+1];                       /* defined in bach.c */


/*  Prototypes  */
#ifdef    HARDWARE
void Decompose( void );
#else
void Decompose( int n );
#endif

#ifdef    HARDWARE
int DoFilterPass(int fl, int fh, int filterCenter );
#else
int DoFilterPass(int fl, int fh, int filterCenter, int n );
#endif

int FindFo(int fl, int fh, int filter, int n);

/* from getfo.c */
void GetFundamental( DSP_HIGGINS *frmstart, int *Fo, int *FoAmpl );
void FoHistogram( DSP_HIGGINS *frmstart, int *Fo, int *FoAmpl );

/* from bachinit.c */
int InitializeBach( int **ppRawData, float **ppFilteredData );
void CleanUpBach( int *pRawData, float *pFilteredData  );

/* from overlap.c */
void      SaveOverlapData( int *pData );
int LoadInput( int *InData, int begOffset, int n, float *OutData, int PointsToSkip );
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/* From evalfilt.c */
void EvaluateFilter(int n, COEFF *pCoeff, int fl, int fh, int filternumber);

#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*********************************************************
 * dsp.h
 * Written by R. Brian Moncur
 *
 * Mike Newson 04/11/94
 *        Added Higgins Struct
 *    Added Ruler Defines
 ********************************************************/

#ifndef  DSP_H
#define DSP_H

#include  <stdio.h>
#include  <stdlib.h>
#include  <mem.h>
#include  <math.h>
#include  <string.h>
#include  <dir.h>
#include  <process.h>
#include  <conio.h>
#include  <ctype.h>

#include  "srengine.h"                /* for now. */

#ifdef MEM_DEBUG
#include  "smrtheap.h"
#include  "shmalloc.h"
#endif

#define ulong unsigned long
#define uint unsigned int
#define unchar unsigned char
#define unint unsigned int
#define unlong unsigned long

#define TRUE 1
#define FALSE 0

#define PI 3.14159265358979323846

#define MAX 1024
#define SEGSIZE 1024                    /*  Size of a data segment            */
#define RAWDATASIZE 10240     /* Amount of raw data processed at a time */
#define QLEVEL  250                     /*  Anything below this is quiet      */
#define SLPPTS  15            /*  Number of points to use to calc slope  */
#define   SAMPLESIZE          256/* Number of sample to look at at a time. */

#define NFFT 512   /*  # of fracture points for FFT       */
#define SAMPLERATE  44100L    /* New Sample rate of data input not using half data */
#define SUM 2

#define QUIET         -1
#define VOICED      1
#define UNVOICED    0
#define VOICED_CUTOFF 6000
#define UNVOICED_CUTOFF 14500

/* auditory.h */
#define NUM_AUDITORY 16

/* General Magnitude Rulers */
#define FRAMED_FRACTURED                        0
#define WEIGHTED_MEAN                                     1
#define MEDIAN_FREQUENCY                        2
#define HARMONIC_PATTERN              3
#define AVERAGE_SLOPE                                     4
#define FUNDIMENTAL_FREQ                        5
#define NORMAL_WEIGHTED_MEAN          6
#define GRID_1D_MAPPING                                   7

/* Time Domain Rulers  */
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
#define WAVE_WIDTH                                   10              /* # samples in
period */
#define NUMBER_MAXIMUMS                              11
#define NUMBER_ZERO_CROSSINGS            12
#define BEGIN_SLOPE                                  13        /*  Slope of start of period
*/
#define MEAN_SQR_ERROR                               14              /*  MSE of Time
Domain Data  */
#define NORMAL_ZERO_CROSSINGS            15
#define PEAK_RATE                                              16
#define DURATION                                               17

/*  Formant Rulers  */
#define NUMBER_FORMANTS                              20
#define FORMANT_WEIGHTED_MEAN            21
#define OUTPUT_FORMANT_LOC                     22    /* Outputs Fo - F7 */

/*  Window Rulers (could also be used for framed data) */
#define SLOPE_BY_DECADE                              30
#define ENERGY_LOCATION                              31
#define MAX_ENERGY_LOCATION              32
#define NORMAL_INTEGRAL                              33
#define ENERGY_BY_DECADE                       34              /*  Normalized energy for a
freq range  */
#define AUDITORY_ENERGY                              35
#define HARMONIC_EXISTENCE                     36
#define HARMONIC_SLOPE                               37
#define HARMONIC_POWER                               38
#define HARMONIC_WEIGHTED_MEAN           39
#define DC_OFFSET                                              40

#define NUMBER_OF_RULERS                       45


/* Node values */
#define UNKNOWN       -1

typedef short BOOLEAN;

#define ALL 1
#define NONE 0
#define SOME -1
#define VALID_SOUNDS 50
#define UNKNOWN_PATH 128
#define MAXBUFFER 128        /* used in  patanal2.c */

#define MAX_SOUNDS 200
#define MAX_PERSONS 100
#define MAX_KNOWN 17
#define MAX_UNVOICED_PATTERNS 16
#define MAX_RULERS 25

/* The regression equations constants for Formants 1,2,3 are:
         (MX + B) M = Slope, X = LOGe(Fundemental Frequency), B = Y Intercept
          S = Standard Error, N = Number of samples in standards data */

typedef struct
{
         int Pascii;
         float B[3], M[3];
} FORMULA;

typedef struct
{
         int Pascii;
         float MD[MAX_UNVOICED_PATTERNS];
} PATTERNS;

struct COMMANDLINE {
         char *inputpath,
                    *outputpath;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        int debug,
                wavout,
                higgout,
                sound,
                outputwaves,
                outputtext,
                testmode,
                dumpmaglyn,
                dumpframe,
                dumpwindow,
                Zscore,
                stdFormant,
                snflag,
                soundnumbers[MAX_SOUNDS],
                pnflag,
                personnumbers[MAX_PERSONS],
                rulerflag,
                rulers[NUMBER_OF_RULERS],
                reject_bad_samples,
                aql,
                spectogram;
        int             vbssFlag;       /* 1 = if processing a vbss file; 0 otherwise */

        long    frameloc,
                        framesize,
                        curbuffloc;     /* This is to keep trak of where in the file we
read from */

};


typedef struct
{               /* The Pascii Id relates to the position in the array that
                                                this information is found. *
        int N;          /* The Number of values */
        float *value;   /* The Standard value */
        float *stdev; /* The Standard deveation of the standard value */

} SOUND_NODE;


#ifdef FEDERATION
extern void GiveFileToElrond (char huge *SoundFilePath);
#endif

#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/************************************************
 *                    -- measuref.h --
 * Warning Confidential Material
 * Property of Synergetics
 * Copyright 1993, 1994 All Rights Reserved
 *
 *  Written by R. Brian Moncur
 ************************************************/
#ifndef MEASUREF_H
#define MEASUREF_H

#include <stdio.h>
#include <stdlib.h>

/*  Prototypes  */
int MeasureFreq(float *pSlopeData, int decimated256, int decFilterLen,
                                                                    int fl, int fh, long
SampleRate, int *pFreq);

#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*H_HEADER_FILE**************************************************************
        FILE            : filtcoef.h
        DESC            : PreCalculated Filter coefficients
        TABS            : 3
        OWNER           : Brent Hale
        DATE CREATED: 25 Oct 1994

                                        Copyright Synergetics 1993, 1994

                                        Warning Confidential Material
                                        Property of Synergetics
                                        Copyright 1993, 1994 All Rights Reserved

        SYNOPSIS:

*END_HEADER*****************************************************************/

#ifndef  FILTCOEF_H
#define  FILTCOEF_H

#define  A_LEN           8
#define  B_LEN           10


typedef struct coeff {
        int                             filterCenter;
        unsigned int       effectiveSampleRate;
        int             pointsToSkip;
        float           a[A_LEN];
        float           b[B_LEN];
        float           lastOutput[A_LEN];
        float         lastInput[B_LEN];
} COEFF;


#define  NUMOFCOEF        24
extern COEFF      coeffTable[NUMOFCOEF];

int GetPtr2Coeff( int fc );

#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/************************************************
 *                    -- spgain.h --
 *  Copywrite Synergetics 1993, 1994
 *
 * Warning Confidential Material
 * Property of Synergetics
 * Copyright 1993, 1994 All Rights Reserved
 ************************************************/
#ifndef SPGAIN_H
#define SPGAIN_H


void OutputSPGain(float *b, float *a, int ns, int ln,
          float fln, float fhn, long SampleRate);
COMPLEX spgain(float *b, float *a, int lb, int la, float freq);

#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*************************************************
 *                    -- gencoeff.h --
 *  Copywrite Synergetics 1993, 1994
 *
 * Warning Confidential Material
 * Property of Synergetics
 * Copyright 1993, 1994 All Rights Reserved
 *************************************************/
#ifndef GENCOEFF_H
#define GENCOEFF_H

#include <stdio.h>
#include <stdlib.h>
#include <math.h>
#include "cmplx.h"
#include "errors.h"

#define PI    3.14159265358979323846
#define SAMPLERATE 44100L
#define BAND_PASS_SECTION_ORDER 4

#define FALSE        0
#define TRUE         1
#define BIG          1e10
#define SMALL        1e-10
#define ORDER5       1e-5
#define ORDER4       1e-4

#define LOWPASS  1
#define HIGHPASS 2
#define BANDPASS 3
#define STOPBAND 4

/*  Prototypes  */
int GenerateCoefficients(int iband, float fl, float fh, int ln, int ns, float *b, float *a, long
SampleRate);
int spiird(int iband, int ns, int ls, float fln, float fhn, float *b, float *a);
int spfblt( float *d, float *c, int ln, int iband, float fln, float fhn,
                     float *b, float *a, float *work);
int spbwcf(int l, int k, int ln, float *d, float *c);
int spbiln(float *d, float *c, int ln, float *b, float *a, float *work );
double spbfct(int i1, int i2);

#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*H_HEADER_FILE*****************************************************************
        FILE            : wavio.c
        DESC            : prototypes for wavio.c
        TABS            : 3
        OWNER           : Brent Hale
        DATE CREATED:

                                    Copyright Synergetics 1993, 1994

                                    Warning Confidential Material
                                    Property of Synergetics
                                    Copyright 1993, 1994 All Rights Reserved

        SYNOPSIS:

*END_HEADER*******************************************************************/

#ifndef  WAVIO_H
#define  WAVIO_H

void read_header(FILE *fptr);
int read_wav(FILE *fptr, int *pBuffer);
int GetVBSSInfo(void);
void PrintFrmnts( struct HIGGINS *frmstart );
long GetFileLocation( int loc );

#ifdef   CRT
FILE *SetupOutputFile( char *pFilename );
#endif
int file_exists(char *filename);

#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/************************************************
 *                 -- filter.h --
 *  Copywrite Synergetics 1993, 1994
 *
 * Warning Confidential Material
 * Property of Synergetics
 * Copyright 1993, 1994 All Rights Reserved
 ************************************************/
#ifndef FILTER_H
#define FILTER_H

#include <stdio.h>
#include <stdlib.h>
#include <math.h>
#include "cmplx.h"
#include "errors.h"

#define PI    3.14159265358979323846
#define SAMPLERATE 44100L
#define BAND_PASS_SECTION_ORDER 4

#define FALSE       0
#define TRUE        1
#define BIG         1e10
#define SMALL       1e-10
#define ORDER5      1e-5
#define ORDER4      1e-4

#define LOWPASS  1
#define HIGHPASS 2
#define BANDPASS 3
#define STOPBAND 4

/*#define ABS(x)  ((x) >= 0 ? (x) : -(x)) */
/*#define MIN(a,b)  ((a) <= (b) ? (a) : (b)) */
/*#define MAX(a,b)  ((a) >= (b) ? (a) : (b)) */

/*  Prototypes  */
int spcflt(         float *b, float *a, int ls, int ns, float *x, int n,
                    float *px, float *py);
int GenerateCoefficients(int iband, float fl, float fh, int ln, int ns, float *b, float *a);
int spiird(int iband, int ns, int ls, float fln, float fhn, float *b, float *a);
int spfblt( float *d, float *c, int ln, int iband, float fln, float fhn,
                    float *b, float *a, float *work);
int spbwcf(int l, int k, int ln, float *d, float *c);
int spbiln(float *d, float *c, int ln, float *b, float *a, float *work );
double spbfct(int i1, int i2);

#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*H_HEADER_FILE***************************************************************
         FILE              : pascii.h
         DESC              : extern for pascii table
         TABS              : 3
         OWNER             : Brent Hale
         DATE CREATED: 22 Oct 1994

                                             Copyright Synergetics 1993, 1994

                                             Warning Confidential Material
                                             Property of Synergetics
                                             Copyright 1993, 1994 All Rights Reserved

         SYNOPSIS:

*END_HEADER******************************************************************/

#ifndef   PASCII_H
#define   PASCII_H

extern char pascii[127][5];

#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*H_HEADER_FILE*****************************************************************
        FILE            : cloption.h
        DESC            : prototypes for cloption.c
        TABS            : 3
        OWNER           : Brent Hale
        DATE CREATED:   22 Oct 1994

                                        Copyright Synergetics 1993, 1994

                                        Warning Confidential Material
                                        Property of Synergetics
                                        Copyright 1993, 1994 All Rights Reserved

        SYNOPSIS:

*END_HEADER*****************************************************************/

#ifndef   CLOPTION_H
#define   CLOPTION_H

void InitCommandlineOptions(struct COMMANDLINE *clo);
void GetCommandlineOptions(struct COMMANDLINE *clo, int argc, char **argv);


#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/************************************************************
 * auditory.h
 *
 * Warning Confidential Material
 * Property of Synergetics
 * Copyright 1993, 1994 All Rights Reserved
 *
 ************************************************************/
#include "dsp.h"


/*  The numbers below represent the frequency ranges for blocks
 *  of 1000 ear cholea hairs  */
double AuditoryRange[NUM_AUDITORY] =
{
        0, 151, 214, 304, 431, 612, 868, 1233,
        1751, 2486, 3530, 5014, 7121, 10113, 14364, 20392
};
```

A:\132172.PAT

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

Compilation of Source Codes for 13217.2

```
;       After setting up the hardware this routine will call the user
;       function main().
;********************************************************************
          XDEF    START,__brkp,__brksz,__exit,_fputc
          XREF    STKTOP,DATA,_main

          INCLUDE voicebox.inc

;********************************************************************
;       If C++ style startup code is not desired, then
;       define CPLUSPLUS to 0
;********************************************************************
CPLUSPLUS       = 0

;********************************************************************
;       Define variables to track memory allocations for mbrk().
;********************************************************************
          SECTION ram
__brkp  DS.L    1                       ; point to available memory
__brksz DS.L    1                       ; number of available bytes

;********************************************************************
;         Constant data
;********************************************************************
;
;         DC.B      'Copyright 1994 Synergetics, Inc'
;         DC.B      ' All rights reserved.'
;         DC.B      0

;************************************************************
;       The reset vector will point to this code (START).
;       By the time we get here, A7 will have been initialized.
;************************************************************
          SECTION code
          .STK    "none"                  ; terminate call chain for -OG
START   MOVE.L  #STKTOP,A7              ; set the stack pointer
          MOVE.L  #0,A6                   ; terminate call chain for -Og

;Go ahead and enable instruction caching, but leave data cache off until
;we test memory.

          move.l  #InsBurstEnable+ClearInsCache+EnableInsCache,d0
          movec   d0,CACR

          ;The first thing we need to do is start the refresh. Then we can
          ;determine memory size and do the memory test.

          move.l  #MFPBase,a0
;         move.b  #StartTimer,MFPTCDCR(a0)
;         move.b  #RefreshTime,MFPTDDR(a0)

          ;Refresh should be running, output something to the debug
          ;port.

          move.l  #1,d7                   ;store diag code in d7
          move.l  #DiagPort,a2            ;Point a2 at diag port
          move.b  d7,(a2)                 ;Output it!

          ;Go ahead and setup the rest of the MFP while we give the RAM
          ;a chance to get through a full refresh cycle.

          move.b  #DisableIRQBits,d0      ;Disable ints.
          move.b  d0,MFPIERA(a0)          ;Int. register A
          move.b  d0,MFPIERB(a0)          ;Int. register B
          move.b  d0,MFPIMRA(a0)          ;Mask register A
          move.b  d0,MFPIMRB(a0)          ;Mask register B
          move.b  #DDRBits,MFPDDR(a0)     ;data direction register
          move.b  #AERBits,MFPAER(a0)     ;Active edge register
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        move.b  #VectorBase,MFPVR(a0)   ;Interupt vector reg.

        ;Interrupts are disabled and masked, and the corresponding
        ;levels set. Now test the UART by sending ourselves a few
        ;chars. in loopback mode.

        move.b  #Serial300,MFPTCDR(a0)  ;Start at 300 bps
        move.b  #ClockModeBit+AsyncBits,MFPUCR(a0)
        move.b  #RcvEnableBit,MFPRSR(a0)
        move.b  #XmtGoHiBits+XmtEnableBit,MFPTSR(a0)

        ;Clean up any garbage that might be in receiver port
;       move.b    MFPUDR(a0),d1

;     Serial port set up, output to diag port
        addq.b  #1,d7
        move.b  d7,(a2)

;     Output a char.

;       move.b  #$55,MFPUDR(a0)

        ;**********************************************************
        ;               Initialize other RAM from ROM.
        ;**********************************************************
;       MOVE.L  #DATA,A0                ; A0 = ROM base of region data
;       MOVE.L  #^BASE(data),A1         ; A1 = RAM base of region data
;       MOVE.L  #^SIZE(data),D0         ; D0 = size of region data
;       LSR.L   #2,D0                   ; compute size in longs
;       BRA     IDBF                    ; enter a fast loop
; ILP:  MOVE.L  (A0)+,(A1)+             ; move four bytes at a time
; IDBF: DBF     D0,ILP                  ; up to 256K in inner loop
;       SUB.L   #$10000,D0              ; rest in outer loop
;       BHS     ILP
;

DiagDone:
;Hardware seems to be OK, let's go ahead and get to work!

        ;**********************************************************
        ;               Initialize memory allocator.
        ;**********************************************************
        MOVE.L  #^BASE(malloc),D0       ; address of malloc region
        MOVE.L  #^SIZE(malloc),D1       ; size of malloc region
    .IF "ptrd"?"2"
        SWAP    D0                      ; handle 2-byte C "pointers"
    .ENDIF
    .IF "long"?"2"
        SWAP    D1                      ; handle 2-byte C "longs"
    .ENDIF
        MOVE.L  D0,__brkp               ; vars referenced by mbrk()
        MOVE.L  D1,__brksz

 .IF CPLUSPLUS
        ;**********************************************************
        ;               Call any C++ initializer thunks.
        ;**********************************************************
        MOVE.L  #^BASE(init),A5         ; A5 = base of region init
        MOVE.L  #^SIZE(init),D7         ; D7 = size of region init
    .IF "ptrf"?"2"
        LSR.L   #1,D7                   ; number of initializer thunks
    .ELSE
        LSR.L   #2,D7                   ; number of initializer thunks
    .ENDIF
        BRA     NDBF                    ; enter loop
  NLP:
    .IF "ptrf"?"2"
        MOVE.W  (A5)+,A0                ; get address of thunk
    .ELSE
        MOVE.L  (A5)+,A0                ; get address of thunk
    .ENDIF
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        CMP.W   #0x4E71,A0              ; NOP may pad region
        BEQ     NDBF
        JSR     (A0)                    ; call initializer thunk
 NDBF: DBF     D7,NLP                  ; up to 256K in inner loop
        SUB.L   #$10000,D7              ; rest in outer loop
        BHS     NLP
 .ENDIF
        ;************************************************************
        ;               Invoke main() with no arguments.
        ;************************************************************
        JSR     _main                   ; "int" return value in D0

        ;************************************************************
        ;               Call any C++ exit thunks.
        ;************************************************************
__exit
 .IF CPLUSPLUS
        MOVE.L  #`BASE(exit),A5         ; A5 = base of region exit
        MOVE.L  #`SIZE(exit),D7         ; D7 = size of region exit
        ADD.L   D7,A5                   ; reverse order
   .IF "ptrf"?"2"
        LSR.L   #1,D7                   ; number of exit thunks
   .ELSE
        LSR.L   #2,D7                   ; number of exit thunks
   .ENDIF
        BRA     XDBF                    ; enter loop
 XLP:
   .IF "ptrf"?"2"
        MOVE.W  -(A5),A0                ; get address of thunk
   .ELSE
        MOVE.L  -(A5),A0                ; get address of thunk
   .ENDIF
        CMP.W   #0x4E71,A0              ; NOP may pad region
        BEQ     XDBF
        JSR     (A0)                    ; call exit thunk
 XDBF: DBF     D7,XLP                  ; up to 256K in inner loop
        SUB.L   #$10000,D7              ; rest in outer loop
        BHS     XLP
 .ENDIF

Done:
        move.l   #DiagPort,a2
        clr.b    d0
DoneLoop:
        move.b   d0,(a2)
        addq.b   #1,d0
        bra.s    DoneLoop

DiagDeath:
;Where we come if the hardware fails...
;We don't know if we can trust memory or not, but go ahead and write
;the diag code in a 'scope loop so we can see it.


        move.b  d7,(a2)
;       stop    #$FFFF
        bra.s    DiagDeath

;*******************************************************************
;
;fputc - C callable function to output to the serial port
;
;int fputc( int chr, FILE *device );
;
;This function should really be implemented as a trap so it can be
;exported to non-Synergetics apps...

        .FDEF    _fputc,6             ;we will remove 6 bytes
_fputc:
        move.w   4(sp),d0             ;get the "char" parameter
        move.l   a0,-(sp)             ;push a0
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
;         move.l    d1,-(sp)            ;push d1
          move.l    #MFPBase,a0                   ;use a0 as pointer to 68901 MFP
;         clr.w     d1                            ;retry 64K times
;fpXmitReadyLoop:
;         btst      #7,MFPTSR(a0)                 ;get transmitter status
;         bne.s     fpOutChar
;         dbf       d1,fpXmitReadyLoop
;fpXmtBusyError:
;         move.w    #$ffff,d0
;         bra.s     fputcExit

fpOutChar:
          move.b    d0,MFPUDR(a0)                 ;output the data byte

fputcExit:
;         move.l    (sp)+,d1            ;restore d1
          move.l    (sp)+,a0            ;restore a0
          rtd       #6                            ;clean off 2 byte int & 4 byte pointer


;*********************************************************************
;       RESET VECTOR: to supervisor program space at address 0.
;*********************************************************************
          SECTION reset
          DC.L    STKTOP                ; initial stack pointer
          DC.L    START                 ; initial execution address

;*********************************************************************
;       OTHER EXCEPTION VECTORS: to supervisor data space at address 8,
;       or 8 bytes beyond where the vector base register will point.
;       This table is commented out because no actual interrupt rou-
;       tines are provided.
;*********************************************************************
;       SECTION vects
;       DC.L    BUSERROR,ADRERROR                       ; 0x08
;       DC.L    ILLEGAL,ZERODIV,CHK,TRAPV               ; 0x10
;       DC.L    PRIVILEGE,TRACE,EMULA,EMULF             ; 0x20
;       DC.L    RESVD,PROTO,FORMAT,UNINIT               ; 0x30
;       DCB.L   8,RESVD                                 ; 0x40
;       DC.L    SPURIOUS,AUTO1,AUTO2,AUTO3              ; 0x60
;       DC.L    AUTO4,AUTO5,AUTO6,AUTO7                 ; 0x70
;       DC.L    TRAP0,TRAP1,TRAP2,TRAP3                 ; 0x80
;       DC.L    TRAP4,TRAP5,TRAP6,TRAP7                 ; 0x90
;       DC.L    TRAP8,TRAP9,TRAPA,TRAPB                 ; 0xa0
;       DC.L    TRAPC,TRAPD,TRAPE,TRAPF                 ; 0xb0
;       DC.L    FUNORD,FNEXACT,FZERODIV,FUNFLOW         ; 0xc0
;       DC.L    FOPND,FOVFLOW,FSNAN,RESVD               ; 0xd0
;       DCB.L   8,RESVD                                 ; 0xe0
;       DC.L    GPI0,GPI1,GPI2,GPI3                     ; 0xf0
;       DC.L    TimerD,TimerC,GPI4,GPI5                 ; 0x100
;       DC.L    TimerB,XmtError,TBEmpty,RcvError        ; 0x110
;       DC.L    RcvBuffFull,TimerA,GPI6,GPI7            ; 0x120
;       DCB.L   128,USER                                ; 0x130
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*******************************************************************
        GNDFMAIN.C

        Desc:    This file contains the code to load the ELROND and TROI modules into
                              memory.  It also contains the scheduler code.


********************************************************************/

#include <stdio.h>
#include "voicebox.h"
#include "dsp.h"
#include "higlist.h"


void main( void )
{

        unsigned int *Ptr;
        unsigned int c;
        unsigned long Len;
        unsigned int Data;
        int WriteStrobe;
        unsigned char *DSPPtr = DSPBase;

        void(*Sched)(void);

        /**********************************************
         Now we go to the serial port and read the Elrond
         and Troi functions from the host

         **********************************************/


        Len = TransLen();   /* Get len of transfer */

        Ptr = malloc(Len);

        (unsigned int *)Sched = Ptr;  /* Set up our address to jump to */


        WriteStrobe = 1;
        Data = 0;

        for(x = 0; x < Len; x++)
        {
                while((c = fgetc(stdin)) == EOF);       /* Wait until byte avalable */

                Data <<= 8;
                Data += (unsigned char)c;

                WriteStrobe ^= 1;

                if(WriteStrobe)
                {
                        *Ptr++ = Data;
                        Data = 0;
                }
        }



        (*Sched)();                     /* Pass control to the scheduler */
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
rem Batch file to build Voicebox CPU firmware.
rem Copyright 1994 Synergetics, Inc. All rights reserved.

del errs
as68000 -E+errs -V 20 -L start.s -o list=start.lst
as68000 -E+errs -V 20 -L vbdspin.s -o list=vbdspin.lst

cc68000 -E+errs -f -V 20 -s int=2,sizeof=2 -I c:\sds62\lib68000\include elrond.c
linker -E+errs -f link.spc start.o elrond.o c:\sds62\lib68000\libc.a -o elrond.out
type errs
down -d mot elrond.out
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/***********************************************
 *                 -- cheat.c --
 *  Copywrite Synergetics 1993, 1994
 *  Written by Tom Jensen
 *
 * Warning Confidential Material
 * Property of Synergetics
 * Copyright 1993, 1994 All Rights Reserved
 ************************************************/

#include "dsp.h"
#include "errors.h"
#include "wavio.h"

typedef struct {
        int pn;
        int sn;
        long start;
        long len;
} NODE;
#include "cheat.h"

int PersonNumber;
static int TotalNodes;

int FindSoundBin(int Person, long Location, NODE far *WordLookup, int i)
{
        int wn = -1, sn = 0;

        if(i)
                i++;

        for(; i < TotalNodes; i++)
        {
                if(WordLookup[i].pn == Person)
                {
                        if((Location >= WordLookup[i].start) && (Location <=
(WordLookup[i].start + WordLookup[i].len)))
                        {
                                 sn = WordLookup[i].sn;

                                if(sn < 200)
                                {
                                        return(i);
                                }
                        }
                }
        }
        return(wn);
}

/************************************************
 WeBeCheatin
 Desc:   This is a temporary routine to help in the
                                testing of the Liguistics Processor.
 In:             pointer to liked list of higgins structures
 Out:            Some higgins structures possibilities may be
                                modified.
 Ret:            None.
*************************************************/
void WeBeCheatin(struct HIGGINS *frmstart)
{
        struct HIGGINS *Higgins;
        FILE *fpFile;
//static int Slopes[MAXFORMANTS];
        int i, x;
        static int FirstTime = 1;
        static long counter = 0;
        char Filename[MAXBUFFER];
        static NODE far *Word_Loc;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        long FileLen;
        float Weight;

        PersonNumber = 118;
        if(FirstTime)
        {
//              if ( file_exists("word_loc.bin") )                      /* check
default location  */
//                      strcpy(Filename, "word_loc.bin");

//              else if ( file_exists("c:\\word_loc.bin") )     /*  check root  */
//                      strcpy(Filename, "c:\\word_loc.bin");

//              else if ( file_exists("c:\\dev\\elrond\\word_loc.bin") )
                        strcpy(Filename, "c:\\dev\\elrond\\word_loc.bin");

//              else
//                      ErrorHandler( FileOpen, "" );


                if ( (fpFile = fopen(Filename,"rb")) == NULL )
                        ErrorHandler( FileOpen, "" );

                fseek(fpFile, 0L, SEEK_END);

                FileLen = ftell(fpFile);
                TotalNodes = (int)(FileLen / sizeof(NODE));

                fseek(fpFile, 0L, SEEK_SET);

                Word_Loc = malloc((int)FileLen);

                if(!Word_Loc)
                {
                        printf("Error allocating space for Word_Loc.bin\n");
                        return;
                }

                fread(Word_Loc, sizeof(char), (int)FileLen, fpFile);

                fclose(fpFile);
                FirstTime = 0;

        }

        Higgins = frmstart;


        i = 0;
        x = 0;

        while(Higgins)
        {
                do {

                        i = FindSoundBin(PersonNumber, Higgins->loc + counter, Word_Loc, i);
                        if(i >= 0)
                        {
                                Higgins->pascii[x++].p = Word_Loc[i].sn;
                        }
                }while(i >= 0);

                if(x)
                {
                        Weight = 1 / x;
                        x--;
                        for(; x >= 0; x--)
                        {
                                Higgins->pascii[x].c = Weight;
                        }
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
            }
            Higgins = Higgins->next;
        }
        counter+=10240;
    }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
// codes.c

#include "codes.h"

#define UNKWN     0

unsigned char AsciiCode[128] =
{
          UNKWN,     // 0
          'E',       // 1
          UNKWN,     // 2
          'i',       // 3
          UNKWN,     // 4
          'A',       // 5
          UNKWN,     // 6
          'e',       // 7
          UNKWN,     // 8
          0x91,      // 9
          UNKWN,     // 10
          UNKWN,     // 11
          UNKWN,     // 12
          UNKWN,     // 13
          'a',       // 14
          UNKWN,     // 15
          UNKWN,     // 16
          'o',       // 17
          UNKWN,     // 18
          'u',       // 19
          UNKWN,     // 20
          'O',       // 21
          'U',       // 22
          '0',       // 23
          'H',       // 24
          UNKWN,     // 25
          'I',       // 26
          'X',       // 27
          'Y',       // 28
          'r',       // 29
          UNKWN,     // 30
          'm',       // 31
          UNKWN,     // 32
          'n',       // 33
          UNKWN,     // 34
          UNKWN,     // 35
          'N',       // 36
          UNKWN,     // 37
          UNKWN,     // 38
          'p',       // 39
          'b',       // 40
          't',       // 41
          'd',       // 42
          UNKWN,     // 43
          UNKWN,     // 44
          UNKWN,     // 45
          UNKWN,     // 46
          'k',       // 47
          'g',       // 48
          UNKWN,     // 49
          UNKWN,     // 50
          UNKWN,     // 51
          UNKWN,     // 52
          UNKWN,     // 53
          UNKWN,     // 54
          UNKWN,     // 55
          UNKWN,     // 56
          'f',       // 57
          'v',       // 58
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
            'T',        // 59
            'D',        // 60
            's',        // 61
            'z',        // 62
      UNKWN,      // 63
      UNKWN,      // 64
            'S',        // 65
            'Z',        // 66
            UNKWN,      // 67
            UNKWN,      // 68
            UNKWN,      // 69
            UNKWN,      // 70
            UNKWN,      // 71
            UNKWN,      // 72
            'W',        // 73
            UNKWN,      // 74
            UNKWN,      // 75
            'h',        // 76      UNKWN,      // 77
            UNKWN,      // 78
            UNKWN,      // 79
            UNKWN,      // 80
            UNKWN,      // 81
            'j',        // 82
            UNKWN,      // 83
            UNKWN,      // 84
            'w',        // 85
            UNKWN,      // 86
            UNKWN,      // 87
            UNKWN,      // 88
            UNKWN,      // 89
            '1',        // 90
            UNKWN,      // 91
            UNKWN,      // 92
            UNKWN,      // 93
            'R',        // 94
      UNKWN,      // 59
      UNKWN,      // 69
      UNKWN,      // 97
      UNKWN,      // 98
      UNKWN,      // 99
      UNKWN,      // 100
      UNKWN,      // 101
            UNKWN,      // 102
      UNKWN,      // 103
      UNKWN,      // 104
      UNKWN,      // 105
      UNKWN,      // 106
            UNKWN,      // 107
            UNKWN,      // 108
            UNKWN,      // 109
            UNKWN,      // 110
            UNKWN,      // 111
            UNKWN,      // 112
            UNKWN,      // 113
            UNKWN,      // 114
            'J',        // 115
            'c',        // 116
      UNKWN,      // 117
      UNKWN,      // 118
      UNKWN,      // 119
      UNKWN,      // 120
      UNKWN,      // 121
            UNKWN,      // 122
      UNKWN,      // 123
      UNKWN,      // 124
      UNKWN,      // 125
            UNKWN,      // 126
      UNKWN,      // 127
};

unsigned char PAsciiCode[256] =
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
{
    UNKWN,    // 0
    UNKWN,    // 1
    UNKWN,    // 2
    UNKWN,    // 3
    UNKWN,    // 4
    UNKWN,    // 5
    UNKWN,    // 6
    UNKWN,    // 7
        UNKWN,    // 8
    UNKWN,    // 9
    UNKWN,    // 10
        UNKWN,    // 11
    UNKWN,    // 12
    UNKWN,    // 13
    UNKWN,    // 14
    UNKWN,    // 15
    UNKWN,    // 16
    UNKWN,    // 17
        UNKWN,    // 18
    UNKWN,    // 19
    UNKWN,    // 20
    UNKWN,    // 21
    UNKWN,    // 22
    UNKWN,    // 23
    UNKWN,    // 24
    UNKWN,    // 25
        UNKWN,    // 26
    UNKWN,    // 27
    UNKWN,    // 28
    UNKWN,    // 29
    UNKWN,    // 30
    UNKWN,    // 31
        UNKWN,    // 32
    UNKWN,    // 33
    UNKWN,    // 34
    UNKWN,    // 35
    UNKWN,    // 36
    UNKWN,    // 37
    UNKWN,    // 38
    UNKWN,    // 39
        UNKWN,    // 40
        UNKWN,    // 41
        UNKWN,    // 42
    UNKWN,    // 43
    UNKWN,    // 44
    UNKWN,    // 45
        UNKWN,    // 46
        UNKWN,    // 47
        23,       // 48
    UNKWN,    // 49
    UNKWN,    // 50
    UNKWN,    // 51
    UNKWN,    // 52
    UNKWN,    // 53
    UNKWN,    // 54
    UNKWN,    // 55
        UNKWN,    // 56
    UNKWN,    // 57
    UNKWN,    // 58
    UNKWN,    // 59
    UNKWN,    // 60
    UNKWN,    // 61
        UNKWN,    // 62
    UNKWN,    // 63
        UNKWN,    // 64
        5,        // 65
        UNKWN,    // 66
        UNKWN,    // 67
        60,       // 68
        1,        // 69
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                UNKWN,    // 70
                UNKWN,    // 71
                24,       // 72
                26,       // 73
                115,      // 74
                UNKWN,    // 75
                UNKWN,    // 76
                UNKWN,    // 77
                36,       // 78
                21,       // 79
                UNKWN,    // 80
                UNKWN,    // 81
                94,       // 82
                65,       // 83
                59,       // 84
                22,       // 85
                UNKWN,    // 86
                73,       // 87
                27,       // 88
                28,       // 89
                66,       // 90
                UNKWN,    // 91
                UNKWN,    // 92
                UNKWN,    // 93
                UNKWN,    // 94
                UNKWN,    // 95
                UNKWN,    // 96
                14,       // 97
                40,       // 98
                116,      // 99
                42,       // 100
                7,        // 101
                57,       // 102
                48,       // 103
                76,       // 104
                3,        // 105
                82,       // 106
                47,       // 107
                90,       // 108
                31,       // 109
                33,       // 110
                17,       // 111
                39,       // 112
                UNKWN,    // 113
                29,       // 114
                61,       // 115
                41,       // 116
                19,       // 117
                58,       // 118
                85,       // 119
                UNKWN,    // 110
                UNKWN,    // 121
                62,       // 122
                UNKWN,    // 123
        UNKWN,    // 124
        UNKWN,    // 125
        UNKWN,    // 126
        UNKWN,    // 127
                UNKWN,    // 128
        UNKWN,    // 129
        UNKWN,    // 130
        UNKWN,    // 131
        UNKWN,    // 132
        UNKWN,    // 133
        UNKWN,    // 134
                UNKWN,    // 135
                UNKWN,    // 136
                UNKWN,    // 137
                UNKWN,    // 138
                UNKWN,    // 139
                UNKWN,    // 140
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
          UNKWN,     // 141
          UNKWN,     // 142
          UNKWN,     // 143
          UNKWN,     // 144
          9,         // 145
     UNKWN,     // 146
     UNKWN,     // 147
     UNKWN,     // 148
     UNKWN,     // 149
     UNKWN,     // 150
     UNKWN,     // 151
          UNKWN,     // 152
     UNKWN,     // 153
     UNKWN,     // 154
     UNKWN,     // 155
     UNKWN,     // 156
     UNKWN,     // 157
     UNKWN,     // 158
          UNKWN,     // 159
     UNKWN,     // 160
     UNKWN,     // 161
          UNKWN,     // 162
     UNKWN,     // 163
     UNKWN,     // 164
     UNKWN,     // 165
     UNKWN,     // 166
     UNKWN,     // 167
     UNKWN,     // 168
     UNKWN,     // 169
     UNKWN,     // 170
     UNKWN,     // 171
     UNKWN,     // 172
     UNKWN,     // 173
     UNKWN,     // 174
     UNKWN,     // 175
          UNKWN,     // 176
     UNKWN,     // 177
     UNKWN,     // 178
     UNKWN,     // 179
     UNKWN,     // 180
     UNKWN,     // 181
     UNKWN,     // 182
          UNKWN,     // 183
     UNKWN,     // 184
     UNKWN,     // 185
          UNKWN,     // 186
     UNKWN,     // 187
     UNKWN,     // 188
     UNKWN,     // 189
     UNKWN,     // 190
     UNKWN,     // 191
     UNKWN,     // 192
     UNKWN,     // 193
     UNKWN,     // 194
     UNKWN,     // 195
     UNKWN,     // 196
     UNKWN,     // 197
     UNKWN,     // 198
     UNKWN,     // 199
          UNKWN,     // 200
     UNKWN,     // 201
     UNKWN,     // 202
     UNKWN,     // 203
     UNKWN,     // 204
     UNKWN,     // 205
     UNKWN,     // 206
          UNKWN,     // 207
     UNKWN,     // 208
     UNKWN,     // 209
          UNKWN,     // 210
     UNKWN,     // 211
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
UNKWN,    // 212
UNKWN,    // 213
UNKWN,    // 214
UNKWN,    // 215
UNKWN,    // 216
UNKWN,    // 217
UNKWN,    // 218
UNKWN,    // 219
UNKWN,    // 220
UNKWN,    // 221
UNKWN,    // 222
UNKWN,    // 223
      UNKWN,    // 224
UNKWN,    // 225
UNKWN,    // 226
UNKWN,    // 227
UNKWN,    // 228
UNKWN,    // 229
UNKWN,    // 230
      UNKWN,    // 231
UNKWN,    // 232
UNKWN,    // 233
      UNKWN,    // 234
UNKWN,    // 235
UNKWN,    // 236
UNKWN,    // 237
UNKWN,    // 238
UNKWN,    // 239
UNKWN,    // 240
UNKWN,    // 241
UNKWN,    // 242
UNKWN,    // 243
UNKWN,    // 244
UNKWN,    // 245
UNKWN,    // 246
UNKWN,    // 247
      UNKWN,    // 248
      UNKWN,    // 249
      UNKWN,    // 250
      UNKWN,    // 251
      UNKWN,    // 252
      UNKWN,    // 253
      UNKWN,    // 254
      UNKWN,    // 255
};
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
// colloc.c

#include <stdlib.h>
#include <string.h>
#include "colloc.h"


static char *Collocations[] =
{
        "go fly a kite",
        "I understand you",
        "random access memory",
        "take a long walk off a short pier",
        NULL
};


void InitColloc
(
        void
)
{
}


void QuitColloc
(
        void
)
{
}


int CheckColloc
(
        CollocInfo *pCurr,
        CollocInfo **ppNew,
        char *pWord
)
{
        int Rc;

        if (!pCurr)
        {
                char **ppSrch;
                char cSrch;

                *ppNew = NULL;
                Rc = COLLOCATION_NOT_FOUND_RC;
                cSrch = strlen(pWord);

                for (ppSrch = Collocations;
                        *ppSrch;
                        ppSrch++)
                {
                        if ((*ppSrch)[cSrch] == ' ' &&
                                strnicmp(*ppSrch, pWord, cSrch) == 0)
                        {
                                Rc = COLLOCATION_OK_RC;
                                if ((*ppNew = malloc(sizeof(CollocInfo))) != NULL)
                                {
                                        char *pSrch;

                                        for (pSrch = *ppSrch;
                                                *pSrch != ' ';
                                                pSrch++)
                                        {
                                        }
                                        (*ppNew)->pWord = pSrch + 1;
                                }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        break;
                                }
                        }
                }
                else
                {
                        char *pSrch;
                        char cSrch;

                        pSrch = pCurr->pWord;

                        cSrch = strlen(pWord);

                        if ((pSrch[cSrch] == ' ' || pSrch[cSrch] == '\0') &&
                                strnicmp(pSrch, pWord, cSrch) == 0)
                        {
                                (*ppNew)->pWord = pSrch + cSrch;
                                if (*(*ppNew)->pWord)
                                {
                                        (*ppNew)->pWord++;
                                        Rc = COLLOCATION_OK_RC;
                                }
                                else
                                {
                                        free(pCurr);
                                        *ppNew = NULL;
                                        Rc = COLLOCATION_COMPLETE_RC;
                                }
                        }
                        else
                        {
                                free(pCurr);
                                *ppNew = NULL;
                                Rc = COLLOCATION_NOT_FOUND_RC;
                        }
                }


AllDone:

        return Rc;
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE*****************************************************************
          FILE            : compress.c
          DESC            : Routine to compress Quiet's and phon's into phonemes
          TABS            : 3
          OWNER           : Brent Hale
          DATE CREATED: 22 Oct 1994

                                          Copyright Synergetics 1993, 1994

                                          Warning Confidential Material
                                          Property of Synergetics
                                          Copyright 1993, 1994 All Rights Reserved

          SYNOPSIS:
*END_HEADER*********************************************************************/

#include  "dsp.h"
#include  "errors.h"
#include  "higlist.h"
#include  "srengine.h"
#include  "compress.h"

static struct HIGGINS *pMyHdr = (struct HIGGINS *)0;

/*FUNCTION_HEADER**********************
NAME:          CompressPhones
DESC:          Routine to compress the quiets and phon's into phoneme's
IN:            *frmstart - ptr to head of main higgins list.
OUT:
RETURN:   A pointer to a different HIGGINS list of only pmi's and Quiets.
NOTES:    This should:
                                   Create a separate higgins list of pmi's and quiets.
                                   Compress sections of Quiets into one node with the size
updated
                                          to reflect how much quiet there was.
STILL NEED ==>                            Combine phon's into phoneme's where applicable.

                              Originally written by Russ Peterson.
*END_HEADER****************************/
struct HIGGINS *CompressPhones( struct HIGGINS *frmstart )
{
          struct HIGGINS *pNew;
          struct HIGGINS *pCurr;
          struct HIGGINS *pQuiet;
          struct HIGGINS *pNext;
          struct HIGGINS *pPrev;

          pQuiet    = NULL;
          pNew = pMyHdr;

          /* Combine sections of Quiet into one node with the size changed to
                    reflect how many quiet sections are represented. */
          for(pCurr = frmstart; pCurr; pCurr = pCurr->next) {
                    if(pCurr->type == QUIET && pQuiet) {
                              pQuiet->size += pCurr->size;
                    }
                    else {
                              if(pCurr->pmi || (pCurr->type == QUIET && !pQuiet)) {
                                        /* Copy contents of original higgins struct into new list
*/
                                        pPrev = pNew->prev;
                                        pNext = pNew->next;
                                        memcpy(pNew, pCurr, sizeof(struct HIGGINS));
                                        pNew->prev = pPrev;
                                        pNew->next = pNext;


                                        if(pCurr->type == QUIET) {
                                                  pQuiet = pNew;
                                        }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        else {
                                                pQuiet = (struct HIGGINS *)0;
                                        }
                                        pNew = pNext;
                                }
                        }
                }

                if (pNew) {
                        /* Specify where the end of the list is */
                        pNew->type = 'N';
                }

                return(pMyHdr);
        }

        /*FUNCTION_HEADER**********************
        NAME:           InitializeCompressPhones
        DESC:           Allocate memory for CombinePhones
        IN:             none
        OUT:            none
        RETURN:   none
        NOTES:
        *END_HEADER***************************/
        void InitializeCompressPhones( void )
        {
                if (pMyHdr == (struct HIGGINS *)0) {
                        if (CreateHigginsList( NumberOfNodes, &pMyHdr ) != ALL_OK) {
                                return;                 /* Couldn't create the list. */
                        }
                }
        }

        /*FUNCTION_HEADER**********************
        NAME:           CleanUpCompressPhones
        DESC:           Free up memory used in CombinePhones
        IN:             none
        OUT:            none
        RETURN:   none
        NOTES:
        *END_HEADER***************************/
        void CleanUpCompressPhones( void )
        {
                FreeHigginsList( pMyHdr );
                pMyHdr = (struct HIGGINS *)0;
        }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/************************************************
 *                -- dspmain.c --
 *  Copyright Synergetics 1993, 1994
 *  Written by R. Brian Moncur
 *
 * Warning Confidential Material
 * Property of Synergetics
 * Copyright 1993, 1994 All Rights Reserved
 ************************************************/
#ifdef    __cplusplus
extern "C" {
#endif

#undef CRT

#include <windows.h>
#include <windowsx.h>
#include <mmsystem.h>
#include <stdio.h>
#include <stdlib.h>
#include "higlist.h"
#include "federatn.h"
#include "_federat.h"
#include "troi.h"
#include "simpleio.h"
#include "dsp-cpu.h"
#include "srengine.h"

#ifdef _WINDOWS
long FAR PASCAL MainWndProc(HWND hWnd, UINT msg, WPARAM     wParam, LPARAM lParam);
BOOL InitApplication(HANDLE hInstance);
BOOL InitInstance(HANDLE hInstance, int nCmdShow);

HINSTANCE                         hInst;
HWND                                          hwndCPU;
int                                                  PortID;
APP_OPTS                          AppOpts={SRC_MICHROPHONE, DEST_PORT, NULL, NULL, /*COM1*/1};
int                                                  g_CPUMaxAmpl = 0;
struct HIGGINS *g_HigginsHead = 0, *g_HigginsNext = 0;
FILE                                          *g_fpPhonemeFile;
#endif

/* Globals */
int       TotalMicrobes = 0,
                 Microbes = 0,
                 ncalls = 0;

// New Stuff for DSP/CPU split
struct DSPHIGGINS {
        char      type;                                          /* Whether it's
Voiced, Unvoiced or Quiet */
        int       loc;                           /* array location of where period starts
*/
        int                size;                         /* period size  */
        int                duration;        /* in milliseconds  */
        int                Ls;                           /* average amplitude  */
        int                Ld;                  /* average difference of amplitudes  */
        int                Fo;                                   /* Fundamental
frequency */
        int                ffreq[MAXFORMANTS]; /* Formant Frequencies */
        int                ampl[MAXFORMANTS];  /* amplitude of formant's */
        int                zcr;                                          /* Zero
Crossing Rate */
};

int bProcessingInterrupt = FALSE;

#ifdef _WINDOWS
LPVOID lpHigData;
#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*FUNCTION_HEADER**********************
NAME:              LookAtHiggins
DESC:              The event handler for the Sound Recognition engine.
IN:                *pCompressedList - ptr to a HIGGINS list with only the pmi and quiet
                                     nodes in it.
                            *pHiggins - ptr to a filled in higgins list.
                            maxAmpl - The value to go in the global MaxAmpl on our side.
OUT:               none
RETURN:   none
NOTES:    *pHiggins is needed only for debugging.
*END_HEADER*****************************/
void LookAtHiggins( struct HIGGINS *pCompressedList, struct HIGGINS   *pHiggins )
{
        struct HIGGINS      *frame = NULL;
        int         i, flag;

#ifdef  SHOW_PHONS
        printf("\n\nWe found:\n");
        /* Only process the compressed list */
        frame = pCompressedList;
        while (frame != NULL && frame->type != 'N') {
                if (! frame->pmi ) {
                        frame = frame->next;
                        continue;
                }

                for (flag = i = 0; i < MAX_POSSIBILITIES; i++) {
                        if ((frame->pascii[i].p != UNKNOWN_PATH) &&
                                        (frame->pascii[i].p != 0)) {

                                if (i != 0)
                                        printf("\t");
                                printf("#%d", frame->pascii[i].p );
                                printf(" %s", pascii[frame->pascii[i].p] );
                                printf(" %d\%", (int)frame->pascii[i].c );
                                flag++;
                        }
                }
                if (flag)
                        printf("\n");

                frame = frame->next;
        }
#endif

#ifdef FEDERATION
        GiveToTroi(&pCompressedList);
#endif
}

void InitCPUData(void)
{
        /* Create the HIGGINS doublely linked list once; we'll reuse it over
                each 10240 chunk of data.  It contains 40        nodes. */
        CreateHigginsList(NumberOfNodes, &g_HigginsHead);
}

void TermCPUData(void)
{
        FreeHigginsList(g_HigginsHead);
        g_HigginsHead = (struct HIGGINS *)0;
}

#ifdef _68030
void MainLoop(void)
{
        InitCPUData();
        while(1)
        {
                if (!bProcesingInterrupt && g_HigginsHead != NULL)
                        sreProcessHiggins(g_HigginsHead, g_CPUMaxAmpl );
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
		}
		TermCPUData();
}
#endif

void InterruptServiceRoutine(void)
{
		int nCount;

#ifdef _WINDOWS
		LPVOID lpHigPtr;

		lpHigPtr = lpHigData;
#endif
		bProcessingInterrupt = TRUE;
		g_HigginsNext = g_HigginsHead;

		for (nCount = 1; nCount <= NumberOfNodes; nCount++)
		{
				if (g_HigginsNext != NULL)
				{
#ifdef _WINDOWS
						char szOutBuff[20];
						memcpy(g_HigginsNext, lpHigPtr, sizeof(struct HIGGINS));
						wsprintf(szOutBuff, "<%d>", g_HigginsNext->zcr);
//				OutputDebugString(szOutBuff);
#else
						// copy Higgins data from DSP ports to 68030
						// version of Higgins Structs
#endif
						g_HigginsNext = g_HigginsNext->next;
				}
				else
				{
						goto err;
				}
				((struct HIGGINS *)lpHigPtr)++;
		}
err:
		bProcessingInterrupt = FALSE;
		return;
}

#ifdef _WINDOWS
/***************************************************************************
		FUNCTION: MainWndProc(HWND, UINT, UINT, LONG)
		PURPOSE:  Processes messages
		MESSAGES:
				WM_COMMAND	- application menu
				WM_CREATE	- create window and objects
				WM_DESTROY	- destroy window
***************************************************************************/
long FAR PASCAL __export MainWndProc(HWND hWnd, UINT msg, WPARAM wParam, LPARAM lParam)
{
// this goes just above main message switch for CPU.EXE
		static UINT uDSPMsg = 0;

		if(msg == uDSPMsg)
		{
				switch(wParam)
				{
						case DSP_CPU_MSG_PHONEMEFILE:
						{
										// GivePhonemeFileToTroi expects file name already
in

										InitAppOpts();
										InitTroi();
										GivePhonemeFileToTroi();
										EndOfSounds();
										QuitTroi();
										break;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                    }
                    case DSP_CPU_MSG_INITOPTS:
                    {
                                InitAppOpts();
                                break;
                    }
                    case DSP_CPU_MSG_NEWLIST:
                    {
                                lpHigData = (LPVOID)lParam;
//                              OutputDebugString("\n\n");
                                InterruptServiceRoutine();
//                              OutputDebugString("\n\n");
//                              ProcessData();
                                /* Send the Higgins structure and the MaxAmpl
calculated on the DSP
                                to the 68030. */
                                sreProcessHiggins(g_HigginsHead, g_CPUMaxAmpl )
                                break;
                    }
                    case DSP_CPU_MSG_BEGINFILE:
                          InitTroi();
                          break;
                    case DSP_CPU_MSG_ENDOFFILE:
                          EndOfSounds();
                          QuitTroi ();
                          break;
                    case DSP_CPU_MSG_MAXAMPL:
                    {
                          g_CPUMaxAmpl = 0;
                          g_CPUMaxAmpl = HIWORD(lParam);
                          break;
                    }
                    default:
                          break;
              }
              return TRUE;
        }
// end of msg processing

        switch (msg)
        {
              case WM_CREATE:
              {
                    hwndCPU = hWnd;
                    InitAppOpts();
                    InitCom(AppOpts.Port);
                    LoadCursor(NULL, IDC_ARROW);
                    LoadCursor(NULL, IDC_WAIT);
                    uDSPMsg = RegisterWindowMessage("DSPNotifyMessage");

                    /* Initialize the Sound Recognition Engine */
                    if (sreInitialize( LookAtHiggins ))
                          return -1;

                    return 0;
              } // END OF WM_CREATE
              case WM_DESTROY:
              {
                    HANDLE                  hTemp1, hTemp2;

                    hTemp1 = (HANDLE)NULL;
                    hTemp2 = (HANDLE)NULL;
                    hTemp1 = GlobalPtrHandle((LPVOID)AppOpts.szWaveFile);
                    hTemp2 = GlobalPtrHandle((LPVOID)AppOpts.szPhonemeFile);
                    hTemp1 = GlobalFree(hTemp1);
                    hTemp2 = GlobalFree(hTemp2);
                    QuitCom();

                    sreCleanUp();

                    PostQuitMessage(0);
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                        return 0;
                }
                default:
                        return(DefWindowProc(hWnd, msg, wParam, lParam));
        }
} // END OF MainWndProc()

/*************************************************************************
        FUNCTION: InitApplication(HANDLE)
        PURPOSE: Initializes window data and registers window class
*************************************************************************/
BOOL InitApplication(HINSTANCE hInstance) {
 WNDCLASS wc;

        wc.style = CS_HREDRAW | CS_VREDRAW;
        wc.lpfnWndProc = MainWndProc;
        wc.cbClsExtra = 0;
        wc.cbWndExtra = 0;
        wc.hInstance = hInstance;
        wc.hIcon = LoadIcon(NULL, IDI_APPLICATION);
        wc.hCursor = LoadCursor(NULL, IDC_ARROW);
        wc.hbrBackground = GetStockObject(WHITE_BRUSH);
        wc.lpszMenuName = NULL;
        wc.lpszClassName = "CPUMainClass";

        return (RegisterClass(&wc));
} // END OF InitApplication()

/*************************************************************************
        FUNCTION:  InitInstance(HANDLE, int)
        PURPOSE:  Saves instance handle and creates main window
*************************************************************************/
BOOL InitInstance(HINSTANCE hInstance, int nCmdShow) {
 HWND           hWnd;

        hInst = hInstance;
        hWnd = CreateWindow("CPUMainClass", "CPU Main", WS_OVERLAPPEDWINDOW,
                CW_USEDEFAULT, CW_USEDEFAULT, CW_USEDEFAULT, CW_USEDEFAULT,
                NULL, NULL, hInstance, NULL);

        if (!hWnd)
                return (FALSE);

        ShowWindow(hWnd, SW_MINIMIZE);
        UpdateWindow(hWnd);

        return (TRUE);
} // END OF InitInstance()


/*************************************************************************
        FUNCTION: WinMain(HANDLE, HANDLE, LPSTR, int)
        PURPOSE: calls initialization function, processes message loop
*************************************************************************/
int PASCAL WinMain(HANDLE hInstance, HANDLE hPrevInstance, LPSTR lpCmdLine,
        int nCmdShow)
{
        MSG     msg;

        if (!hPrevInstance)
                if (!InitApplication(hInstance))
                        return (FALSE);

        InitCPUData();

        if (!InitInstance(hInstance, nCmdShow))
                return (FALSE);

        while (GetMessage(&msg, NULL, NULL, NULL)) {
                TranslateMessage(&msg);
                DispatchMessage(&msg);
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        }

        TermCPUData();

        return (msg.wParam);
} /* END OF WinMain() */

/**************************************************************************
        FUNCTION: InitAppOpts
        PURPOSE:  Initialize the applications options.
**************************************************************************/
void InitAppOpts(void)
{
        HANDLE                          hTemp1, hTemp2;

        hTemp1 = (HANDLE)NULL;
        hTemp2 = (HANDLE)NULL;
        hTemp1 = GlobalAlloc(GPTR, 80);
        hTemp2 = GlobalAlloc(GPTR, 80);
        AppOpts.szWaveFile = (char *)GlobalLock(hTemp1);
        AppOpts.szPhonemeFile = (char *)GlobalLock(hTemp2);
        AppOpts.sourceID = GetPrivateProfileInt ("Settings", "sourceID",
                SRC_MICHROPHONE, "dsp-cpu.ini");
        AppOpts.DestID = GetPrivateProfileInt ("Settings", "DestID",
                DEST_PORT, "dsp-cpu.ini");
        GetPrivateProfileString("Settings", "szWaveFile", "record.wav",
                (LPSTR)AppOpts.szWaveFile, 80, "dsp-cpu.ini");
        GetPrivateProfileString("Settings", "szPhonemeFile", "words",
                (LPSTR)AppOpts.szPhonemeFile, 80, "dsp-cpu.ini");
        AppOpts.Port = GetPrivateProfileInt ("Settings", "Port", 1/*COM1*/,
                "dsp-cpu.ini");
} // END OF InitAppOpts()

#endif /* END OF #ifdef _WINDOWS */

#ifdef  __cplusplus
}
#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

Docket No.: 132-7.

```
#include <string.h>
#include <stdio.h>
#include "error.h"

char ErrorBuff[128];

void DebugOutput(UINT flags, LPCSTR lpsz) {
 char     Buff[32];

         switch (flags) {
                  case DBF_TRACE:
                           strcpy(Buff, "\n");
                  break;

                  case DBF_WARNING:
                           strcpy(Buff, "\nWarning: ");
                  break;

                  case DBF_ERROR:
                           strcpy(Buff, "\nError: ");
                  break;

                  case DBF_FATAL:
                           strcpy(Buff, "\nFATAL_ERROR: ");
                  break;

                  default:
                           wsprintf(Buff, "\n<%#04x>: ", flags);
                  break;
         }

#ifdef DOS
         printf(Buff);
         printf(lpsz);
#else
//       printf(Buff);
//       printf(lpsz);
         OutputDebugString(Buff);
         OutputDebugString(lpsz);
#endif
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/***************************************************************************
                        File: evaluate.c
 Description: Evaluate frame infomation
                        Tabs: 3
                       Owner: MNewson
Date created: 02/30/1994

            Synopsis: Take a frame structure and filter it through rulers until we
                                      get a unique phonic.

***************************************************************************/

#include "synergy.h"
#include "dsp.h"
#include "errors.h"
#include "stdrds.h"
#include  "evaluate.h"
#include  "pascii.h"
#include  "possible.h"

GLOBAL int          MaxAmpl;

/* from patanal3.c */
extern int pat_anal3( int NumberOfValues, int startMatchingId,
                              STANDARD *StandardValues, float *MeasuredValues, POSSIBLE *Phoneme );
extern int FindClosest( int freq, int *arr, int numInArr );

/* High energy noise is considered to be above this level */
#define   HIGH_FREQ_FLOOR               6000
#define   LOG_2                                                          0.301029996

/*FUNCTION_HEADER**********************
NAME:              IsFricative
DESC:              Routine to tell us if there is any high energy noise at this point.
IN:                *frame - ptr to a pmi point.
OUT:
RETURN:    Boolean: 0 - if no high noise at this point.
                                                   1 - if there is high noise at this point
NOTES:     We will use this to determine fricatives.  High noise is considered
                          to be any signal detected above 6000 Hz.

                          The relative amplitude also needs to be low!!!!  It is possible to
                          have a non-fricative sound with some high frequency stuff in it.
                          We have seen it before, however, high frequency and low amplitude
                          together should be a good division factor.
*END_HEADER***************************/
#define FricAmplThreshold      65
static int          IsFricative( struct HIGGINS *frame )
{
          int        retval = FALSE;              /* assume no high noise */
          int        i;
          int        relAmpl;
          int        nHits = 0;

          for (i = 0; i < MAXFORMANTS; i++) {
                    if (frame->ffreq[i] >= HIGH_FREQ_FLOOR) {
                              nHits++;
                              break;
                    }
          }
          relAmpl = (int)((float)frame->Ls / (float)MaxAmpl * 100.0);
          if (nHits >= 2 &&
                     relAmpl <= FricAmplThreshold ) {
                    retval = TRUE;
          }

          return retval;
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*FUNCTION_HEADER**********************
NAME:      IsBurst
DESC:      Boolean test to tell if we are looking at a burst or not.
IN:
OUT:
RETURN:
NOTES:
*END_HEADER***************************/
int IsBurst( struct HIGGINS *frame )
{
        /*  It is unvoiced and very short such as a plosion  */
        if ( frame->type == 'U' &&
                  frame->pmi <= 3 )
                return TRUE;

/* else if ( frame->type == 'V' )  ????? */

        else
                return FALSE;
}

#ifdef    CALCFORMANTSTD
/*FUNCTION_HEADER**********************
NAME:     CalcFormantStd
DESC:     Calculate the new Formant Standards based upon a Fo.
IN:                *pFormula - Ptr to a null terminated array of Formulas.
                   *pStd - ptr to the destination array of standards.
                   Fo - The fundamental frequency at which to evaluate the standards.
OUT:      *pStd - loaded with the new Standard data.
RETURN:   None
NOTES:    Used for Voiced recognition.
                   F(i) = (m * Fo) + b                    Formant frequency as a function of Fo

*END_HEADER***************************/
static void CalcFormantStd( FORMULA *pFormula, STANDARD *pStd, int Fo )
{
        int              i;

        for ( i = 0; pFormula[i].Pascii != 0; i++ )
        {
                /* Which pascii value is assciated with these formants */
                pStd[i].pascii = pFormula[i].Pascii;

                /* Formant 1 */
                pStd[i].pattern[0] = (pFormula[i].M[0] * Fo) + pFormula[i].B[0];

                /* Formant 2 */
                pStd[i].pattern[1] = (pFormula[i].M[1] * Fo) + pFormula[i].B[1];

                /* Formant 3 */
                pStd[i].pattern[2] = (pFormula[i].M[2] * Fo) + pFormula[i].B[2];
        }
}
#endif

/*FUNCTION_HEADER**********************
NAME:     CalcHarFormantStd
DESC:     Calculate the new Formant Standards based upon a Fo.
IN:                *pFormula - Ptr to a null terminated array of Formulas.
                   *pStd - ptr to the destination array of standards.
                   Fo - The fundamental frequency at which to evaluate the standards.
OUT:      *pStd - loaded with the new Standard data.
RETURN:   None
NOTES:    Used for Voiced recognition.
                   F(i) = (m * Fo) + b                    Formant frequency as a function of Fo

*END_HEADER***************************/
static void CalcHarFormantStd( HARMONIC_FORMULA *pFormula, STANDARD *pStd, int Fo )
{
        int              i, j;
        static   int firstTime = 1;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        if (firstTime) {
                firstTime = 0;

                for ( j = 0; pStd[j].pascii != 0; j++ ) {
                        for ( i = 0; i < NUMOFBANDS; i++ ) {
                                pFormula[j].band[i].b /= 60.0;
                                pFormula[j].band[i].m /= 60.0;
                        }
                }
        }

        for ( j = 0; pStd[j].pascii != 0; j++ ) {
                for ( i = 0; i < NUMOFBANDS; i++ ) {
                        pStd[j].pattern[i] = (pFormula[j].band[i].b - (pFormula[j].band[i].m *
(float)Fo)) ;
                }
        }
}

#ifdef  OLD_HARMONIC_CALC
/*FUNCTION_HEADER**********************
NAME:     CompareAgainstHarmonics
DESC:     Calculate the new Harmonic Formant Standards based upon a Fo.
IN:       *pFormula - Ptr to a null terminated array of Formulas.
                         *pStd - ptr to the destination array of standards.
                         *frame - ptr to current pmi point in Higgins list.
OUT:      *pStd - loaded with the new Standard data.
RETURN:   None
NOTES:    Used for Voiced recognition.
                         s1 = m * Fo + b;
                         F1calc = Fo * 2**(s1/12);
                         F2calc = F1match * 2**(s2/12);
                         F3calc = F2match * 2**(s3/12);
                                                  F3match

*END_HEADER***************************/
static void CompareAgainstHarmonics( HARMONIC_FORMULA *pFormula,

                STANDARD *pStd, struct HIGGINS *frame )
{
        int             i, j;
        int             s1;
        int             Fmatch[3];
        int             tbuf[MAX_PATTERN_LEN];
        float           CurDistance = 0;
        float           diff;

        for ( i = 0; pFormula[i].pascii != 0; i++ )
        {
                memmove( tbuf, frame->ffreq, MAX_PATTERN_LEN  * sizeof(int));
                memset( Fmatch, 0, 3 * sizeof(int) );

                /* Which pascii value is assciated with these formants */
                pStd[i].pascii = pFormula[i].pascii;

                s1 = (pFormula[i].m * frame->Fo) + pFormula[i].b;

                /* Formant 1 */
                pStd[i].pattern[0] = frame->Fo * PowerTblLookup[s1];
                Fmatch[0] = FindClosest( pStd[i].pattern[0], tbuf, MAX_PATTERN_LEN );

                /* Formant 2 */
                pStd[i].pattern[1] = (int)((float)Fmatch[0] * PowerTblLookup[pFormula[i].s2]);
                Fmatch[1] = FindClosest( pStd[i].pattern[1], tbuf, MAX_PATTERN_LEN );

                /* Formant 3 */
                pStd[i].pattern[2] = (int)((float)Fmatch[1] * PowerTblLookup[pFormula[i].s3]);
                Fmatch[2] = FindClosest( pStd[i].pattern[2], tbuf, MAX_PATTERN_LEN );

                /* Go ahead and calculate the eclidean distance now since we
                        have all of the needed information at this point.  This will
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                        prevent us from calculating the Fmatch'd numbers again in
                        pat_anal3().  */
                CurDistance = 0;
                for (j = 0; j < 3; j++) {
                        if (Fmatch[j]) {
                                diff = ((float)(Fmatch[j] - pStd[i].pattern[j])
                                                / (float)Fmatch[j] ) * 100.0;
                                CurDistance += (diff * diff);
                        }
                }
                CurDistance        = sqrt(CurDistance);

                /* Insert current finds in Phoneme from minimum distance to max.
                        I currently don't have anything to pass for relAmpl and duration. */
#ifdef   SAVE_HALF_STEPS
                pInsert( frame->pascii, pStd[i].pascii, CurDistance, pFormula[i].relAmpl, 0,
Fmatch );
#else
                pInsert( frame->pascii, pStd[i].pascii, CurDistance, pFormual[i].relAmpl, 0 );
#endif
        }

        /* Adjust the Euclidean distance to a probability value in the range of 0-100
         * using the formula (1 - i/sum)/(n-1) * 100.  This way the sum of the
         * confidence's will add up to 100. */
        Distance2Probability( frame->pascii );
}
#endif

/*FUNCTION_HEADER**********************
NAME:    AdjustForRelAmpl
DESC:    Adjust the confidence level in the array of possibles according to
                what we find for the Relative Amplitude of the current pmi.
IN:      *frame - current pmi frame
                *pPossible - Array of current possibilities and their confidence level
                                        and the standard relative Amplitude for each.
OUT:
RETURN:
NOTES:
                Calculate the difference between the measured relAmpl and the stdrelAmpl
                and rank them from MAX_POSSIBILITIES to 1.  Sum the rank of the
                confidence values and the rank of the relAmpl differences and then
                resort based on the sum rank.
*END_HEADER***************************/
static void AdjustForRelAmpl( struct HIGGINS *frame, POSSIBLE *pPossible )
{
        int      i,
                        min = 1000,
                        max = 0,
                        relAmpl,
                        diff[MAX_POSSIBILITIES];

        float tmpfloat;

        POSSIBLE tPossible;
        BOOLEAN flag;

        /*  The measured relative amplitude  */
        relAmpl = (int)((float)frame->Ls / (float)MaxAmpl * 100.0);

        /*  Calculate the differences and find the absolute min and max  */
        for ( i = 0; i < MAX_POSSIBILITIES; i++ )
        {
                diff[i] = abs(pPossible[i].relAmpl - relAmpl);
                if ( diff[i] > max )
                        max = diff[i];
                else if ( diff[i] < min )
                        min = diff[i];
        }

        /*  If there's no major differences then don't bother  */
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        if ( max - min < 10 )
                return;

        flag = TRUE;
        while ( flag )
        {
                for ( i = 0; i < (MAX_POSSIBILITIES - 1); i++ )
                {
                        flag = FALSE;
                        /*  If the confidences are fairly close but the i+1 diff
                                is substantially smaller then swap the two but not the
                                confidences.  */
                        if ( (pPossible[i].c - pPossible[i+1].c) < 5 &&
                                 diff[i] - diff[i+1] > 10 )
                        {
                                tPossible = pPossible[i];
                                pPossible[i] = pPossible[i+1];
                                pPossible[i+1] = tPossible;
                                tmpfloat = pPossible[i].c;
                                pPossible[i].c = pPossible[i+1].c;
                                pPossible[i+1].c = tmpfloat;
                                flag = TRUE;
                        }
                }
        }
}

/*FUNCTION_HEADER**********************
NAME:   Evaluate
DESC:   Evaluate the frame information and progress down a
                                        tree until a unique result is obtained
IN:             *frmstart - Start of the higgins list to start evaluating at.
OUT:
RETURN:
NOTES:  This function will consist of two major parts.
                        Recognize the phon's (atomic sounds)
*END_HEADER***************************/
int Evaluate( struct HIGGINS *frmstart, int dspMaxAmpl )
{
        struct  HIGGINS *frame = frmstart;
        float           MeasuredValues[NUMOFBANDS * 2];
        int             i;

        MaxAmpl = dspMaxAmpl;

        /***************************************************************
        /* Process every node representing the Point of Maximum Intelligence
                and find the phon's that they represent.
         ***************************************************************/
        while (frame != NULL) {

                /* If its not a Point of Maximum Intelligence then we don't need
                        to evaluate it. */
#ifdef  PMIS_ONLY
                if (! frame->pmi) {
                        frame = frame->next;
                        continue;
                }
#endif

                InitializePossible( frame->pascii );

                /* Copy the Measured values into the match array */
                memset( MeasuredValues, 0, NUMOFBANDS * 2 * sizeof(float));

                /*  Pull out pascii #39, 40, 41, 42, 47, 48  */
                if (IsBurst( frame ))
                {
                        /*  find the max amplitude formant
                                if ( maxampl < 1500 )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
				{
					if ( frame->type == 'V' )
						its a p
					else
						its a b
				}
				else if ( maxampl < 4000 )
				{
					if ( frame->type == 'V' )
						its a g
					else
						its a k
				}
				else
				{
					if ( frame->type == 'V' )
						its a d
					else
						its a t
				}
			*/
		}

		/* Divide Voiced from Unvoiced */
		else if (frame->type == 'V') {
			for (i = 1; i < NUMOFBANDS; i++) {
				/* Why should I have to test for frame->Fo != 0.  It should
never be
					but I'm getting it. */
				if (frame->ffreq[i] && frame->Fo) {
					MeasuredValues[i-1] = (0.2 *
log((float)frame->ffreq[i] / (float)frame->Fo)) / LOG_2;
				}
				else {
					MeasuredValues[i-1] = 0.0;
				}
			}
			for (i = 1; i < NUMOFBANDS; i++) {
				if (frame->ampl[i]) {
					MeasuredValues[NUMOFBANDS-1+i] =
(float)frame->ampl[i] / (float)frame->Ls;
				}
				else {
					MeasuredValues[NUMOFBANDS-1+i] = 0.0;
				}
			}

			/* Distinguish between Fricatives and other sounds.  If there
				is High Freq Noise, then we are assuming its a Fricative.
				(#58, #60, #62, or #66) */
			if (IsFricative( frame )) {
				/* Compare and evaluate the measured data against the
Harmonically
					formulated standards.  This does a pattern
analysis at the
					time of the calculation of the standards since we
already have
					the information we need to compare at that time.
*/
/*				CompareAgainstHarmonics( VoicedHarFricFormulas,
VoicedFricStd, frame );	*/

#ifdef	DONT_HAVE_ANY
				CalcHarFormantStd( VoicedHarFricFormulas, VoicedFricStd,
frame->Fo );

				pat_anal3( NUMOFBANDS * 2, NUMOFBANDS * 2,
								VoicedFricStd,
MeasuredValues, frame->pascii );
#endif
			}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        /* Then its a vowel, nasal or semi-Vowel */
                                        else {
                                                CalcHarFormantStd( VoicedHarOtherFormulas, VoicedOtherStd,
frame->Fo );
                                                pat_anal3( (int)(NUMOFBANDS * 2), (int)(NUMOFBANDS * 2),
                                                                                (STANDARD
*)VoicedOtherStd, (float *)MeasuredValues, (POSSIBLE *)frame->pascii );

                                                /* Now look at the amplitude to help boost our confidence
                                                        level.  Calculate the difference between the
measured value
                                                        and each of the standards for relAmpl, moving the
ones with the
                                                        lowest difference further up the POSSIBLE list.
*/
/*
                                                AdjustForRelAmpl( frame, frame->pascii );
*/
                                        }
                                }

                                /* Unvoiced pmi */
                                else {
                                        /* Includes unvoiced fricative (#57, #59, #61, or #65)
                                                        We think these are phonemes (ie. a
combination of phons).
                                                        These will be found later when we combin
the phonemes. bjh */
/*                                      pat_anal3( 0, 0, UnvoicedOtherStd, MeasuredValues, frame->pascii
);      */
                                }

                                frame = frame->next;
                        }

                        return  ALL_OK;
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
#ifdef    __cplusplus
extern "C" {
#endif
#undef CRT
#include <windows.h>
#include <mmsystem.h>
#include <stdio.h>
#include <stdlib.h>
#include "federatn.h"
#include "_federat.h"
#include "troi.h"
//#include "sio.h"
#include "simpleio.h"

/* 10240 + 5 * 256 */
#define   VBDATASIZE                                    ((SEGSIZE * 10) + (NOverLapNodes * 256))

#ifdef _WINDOWS
long FAR PASCAL MainWndProc(HWND        hWnd,

                    UINT                msg,

                    WPARAM    wParam,

                    LPARAM    lParam);
BOOL InitApplication(HANDLE hInstance);
BOOL InitInstance(HANDLE hInstance, int nCmdShow);
#endif
void ProcessWaveFile(char *WaveFile);
char *GetWaveFile(void);

#undef CRT

int                             hInst;
HWND                hwndFed;
TroiContext         Troi;
int                             PortID;
APP_OPTS  AppOpts={SRC_MICHROPHONE, DEST_PORT, NULL, NULL, /*COM1*/1};
#ifdef FROMFILE
FILE                *g_fpPhonemeFile;
#endif
static MCI_WAVE_OPEN_PARMS    WaveParms;
static MCI_RECORD_PARMS                              RecordParms;
static MCI_WAVE_SET_PARMS               SetParms;
DWORD                                                      mciError;
/* Globals */
struct COMMANDLINE clo;                 /*  command line options  */
int       *vb_data = NULL,              /*  Voiced data  */
                    SoundNumber,
                    PersonNumber,
                    TotalMicrobes = 0,
                    Microbes = 0,
                    ncalls = 0,
                    fHotMic = FALSE;             /* Flag to see if the Microphone is the input
device */

#ifdef _WINDOWS
/****************************************************************************
          FUNCTION: MainWndProc(HWND, UINT, UINT, LONG)
          PURPOSE:  Processes messages
          MESSAGES:
                    WM_COMMAND    - application menu
                    WM_CREATE     - create window and objects
                    WM_DESTROY    - destroy window
****************************************************************************/
long FAR PASCAL __export MainWndProc(
          HWND hWnd, UINT msg, WPARAM wParam, LPARAM lParam
) {
 HMENU    hMenu;
 static HCURSOR hSavCur;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
switch (msg)
{
            case WM_CREATE:
            {
                        HMENU            hMenu;

                        hwndFed = hWnd;
#ifdef FROMFILE
                        g_fpPhonemeFile = (FILE *)NULL;
#endif
                        InitAppOpts();
                        OutputDebugString("\nProcessor Started\n");
                        InitCom(AppOpts.Port);
                        LoadCursor(NULL, IDC_ARROW);
                        LoadCursor(NULL, IDC_WAIT);
                        hMenu = GetMenu(hWnd);
                        CheckMenuItem(hMenu,
                                    IDM_SMICROPHONE+AppOpts.sourceID-SRC_MICHROPHONE,
                                    MF_CHECKED);
                        CheckMenuItem(hMenu,
                                    IDM_DWAVEFILE+AppOpts.DestID-DEST_WAVEFILE,
                                    MF_CHECKED);
                        return 0;
            } // END OF WM_CREATE
            case WM_DESTROY:
                        SaveAppOpts();
                        QuitCom();
                        PostQuitMessage(0);
            return 0;

            case WM_COMMAND: {
                        switch(wParam) {
                                    case IDM_EXIT:
                                    {
                                                mciError = mciSendCommand(
                                                            WaveParms.wDeviceID, MCI_STOP, MCI_WAIT,
                                                            (DWORD) &WaveParms
                                                );
                                                mciError = mciSendCommand(
                                                            WaveParms.wDeviceID,
                                                            MCI_CLOSE, MCI_WAIT, (DWORD) &WaveParms
                                                );
                                                DestroyWindow(hWnd);
                                                return 0;
                                    } // END OF IDM_EXIT
                                    case IDM_START:
                                    {
                                                if (wParam==IDM_START) {
                                                            InitSound();
                                                }
                                                // begins recording, then displays the RECORDING
dialog box
                                                // to allow STOP to be pressed
                                                // intentiaonally falls through to IDM_STOP
                                                OutputDebugString("Recording ...\n");
                                                if (AppOpts.sourceID <= SRC_MICHROPHONE) {
                                                            mciError = mciSendCommand(
                                                                        WaveParms.wDeviceID,
                                                                        MCI_RECORD, MCI_NOTIFY |
MCI_TO | MCI_FROM | MCI_RECORD_OVERWRITE,
                                                                        (DWORD) &RecordParms
                                                            );
                                                            DialogBoxParam(
                                                                        hInst,
MAKEINTRESOURCE(IDD_DIALOG1),
                                                                        hWnd, (DLGPROC)RecordDlgProc,
                                                                        (LPARAM)
MAKELONG(WaveParms.wDeviceID, 0)
                                                            );
                                                }
                                    }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
case IDM_VOX:
{
        // watches for an input signal, then falls through
to
        // IDM_START processing
        if (AppOpts.sourceID <= SRC_MICHROPHONE) {
                MCI_STATUS_PARMS StatusParms;
                MSG msg;

                InitSound();
                StatusParms.dwItem =
MCI_WAVE_STATUS_LEVEL;
                do {
                        if (PeekMessage(&msg, NULL, 0,
0, PM_REMOVE)) {
TranslateMessage(&msg);
DispatchMessage(&msg);
                        }
                        mciError = mciSendCommand(
                                WaveParms.wDeviceID,
MCI_STATUS,
                                MCI_STATUS_ITEM |
MCI_WAIT,
                                (DWORD) &StatusParms
                        );
                } while (LOWORD(StatusParms.dwReturn) <
800);
                // We should make the "800" value
variable
                // selected from a menu option
        }
}
case IDM_STOP:
{
        TermSound();
        OutputDebugString("Done Recording\n");
        SetCursor(LoadCursor(NULL,IDC_WAIT));
        InitSIO();
//
        if(InitTroi(&Troi))
                return(0);
        if (AppOpts.sourceID <= SRC_WAVEFILE) {
                if (AppOpts.DestID == DEST_PHONEMEFILE)
{
#ifdef FROMFILE
                        g_fpPhonemeFile =
fopen(AppOpts.szPhonemeFile, "w+t");
#endif
                }
                if (AppOpts.DestID > DEST_WAVEFILE) {
                        OutputDebugString("Giving file
to Elrond\n");
                GiveFileToElrond (AppOpts.szWaveFile);
//
                }
                if (AppOpts.DestID == DEST_PHONEMEFILE)
{
#ifdef FROMFILE
                        fclose(g_fpPhonemeFile);
                        g_fpPhonemeFile = NULL;
#endif
                }
        } else {
                GivePhonemeFileToTroi (&Troi);
        }
        EndOfSounds(&Troi);
        QuitTroi (&Troi);
        TermSIO();
//
        OutputDebugString("Closing process\n");
        hSavCur = SetCursor(hSavCur);
        return 0;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                    } // END OF IDM_STOP
                    case IDM_OPTIONS: {
                            FARPROC    pOptionsDlgProc;

                            pOptionsDlgProc = MakeProcInstance(OptionsDlgProc,
hInst);
                            DialogBox(
                                    hInst, MAKEINTRESOURCE(IDD_OPTIONS),
                                    hWnd, pOptionsDlgProc
                            );
                            FreeProcInstance(pOptionsDlgProc);
                    }
                    return 0;

                    case IDM_SMICROPHONE:
                    case IDM_SWAVEFILE:
                    case IDM_SPHONEMEFILE:
                    {
                            HMENU                           hMenu;

                            hMenu = GetMenu(hWnd);
                            CheckMenuItem(hMenu,

AppOpts.sourceID+IDM_SMICROPHONE-SRC_MICHROPHONE,
                                            MF_UNCHECKED);
                            CheckMenuItem(hMenu, wParam, MF_CHECKED);
                            AppOpts.sourceID =
wParam-IDM_SMICROPHONE+SRC_MICHROPHONE;
                            return 0;
                    }
                    case IDM_DWAVEFILE:
                    case IDM_DPHONEMEFILE:
                    case IDM_DSCREEN:
                    case IDM_DIO:
                    {
                            HMENU                           hMenu;

                            hMenu = GetMenu(hWnd);
                            CheckMenuItem(hMenu,

AppOpts.DestID+IDM_DWAVEFILE-DEST_WAVEFILE,
                                            MF_UNCHECKED);
                            CheckMenuItem(hMenu, wParam, MF_CHECKED);
                            AppOpts.DestID =
wParam-IDM_DWAVEFILE+DEST_WAVEFILE;
                            return 0;
                    }
                    default:
                            return (DefWindowProc(hWnd, msg, wParam, lParam));
                } //switch wParam
            } // case WM_COMMAND
            default:
                    return (DefWindowProc(hWnd, msg, wParam, lParam));
    }
} // END OF MainWndProc()

#endif /* END OF #ifdef _WINDOWS


/**************************************************************************
        FUNCTION: InitAppOpts
        PURPOSE:  Initialize the applications options.
***************************************************************************/
void InitAppOpts(void) {
 char     Buff[256];
 long             lBuff;

        AppOpts.sourceID = GetPrivateProfileInt (
                "Federation", "sourceID", SRC_MICHROPHONE, "federatn.ini"
        );
        AppOpts.DestID = GetPrivateProfileInt (
```

Docket No.: 13217

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                "Federation", "DestID", DEST_PORT, "federatn.ini"
        );
        if ((lBuff=GetPrivateProfileString("Federation", "szWaveFile", "", Buff,
                256, "federatn.ini"))!=0)
        {
                AppOpts.szWaveFile = malloc(lBuff+1);
                strcpy(AppOpts.szWaveFile, Buff);
        } else {
                AppOpts.szWaveFile = malloc (strlen("record.wav"));
                strcpy(AppOpts.szWaveFile, "record.wav");
        }
        if (
                (lBuff=GetPrivateProfileString(
                        "Federation", "szPhonemeFile", "", Buff, 256, "federatn.ini"
                ))!=0
        ) {
                AppOpts.szPhonemeFile = malloc(lBuff+1);
                strcpy(AppOpts.szPhonemeFile, Buff);
        } else {
                AppOpts.szPhonemeFile = malloc (strlen("words"));
                strcpy(AppOpts.szPhonemeFile, "words");
        }
        AppOpts.Port = GetPrivateProfileInt (
                "Federation", "Port", 1/*COM1*/, "federatn.ini"
        );
} // END OF InitAppOpts()

/****************************************************************************
        FUNCTION: SaveAppOpts
        PURPOSE:  Save the applications options.
****************************************************************************/
void SaveAppOpts(void) {
 char intBuff[17];

        WritePrivateProfileString (
                "Federation", "sourceID",
                itoa(AppOpts.sourceID, intBuff, 10), "federatn.ini"
        );
        WritePrivateProfileString (
                "Federation", "DestID",
                itoa(AppOpts.DestID, intBuff, 10), "federatn.ini"
        );
        WritePrivateProfileString (
                "Federation", "szWaveFile", AppOpts.szWaveFile, "federatn.ini"
        );
        if(AppOpts.szWaveFile != NULL)
        {
                free(AppOpts.szWaveFile);
                AppOpts.szWaveFile = NULL;
        }
        WritePrivateProfileString (
                "Federation", "szPhonemeFile", AppOpts.szPhonemeFile, "federatn.ini"
        );
        if(AppOpts.szPhonemeFile != NULL)
        {
                free(AppOpts.szPhonemeFile);
                AppOpts.szPhonemeFile = NULL;
        }
        WritePrivateProfileString (
                "Federation", "Port",
                itoa(AppOpts.Port, intBuff, 10), "federatn.ini"
        );
} // END OF SaveAppOpts()

/****************************************************************************
        FUNCTION: OptionsDlgProc
        PURPOSE:  Set options these options could have already been retreived
        from the *.ini file, set by the command line, and/or altered by this
        dialog.
****************************************************************************/
BOOL CALLBACK OptionsDlgProc(
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
            HWND hwndDlg, UINT msg, WPARAM wParam, LPARAM lParam
) {
 LRESULT  lResult;

            switch (msg) {
                     case WM_INITDIALOG:
                               SendDlgItemMessage(
                                         hwndDlg, IDC_WAVEFILE, WM_SETTEXT, 0,
(LPARAM)AppOpts.szWaveFile
                               );
                               SendDlgItemMessage(
                                         hwndDlg, IDC_PHONENEFILE, WM_SETTEXT, 0,
(LPARAM)AppOpts.szPhonemeFile
                               );

                               SendDlgItemMessage(hwndDlg, IDC_PORT, CB_RESETCONTENT, 0, 0);
                               lResult = SendDlgItemMessage(
                                         hwndDlg, IDC_PORT, CB_ADDSTRING, 0, (LPARAM)"COM1"
                               );
                               if (lResult>=0) {
                                         SendDlgItemMessage(
                                                   hwndDlg, IDC_PORT, CB_SETITEMDATA,
LOWORD(lResult), 1
                                         );
                               }
                               lResult = SendDlgItemMessage(
                                         hwndDlg, IDC_PORT, CB_ADDSTRING, 0, (LPARAM)"COM2"
                               );
                               if (lResult>=0) {
                                         SendDlgItemMessage(
                                                   hwndDlg, IDC_PORT, CB_SETITEMDATA,
LOWORD(lResult), 2
                                         );
                               }
                               lResult = SendDlgItemMessage(
                                         hwndDlg, IDC_PORT, CB_ADDSTRING, 0, (LPARAM)"COM3"
                               );
                               if (lResult>=0) {
                                         SendDlgItemMessage(
                                                   hwndDlg, IDC_PORT, CB_SETITEMDATA,
LOWORD(lResult), 3
                                         );
                               }
                               lResult = SendDlgItemMessage(
                                         hwndDlg, IDC_PORT, CB_ADDSTRING, 0, (LPARAM)"COM4"
                               );
                               if (lResult>=0) {
                                         SendDlgItemMessage(
                                                   hwndDlg, IDC_PORT, CB_SETITEMDATA,
LOWORD(lResult), 4
                                         );
                               }
                               lResult = SendDlgItemMessage(
                                         hwndDlg, IDC_PORT, CB_ADDSTRING, 0, (LPARAM)"COM5"
                               );
                               if (lResult>=0) {
                                         SendDlgItemMessage(
                                                   hwndDlg, IDC_PORT, CB_SETITEMDATA,
LOWORD(lResult), 5
                                         );
                               }
                               lResult = SendDlgItemMessage(
                                         hwndDlg, IDC_PORT, CB_ADDSTRING, 0, (LPARAM)"COM6"
                               );
                               if (lResult>=0) {
                                         SendDlgItemMessage(
                                                   hwndDlg, IDC_PORT, CB_SETITEMDATA,
LOWORD(lResult), 6
                                         );
                               }
                               lResult = SendDlgItemMessage(
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        hwndDlg, IDC_PORT, CB_ADDSTRING, 0, (LPARAM)"COM7"
                                );
                                if (lResult>=0) {
                                        SendDlgItemMessage(
                                                hwndDlg, IDC_PORT, CB_SETITEMDATA,
LOWORD(lResult), 7
                                        );
                                }
                                lResult = SendDlgItemMessage(
                                        hwndDlg, IDC_PORT, CB_ADDSTRING, 0, (LPARAM)"COM8"
                                );
                                if (lResult>=0) {
                                        SendDlgItemMessage(
                                                hwndDlg, IDC_PORT, CB_SETITEMDATA,
LOWORD(lResult), 8
                                        );
                                }
                                lResult = SendDlgItemMessage(
                                        hwndDlg, IDC_PORT, CB_ADDSTRING, 0, (LPARAM)"COM9"
                                );
                                if (lResult>=0) {
                                        SendDlgItemMessage(
                                                hwndDlg, IDC_PORT, CB_SETITEMDATA,
LOWORD(lResult), 9
                                        );
                                }
                                SendDlgItemMessage(hwndDlg, IDC_PORT, CB_SETCURSEL, AppOpts.Port-1,
0);
                        return TRUE;

                        case WM_COMMAND:
                                switch (wParam) {
                                        case IDOK: {
 char     Buff[256];
 int      szBuff;

//@glw                                          /* save off options here */
                                                if (
                                                        SendDlgItemMessage(
                                                                hwndDlg, IDC_WAVEFILE,
EM_GETMODIFY, 0, 0
                                                        )
                                                ) {
                                                        if (AppOpts.szWaveFile) {
                                                                free(AppOpts.szWaveFile);
                                                                AppOpts.szWaveFile = NULL;
                                                        }
                                                        *(int *)Buff = 256;
                                                        if (
                                                                (szBuff =
LOWORD(SendDlgItemMessage(
                                                                        hwndDlg,
IDC_WAVEFILE, EM_GETLINE, 0, (LPARAM)Buff
                                                                )))!=0
                                                        ) {
                                                                Buff[szBuff] = 0;
                                                                AppOpts.szWaveFile = malloc
(LOWORD(szBuff)+1);
                                                                strcpy(AppOpts.szWaveFile,
Buff);
                                                        }
                                                }
                                                if (
                                                        SendDlgItemMessage(
                                                                hwndDlg, IDC_PHONEMEFILE,
EM_GETMODIFY, 0, 0
                                                        )
                                                ) {
                                                        if (AppOpts.szPhonemeFile) {
                                                                free(AppOpts.szPhonemeFile);
                                                                AppOpts.szPhonemeFile = NULL;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                                            }
                                                            *(int *)Buff = 256;
                                                            if (
                                                                    (szBuff =
LOWORD(SendDlgItemMessage(
                                                                            hwndDlg,
IDC_PHONENEFILE, EM_GETLINE, 0, (LPARAM)Buff
                                                                    )))!=0
                                                            ) {
                                                                    Buff[szBuff] = 0;
                                                                    AppOpts.szPhonemeFile = malloc
(szBuff+1);
                                                                    strcpy(AppOpts.szPhonemeFile,
Buff);
                                                            }
                                                    }
                                                    AppOpts.Port = LOWORD(SendDlgItemMessage(
                                                            hwndDlg, IDC_PORT, CB_GETITEMDATA,
                                                            LOWORD(SendDlgItemMessage(
                                                                    hwndDlg, IDC_PORT,
CB_GETCURSEL, 0, 0
                                                            )),
                                                            0
                                                    ));
                                            }       /* There is no break/return here on purpose */
                                            case IDCANCEL:
                                                    EndDialog(hwndDlg, wParam);
                                            break;
                                    }
                    default:
                    return FALSE;
            }
} // END OF OptionsDlgProc()


/************************************************************************
            FUNCTION:           InitSound
            PURPOSE: Initialize the Sound stuff if needed
************************************************************************/
int /*OK*/ InitSound(void) {
 int        RetVal=1;
 char       Buff[255];

            if (AppOpts.sourceID <= SRC_MICHROPHONE) {
//          printf("\nremove  returned %d.", remove(AppOpts.szWaveFile));
                    // Initialize all the MCI structures, open the WAVE_AUDIO device
                    // and set it to 44100 samples/sec, 16 bits/sample, stereo
                    memset(&WaveParms, 0, sizeof(MCI_WAVE_OPEN_PARMS));
                    memset(&RecordParms, 0, sizeof(MCI_RECORD_PARMS));
                    memset(&SetParms, 0, sizeof(MCI_SET_PARMS));
                    RecordParms.dwCallback = (DWORD)hwndFed;
                    RecordParms.dwTo = 60000L;              // Maximum record time set to 60 seconds
                    RecordParms.dwFrom = 0;
                    SetParms.dwCallback = (DWORD)hwndFed;
                    SetParms.dwAudio = MCI_SET_AUDIO_ALL;
                    SetParms.nChannels = 1;
                    SetParms.nSamplesPerSec = (DWORD)44100;
                    SetParms.wBitsPerSample = 16;
                    SetParms.wFormatTag = WAVE_FORMAT_PCM;
                    WaveParms.dwCallback = (DWORD)hwndFed;
                    WaveParms.wDeviceID = WAVE_MAPPER;
                    WaveParms.lpstrElementName = "";
                    WaveParms.dwBufferSeconds = 30;
                    WaveParms.lpstrDeviceType = "waveaudio";
                    mciError = mciSendCommand(0, MCI_OPEN,
                            MCI_OPEN_ELEMENT | MCI_OPEN_TYPE,
                            (DWORD) &WaveParms);
                    mciGetErrorString (mciError, Buff, 255);
                    mciError = mciSendCommand(WaveParms.wDeviceID, MCI_SET,
                            MCI_WAVE_SET_BITSPERSAMPLE | MCI_WAVE_SET_CHANNELS |
                            MCI_WAVE_SET_SAMPLESPERSEC | MCI_WAVE_SET_FORMATTAG,
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                        (DWORD) &SetParms
                );
                mciGetErrorString (mciError, Buff, 255);
        }
        return RetVal;
} // END OF InitSound()

/***********************************************************************
        FUNCTION:       TermSound
        PURPOSE: Undo InitSound.
***********************************************************************/
void TermSound(void) {
 MCI_SAVE_PARMS SaveParms;
 char    Buff[255];

        if (AppOpts.sourceID <= SRC_MICHROPHONE) {
                // Now that I'm using the RECORDING dialog box to get the STOP
                // message, this option means nothing from the menu
                mciError = mciSendCommand(
                        WaveParms.wDeviceID, MCI_STOP,
                        MCI_WAIT, (DWORD) &WaveParms
                );
                // saves recorded sound to "RECORD.WAV"
                // this should be made variable
                SaveParms.lpfilename = AppOpts.szWaveFile;
                mciError = mciSendCommand(
                        WaveParms.wDeviceID, MCI_SAVE, MCI_WAIT | MCI_SAVE_FILE,
                        (DWORD) &SaveParms
                );
                RecordParms.dwFrom = 0;
                // Plays back what was recorded
//      if (AppOpts.DestID <= DEST_WAVEFILE) {
                        mciError = mciSendCommand(
                                WaveParms.wDeviceID, MCI_PLAY, MCI_WAIT | MCI_FROM,
                                (DWORD) &RecordParms
                        );
//      }
                // Close and reopen WAV_AUDIO device to flush out
                // what we just saved
                mciError = mciSendCommand(
                        WaveParms.wDeviceID,
                        MCI_CLOSE, MCI_WAIT, (DWORD) &WaveParms
                );
                mciError = mciSendCommand(
                        0, MCI_OPEN,
                        MCI_OPEN_ELEMENT | MCI_OPEN_TYPE,
                        (DWORD) &WaveParms
                );
                mciGetErrorString (mciError, Buff, 255);
                WaveParms.lpstrElementName = "";
                mciError = mciSendCommand(
                        WaveParms.wDeviceID, MCI_SET,
                        MCI_WAVE_SET_BITSPERSAMPLE | MCI_WAVE_SET_CHANNELS |
                        MCI_WAVE_SET_SAMPLESPERSEC | MCI_WAVE_SET_FORMATTAG, (DWORD) &SetParms
                );
                mciGetErrorString (mciError, Buff, 255);
                // Close and reopen WAV_AUDIO device to flush out
                // what we just saved
                mciError = mciSendCommand(
                        WaveParms.wDeviceID,
                        MCI_CLOSE, MCI_WAIT, (DWORD) &WaveParms
                );
                mciGetErrorString (mciError, Buff, 255);
        }
} // END OF TermSound()

/***********************************************************************
        FUNCTION: RecordDlgProc(HANDLE, MSG, WPARAM, LPARAM)
        PURPOSE: processes Recording dialog box to allow STOP
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
 ************************************************************************/
BOOL FAR PASCAL __export RecordDlgProc(HWND hWnd,UINT message, UINT wParam, LONG lParam) {
 static UINT        uTimer;
 static WORD        wCounter = 0;
 char                       szBuffer[15];

        switch (message) {
                case WM_INITDIALOG:
                        // reset counter
                        wCounter = 0;
                        // set a 1/10 second timer
                        uTimer = SetTimer(hWnd, 16, 100, NULL);
                return TRUE;

                case WM_TIMER:
                        // every 1/10th second, update the counter on screen
                        itoa(++wCounter, szBuffer, 10);
                        SetDlgItemText(hWnd, IDC_COUNT, szBuffer);
                return TRUE;

                case WM_COMMAND:
                        EndDialog(hWnd, wParam);
                default:
                return FALSE;
        }
} // END OF RecordDlgProc()


#if 0
/************************************************************************
        FUNCTION:        InitSIO
        PURPOSE: Initialize the SIO Port if needed
************************************************************************/
int /*OK*/ InitSIO(void) {
 int      RetVal=1;

        if (AppOpts.DestID >= DEST_PORT) {
                PortID = OpenTransmitter(AppOpts.Port);
                OutputDebugString("Starting up SIO.\n");
                do
                {
                        RetVal = PortStatus(PortID, PORT_RECEIVER_READY);
                        if (RetVal == 0)
                        {
                                MSG msg;

                                GetMessage(&msg, NULL, NULL, NULL);
                                TranslateMessage(&msg);
                                DispatchMessage(&msg);
                        }
                } while (RetVal == 0);
                OutputDebugString("\nSIOWatcher is ready.\n");
        }
        return RetVal;
}

/************************************************************************
        FUNCTION:        TermSIO
        PURPOSE: Undo InitSIO.
************************************************************************/
void TermSIO(void) {
        if (AppOpts.DestID >= DEST_PORT) {
                CloseTransmitter (PortID);
        }
}
#endif


#ifdef _WINDOWS
/************************************************************************
        FUNCTION: InitApplication(HANDLE)
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        PURPOSE: Initializes window data and registers window class
****************************************************************************/
BOOL InitApplication(HINSTANCE hInstance) {
 WNDCLASS wc;

        wc.style = CS_HREDRAW | CS_VREDRAW;
        wc.lpfnWndProc = MainWndProc;
        wc.cbClsExtra = 0;
        wc.cbWndExtra = 0;
        wc.hInstance = hInstance;
        wc.hIcon = LoadIcon(NULL, IDI_APPLICATION);
        wc.hCursor = LoadCursor(NULL, IDC_ARROW);
        wc.hbrBackground = GetStockObject(WHITE_BRUSH);
        wc.lpszMenuName =  MAKEINTRESOURCE(MENU_1);;
        wc.lpszClassName = "FererationMainClass";

        return (RegisterClass(&wc));
} // END OF InitApplication()


/****************************************************************************
        FUNCTION:  InitInstance(HANDLE, int)
        PURPOSE:  Saves instance handle and creates main window
****************************************************************************/
BOOL InitInstance(HINSTANCE hInstance, int nCmdShow) {
 HWND           hWnd;

        hInst = hInstance;
        hWnd = CreateWindow(
                "FererationMainClass",
                "Voice Processor",
                WS_OVERLAPPEDWINDOW,
                CW_USEDEFAULT,
                CW_USEDEFAULT,
                CW_USEDEFAULT,
                CW_USEDEFAULT,
                NULL,
                        NULL,
                        hInstance,
                        NULL
        );

        if (!hWnd)
                return (FALSE);

        ShowWindow(hWnd, nCmdShow);
        UpdateWindow(hWnd);

        return (TRUE);
} // END OF InitInstance()


/****************************************************************************
        FUNCTION: WinMain(HANDLE, HANDLE, LPSTR, int)
        PURPOSE: calls initialization function, processes message loop
****************************************************************************/
int PASCAL WinMain(
        HANDLE hInstance, HANDLE hPrevInstance, LPSTR lpCmdLine, int nCmdShow
) {
 MSG     msg;


        if (!hPrevInstance)
                if (!InitApplication(hInstance))
                        return (FALSE);

        if (!InitInstance(hInstance, nCmdShow))
                return (FALSE);

        while (GetMessage(&msg, NULL, NULL, NULL)) {
                TranslateMessage(&msg);
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                DispatchMessage(&msg);
        }

        return (msg.wParam);
} /* END OF WinMain() */
#endif /* END OF #ifdef _WINDOWS */


/****************************************
 *  CheckLinkedList - Make sure that all of
 *  the list pointers are pointing to the
 *  right place.  This is a debug routine
 ****************************************/
int
CheckLinkedList(struct HIGGINS *fs)
{
        struct HIGGINS *frame;

        frame = fs;

        printf("\n");
        while ( frame != NULL )
        {
                if ( frame->prev == NULL && frame != fs )
                        return 0;

                if ( frame->next != NULL )
                {
                        if ( frame->next->prev != frame )
                                return 0;
                }

                if ( frame->prev != NULL )
                        if ( frame->prev->next != frame )
                                return 0;

/*
                The overlapping nodes we have set to negative loc's so this now
                doesn't make for a hosed linked list.
                if ( frame->loc < 0 )
                        return 0;
*/

                if ( frame->type == 'U' )
                        printf( "u" );
                else
                        printf("%c", frame->type);

                frame = frame->next;
        }
        printf("\n");
        return 1;
} /* END OF CheckLinkedList()


/**********************************************************************
 * GetInputFile - Get the input wave file, handle ps and vbss options as
 * well as wildcard options and then process the resulting wave files.
 **********************************************************************/
void
GetInputFile(void)
{
        char    sound[4] = "\0\0\0\0",
                person[4] = "\0\0\0\0",
                tmp[4] = "\0\0\0\0",
                drive[MAXDRIVE],
                dir[MAXDIR],
                file[MAXFILE],
                ext[MAXEXT],
                SoundFilePath[MAXBUFFER];
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

Docket No.: 13217.2

```
int      i, j;

struct ffblk ffblk;

drive[MAXDRIVE-1] = '\0';
dir[MAXDIR-1] = '\0';
file[MAXFILE-1] = '\0';
ext[MAXEXT-1] = '\0';

if ( clo.inputpath != NULL )
        fnsplit( clo.inputpath, drive, dir, file, ext );

else
{
        clo.inputpath = GetWaveFile();
        fnsplit( clo.inputpath, drive, dir, file, ext );
}

if ( strstr(ext, "WAV") == NULL &&      /*  Input file must be a wave file  */
                strstr(ext, "wav") == NULL )
        ErrorHandler( BadInputFile );


/*  Process  non-ps and non-vbss files  */
if ( toupper(*file) != 'P' &&
                strstr(file, "VBSS") == NULL &&
                strstr(file, "vbss") == NULL )
{
        clo.vbssFlag = 1;
        fnmerge( SoundFilePath, drive, dir, file, ext );

        if ( findfirst( SoundFilePath, &ffblk, 0 ) != 0 )
                return;

        do
        {
                ProcessWaveFile(SoundFilePath);

        } while ( findnext(&ffblk) == 0 );

        return;

}

/*  Process PS files  */
else if ( toupper(*file) == 'P' )
{
        if ( strlen(file) == 8 )
        {
                strncpy(sound, &file[2], 3);
                strncpy(person, &file[5], 3);
        }

        else if ( strlen(file) == 6 )
        {
                strncpy(sound, &file[2], 3);
                strcpy(person, "???");

        }

        else
        {
                strcpy(sound, "???");
                strcpy(person, "???");
        }

        if ( clo.pnflag == ALL && clo.snflag == ALL )
        {
                sprintf(file, "P?%3s%3s", sound, person);

                fnmerge( SoundFilePath, drive, dir, file, ext );
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        if ( findfirst( SoundFilePath, &ffblk, 0 ) != 0 )
                return;

        do
        {
                strncpy( file, ffblk.ff_name, 8 );

                strncpy(tmp, &file[2], 3);
                SoundNumber = atoi(tmp);
                strncpy(tmp, &file[5], 3);
                PersonNumber = atoi(tmp);
                fnmerge( SoundFilePath, drive, dir, file, ext );

                ProcessWaveFile(SoundFilePath);

        } while ( findnext(&ffblk) == 0 );
}

else if ( clo.pnflag == ALL && clo.snflag == SOME )
{
        for ( i = 0; i < MAX_SOUNDS && clo.soundnumbers[i] != 0; i++ )
        {
                sprintf(file, "P?%03d%s", clo.soundnumbers[i], person);
                fnmerge( SoundFilePath, drive, dir, file, ext );

                if ( findfirst( SoundFilePath, &ffblk, 0 ) != 0 )
                        return;

                do
                {
                        strncpy( file, ffblk.ff_name, 8 );

                        strncpy(tmp, &file[2], 3);
                        SoundNumber = atoi(tmp);
                        strncpy(tmp, &file[5], 3);
                        PersonNumber = atoi(tmp);
                        fnmerge( SoundFilePath, drive, dir, file, ext );

                        ProcessWaveFile(SoundFilePath);

                } while ( findnext(&ffblk) == 0 );
        }

}

else if ( clo.pnflag == SOME && clo.snflag == ALL )
{
        for ( i = 0; i < MAX_PERSONS && clo.personnumbers[i] != 0; i++ )
        {
                sprintf(file, "P?%s%03d", sound, clo.personnumbers[i]);
                fnmerge( SoundFilePath, drive, dir, file, ext );

                if ( findfirst( SoundFilePath, &ffblk, 0 ) != 0 )
                        return;

                do
                {
                        strncpy( file, ffblk.ff_name, 8 );

                        strncpy(tmp, &file[2], 3);
                        SoundNumber = atoi(tmp);
                        strncpy(tmp, &file[5], 3);
                        PersonNumber = atoi(tmp);
                        fnmerge( SoundFilePath, drive, dir, file, ext );

                        ProcessWaveFile(SoundFilePath);

                } while ( findnext(&ffblk) == 0 );
        }

}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
				else if ( clo.pnflag == SOME && clo.snflag == SOME )
				{
					for ( i = 0; i < MAX_PERSONS && clo.personnumbers[i] != 0; i++ )
					{
						for ( j = 0; j < MAX_SOUNDS && clo.soundnumbers[j] != 0; j++
)
						{
							sprintf(file, "P?%03d%03d", clo.soundnumbers[j],
clo.personnumbers[i]);
							fnmerge( SoundFilePath, drive, dir, file, ext );
							if ( findfirst( SoundFilePath, &ffblk, 0 ) != 0 )
								return;

							strncpy( file, ffblk.ff_name, 8 );
							strncpy(tmp, &file[2], 3);
							SoundNumber = atoi(tmp);
							strncpy(tmp, &file[5], 3);
							PersonNumber = atoi(tmp);
							fnmerge( SoundFilePath, drive, dir, file, ext );

							ProcessWaveFile(SoundFilePath);

						}
					}

				}

				return;
			}	/*  End of PS file processing  */

			/*  Process VBSS files  */
			else if ( strstr(file, "VBSS") ||
						strstr(file, "vbss") )
			{
				clo.vbssFlag = 1;

				if ( strlen(file) == 8 )
					strncpy(person, &file[5], 3);

				else
					strcpy(person, "???");

				if ( clo.pnflag == ALL && clo.snflag == ALL )
				{
					sprintf(file, "VBSS0%3s", person);
					fnmerge( SoundFilePath, drive, dir, file, ext );

					if ( findfirst( SoundFilePath, &ffblk, 0 ) != 0 )
						return;

					do
					{
						strncpy( file, ffblk.ff_name, 8 );

						strncpy(tmp, &file[5], 3);
						PersonNumber = atoi(tmp);
						fnmerge( SoundFilePath, drive, dir, file, ext );

						ProcessWaveFile(SoundFilePath);

					} while ( findnext(&ffblk) == 0 );

				}

				else if ( clo.pnflag == ALL && clo.snflag == SOME )
				{
					sprintf(file, "VBSS0%3s", person);
					fnmerge( SoundFilePath, drive, dir, file, ext );

					if ( findfirst( SoundFilePath, &ffblk, 0 ) != 0 )
						return;
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
				do
				{
					strncpy( file, ffblk.ff_name, 8 );
					fnmerge( SoundFilePath, drive, dir, file, ext );
					strncpy(tmp, &file[5], 3);
					PersonNumber = atoi(tmp);

					for ( i = 0; i < MAX_SOUNDS && clo.soundnumbers[i] != 0; i++
)
					{
						SoundNumber = clo.soundnumbers[i];
						while ( GetVBSSInfo() )
							ProcessWaveFile(SoundFilePath);
					}

				} while ( findnext(&ffblk) == 0 );

			}

			else if ( clo.pnflag == SOME && clo.snflag == ALL )
			{

				for ( i = 0; i < MAX_PERSONS && clo.personnumbers[i] != 0; i++ )
				{
					sprintf(file, "VBSS0%03d", clo.personnumbers[i]);
					PersonNumber = clo.personnumbers[i];
					fnmerge( SoundFilePath, drive, dir, file, ext );

					ProcessWaveFile(SoundFilePath);
				}

			}

			else if ( clo.pnflag == SOME && clo.snflag == SOME )
			{

				for ( i = 0; i < MAX_PERSONS && clo.personnumbers[i] != 0; i++ )
				{
					sprintf(file, "VBSS0%03d", clo.personnumbers[i]);
					PersonNumber = clo.personnumbers[i];
					fnmerge( SoundFilePath, drive, dir, file, ext );

					for ( j = 0; j < MAX_SOUNDS && clo.soundnumbers[j] != 0; j++
)
					{
						SoundNumber = clo.soundnumbers[j];
						while ( GetVBSSInfo() )
							ProcessWaveFile(SoundFilePath);
					}

				}

			}

			return;

		}	/*  End of VBSS file processing  */

}

/****************************************************************
 *  ProcessWaveFile - Do Sound recognition on a given wave file.
 ****************************************************************/
void
ProcessWaveFile(char *WaveFile)
{
	int				numpts,
						firstTime,
						*pVBData,
						i;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
	FILE			*fptr;
	struct HIGGINS	*frmstart = NULL,
					*frame = NULL,
					*tframe = NULL;

	if ((fptr = fopen( WaveFile,"rb")) == NULL)
	{
		printf("<%d> Couldn't open Wave File %s\n",
			(int)fptr, WaveFile);
		return;
	}

	if ( clo.debug )
		printf( "Reading file %s\n", WaveFile );

#if defined(DOS)
	if ( clo.sound )
		spawnlp(P_WAIT, "playfile.exe"," ", WaveFile, NULL);
#else
	if ( clo.sound )
		sndPlaySound( WaveFile, SND_ASYNC );
#endif

#ifdef CRT
	printf( "\n\nTesting Person %d -- Sex: %c Age: %d -- Sound [%d] %s: ",
				PersonNumber,
				subject[PersonNumber].sex,
				subject[PersonNumber].age,
				SoundNumber,
				(SoundNumber < 128 ? pascii[SoundNumber] :
"Unknown") );
#endif

	Microbes = ncalls = 0;

	read_header(fptr);

	/* Seek to the start of the selected sound data */
	fseek(fptr, (clo.frameloc * sizeof(int)), SEEK_SET);

	/* Create the HIGGINS doublely linked list once; we'll reuse it over
		each 10240 chunk of data.  It contains 40 plus NOverLapNodes (5)
		nodes. */
	if (CreateHigginsList( NumberOfNodes, &frmstart ) != ALL_OK) {
		return;			/* Couldn't create the list. */
	}

	/* Read 10240 into buffer past the overlap data */
	pVBData = vb_data + (NOverLapNodes * 256);
	firstTime = 1;
	while ( (numpts = read_wav(fptr, pVBData)) != 0 ) {
		/*  Frame data  */
		ncalls++;

		/* advance the ptr beyond what will usually be the
			overlap area.  This will prevent bogus values being printed out
			from the overlap area the first time through. */
		frame = frmstart;
		for ( i = 0; i < NOverLapNodes; i++ ) {
			/* Has this node been processed yet?  Do we need to? */
			if (frame->type == 'V' && frame->ffreq[0] == 0) {
				break;
			}
			frame = frame->next;
		}

		/* Calculate Ls, Ld, zcr and the node type (Voiced, Unvoiced,
			Quiet) for every node in the list and set the node location
			and size. */
		EvalTimeDomain( pVBData, numpts, frame, (firstTime) ? 0 : (double)(pVBData -
vb_data));
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                        firstTime = 0;

                        if ( clo.debug )
                        {
                                if ( !CheckLinkedList(frmstart) )
                                        printf("Linked list is hosed\n");

                                printf("\nComputing FFT and evaluating data\n");
                        }

                        /* Run the Bach analysis on the voice data */
                        Decompose( pVBData, frame );

                        /*  Line up formants into tracks for further evaluation  */
                        //FormantTracker( frmstart );

                        /*  Find the Points of max intelligence from the formants to
                                indicate areas for sound recognition. */
                        PointMaxIntelligence( frmstart );

//                      ImproveFormants( frame );
//                      MakeSpectogram( frame );
//                      PrintFrmnts( frame, numpts );
//                      OutputSpectrumData( frame );


                        Evaluate( frame );                              /* Match points of maximum
intelligence */

#ifdef    OLD_METHOD
                        if ( !clo.testmode ) {
//                              frame = frmstart;
                                tframe = frame;
                                while ( frame != NULL )
                                {
                                        Evaluate( frame );

                                        if ( clo.aql )
                                                PrintAQL(frame);

                                        frame = frame->next;
                                }

                                frame = tframe;
                                WavFileInfoOut(frame);
//                              MeldFrames (&frame);

                        }       /* end of !clo.testmode */
#endif

                        if(clo.higgout)
                                StuffHigginsToDisk(frame);              // Ouch! that must hurt!
                        /* Adjust the linked list so that the last NOverLapNodes nodes are
                                at the head of the list.  frame will be advanced past the
                                overlap nodes so that processing can begin there. */
                        BumpHigginsList(&frmstart, NOverLapNodes);

                        /* copy what will be the overlap data into the bottom of vb_data */
                        memmove( vb_data, vb_data + SEGSIZE * 10, NOverLapNodes * 256 * sizeof(int));
                        pVBData = vb_data;

#ifdef FEDERATION
          GiveToTroi(&frmstart);
#endif

          }       /* End of While( read_wav)  */

          /* Free up the linked list */
          FreeHigginsList( frmstart );
          frmstart = (struct HIGGINS *)0;
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```c
/****************************************************************
 *  GetWaveFile - Get a wave filename interactively or create
 *  one using the microphone.
 ****************************************************************/
char *
GetWaveFile(void)
{
        char    *c,
                        *WaveFile;

        if ( (WaveFile = (char *)malloc(MAXBUFFER)) == NULL )
                ErrorHandler( OutOfMemory );

        /*  If an input file name is not input on the command line
         *  then get it interactively.  */
        if ( !fHotMic )
        {
                printf("\nEnter the file spec to the sound files.\n"
                                "(Wild cards are supported -- I.E. G:\VOICE\SS*.WAV )\n"
                                "(Press <ENTER> to create a wave file)\n");
                printf("\nInput file: ");

                gets(WaveFile);

                while ( (c = strstr(WaveFile, "\n")) != NULL )
                        *c = '\0';
        }

        if ( fHotMic || WaveFile[0] == '\0')
        {
                fHotMic = TRUE;
#if defined(DOS)
                strcpy(WaveFile, "c:\\sretemp.wav");
                spawnlp(P_WAIT, "pas.exe", "pas.exe", "set", "volume", "to", "0", NULL);
                spawnlp(P_WAIT, "pas.exe", "pas.exe", "set", "mic", "to", "100", NULL);
                remove(WaveFile);

                printf("\nPress a key to start recording, then press  [Esc] to stop.\n");
                getch();
                spawnlp(P_WAIT, "recfile.exe", "recfile.exe", WaveFile, "16 r44100 -M", NULL);
                printf("\n\tProcessing, please wait . . .\n");
                spawnlp(P_WAIT, "pas.exe", "pas.exe", "set", "mic", "to", "0", NULL);
                spawnlp(P_WAIT, "pas.exe", "pas.exe", "set", "volume", "to", "100", NULL);
#endif
        }

        return WaveFile;
}

#ifdef FEDERATION
void GiveFileToElrond (char huge *SoundFilePath) {
        if ( (vb_data = (int *)malloc(VBDATASIZE*sizeof(int))) == NULL )      {
                fprintf(stderr, "Out of memory while trying to malloc vb_data\n");
                exit(0);
        }

        InitCommandlineOptions(&clo);
        clo.sound = FALSE;
        clo.testmode = FALSE;
        ProcessWaveFile(SoundFilePath);

        if (vb_data != NULL) {
                        free(vb_data);
                        vb_data = NULL;
        }
        if (clo.inputpath != NULL)
        {
                free(clo.inputpath);
                clo.inputpath = NULL;
        }
        }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
#endif /* END OF #ifdef FEDERATION */

#ifdef    __cplusplus
}
#endif
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE*****************************************************************
         FILE             : fixtrack.c
         DESC             : Routines smooths filter bins, removes extraneous frequencies
                                   and fills in a few holes.
         TABS             : 3
         OWNER            : Brian Moncur
         DATE CREATED: 2 Nov 1994

                                             Copyright Synergetics 1993, 1994

                                             Warning Confidential Material
                                             Property of Synergetics
                                             Copyright 1993, 1994 All Rights Reserved

         SYNOPSIS: This code will reside on the 68030
*END_HEADER*********************************************************************/

#include  "fixtrack.h"

/************************************************************
 * FixTrack - Look forward and backward one time slice
 * and smooth the current time slice if there is data to
 * do so, fill in any blank holes if possible, and weed out
 * any wild points.
 ************************************************************/
void FixTrack( struct HIGGINS *pHiggins )
{
         int      i;
         float threshold;
         struct HIGGINS *frame = pHiggins;

         while ( frame != NULL ) {
                  if ( frame->prev != NULL &&
                           frame->next != NULL ) {

                           for ( i = 0; i < NFILTERS; i++ ) {
                                    /*  Smooth it if there is a freq before and after */
                                    if ( frame->prev->ffreq[i] != 0 &&
                                             frame->next->ffreq[i] != 0 )
                                    {
                                             /*  Smooth it by averaging  */
                                             if ( frame->ffreq[i] != 0 )
                                             {
                                                      frame->ffreq[i] = (frame->ffreq[i] +
frame->prev->ffreq[i] + frame->next->ffreq[i]) / 3;
                                                      frame->ampl[i] = (frame->ampl[i] +
frame->prev->ampl[i] + frame->next->ampl[i]) / 3;
                                             }

                                             /*  Fill in a hole if there is one  */
                                             else
                                             {
                                                      frame->ffreq[i] = (frame->prev->ffreq[i]
+ frame->next->ffreq[i]) / 2;
                                                      frame->ampl[i] = (frame->prev->ampl[i] +
frame->next->ampl[i]) / 2;
                                             }
                                    }

                                    /*  Delete it if there's nothing before or after  */
                                    else if ( frame->ffreq[i] != 0 &&
                                                      frame->prev->ffreq[i] == 0 &&
                                                      frame->next->ffreq[i] == 0 )
                                    {
                                             frame->ffreq[i] = frame->ampl[i] = 0;
                                    }

                                    /*  This is Randy's Threshold  (Ax Fx) / (Ao Fo)  < 1  */
#ifdef THRESHOLD
                                    if ( frame->Fo != 0 && frame->FoAmpl != 0 )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        {
                                                threshold = (float)frame->ampl[i] /
(float)frame->FoAmpl * (float)frame->ffreq[i] / (float)frame->Fo;
                                                if ( threshold < 1 )
                                                        frame->ampl[i] = frame->ffreq[i] = 0;
                                        }
#endif
                                }
                        }

#define MAX_N_FORMANTS
#ifdef MAX_N_FORMANTS
                        {
                                int     count = NFILTERS,
                                                min,
                                                minloc;
                                struct HIGGINS *tmpHiggins;

                                /*  Don't allow formants within 100hz of each other.  Remove the
                                        lower one.  */
                                for ( i = 2; i < NFILTERS; i++ )
                                {
                                        if ( abs(frame->ffreq[i] - frame->ffreq[i-1]) < 100 )
                                        {
                                                if ( frame->ampl[i] > frame->ampl[i-1] )
                                                        frame->ffreq[i-1] = frame->ampl[i-1] =
0;
                                                else
                                                        frame->ffreq[i] = frame->ampl[i] = 0;
                                        }
                                }

                                /*  Don't allow formant 1 to be in both band 1 and 2  */
                                if ( frame->ffreq[1] && frame->ffreq[2] )
                                {
                                        if ( frame->ampl[1] > frame->ampl[2] )
                                                frame->ffreq[2] = frame->ampl[2] = 0;
                                        else
                                                frame->ffreq[1] = frame->ampl[1] = 0;
                                }

                                /*  Only allow one plosive per Unvoiced section and it should be
                                        preceeded by a Quiet */
                                if ( frame->pmi == -1 )
                                {
                                        tmpHiggins = frame;
                                        while ( tmpHiggins && tmpHiggins->type == 'U' )
                                                tmpHiggins = tmpHiggins->prev;

                                        if ( tmpHiggins && tmpHiggins->type != 'Q' )
                                                        frame->pmi = frame->Fo = frame->FoAmpl =
0;
                                        if ( frame->next )
                                        {
                                                tmpHiggins = frame->next;
                                                while ( tmpHiggins && tmpHiggins->type == 'U' )
                                                {
                                                        if ( tmpHiggins->pmi == -1 )
                                                        {
                                                                tmpHiggins->pmi =
tmpHiggins->Fo = tmpHiggins->FoAmpl = 0;
                                                        }
                                                        tmpHiggins = tmpHiggins->next;
                                                }
                                        }
                                }

                                /*  Delete all but the 6 greatest amplitude formants  */
                                while ( count > 6 )
                                {
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                    for ( i = NFILTERS, count = minloc = 0, min = 20000; i >= 0;
i-- )
                    {
                            if ( frame->ampl[i] != 0 )
                            {
                                    count++;
                                    if ( frame->ampl[i] < min )
                                    {
                                            min = frame->ampl[i];
                                            minloc = i;
                                    }
                            }
                    }
                    frame->ffreq[minloc] = frame->ampl[minloc] = 0;
            }
        }
#endif

        frame = frame->next;
    }
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
#include "grammar.h"

/*********************************************************

ReadGrammarFromFile
	Reads the Grammar rules from a file and prepares them for
	OpenGrammarParser.  It expects the rules to look like the
	parsers wants but seperated by CR/LF in the file.  The data
	will be stored in a file that is farmalloced and will need
	to be farfreed when it is no longer needed.
	Returns:
		0 on success
		1 on an error

*********************************************************
int ReadGrammarFromFile
(
	char				*pfilename,			// Name of
the file to get the data from
	char				**pdata				// Will
point to the data
);
*********************************************************/
int ReadGrammarFromFile( char *pfilename, char **pdata )
{
	int					nSize=RULE_LIST_SIZE, hFile, nPos=0;
	char				cTemp, pBuf[2];

	hFile = open( pfilename, O_BINARY|O_RDWR, S_IWRITE|S_IREAD );
	if( hFile < 1 )
		return 1;

	*pdata = (char*) malloc( nSize );
	if( !*pdata )
	{
		close(hFile);
		return 1;
	}
	memset( *pdata, 0x00, nSize );

	while( !eof(hFile) )
	{
		// Read the next type
		if( read( hFile, pBuf, 2 ) != 2 )
		{
			free(*pdata);
			close(hFile );
			return 1;
		}

		if( pBuf[0] == '/' )
		{
			// Skip to the end of the line
			while( cTemp!='\r' && cTemp!='\n' && !eof(hFile) )
				if ( read( hFile, &cTemp, 1 ) != 1)
				{
					free( *pdata );
					close( hFile );
					return 1;
				}

			while( (cTemp=='\r' || cTemp=='\n') && !eof(hFile) )
				if ( read( hFile, &cTemp, 1 ) != 1)
				{
					free( *pdata );
					close( hFile );
					return 1;
				}
```

Docket No.: 1321'2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        if( !eof(hFile) )
                if ( lseek( hFile, SEEK_CUR, -1L ) != -1)
                        continue;
                else
                {
                        free( *pdata );
                        close( hFile );
                        return 1;
                }

}

// Read the equals sign
if( read( hFile, &cTemp, 1 ) != 1 )
{
        free(*pdata);
        close(hFile );
        return 1;
}
if( cTemp != '=' )
{
        free(*pdata);
        close(hFile );
        return 1;
}

// Save this type in the buffer
(*pdata)[nPos] = GetType( pBuf );
if( (*pdata)[nPos] == INVALID_TYPE )
{
        // Invalid type
        free(*pdata);
        close(hFile );
        return 1;
}
nPos++;
if( nPos >= nSize )
{
        free(*pdata);
        close(hFile );
        return 1;
}

// Read the types
while( pBuf[0]!='\r' && pBuf[0]!='\n' && !eof(hFile) )
{
        if( read(hFile,pBuf,2) != 2 )
        {
                free(*pdata);
                close(hFile );
                return 1;
        }

        if( pBuf[0]!='\r' && pBuf[0]!='\n' )
        {
                (*pdata)[nPos] = GetType( pBuf );
                if( (*pdata)[nPos] == INVALID_TYPE )
                {
                        // Invalid type
                        free(*pdata);
                        close(hFile);
                        return 1;
                }
                nPos++;
                if( nPos >= nSize )
                {
                        free( *pdata );
                        close( hFile );
                        return 1;
                }
        } // end if( pBuf[0]!='\r' && pBuf[0]!='\n' )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

Docket No.: 13217.2

```
			} // end while( pBuf[0]!='\r' && pBuf[0]!='\n' && !eof(hFile) )
			(*pdata)[nPos++] = NULL;

			if( !eof(hFile) )
			{
				if( read(hFile,&cTemp,1) != 1 )
				{
					free( *pdata );
					close( hFile );
					return 1;
				}
				while( (cTemp=='\r' || cTemp=='\n') && !eof(hFile) )
					if( read(hFile,&cTemp,1) != 1 )
					{
						free( *pdata );
						close( hFile );
						return 1;
					}
				// end while( (cTemp=='\r' || cTemp=='\n') && !eof(hFile)
				if( !eof(hFile) )
					if ( lseek( hFile, SEEK_CUR, -1L ) == -1)
					{
						free( *pdata );
						close( hFile );
						return 1;
					}

			} // end if( !eof(hFile) )
		} // end while( !eof(hFile) )

		close( hFile );
		return 0;
} // end int ReadGrammarFromFile( char *pfilename, char **pdata )

/**********************************************************

GetType
		Converts the two letter char types to it's #define
		Returns:
			#define on success
			TYPE_COUNT on an error

**********************************************************/
int GetType( char* ptext )
{
		if( !strcmp( ptext, "VB" )	)				// Verb
			return VB;
		if( !strcmp( ptext, "NN" )	)				// Noun
			return NN;
		if( !strcmp( ptext, "AR" )	)				// Article
			return AR;
		if( !strcmp( ptext, "CJ" )	)				// Conjunction
			return CJ;
		if( !strcmp( ptext, "PN" )	)				// Pronoun
			return PN;
		if( !strcmp( ptext, "AJ" )	)				// Adjective
			return AJ;
		if( !strcmp( ptext, "AX" )	)				// Auxillary verb
			return AX;
		if( !strcmp( ptext, "AV" )	)				// Adverb
			return AV;

		if( !strcmp( ptext, "NP" )	)				// Noun phrase
			return NP;
		if( !strcmp( ptext, "VP" )	)				// Verb phrase
			return VP;
		if( !strcmp( ptext, "PP" )	)				// Prepositional phrase
			return PP;
		if( !strcmp( ptext, "SN" )	)				// Sentance
			return SN;
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
	if( !strcmp( ptext, ".." ) )
		return REPEAT;

	return 0;
} // end int GetType( char* ptext )

/**********************************************************

OpenGrammarParser
	Sets up the lists that the grammar parser will use.
	Returns:
		0 on success
		1 on an error

**********************************************************
int OpenGrammarParser
(
	GRAMMAR_DATA	*pthis,			// Points to the grammar data
to fill
	char			*pfilename		// Points
to file with the list of
					// strings that represent the grammar
					// rules.
);
**********************************************************/
int OpenGrammarParser( GRAMMAR_DATA *pthis, char *pfilename )
{
	int		x, nPos;
	char		*pList;
	GRAMMAR_WORD	*pCurrent, *pNew, *pTemp;
	GRAMMAR_WORD	*pRules[TYPE_COUNT], *pTempArray[TYPE_COUNT];

	// Initialize the data in GRAMMAR_DATA
	for( nPos=0; nPos<TYPE_COUNT; nPos++ )
		pthis->pTypes[nPos] = NULL;
	memset( &(pthis->pCache), 0x00, sizeof(REAL_WORD)*CACHE_SIZE );

	// Read the grammar rules from the file
	if( ReadGrammarFromFile( pfilename, &pList ) )
		return 1;

	while( pList[nPos] && nPos<RULE_LIST_SIZE )
	{
		pCurrent = NULL;
		while( pList[nPos] && nPos<RULE_LIST_SIZE )
		{
			// Create the rule
			pNew = (GRAMMAR_WORD*) malloc( sizeof(GRAMMAR_WORD) );
			if( !pNew )
			{
				free( pList );
				return 1;
			}
			pNew->cType = pList[nPos];

			// Attach to the current rule
			pNew->pPrevRule = pCurrent;
			pNew->pNextRule = NULL;

			// Attach to the list of types
			pNew->pNextType = pthis->pTypes[ pList[nPos] ];
			pthis->pTypes[ pList[nPos] ]->pPrevType = pNew;
			pNew->pPrevType = NULL;

			if( pList[nPos+1] == REPEAT )
			{
				pNew->cFlags |= REPEAT_FLAG;
				nPos++;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                        }
                        nPos++;
                } // end while( pList[nPos] && nPos<RULE_LIST_SIZE )
                nPos++;
        } // end while( pList[nPos] && nPos<RULE_LIST_SIZE )

        // Initialize the possibilities list
        for( x=0; x<TYPE_COUNT; x++ )
                pRules[x] = NULL;

        // Create the possibilities list
        for( x=0; x<TYPE_COUNT; x++ )
        {
                pCurrent = pthis->pTypes[x];
                while( pCurrent )
                {
                        if( pCurrent->cFlags&REPEAT_FLAG )
                        {
                                pNew = (GRAMMAR_WORD*) malloc( sizeof(GRAMMAR_WORD) );
                                if( !pNew )
                                {
                                        free( pList );
                                        return 1;
                                }
                                pNew->cFlags = pCurrent->cFlags;
                                pNew->cType = pCurrent->cType;
                                pNew->pPrevRule = NULL;
                                pNew->pNextRule = pRules[x];

                                if( pRules[x] )
                                        pRules[x]->pPrevRule = pNew;

                                pRules[x] = pNew;
                        }
                        if( pCurrent->pNextRule )
                                if( pCurrent->pNextRule->cType < BASIC_COUNT )
                                {
                                        pNew = (GRAMMAR_WORD*) malloc(
sizeof(GRAMMAR_WORD) );
                                        if( !pNew )
                                        {
                                                free( pList );
                                                return 1;
                                        }
                                        pNew->cFlags = pCurrent->pNextRule->cFlags;
                                        pNew->cType = pCurrent->pNextRule->cType;
                                        pNew->pPrevRule = NULL;
                                        pNew->pNextRule = pRules[x];

                                        if( pRules[x] )
                                                pRules[x]->pPrevRule = pNew;

                                        pRules[x] = pNew;
                                }
                                else // else if( pCurrent->pNextRule->cType < BASIC_COUNT )
                                {
                                        pTemp = pthis->pTypes[pCurrent->cType];
                                        while( pTemp )
                                        {
                                                if( pTemp->pNextRule )
                                                        if( pTemp->pNextRule->cType <
BASIC_COUNT )
                                                        {
                                                                pNew =
(GRAMMAR_WORD*) malloc( sizeof(GRAMMAR_WORD) );
                                                                if( !pNew )
                                                                {
                                                                        free(
pList );
                                                                        return 1;
                                                                }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                                                pNew->cFlags =
pTemp->pNextRule->cFlags;
                                                                pNew->cType =
pTemp->pNextRule->cType;
                                                                pNew->pPrevRule =
NULL;
                                                                pNew->pNextRule =
pRules[x];

                                                                if( pRules[x] )

pRules[x]->pPrevRule = pNew;

                                                                pRules[x] = pNew;
                                                        } // end if(
pTemp->pNextRule->cType < BASIC_COUNT )
                                                // end if( pTemp->pNextRule )
                                        } // end while( pTemp )
                                } // end if( pCurrent->pNextRule->cType < BASIC_COUNT )
                        // end if( pCurrent->pNextRule )
                        pCurrent = pCurrent->pNextRule;
                } // end while( pCurrent )
        } // end for( x=0; x<TYPE_COUNT; x++ )
        memcpy( pTempArray, pthis->pTypes, sizeof(GRAMMAR_WORD*)*TYPE_COUNT );
        memcpy( pthis->pTypes, pRules, sizeof(GRAMMAR_WORD*)*TYPE_COUNT );

        // Free the memory for the old types list
        for( x=0; x<TYPE_COUNT; x++ )
        {
                pCurrent = pTempArray[x];
                while( pCurrent )
                {
                        pTemp = pCurrent->pNextType;
                        free( pCurrent );
                        pCurrent = pTemp;
                }
        }

        free( pList );
        return 0;
} // end int OpenGrammarParser( GRAMMAR_DATA *pthis, char *pfilename )


/*********************************************************

CloseGrammarParser
        Frees up the memory that the grammar parser is using.

**********************************************************
void CloseGrammarParser
(
        GRAMMAR_DATA        *pthis                      // Points to the data to free
);
*********************************************************/
void CloseGrammarParser( GRAMMAR_DATA *pthis )
{
        GRAMMAR_WORD *pTemp, *pTemp1;
        int x;

        // Free up the grammar rules
        for(x=0; x<TYPE_COUNT; x++ )
        {
                pTemp = pthis->pTypes[x];
                while( pTemp )
                {
                        pTemp1 = pTemp->pNextType;
                        free( pTemp );
                        pTemp = pTemp1;
                } // end while( pTemp )
        } // end for( int x=0; x<TYPE_COUNT; x++ )
} // end void CloseGrammarParser( GRAMMAR_DATA *pthis )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*******************************************************

int WriteNextGrammarWord
        Checks the next word in the stream.  This word will be put
        in the cache and the oldest is removed.
        Returns:
                Part of speach on success
                0 on fail

*********************************************************
int WriteNextGrammarWord
(
        GRAMMAR_DATA       *pthis                          // Grammar rules
        REAL_WORD          *pword                          // The word to add
);
*******************************************************/
int WriteNextGrammarWord( GRAMMAR_DATA *pthis, REAL_WORD *pword )
{
        int                                     x;
        char                                    bDone, bFound;
        GRAMMAR_WORD    pTypeList, pCurrentRule;

        // Make sure the types are valid
        for( x=0; x<MAX_TYPES; x++ )
                if( pword->cTypes[x] >= TYPE_COUNT || pword->cTypes[x] <= INVALID_TYPE )
                        return 0;

        // Put the next word in the cache
        memcpy( &(pthis->pCache[0]), &(pthis->pCache[1]), sizeof(REAL_WORD)*(CACHE_SIZE-1) );
        pthis->pCache[CACHE_SIZE-1] = *pword;

        return 1;
} // end int WriteNextGrammarWord( REAL_WORD *pword )


/*******************************************************

int CheckGrammar
        Attempts to find a rule(s) that matches the last ntotest
words in the grammar checker cache.

        Returns:
                1 if it found a ruld
                0 it it failed

*********************************************************
int CheckGrammar
(
        GRAMMAR_DATA       *pthis                          // Grammar rules
        int                                ntotest                         // Number
of words to test
);
*******************************************************/
int CheckGrammar( GRAMMAR_DATA *pthis, int ntotest )
{
        int                                     x, nResult = 0;
        GRAMMAR_WORD       *pCurrent;

        if( ntotest > CACHE_SIZE )
                return 0;

        // Check all the possibilities for all the types the first word
        // in the cache can be
        x=0;
        nResult = 1;
        while( nResult && x<ntotest && pthis->pCache[CACHE_SIZE-x-1].cTypes[0]==INVALID_TYPE )
        {
                pCurrent =  pthis->pTypes[ pthis->pCache[CACHE_SIZE-x-1].cTypes[0] ];
                nResult = 0;
                while( pCurrent && !nResult )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
				{
					if( pCurrent->cType == pthis->pCache[CACHE_SIZE-x-1].cTypes[0] )
						nResult = 1;
					pCurrent = pCurrent->pNextRule;
				} // end while( pCurrent && !nResult )
				x++;
			} // end while( nResult && x<ntotext && pthis->pTypes[CACHE_SIZE-x-1] )

			return nResult;
} // end int CheckGrammar( GRAMMAR_DATA *pthis, int ntotest )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE****************************************************************
	FILE		: higlist.c
	DESC		: routines to build, manipulate and free the doublely linked
				  list of HIGGINS structures.
	TABS		: 4
	OWNER		: Brent Hale
	DATE CREATED: 5 Oct 1994

				  Copyright Synergetics 1993, 1994

				  Warning Confidential Material
				  Property of Synergetics
				  Copyright 1993, 1994 All Rights Reserved

	SYNOPSIS:
*END_HEADER*******************************************************************/


#include "dsp.h"
#include "higlist.h"
#include "errors.h"

/*FUNCTION_HEADER**********************
NAME:	AllocateHigginsNode
DESC:	Allocate memory for a frame node.
IN:		None
OUT:	None
RETURN:	ptr to a HIGGINS struct; Return zero if it didn't get memory.
NOTES:
*END_HEADER***************************/
static struct HIGGINS *AllocateHigginsNode(void)
{
	struct HIGGINS *frame;

	if ((frame = (struct HIGGINS *)calloc(1, sizeof(struct HIGGINS))) == NULL) {
		ErrorHandler(OutOfMemory, "in AllocateHigginsNode" );
		return (struct HIGGINS *)0;
	}

	return frame;
}


/*FUNCTION_HEADER**********************
NAME:	AppendNode
DESC:	Adds newNode after the node passed in.
IN:		**node - node to insert after.  If null then newNode is the first
				node in the list which is why it needs to be a ptr ptr.
		*newNode - Node to be inserted.
OUT:
RETURN:	None
NOTES:
*END_HEADER***************************/
static void AppendHigginsNode( struct HIGGINS **node, struct HIGGINS *newNode )
{
	struct HIGGINS *pNode;

	/* Will the new node be the first item in the list? */
	if ( *node == NULL ) {
		*node = newNode;						/* yes */
		newNode->next = NULL;
		newNode->prev = NULL;
		return;
	}

	pNode = *node;								/* So I
don't have to indirect */

	/* Last node on the list? */
	if (pNode->next == NULL) {
```

Docket No.: 132-7.?

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                pNode->next = newNode;                              /* Tack node onto
the end */
                newNode->prev = pNode;
                newNode->next = NULL;                                        /* just to
make sure. */
                return;
        }

        /* Otherwise node is somewhere in the middle of the linked list. */
        newNode->next = pNode->next;
        newNode->prev = pNode;
        pNode->next = newNode;
        newNode->next->prev = newNode;

        return;
}

/*FUNCTION_HEADER**********************
NAME:   CreateHigginsList
DESC:   Create a list numOfNodes long and return it
IN:             numOfNodes - number of nodes to have in the list
OUT:    **hdrNode - ptr ptr to return the beginning of the list back in.
RETURN: ALL_OK if the list was created alright.
                OutOfMemory if I couldn't get the memory needed.
NOTES:
*END_HEADER***************************/
int CreateHigginsList( int numOfNodes, struct HIGGINS **hdrNode )
{
        struct HIGGINS      *newNode, *pCNode;
        int                                 i;

        pCNode = (struct HIGGINS *)NULL;
        for (i = 0; i < numOfNodes; i++ ) {
                newNode = AllocateHigginsNode();
                if (! newNode) {
                        return OutOfMemory;
                }

                if (i == 0) {                                   /* Keep track of the header
node */
                        *hdrNode = newNode;
                }

                AppendHigginsNode( &pCNode, newNode );
                pCNode = newNode;
        }

        return ALL_OK;
}


/*FUNCTION_HEADER**********************
NAME:   FreeHigginsList
DESC:   Free all nodes in a higgins list.
IN:             *hdrNode - ptr to a node to begin deleting at
OUT:
RETURN:
NOTES:
*END_HEADER***************************/
void FreeHigginsList( struct HIGGINS *hdrNode )
{
        struct HIGGINS *pNode, *pNext;

        /* Make sure its not null */
        if ( hdrNode != NULL ) {
                pNode = hdrNode;

                while ( pNode != NULL ) {
                        pNext = pNode->next;

                        free( pNode );
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                pNode = pNext;
                        }
                }
}

#ifdef    USING_OVERLAP
/*FUNCTION_HEADER**********************
NAME:     BumpHigginsList
DESC:     Adjust the list leaving an overlap of data and clearing the rest.
IN:                 **hdrNode - ptr ptr to the header of the linked list.
                    nOverlapNodes - Number of nodes to use as overlap.
OUT:      **hdrNode will be updated to point at the new header node of the list
RETURN:   None
NOTES:
*END_HEADER***************************/
struct HIGGINS * BumpHigginsList( struct HIGGINS **hdrNode, int nOverlapNodes )
{
          struct HIGGINS *pNode, *pNewHdrNode, *pEndNode, *pOldHdrNode;
          struct HIGGINS *pNext, *pPrev;
          int                                     i, loc;

          pOldHdrNode = *hdrNode;

          pNode = *hdrNode;

          assert( FindHigginsNode(pNode));

          /* Get to the last node in the linked list */
          while (pNode->next) {
                    pNode = pNode->next;
                    assert( FindHigginsNode(pNode));
          }
          pEndNode = pNode;                              /* Save a ptr to the last node */

          assert( FindHigginsNode(pEndNode));

          /* Now back up the number of frames we want to preserve for the next run */
          for (i = 0; i < nOverlapNodes-1; i++) {
                    pNode = pNode->prev;
          }
          pNewHdrNode = pNode;                           /* This will be the new header node */

          assert( FindHigginsNode(pNewHdrNode));
          /* The previous node now becomes the end of the list */
          pNewHdrNode->prev->next = NULL;

          /* Make this node the new header of the list */
          pNewHdrNode->prev = NULL;

          /* Connect the old end of list with the old head of the list */
          pEndNode->next = pOldHdrNode;
          pOldHdrNode->prev = pEndNode;

          /* Initialize the 40 nodes that we will be over writing */
          pNode = pOldHdrNode;

          while (pNode != NULL) {
                    pNext = pNode->next;
                    pPrev = pNode->prev;
                    assert( FindHigginsNode(pNode));

                    /* Clear out the node */
                    memset( pNode, 0, sizeof(struct HIGGINS) );

                    pNode->next = pNext;                 /* Link the node back up */
                    pNode->prev = pPrev;
                    pNode = pNext;
          }

          /* Change the loc field in the nodes to be negative values to reflect
                    the fact that we've already looked and analysed this data.  Also zero
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                out the "notProcessed" flag so it won't prevent us from not processing
                it this time through. */
        pNode = pNewHdrNode;
        for (i = loc = 0; i < nOverlapNodes; i++, loc += 256) {
                assert( FindHigginsNode(pNode));

                pNode->loc = loc;
                pNode = pNode->next;
        }

        /* Pass back the new beginning node */
        *hdrNode = pNewHdrNode;

        /* Adjust the linked list so that the last NOverLapNodes nodes are
                at the head of the list.  frame will be advanced past the
                overlap nodes so that processing can begin there. */
        return (pNode);
}
#endif

/*FUNCTION_HEADER**********************
NAME:     ClearHigginsList
DESC:     Clear the values in the nodes.
IN:       *hdrNode - ptr ptr to the header of the linked list.
OUT:
RETURN:   None
NOTES:
*END_HEADER***************************/
void ClearHigginsList( struct HIGGINS *hdrNode )
{
        struct HIGGINS *pNode;
        struct HIGGINS *pNext, *pPrev;

        /* Initialize the 40 nodes that we will be over writing */
        pNode = hdrNode;
        while (pNode != NULL) {
                pNext = pNode->next;
                pPrev = pNode->prev;

                /* Clear out the node */
                memset( pNode, 0, sizeof(struct HIGGINS) );

                pNode->next = pNext;            /* Link the node back up */
                pNode->prev = pPrev;

                pNode = pNext;
        }
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
#include "pascichr.h"

char *PasciiChars[] = {
          /* 01 */ "ee",
          /* 02 */ "-",
          /* 03 */ "i",
          /* 04 */ "-",
          /* 05 */ "A",
          /* 06 */ "-",
          /* 07 */ "e",
          /* 08 */ "-",
          /* 09 */ "a",
          /* 10 */ "-",
          /* 11 */ "-",
          /* 12 */ "-",
          /* 13 */ "-",
          /* 14 */ "a",
          /* 15 */ "-",
          /* 16 */ "-",
          /* 17 */ "oo",
          /* 18 */ "-",
          /* 19 */ "u",
          /* 20 */ "-",
          /* 21 */ "O",
          /* 22 */ "u",
          /* 23 */ "aw",
          /* 24 */ "ah",
          /* 25 */ "-",
          /* 26 */ "o",
          /* 27 */ "ow",
          /* 28 */ "oy",
          /* 29 */ "er",
          /* 30 */ "-",
          /* 31 */ "m",
          /* 32 */ "-",
          /* 33 */ "n",
          /* 34 */ "-",
          /* 35 */ "-",
          /* 36 */ "ng",
          /* 37 */ "-",
          /* 38 */ "-",
          /* 39 */ "p",
          /* 40 */ "b",
          /* 41 */ "t",
          /* 42 */ "d",
          /* 43 */ "-",
          /* 44 */ "-",
          /* 45 */ "-",
          /* 46 */ "-",
          /* 47 */ "c",
          /* 48 */ "g",
          /* 49 */ "-",
          /* 50 */ "-",
          /* 51 */ "-",
          /* 52 */ "-",
          /* 53 */ "-",
          /* 54 */ "-",
          /* 55 */ "-",
          /* 56 */ "-",
          /* 57 */ "f",
          /* 58 */ "v",
          /* 59 */ "th",
          /* 60 */ "th",
          /* 61 */ "z",
          /* 62 */ "-",
          /* 63 */ "-",
          /* 64 */ "-",
          /* 65 */ "sh",
          /* 66 */ "si",
          /* 67 */ "-",
```

```
        /* 68 */ "-",
        /* 69 */ "-",
        /* 70 */ "-",
        /* 71 */ "-",
        /* 72 */ "-",
        /* 73 */ "wh",
        /* 74 */ "-",
        /* 75 */ "-",
        /* 76 */ "h",
        /* 77 */ "-",
        /* 78 */ "-",
        /* 79 */ "-",
        /* 80 */ "-",
        /* 81 */ "-",
        /* 82 */ "y",
        /* 83 */ "-",
        /* 84 */ "-",
        /* 85 */ "w",
        /* 86 */ "-",
        /* 87 */ "-",
        /* 88 */ "-",
        /* 89 */ "-",
        /* 90 */ "11",
        /* 91 */ "-",
        /* 92 */ "-",
        /* 93 */ "-",
        /* 94 */ "r",
        /* 95 */ "-",
        /* 96 */ "-",
        /* 97 */ "-",
        /* 98 */ "-",
        /* 99 */ "-",
        /*100 */ "-",
        /*101 */ "-",
        /*102 */ "-",
        /*103 */ "-",
        /*104 */ "-",
        /*105 */ "-",
        /*106 */ "-",
        /*107 */ "-",
        /*108 */ "-",
        /*109 */ "-",
        /*110 */ "-",
        /*111 */ "-",
        /*112 */ "-",
        /*113 */ "-",
        /*114 */ "-",
        /*115 */ "j",
        /*116 */ "ch",
        /*117 */ "-",
        /*118 */ "-",
        /*119 */ "-",
        /*120 */ "-",
        /*121 */ "-",
        /*122 */ "-",
        /*123 */ "-",
        /*124 */ "-",
        /*125 */ "-",
        /*126 */ "-",
        /*127 */ "-",
};
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*************************************************************
 * pat_anal3.c - Perform pattern recognition on ruler data input.
 *                                     Created for the bogus standards.
 *
 * Warning Confidential Material
 * Property of Synergetics
 * Copyright 1993, 1994 All Rights Reserved
 *
 *************************************************************/
#include "dsp.h"
#include "errors.h"
#include "stdrds.h"
#include "possible.h"

/*FUNCTION_HEADER**********************
NAME:     Find the closest freq in the array.
DESC:
IN:
OUT:
RETURN:
NOTES:    Could speed this up by passing in the array index at which
                we last found a match.  Then we could just start looking there
                and not have to reevaluate lower frequencies.  But, for now...
*END_HEADER***************************/
int FindClosest( int freq, int *arr, int numInArr )
{
        int     i;
        int     diff = 0x7FFF;
        int     closestId = -1;
        int     retval = 0;

        for (i = 0; i < numInArr; i++)
        {
                if (arr[i] && abs(arr[i] - freq) < diff)
                {
                        diff = abs(arr[i] - freq);
                        closestId = i;
                }
        }

        /* Did we find anything at all? */
        if (closestId != -1) {
                retval = arr[closestId];

                /* Zero this element out so that we can never match with it again. */
                arr[closestId] = 0;
        }
        return retval;
}


/*****************************************************************
 *  pat_anal3 - compare a ruler value against a set of patterns to
 *                      determine which sound this is.
 *      IN:
 *              NumberOfValues      -       the number of elements in the MeasuredValues
Array.
 *                                                      For a 2d array this could be
the width x height.
 *              startMatchingId - the index to start matching closest frequencies.  If
 *                                                      no matching is to be done then
startMatchingId should be
 *                                                      equal to MAX_PATTERN_LEN
 *              StandardValues      -       ptr to an array NumberOfValues wide by whatever
high.
 *                                                      The array is Null terminated
in the pascii # element.
 *              MeasuredValues      -       pointer to an array of NumberOfValues x width
```

Docket No.: 13217.5

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
 *                                                   containing the measured values
of the incoming
 *                                                   sound.
 *          Phoneme              -       structure to return the closest phoneme
in.
 *
 *      NOTES:   The Values are arranged thusly:
                     [0] = Relative Amplitude
                     [1] = Zero Crossing Rate
                     [2] = duration
                     [3] = F1
                     [4] = F2
                     [5] = F3
 ******************************************************************/
int
pat_anal3( int NumberOfValues, int startMatchingId, STANDARD *StandardValues,
float *MeasuredValues, POSSIBLE *Phoneme )
{
        int     i,
                j;
#ifdef  DONT_NEED
        int     closestFreq,
                k,
                lastClosestFreq;
#endif

        float   CurDistance = 0,
                tbuffer[MAX_PATTERN_LEN * 2],
                diff;

        memset( Phoneme, 0, MAX_POSSIBILITIES * sizeof(POSSIBLE));
        InitializePossible( Phoneme );
        memset( tbuffer, 0, MAX_PATTERN_LEN * 2 * sizeof(int));

        /*  Find the Standard Value closest to the Measured Value  */
        for (i = 0; StandardValues[i].pascii != 0; i++)
        {
                /*  Calculate the normalized euclidean distance to node for this sound */
                CurDistance =  0;
                memcpy( tbuffer, MeasuredValues, NumberOfValues * sizeof(float) );

                /* Get diffs for Relative Amplitude, zcr, and duration */
                for (j = 0; j < startMatchingId; j++) {
                        if (StandardValues[i].pattern[j]) {
                                if (tbuffer[j]) {
                                        diff = ((float)(tbuffer[j] -
StandardValues[i].pattern[j])
                                                    / (float)tbuffer[j] ) *
100.0;
                                        CurDistance += (diff * diff);
                                }
#ifdef  THINK_ABOUT_THIS
                                else {
                                        CurDistance += 100;
                                }
#endif
                        }
                }

#ifdef  DONT_NEED
                /* Match up standard frequencies with measured ones -
                        Do it without replacement. */
                if ( startMatchingId < MAX_PATTERN_LEN )
                {
                        lastClosestFreq = 0;
                        for (k = startMatchingId; k < MAX_PATTERN_LEN; k++)
                        {
                                /* This takes each value in a standard
                                and tries to find a matching value in the measured. */
                                if (StandardValues[i].pattern[k]) {
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                                closestFreq = FindClosest(
StandardValues[i].pattern[k],
&tbuffer[startMatchingId],
MAX_PATTERN_LEN - startMatchingId );
                                                /* Make sure we didn't match with a freq less than
the
                                                        last one.  If we didn't match at all
then we want
                                                        to take that into account also.  */
                                                if (closestFreq && closestFreq > lastClosestFreq)
{
                                                        lastClosestFreq = closestFreq;
                                                        diff = ((float)(closestFreq -
StandardValues[i].pattern[k])
                                                                                /
(float)closestFreq ) * 100.0;
                                                        CurDistance += (diff * diff);
                                                }
                                        }
                                }
                        }
#endif
                        CurDistance = sqrt(CurDistance);

                        /* Insert current finds in Phoneme from minimum distance to max */
                        pInsert( Phoneme, StandardValues[i].pascii, CurDistance );
                }

                /* Adjust the Euclidean distance to a probability value in the range of 0-100
                 * using the formula (1 - i/sum)/(n-1) * 100.  This way the sum of the
                 * confidence's will add up to 100. */
                Distance2Probability( Phoneme );

                return ALL_OK;
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
#include <stdlib.h>
#include "list.h"
#include "permman.h"
#include "troi.h"
#include "error.h"
//#include "memtest.h"

static list_t      *pGraphNodeList;

typedef struct GRAPH_NODE_TAG {
        unsigned  offFirstSound;
        list_t             *pFromList;     // list of GRAPH_EDGE
        list_t             *pDestList;                    // list of GRAPH_EDGE
        path_elment        *pFromPerms;
} GRAPH_NODE;

typedef struct GRAPH_EDGE_TAG {
        GRAPH_NODE         *pNode;
        DictContext        *pDict;
} GRAPH_EDGE;

/*********************************************************************
ReleasePerms
        Releases the path_element whose pointer was passed in,
        sub_elements of the path_element are also freed.
*********************************************************************/
void ReleasePerms(path_elment *pPerms) {
        switch (pPerms->type) {
                case PT_SOUND:
                break;

                case PT_WORD:
//                      free((DictContext *)pPerms->pElementList);
                break;

                case PT_SEQUENCE:
                case PT_CHOICES: {
 path_elment        *pNextElement,     *pElement;

                        pNextElement = first_in_list(pPerms->pElementList);
                        while ((pElement=pNextElement)!=NULL) {
                                pNextElement = next_in_list(pElement);
                                ReleasePerms(pElement);
                                remove_from_list(pPerms->pElementList, pElement);
                        }
                        destroy_list(pPerms->pElementList);
                        pPerms->pElementList = NULL;
                }
                break;
        }
}

/*********************************************************************
BuildPermDspBuff
        Build the Displayable Buffer for the path_element whose pointer was
        passed in, sub_elements of the path_element are included.
*********************************************************************/
int BuildPermDspBuff(path_elment *pPerms, char *Buff) {
 unsigned char      WordData[256];
 WordContext        WordCntxt;
 unsigned char      *pWordData;
 unsigned short     Flags;
 int                        idxBuff=0;

        switch (pPerms->type) {
                case PT_SOUND:
                        idxBuff += wsprintf(Buff, "[garbage]");
                break;

                case PT_WORD:
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                idxBuff += wsprintf(Buff, "<");
                                for (
                                        pWordData = GetFirstPhonicWord(
                                                (DictContext *)pPerms->pElementList, &WordCntxt,
WordData
                                        );
                                        pWordData;
                                        pWordData = GetNextPhonicWord(
                                                (DictContext *)pPerms->pElementList, &WordCntxt,
WordData
                                        )
                                ) {
                                        Flags = *((unsigned short *)&WordData[1]);
                                        idxBuff += wsprintf(
                                                &Buff[idxBuff], "%s%s",
                                                &WordData[3],
                                                Flags & LAST_WORD ? ">" : ", "
                                        );
                                }
                        break;

                        case PT_SEQUENCE:
                        case PT_CHOICES: {
 path_elment            *pNextElement,          *pElement;

                                idxBuff += wsprintf(Buff, "<");
                                pNextElement = first_in_list(pPerms->pElementList);
                                while ((pElement=pNextElement)!=NULL) {
                                        pNextElement = next_in_list(pElement);
                                        idxBuff += BuildPermDspBuff(pElement, &Buff[idxBuff]);
                                        if (pPerms->type==PT_CHOICES && pNextElement!=NULL) {
                                                idxBuff += wsprintf(&Buff[idxBuff], "|");
                                        }
                                }
                                idxBuff += wsprintf(&Buff[idxBuff], ">");
                        }
                        break;
        }

        return idxBuff;
}

/*************************************************************************
FindNode
        Finds the node of the graph with the given offFirstSound or if it dosen't
        exist creates it.
*************************************************************************/
GRAPH_NODE *FindNode(unsigned offFirstSound, int bCreate) {
 GRAPH_NODE             *pNode;

        pNode = first_in_list(pGraphNodeList);
        while (pNode && pNode->offFirstSound<offFirstSound) {
                pNode = next_in_list(pNode);
        }
        if (pNode==NULL || pNode->offFirstSound!=offFirstSound) {
                if (bCreate) {
                        pNode = insert_before_in_list(pGraphNodeList, pNode);
                        pNode->offFirstSound = offFirstSound;
                        pNode->pDestList = create_list(sizeof(GRAPH_EDGE));
                        pNode->pFromList = create_list(sizeof(GRAPH_EDGE));
                        pNode->pFromPerms = NULL;
                } else {
                        pNode = NULL;
                }
        }

        return pNode;
}

/*************************************************************************
AddEdge
```

Docket No.: 1321?.?

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        Adds an edge to the graph maintained by the premutaion manager.
***********************************************************************/
void AddEdge (
        unsigned offFirstSound, unsigned offPostSound, DictContext *pDict
) {
 GRAPH_NODE *pFromNode,            *pToNode;
 GRAPH_EDGE        *pFromPlace,        *pDestPlace;

        if ((pFromNode = FindNode(offFirstSound, 1)) == NULL) {
                wsprintf(
                        ErrorBuff,
                        "Unable to find/create node for offset %d!", offFirstSound
                );
                DebugOutput(
                        DBF_ERROR, ErrorBuff
                );
                return;
        }
        if ((pToNode = FindNode(offPostSound, 1)) == NULL) {
                wsprintf(
                        ErrorBuff,
                        "Unable to find/create node for offset %d!",
                        offPostSound
                );
                DebugOutput(DBF_ERROR, ErrorBuff);
                return;
        }

        //Add the link to pToNode from pFromNode
        pDestPlace = append_to_list(pFromNode->pDestList);
        pDestPlace->pNode = pToNode;
        if (pDict==NULL) {
                pDestPlace->pDict = pDict;
        } else {
                if ((pDestPlace->pDict = malloc(sizeof(DictContext)))==NULL) {
                        DebugOutput(DBF_ERROR, "Out of memory");
                        return;
                }
                memcpy(pDestPlace->pDict, pDict, sizeof(DictContext));
        }

        //Add the link back to pFromNode from pToNode
        pFromPlace = append_to_list(pToNode->pFromList);
        pFromPlace->pNode = pFromNode;
        pFromPlace->pDict = pDestPlace->pDict;

        // Clears the computed permutations from this node back to where they
        // are already clear
        while (pToNode && pToNode->pFromPerms!=NULL) {
                ReleasePerms(pToNode->pFromPerms);
                pToNode->pFromPerms = NULL;
                pToNode = next_in_list(pToNode);
        }
}

/**********************************************************************
InitPermMan
        Initializes the permutation manager
***********************************************************************/
void InitPermMan(void) {
        pGraphNodeList = create_list(sizeof(GRAPH_NODE));
}

/**********************************************************************
ResetPermMan
        Resets the permutation manager
***********************************************************************/
void ResetPermMan(void) {
 GRAPH_NODE        *pNode,    *pNext;

        pNext = first_in_list(pGraphNodeList);
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        while ((pNode=pNext)!=NULL) {
                pNext = next_in_list(pNode);
                if (pNode->pDestList) {
                        destroy_list(pNode->pDestList);
                }
                if (pNode->pFromList) {
                        destroy_list(pNode->pFromList);
                }
                if (pNode->pFromPerms) {
                        ReleasePerms(pNode->pFromPerms);
                }
                remove_from_list(pGraphNodeList, pNode);
        }
}

/***********************************************************************
QuitPermMan
        Quits the permutation manager
***********************************************************************/
void QuitPermMan(void) {
        ResetPermMan();
        destroy_list(pGraphNodeList);
        pGraphNodeList = NULL;
}

/***********************************************************************
SoundsPermManDetermined
        returns the index of the HIGGINS struct that follows those for which
        the permutaion mannager has all permutaions for the dictionaries in
        use available.
***********************************************************************/
int SoundsPermManDetermined (void) {
 int            cFrom=0,  cTo=0;
 int            cTroiReady,       RetVal=0;
 GRAPH_NODE     *pNode;

        if (Troi.pFirstActiveWord) {
                if ((cTroiReady = Troi.pFirstActiveWord->offFirstSound)!=0) {
                        pNode = first_in_list(pGraphNodeList);
                        while (pNode && pNode->offFirstSound<cTroiReady) {
                                cFrom += count_in_list(pNode->pFromList);
                                if (cFrom==cTo) {
                                        RetVal = pNode->offFirstSound;
                                }
                                cTo += count_in_list(pNode->pDestList);
                                pNode = next_in_list(pNode);
                        }
                }
        }

        return RetVal;
}

/***********************************************************************
dupPathElement2
        Create a duplicate path element
***********************************************************************/
void dupPathElement2(path_elment *pNewElement, path_elment *pOrgElement) {
 path_elment    *pOrgListElement;
 list_t             *pElementList;

        pNewElement->type = pOrgElement->type;
        switch (pOrgElement->type) {
                case PT_WORD:
                        pNewElement->pElementList = pOrgElement->pElementList;
                break;

                case PT_CHOICES:
                case PT_SEQUENCE:
                        pNewElement->pElementList = pElementList = create_list(
                                sizeof(path_elment)
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                        );
                        for (
                                pOrgListElement = first_in_list(
                                        pOrgElement->pElementList
                                );
                                pOrgListElement;
                                pOrgListElement = next_in_list(pOrgListElement)
                        ) {
                                dupPathElement2(append_to_list(pElementList),
pOrgListElement);
                        }
                break;
        }
}

/***********************************************************************
dupPathElement
        Create a duplicate path element
***********************************************************************/
path_elment *dupPathElement(path_elment *OrgElement) {
 path_elment        *RetVal=NULL;

        if (OrgElement) {
                if ((RetVal = malloc(sizeof(path_elment)))==NULL) {
                        DebugOutput(DBF_ERROR, "Out of memory");
                        return RetVal;
                }

                dupPathElement2(RetVal, OrgElement);
        }

        return RetVal;
}

#ifdef DEBUG
/***********************************************************************
ShowEdges
        Debugging function to dump out the edges
***********************************************************************/
void ShowEdges(void) {
 GRAPH_NODE                 *pNode;
 GRAPH_EDGE                 *pFromEdge;
 GRAPH_EDGE                 *pToEdge;
 int                        idxBuff;

        pNode = first_in_list(pGraphNodeList);
        while (pNode) {
                idxBuff = wsprintf(
                        ErrorBuff,
                        "[%d]<", pNode->offFirstSound
                );
                for (
                        pFromEdge=first_in_list(pNode->pFromList);
                        pFromEdge;
                        pFromEdge=next_in_list(pFromEdge)
                ) {
                        idxBuff += wsprintf(
                                &ErrorBuff[idxBuff],
                                "%d ", pFromEdge->pNode->offFirstSound
                        );
                }
                idxBuff += wsprintf(&ErrorBuff[idxBuff], ">{");
                for (
                        pToEdge=first_in_list(pNode->pDestList);
                        pToEdge;
                        pToEdge=next_in_list(pToEdge)
                ) {
                        idxBuff += wsprintf(
                                &ErrorBuff[idxBuff],
                                "%d ", pToEdge->pNode->offFirstSound
                        );
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
			}
			idxBuff += wsprintf(&ErrorBuff[idxBuff], "}");
			DebugOutput(
				DBF_TRACE, ErrorBuff
			);
			pNode = next_in_list(pNode);
		}
		wsprintf(ErrorBuff, "\n");
		DebugOutput(
			DBF_TRACE, ErrorBuff
		);
}
#endif

/**********************************************************************
GetSoundsPermManDetermined
	returns a path_element that has all the permutaions up to cSounds for the
	dictionaries currently in use.
	cSounds must be return value of SoundsPermManDetermined() since the
	last call to AcceptSoundsPermManDetermined().
**********************************************************************/
path_elment *GetSoundsPermManDetermined(int cSounds) {
 GRAPH_NODE		*pNode;
 GRAPH_EDGE		*pFromEdge;
 int			cFromPlaces;
 path_elment	*RetVal=NULL,	*pFromPlace,	*pSequence=NULL;
 path_elment	*pNewElement,	*pChoices=NULL;

	wsprintf(ErrorBuff, "GetSoundsPermManDetermined(%d)", cSounds);
	DebugOutput(DBF_TRACE, ErrorBuff);
	if (
		Troi.pFirstActiveWord
		&& cSounds<=Troi.pFirstActiveWord->offFirstSound
	) {
		if ((pNode=FindNode(cSounds, 0))!=NULL) {
			if (pNode->pFromPerms) {
				return dupPathElement(pNode->pFromPerms);
			} else if ((cFromPlaces=count_in_list(pNode->pFromList))==0) {
				return NULL;		//this is a leaf node
			} else {			// this is where we generate the
Permutaions
				if (cFromPlaces > 1) { // we need to return a PT_CHOICES
					RetVal = pChoices = malloc (
						sizeof(path_elment)
					);
					if (RetVal==NULL) {
						DebugOutput(DBF_ERROR, "Out of memory");
						return RetVal;
					}
					pChoices->type = PT_CHOICES;
					pChoices->pElementList =
create_list(sizeof(path_elment));
				}
				for (
					pFromEdge = first_in_list(pNode->pFromList);
					pFromEdge;
					pFromEdge = next_in_list(pFromEdge)
				) {
					pFromPlace = GetSoundsPermManDetermined(
						pFromEdge->pNode->offFirstSound
					);
					if (
						pFromPlace
						&& pFromPlace->type==PT_SEQUENCE
						&& pChoices==NULL
					) {
						//This edge is from a SEQUENCE and is
the only edge to here
						RetVal = pFromPlace;
						pNewElement = append_to_list(
							pFromPlace->pElementList
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        );
                            } else { //We need to create a SEQUENCE of <<what
was beforethis edge><this edge>>
                                        if (pChoices) {
                                                pSequence =
append_to_list(pChoices->pElementList);
                                        } else {
                                                RetVal = pSequence = malloc (
                                                        sizeof(path_elment)
                                                );
                                                if (RetVal==NULL) {
DebugOutput(DBF_ERROR, "Out of memory");
                                                        return RetVal;
                                                }
                                        }
                                        if (pFromPlace!=NULL) {     //This
edge is from a non-sequence
                                                pSequence->type = PT_SEQUENCE;
                                                pSequence->pElementList =
create_list(
                                                        sizeof(path_elment)
                                                );
                                                pNewElement = append_to_list(
pSequence->pElementList
                                                );
                                                memcpy(
                                                        pNewElement,
pFromPlace, sizeof(path_elment)
                                                );
                                                free(pFromPlace);
//
                                                pNewElement = append_to_list(
pSequence->pElementList
                                                );
                                        } else {  //This edge is from a leaf
node
                                                pNewElement = pSequence;
                                        }
                            }
                            if (pFromEdge->pDict) {
                                        pNewElement->type = PT_WORD;
                                        (DictContext *)pNewElement->pElementList
=
                                                pFromEdge->pDict;
                            } else {
                                        pNewElement->type = PT_SOUND;
                                        pNewElement->pElementList = NULL;
                            }
                    }
            }
            RetVal = dupPathElement(pNode->pFromPerms=RetVal);
        } else {
            DebugOutput(
                    DBF_ERROR,
                    "Invalid call to GetSoundsPermManDetermined()."
            );
        }
    } else {
        DebugOutput(
            DBF_ERROR,
            "Invalid call to GetSoundsPermManDetermined()."
        );
    }

    return RetVal;
}

/**************************************************************************
AcceptSoundsPermManDetermined
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        Removes all permutaions of words for the first cSounds and renumber
        everything.
**********************************************************************/
void AcceptSoundsPermManDetermined(int cSounds) {
 GRAPH_NODE         *pNext,   *pNode;
 GRAPH_EDGE         *pNextFromPlace,    *pFromPlace;

        AcceptSoundsTroiDetermined(cSounds);
        pNext = last_in_list(pGraphNodeList);
        while ((pNode=pNext)!=NULL && pNode->offFirstSound>=cSounds) {
                pNext = prev_in_list(pNode);
                pNode->offFirstSound -= cSounds;
                if (pNode->pFromPerms) {
                        ReleasePerms(pNode->pFromPerms);
                        pNode->pFromPerms = NULL;
                }
                pNextFromPlace = first_in_list(pNode->pFromList);
                while ((pFromPlace=pNextFromPlace) != NULL) {
                        pNextFromPlace = next_in_list(pFromPlace);
                        if (pFromPlace->pNode->offFirstSound < cSounds) {
                                if (pFromPlace->pDict) {
                                        free(pFromPlace->pDict);
                                }
                                remove_from_list(pNode->pFromList, pFromPlace);
                        }
                }
        }
        while ((pNode=pNext)!=NULL) {
                pNext = prev_in_list(pNode);
                if (pNode->pDestList) {
                        destroy_list(pNode->pDestList);
                }
                if (pNode->pFromList) {
                        pNextFromPlace = first_in_list(pNode->pFromList);
                        while ((pFromPlace=pNextFromPlace) != NULL) {
                                pNextFromPlace = next_in_list(pFromPlace);
                                if (pFromPlace->pDict) {
                                        free(pFromPlace->pDict);
                                }
                                remove_from_list(pNode->pFromList, pFromPlace);
                        }
                        destroy_list(pNode->pFromList);
                }
                if (pNode->pFromPerms) {
                        ReleasePerms(pNode->pFromPerms);
                }
                remove_from_list(pGraphNodeList, pNode);
        }

}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
#include <io.h>
#include <dos.h>
#include <mem.h>
#include <fcntl.h>
#include <stdio.h>
#include <sys/stat.h>

#include "phonic.h"


int InitPhonicTree( char *pFileName, DictContext *pDict )
{
        // Open the dictionary file
        pDict->nFile = open( pFileName, O_BINARY|O_RDONLY, S_IREAD );
        if( pDict->nFile == -1 )
                return 1;

        pDict->offCurr = 50L;                   // jrp

        // Read the first PhonicInfo struct
        if ( lseek( pDict->nFile, 50L, SEEK_SET ) == -1)
                return 1;

        if( read( pDict->nFile, &(pDict->Phonic), sizeof(PhonicInfo) ) != sizeof(PhonicInfo) )
                return 1;

        return 0;
} // end int InitPhonicTree( char *pFileName, DictContext *pDict )


void QuitPhonicTree( DictContext *pDict )
{
        // Close the dictionary file
        close( pDict->nFile );
} // end void QuitPhonicTree( DictContext *pDict )


int SearchPhonicTree( DictContext *pDict, unsigned uPhonicCode, EmphasisType eEmphasis, DictContext
*pNewDict, int *pWordFlag )
{
        DictContext CurrDict;

        *pWordFlag = FALSE;

        if( pDict->Phonic.offSon == 0L )
                return FALSE;

        // Get the first node to look at
        CurrDict.offCurr = pDict->Phonic.offSon;
        if (lseek( pDict->nFile, pDict->Phonic.offSon, SEEK_SET ) == -1)
                return 0;

        if ( read( pDict->nFile, &(CurrDict.Phonic), sizeof(PhonicInfo) ) != sizeof(PhonicInfo) )
                return 0;

        // Search the current level for the phonic code
        while( CurrDict.Phonic.PhonicCode != uPhonicCode )
        {
                // Break if there is not a next node
                if( CurrDict.Phonic.offNext == 0L )
                        break;

                CurrDict.offCurr = CurrDict.Phonic.offNext;

                // Get the next node
                if (lseek( pDict->nFile, CurrDict.Phonic.offNext, SEEK_SET ) == -1)
                        return 0;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
			if( read( pDict->nFile, &(CurrDict.Phonic), sizeof(PhonicInfo) ) !=
sizeof(PhonicInfo) )
				return 0;
	} // end while( CurrDict.Phonic.uPhonicCode != uPhonicCode )

	if( CurrDict.Phonic.PhonicCode != uPhonicCode )
		// The phonic code was not found
		return FALSE;

	// Save the current DictContext int pNewDict
	memcpy( pNewDict, pDict, sizeof(DictContext) );
	memcpy( &(pNewDict->Phonic), &(CurrDict.Phonic), sizeof(PhonicInfo) );
	pNewDict->offCurr = CurrDict.offCurr;

	// Check to see if there is a word here
	if( (CurrDict.Phonic.Flags[0]&0x01) != 0 )
		*pWordFlag = TRUE;

	return TRUE;
} // end int SearchPhonicTree( DictContext *pDict, unsigned uPhonicCode, EmphasisType eEmphasis,
DictContext *pNewDict )


WordInfo *GetFirstPhonicWord( DictContext *pDict, WordContext *pWord, WordInfo *pInfo )
{
	int x;
	unsigned char cLen;		// jrp

	// Search to the word in the file
	if ( lseek( pDict->nFile, pDict->offCurr+sizeof(PhonicInfo), SEEK_SET ) == -1)
		return NULL;

	if ( read( pDict->nFile, &cLen, 1 ) == 1 &&					// jrp
		  read( pDict->nFile, pInfo + 1, cLen ) == cLen)				// jrp
		*pInfo = cLen;
			// jrp
	else
		return NULL;


//	x = 0;
//	do
//	{
//		read( pDict->nFile, &(pInfo[x]), 1 );
//	} while( pInfo[x++] != NULL );

	*pWord = pDict->offCurr + sizeof(PhonicInfo) + cLen;			// jrp
	if (pInfo[1] & 0x01)						// jrp
	{				// jrp
		*pWord = NULL;			// jrp
	}				// jrp

	return pInfo;
} // end WordInfo *GetFirstPhonicWord( DictContext *pDict, WordContext *pWord, WordInfo *pInfo )


WordInfo *GetNextPhonicWord( DictContext *pDict, WordContext *pWord, WordInfo *pInfo )
{
	int x;
	unsigned char cLen;		// jrp

	if (*pWord == NULL)		// jrp
	{			// jrp
		return NULL;	// jrp
	}			// jrp
	// Search to the word in the file
	if (lseek( pDict->nFile, *pWord, SEEK_SET ) == -1)			//jrp
		return NULL;

	if ( read( pDict->nFile, &cLen, 1 ) == 1 &&					// jrp
		  read( pDict->nFile, pInfo + 1, cLen ) == cLen)				// jrp
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                *pInfo = cLen;
                        // jrp
        else
                return NULL;
//      x = 0;
//      do
//      {
//              read( pDict->nFile, &(pInfo[x]), 1 );
//      } while( pInfo[x++] != NULL );

        *pWord += cLen;                                                 // jrp
        if (pInfo[1] & 0x01)                                    // jrp
        {                                       // jrp
                *pWord = NULL;                          // jrp
        }                                       // jrp

        return pInfo;
} // end WordInfo *GetNextPhonicWord( DictContext *pDict, WordContext *pWord, WordInfo *pInfo )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/***********************************************
 *                    -- pmi.c --
 *  Copyright Synergetics 1993, 1994
 *
 * Warning Confidential Material
 * Property of Synergetics
 * Copyright 1993, 1994 All Rights Reserved
 ***********************************************/
#include "dsp.h"
#include "bach.h"
#include "lstsqrs.h"
#include "srengine.h"

extern int MaxAmpl; /* The Maximum Ls value for this region */
/* defined in bach.c */
#ifdef FEDERATION
int bachFilters[NFILTERS] = {0, 250, 500, 1000, 1500, 2000, 2500, 3000, 3500,
                             4000, 4500, 5000, 6000, 7000, 8000, 9000, 10000};
#endif

                                        /* a zero will include the fundimental freq, a one will
skip F0 */
#define USEF0 0
/*FUNCTION_HEADER**********************
NAME:    FindLimit
DESC:    Find the four highest Amplitudes then pick the noise floor.
IN:             pAmp - pointer to the amplitude array (Where to look).
OUT:
RETURN:  Noise floor.
NOTES:
*END_HEADER***************************/
#define POINTS 5
int FindLimit( int *pAmp )
{
        int             i,
                        j,
                        k;

        int             MaxAmp[POINTS];

        for (i = USEF0; i < POINTS; i++)
                MaxAmp[i] = 0;

        for (i = USEF0; i < NFILTERS; i++)
        {
                for (j = 0; j < POINTS; j++)
                {
                        if (pAmp[i] > MaxAmp[j])
                        {
                                for (k = (POINTS -1); k > j; k--)
                                {
                                        MaxAmp[k] = MaxAmp[k-1];
                                }

                                MaxAmp[j] = pAmp[i];
                                break;
                        }
                }
        }

        for (i = (POINTS -1); i >= 0; i--)
                if ( MaxAmp[i] != 0 )
                        break;

        return MaxAmp[i];
}

/*FUNCTION_HEADER**********************
NAME:    FindRange
DESC:    Return half of the bandwidth that the target frequency is within.
```

Docket No.: 132[illegible]

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
IN:                 freq - Target frequency.
OUT:
RETURN:   half of the bandwidth freq is within.
NOTES:
*END_HEADER***************************/
int FindRange( int freq )
{
        int             i;

        for (i = 0; i < NFILTERS; i++)
        {
                if ( freq > bachFilters[i] &&
                        freq < bachFilters[i+1])
                        return ((int)(((bachFilters[i+1] - bachFilters[i]) / 2) + 0.5));
        }
        return 0;       /* satifies the compiler but it should never get here */
}


/*FUNCTION_HEADER**********************
NAME:   FindCloseFreq
DESC:   Find a close frequency in a node
IN:             freq - Frequency to find the freq close to
                range - Plus or Minus amount to search within
                *pFormants - list of possible frequencies to search.
OUT:
RETURN:  0 - if no frequency was close to the target frequency
                freq of the average of all frequencies in the range.
NOTES:
*END_HEADER***************************/
int FindCloseFreq( int Limit, int freq, int range, struct HIGGINS *frame )
{
        int             i;
        int             sum = 0;
        int             sumCount = 0;

        for (i = USEF0; i < NFILTERS; i++)
        {
                if ( frame->ampl[i] > Limit
                                &&
                        (frame->ffreq[i] > (freq - range)
                                &&
                                frame->ffreq[i] < (freq + range)))
                {
                        sum += frame->ffreq[i];
                        sumCount++;
                }
        }

        if (sumCount)
                return ((int)(sum / sumCount + 0.5));

        else
                return 0;
}


/*FUNCTION_HEADER**********************
NAME:   CalcSlope
DESC:   Given a maximum of 3 points, find the average.
IN:             pValues - ptr to 3 values.  If there are only two points then pValues[2]
                                is the location that should be zero.
OUT:
RETURN:  0 - if only one value to look at or if the slope is really zero.
NOTES:
*END_HEADER***************************/
int CalcSlope( int *pValues )
{

        /* Now calculate the slope with what we found */
        if (pValues[0] && pValues[2])
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
			return ((int)(fabs(LeastSquares(pValues, 3, SLOPE))));

		else if (pValues[2] != 0)				/* were both [0] and [2] zero?
*/
			return abs(pValues[2] - pValues[1]);

		else if (pValues[0] != 0 )
			return abs(pValues[1] - pValues[0]);

		else
			return 0;

}


/*****************************************************************
 * SmoothSumSlope - Use a 3pt average to smooth the sumSlope value.
 *****************************************************************/
void
SmoothSumSlope( struct HIGGINS *frmstart )
{
		struct HIGGINS *frame = frmstart;
		int counter,
			values[3];

		while ( frame != NULL )
		{
			if ( frame->type != 'V' )
			{
				frame = frame->next;
				continue;
			}

			counter = 0;

			if ( frame->prev != NULL &&
					frame->prev->type == 'V' )
			{
				values[0] = frame->prev->sumSlope;
				counter++;
			}
			else
				values[0] = 0;

			values[1] = frame->sumSlope;
			counter++;

			if ( frame->next != NULL &&
					frame->next->type == 'V' )
			{
				values[2] = frame->next->sumSlope;
				counter++;
			}
			else
				values[2] = 0;

			frame->sumSlope = (values[0] + values[1] + values[2]) / counter;

			frame = frame->next;
		}

}


/*****************************************************************
 * CalcSumSlope - At each node in the HIGGINS list find the slope
 * of each formant and sum the absolute value of the slopes.  This
 * number is an indication of the rate of change of all of the
 * formants at each node.
 *****************************************************************/
void
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
CalcSumSlope( struct HIGGINS *frmstart )
{
        struct HIGGINS *frame = frmstart;
        int     i,
                range,
                values[3],
                counter;

        int     CurrLimit = 0,
                PrevLimit = 0,
                NextLimit = 0;


        /*  Calculate the sumSlope for each node  */
        while ( frame != NULL )
        {
                frame->pmi = 0;
                frame->sumSlope = 0;

                /*  Find a voiced node */
/*              if ( frame->type != 'V' )                       May want to go back to this */
                if ( frame->type == 'Q' )
                {
                        frame = frame->next;
                        continue;
                }

                counter = 0;        /* only allow 4 formants */
                memset( values, 0, 3 * sizeof(int) );

#define LIMIT_HERE
#ifdef LIMIT_HERE
                CurrLimit = FindLimit( frame->ampl );

                if ( frame->prev != NULL && frame->prev->type == 'V' )
                        PrevLimit = (PrevLimit = FindLimit( frame->prev->ampl )) < CurrLimit ?
PrevLimit : CurrLimit;

                if ( frame->next != NULL && frame->next->type == 'V' )
                        NextLimit = (NextLimit = FindLimit( frame->next->ampl )) < CurrLimit ?
NextLimit : CurrLimit;
#endif

                                        /* Do not include the fundimental */
                for ( i = 1; i < NFILTERS; i++ )
                {
                        if ( frame->ffreq[i] == 0 )
                                continue;

#ifdef LIMIT_HERE
                        if ( (frame->type == 'V' &&
                                        frame->ampl[i] < CurrLimit) ||
                                        counter > 4 )
                                break;
#else
                        if ( frame->type == 'V' )
                        {
                                if ( frame->ffreq[i] > 4500 || counter > 4 )
                                        break;
                        }
#endif

                        range = FindRange( frame->ffreq[i] );
                        if ( frame->prev != NULL && frame->prev->type != 'Q' )
                                values[0] = FindCloseFreq( PrevLimit, frame->ffreq[i],
range, frame->prev );

                        values[1] = frame->ffreq[i];

                        if ( frame->next != NULL && frame->next->type != 'Q' )
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        values[2] = FindCloseFreq( NextLimit, frame->ffreq[i],
range, frame->next );

                                frame->sumSlope += CalcSlope( values );
                                counter++;

                        }

                        if ( counter > 0 )
                                frame->sumSlope = frame->sumSlope / counter;


                        /* keep track of the number of formants that went into sumSlope */
                        frame->pmi = counter;

                        frame = frame->next;
                }
}


/*******************************************************************
 * FindPMI1 - Find all the minimums in the sumSlope data.
 *******************************************************************/
void FindPMI1( struct HIGGINS *frmstart )
{
        struct HIGGINS *frame = frmstart;
        int             flag,
                        m1, m2;
        int             minimums[NumberOfNodes][2];
        int             mincnt = 0;


        /* Don't do anything with the last node in the list */

        while ( frame != NULL )
        {
                if (frame->type != 'V')
                {
                        flag = FALSE;
                        frame->pmi = 0;
                        frame = frame->next;
                        continue;
                }

                /* make sure that there were at least two formants in sumSlope */
                if ( frame->pmi < 2 )
                {
                        frame->pmi = 0;
                        frame = frame->next;
                        continue;
                }

                /* STARTUP - If this is the first point after a non voiced section then
                        pick the first point after the sound gets going.
          */
                if ( flag == FALSE &&
                        ((float)frame->Ls / (float)MaxAmpl) > .3 )
                {
                        flag = TRUE;
                        minimums[mincnt][0] = frame->sumSlope;
                        minimums[mincnt][1] = frame->loc;
                        frame->pmi = 1;                         /* Flag that this microbe is a
pmi */
                        mincnt++;
                }

                /* MINIMUM - Is this one, less than both the next and previous values? */
                else if ( frame->prev != NULL &&
                                        frame->next != NULL &&
                                        frame->sumSlope < frame->prev->sumSlope &&
                                        frame->sumSlope <= frame->next->sumSlope )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
				{
					minimums[mincnt][0] = frame->sumSlope;
					minimums[mincnt][1] = frame->loc;
					frame->pmi = 1;				/* Flag that this microbe is a
pmi */

					if ( frame->next != NULL )	/* don't allow any other pmi within 2
microbes */
					{
						frame = frame->next;
						frame->pmi = 0;
					}
					mincnt++;
					flag = TRUE;
				}

				/* INFLECTION - The slope coming into and leaving this point
				 * differ greatly like _/ or \_ */
				else if ( frame->prev != NULL &&
							frame->next != NULL &&
							frame->prev->pmi == 0 &&
							frame->next->pmi == 0 )
				{
					m1 = frame->sumSlope - frame->prev->sumSlope;
					m2 = frame->next->sumSlope - frame->sumSlope;
					if ( (m1 > 0 && m2 > 0 && abs(m2) > abs(m1 * 4)) ||
						(m1 < 0 && m2 < 0 && abs(m1) > abs(m2 * 4)) )
					{
						minimums[mincnt][0] = frame->sumSlope;
						minimums[mincnt][1] = frame->loc;
						frame->pmi = 1;
						mincnt++;
						flag = TRUE;
					}
					else
						frame->pmi = 0;
				}

				else
					frame->pmi = 0;

				frame = frame->next;
		}
}

/*****************************************************************
 * CorrPMIToLs - Correlate PMI to Ls.  Each of the PMI points should
 * correlate to a max in the Ls (envelope) data and a min in the
 * sumSlope data.  It may be off by one time segment but not much
 * more than that.
 *****************************************************************/
void FindPMI2( struct HIGGINS *frmstart )
{
		struct HIGGINS *frame = frmstart;
		BOOLEAN FirstTime;

		while ( frame != NULL )
		{

				if ( frame->type != 'V' ||
					frame->prev == NULL ||
					frame->next == NULL )
				{
					frame->pmi = 0;
					frame = frame->next;
					continue;
				}

				FirstTime = TRUE;

				while ( frame != NULL  &&
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                frame->next != NULL &&
                                frame->type == 'V' )
                {
                        /* make sure that there were at least two formants that went into
                                calculating sumSlope */

                        if ( frame->pmi < 2 )
                        {
                                frame->pmi = FALSE;
                                frame = frame->next;
                                continue;
                        }

                        frame->pmi = FALSE; /*  reinitialize to 0  */

                        /*  Find the mins in the sumSlope  data */
                        if ( frame->sumSlope > frame->prev->sumSlope ||
                                frame->sumSlope > frame->next->sumSlope )
                        {
                                /*  This point is not a min  */
                                /*  Don't drop through if it's not the FirstTime */
                                if ( FirstTime != TRUE )
                                {
                                        frame = frame->next;
                                        continue;
                                }
                        }

                        /*  The first time into a voiced section find either the first max in
Ls
                                or the first min in sumSlope as the first PMI.  */
                        else if ( FirstTime &&
                                                frame->prev->type == 'V')
                        {
                                /* its a min in sumSlope and FirstTime is true   */
                                FirstTime = FALSE;
                                frame->pmi = TRUE;
                                frame = frame->next;                    /*  Don't want to
drop any further if this is the FirstTime  */
                                continue;
                        }

                        /*  Find the maxs in the Ls  */
                        /* is this point a max? */
                        if ( frame->Ls > frame->prev->Ls &&
                                frame->Ls > frame->next->Ls )
                        {
                                FirstTime = FALSE;
                                frame->pmi = TRUE;
                        }

                        else if ( FirstTime == TRUE )
                        {
                                /*  Don't check any further if we're still looking for the
FirstTime  */
                                frame = frame->next;
                                continue;
                        }

                        else if ( frame->prev->prev != NULL &&
                                                frame->prev->prev->type == 'V' )
                        {
                                /* is this point a max? */
                                if ( frame->prev->Ls < frame->Ls && frame->next->Ls <
frame->Ls )
                                {
                                                frame->pmi = TRUE;
                                }
                                /* is the previous point a max? */
                                else if ( frame->prev->Ls > frame->prev->prev->Ls &&
                                        frame->prev->Ls > frame->Ls )
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        {
                                                        frame->pmi = TRUE;
                                        }
                                        /* is the previous-previous point a max? */
                                        else if ( frame->prev->prev->prev != NULL &&
                                                                frame->prev->prev->prev->type
== 'V' &&
                                                                frame->prev->prev->Ls >
frame->prev->prev->prev->Ls &&
                                                                frame->prev->prev->Ls >
frame->prev->Ls )
                                        {
                                                        frame->pmi = TRUE;
                                        }
                                }

                                else if ( frame->next->next != NULL &&
                                                        frame->next->next->type == 'V' )
                                {
                                        /* is the next point a max? */
                                        if ( frame->next->Ls > frame->next->next->Ls &&
                                                frame->next->Ls > frame->Ls )
                                        {
                                                        frame->pmi = TRUE;
                                        }

                                        /* is the next-next point a max? */
                                        else if ( frame->next->next->next != NULL &&
                                                                frame->next->next->next->type
== 'V' &&
                                                                frame->next->next->Ls >
frame->next->next->next->Ls &&
                                                                frame->next->next->Ls >
frame->next->Ls )
                                        {
                                                        frame->pmi = TRUE;
                                        }
                                }
                                frame = frame->next;
                        }       /*  End of first while loop  */

                }               /*  End of second while loop  */
}

/***************************************************************************
 * FindPMI3 - Select PMI points on the maxs of Ls over the first half of
 * a voiced section and from the mins of sumSlope over the back half.
 ***************************************************************************/
void FindPMI3( struct HIGGINS *frmstart )
{
        struct HIGGINS *frame = frmstart,
                                                        *endframe;
        int max,
                reachedmax;

        while ( frame != NULL )
        {
                /*  Find the beginning voiced section  */
                if ( frame->type != 'V'  )
                {
                        /*  can't have a pmi this close to the end of the data  */
                        frame->pmi = 0;
                        frame = frame->next;
                        continue;
                }

                /*  Find the ending voiced section  */
                endframe = frame;
                max = 0;
                while( endframe->next != NULL &&
                                endframe->next->type == 'V' )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
			{
				if ( endframe->Ls > max )
					max = endframe->Ls;

				endframe = endframe->next;
			}

			while ( frame != endframe )
			{
				/* make sure that there were at least two formants in sumSlope */
				if ( frame->pmi < 2 )
				{
					frame->pmi = 0;
					frame = frame->next;
					continue;
				}

				frame->pmi = reachedmax = 0;  /*  reinitialize to 0  */

				if ( frame->prev != NULL &&
					 frame->next != NULL &&
					 frame->prev->type == 'V' &&
					 frame->next->type == 'V' )
				{
					if ( !reachedmax )
					{
						if ( frame->Ls > frame->prev->Ls &&
								frame->Ls > frame->next->Ls )
							frame->pmi = TRUE;
						if ( frame->Ls == max )
							reachedmax = 1;
					}
					else if ( frame->sumSlope < frame->prev->sumSlope &&
								frame->sumSlope <
frame->next->sumSlope )
					{
						frame->pmi = TRUE;
					}
				}
				frame = frame->next;
			}

			frame = frame->next;
		}
}

/************************************************************
 * FindUnvoicedPMI - Find one maximum in the Ls data for each
 * unvoiced section and label it the PMI.
 ***********************************************************/
void
FindUnvoicedPMI( struct HIGGINS *frmstart )
{
	struct HIGGINS *frame = frmstart,
							*maxframe;
	int max;

	while ( frame != NULL )
	{
		/*  Find the beginning voiced section  */
		if ( frame->type != 'U'  )
		{
			frame = frame->next;
			continue;
		}

		/*  Find the node with the greatest Ls in this unvoiced section  */
		maxframe = frame;
		max = 0;
		while( frame != NULL &&
				frame->type == 'U' )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                {
                        if ( frame->Ls > max )
                        {
                                max = frame->Ls;
                                maxframe = frame;
                        }

                        frame = frame->next;
                }

                maxframe->pmi = TRUE;

        }

}

/***********************************************************************
 * PMIDuration - Determine the number of nodes in the list since the onset
 * of this word or since the last PMI.
 ***********************************************************************/
void
PMIDuration( struct HIGGINS *frmstart)
{
        struct HIGGINS *frame = frmstart,
                                                *tframe;
        int counter;

        while ( frame != NULL )
        {
                if ( frame->type != 'V' &&
                        frame->type != 'U' )
                {
                 frame = frame->next;
                 continue;
                }

                if ( frame->type == 'V' )
                {
                        counter = 0;
                        while ( frame != NULL &&
                                        frame->type == 'V' )
                        {
                                counter++;
                                if ( frame->pmi == TRUE )
                                {
                                        frame->pmi = counter;
                                        counter = 0;
                                }

                                frame = frame->next;
                        }
                }

                /* Duration for unvoiced pmi is the length of the unvoiced section */
                else if ( frame->type == 'U' )
                {
                        counter = 0;
                        tframe = NULL;
                        while ( frame != NULL &&
                                        frame->type == 'U' )
                        {
                                counter++;
                                if ( frame->pmi == TRUE )
                                        tframe = frame;
                                frame = frame->next;
                        }
                        if ( tframe != NULL )
                                tframe->pmi = counter;
                }

        }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
}

/***********************************************************************
 * OnlyOnePoint -- Pick the lowest sumslope of continuous pmi points
 ***********************************************************************/
void
OnlyOnePoint( struct HIGGINS *frmstart)
{
        int Found = FALSE;

        struct HIGGINS *frame = frmstart;
        struct HIGGINS *StartPmiZone;
        struct HIGGINS *EndPmiZone;

        float LowestSlope = 1000;           /* some large number to start off with. */

        while ( frame != NULL )
        {
                                            /* Find the (first/next) PMI
(point/zone) */
                while ( frame->pmi != TRUE && frame->next != NULL )
                {
                        frame = frame->next;
                }

                StartPmiZone = frame;

                while ( frame->pmi == TRUE && frame->next != NULL )
                {
                        frame = frame->next;
                }

                EndPmiZone = frame;

                frame = StartPmiZone;
                while ( frame < EndPmiZone )
                {
                        if ( frame->sumSlope < LowestSlope )
                                LowestSlope = frame->sumSlope;

                        frame = frame->next;
                }

                frame = StartPmiZone;
                while (frame < EndPmiZone )
                {
                        if ( frame->sumSlope > LowestSlope && Found == FALSE )
                        {
                                frame->pmi = FALSE;
                                Found = TRUE;
                        }

                        frame = frame->next;
                }

                frame = EndPmiZone->next;
        }
}
/***********************************************************************
 * OutputMinimums - ???
 ***********************************************************************/
#ifdef  OUTPUT_MINIMUMS
void
OutputMinimums( int **minimums, int mincnt )
{
        extern FILE         *minfptr;
        extern struct COMMANDLINE clo;
        int                 i;

        if (minfptr != NULL) {
                for (i = 0; i < mincnt; i++) {
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                printf("%ld", GetFileLocation( minimums[i][1]) );
                                printf("\t%d\n", minimums[i][0] );

                                fprintf(minfptr, "%ld", GetFileLocation( minimums[i][1] );
                                fprintf(minfptr, "\t%d\n", minimums[i][0] );
                        }
                }
}
#endif

/*FUNCTION_HEADER**********************
NAME:       PointMaxIntelligence
DESC:       Calculate the point of Maximum Intelligence
IN:                 *frmstart - ptr to node in the HIGGINS list containing info for
                                        this 10240 section of data.
OUT:
RETURN:
NOTES:
                    1) Take the minimum 2 pt slope and use it.
                            a) For each node, decide which nodes to use: Don't want to look
                                    at Quiets or Unvoiced.
                                    Use:
                                            V-V-V     Q-V-V     V-V-Q
                    2) Find the minimum sum of slopes across the HIGGINS list.
*END_HEADER***************************/
void
PointMaxIntelligence( struct HIGGINS *frmstart )
{
        CalcSumSlope( frmstart );
        SmoothSumSlope( frmstart );
        SmoothSumSlope( frmstart );
        FindPMI2( frmstart );
        FindUnvoicedPMI( frmstart );
/*      OnlyOnePoint( frmstart );  There is a problem here some doubles are getting through */
        PMIDuration( frmstart);

}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE*************************************************************
        FILE            : possible.c
        DESC            : Routines to handle the possibilities array
        TABS            : 3
        OWNER           : Brent Hale
        DATE CREATED: 27 Oct 1994

                                        Copyright Synergetics 1993, 1994

                                        Warning Confidential Material
                                        Property of Synergetics
                                        Copyright 1993, 1994 All Rights Reserved

        SYNOPSIS:
*END_HEADER*****************************************************************/

#include "srengine.h"
#include "dsp.h"
#include "possible.h"

/*FUNCTION_HEADER**********************
NAME:           InitializePossible
DESC:           Initialize a POSSIBLE's array.
IN:
OUT:
RETURN:
NOTES:
*END_HEADER***************************/
void InitializePossible( POSSIBLE *Phoneme )
{
        int             i;

        /* Init the data areas - sqrt(((meas - std) / std)**2 * NumberOfValues) must
                be less than Confidence 8100 = 90**2, 90% is the worst allowable match */
#ifdef  UNTIL_BETTER
        float   Confidence = 0,

        Confidence = sqrt( (double)8100 * (double)NumberOfValues );
        for ( i = 0; i < MAX_POSSIBILITIES; i++ )
        {
                Phoneme[i].p = UNKNOWN_PATH;
                Phoneme[i].c = Confidence;
        }
#else
        for ( i = 0; i < MAX_POSSIBILITIES; i++ ) {
                Phoneme[i].p = UNKNOWN_PATH;
                Phoneme[i].c = 0x7FFF;
        }
#endif
}

/*FUNCTION_HEADER**********************
NAME:   pInsert
DESC:   Insert a new value into a POSSIBLE array
IN:
OUT:
RETURN:
NOTES:
*END_HEADER***************************/
void pInsert( POSSIBLE *pArray, int Pascii, float Confidence )
{
        int     i,
                        Index = 0;

        for ( i = 0; i < MAX_POSSIBILITIES; i++ )
        {
                /*  Find the index where this Confidence value fits in ascending order */
                if ( Confidence < pArray[i].c )
                        break;
        }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

Docket No.: 13217.2

```
        if ( i < MAX_POSSIBILITIES )
        {
                Index = i;

                /*  Push everything up in the array  */
                for ( i = (MAX_POSSIBILITIES - 1); i > Index; i-- )
                {
                        pArray[i].p = pArray[i-1].p;
                        pArray[i].c = pArray[i-1].c;
                }

                /*  Insert the new value  */
                pArray[Index].p = Pascii;
                pArray[Index].c = Confidence;
        }
        return;
}

/*FUNCTION_HEADER*********************
NAME:           Distance2Probability
DESC:           Adjust the Euclidean distance to a probability value in the range of 0-100
                        using the formula (1 - i/sum)/(n-1) * 100.  This way the sum of the
                        confidence's will add up to 100.
IN:             *Phoneme - ptr to the possiblities array to convert.
OUT:
RETURN:
NOTES:
*END_HEADER***************************/
void Distance2Probability( POSSIBLE *Phoneme )
{
        int             i, sum, sumcnt;

        /* Adjust the Euclidean distance to a probability value in the range of 0-100
         * using the formula (1 - i/sum)/(n-1) * 100.  This way the sum of the
         * confidence's will add up to 100. */
        for ( i = sum = sumcnt = 0; i < MAX_POSSIBILITIES; i++ )
        {
                if ( Phoneme[i].p != UNKNOWN_PATH ) {
                        sum += Phoneme[i].c + 0.5;
                        sumcnt++;
                }
        }

        sumcnt--;                                                       /* get the
n - 1 value */
        for ( i = 0; i < MAX_POSSIBILITIES; i++ )
        {
                if ( sum > 0 )
                {
                        if ( Phoneme[i].p != UNKNOWN_PATH )
                                Phoneme[i].c = (1.0 - (Phoneme[i].c / (float)sum)) / sumcnt
* 100.0;
                        else
                                Phoneme[i].c = 0;
                }
                else
                        Phoneme[i].c = 0;
        }
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE*************************************************************
        FILE            : probable.c
        DESC            : Probablity tables.
        TABS            : 4
        OWNER           : Brent Hale
        DATE CREATED: 22 Oct 1994

                                            Copyright Synergetics 1993, 1994

                                            Warning Confidential Material
                                            Property of Synergetics
                                            Copyright 1993, 1994 All Rights Reserved

        SYNOPSIS:
*END_HEADER******************************************************************/

double Probability[400] = {
1.00000, 0.992020, 0.984040, 0.976060, 0.968100, 0.960120, 0.95216, 0.944200, 0.936000, 0.928280,
0.92034, 0.912420, 0.904480, 0.896560, 0.888660, 0.880760, 0.87288, 0.865020, 0.857160, 0.849320,
0.84148, 0.833660, 0.825880, 0.818100, 0.810340, 0.802580, 0.79486, 0.787160, 0.779480, 0.771820,
0.76418, 0.756560, 0.748980, 0.741400, 0.733860, 0.726340, 0.71884, 0.711380, 0.703940, 0.696540,
0.68916, 0.681800, 0.674480, 0.667200, 0.659940, 0.652720, 0.64552, 0.638360, 0.631240, 0.624140
0.61708, 0.610060, 0.603060, 0.596120, 0.589200, 0.582320, 0.57548, 0.568680, 0.561920, 0.555200,
0.54850, 0.541860, 0.535260, 0.528700, 0.522180, 0.515700, 0.50926, 0.502860, 0.496500, 0.490200,
0.48394, 0.477700, 0.471520, 0.465400, 0.459300, 0.453260, 0.44726, 0.441300, 0.435400, 0.429540,
0.42372, 0.417940, 0.412220, 0.406540, 0.400920, 0.395320, 0.38980, 0.384300, 0.378860, 0.373460,
0.36812, 0.362820, 0.357580, 0.352380, 0.347220, 0.342120, 0.33706, 0.332060, 0.327080, 0.322180,
0.31732, 0.312500, 0.307740, 0.303020, 0.298340, 0.293720, 0.28914, 0.284620, 0.280140, 0.275720,
0.27134, 0.267000, 0.262720, 0.258480, 0.254300, 0.250140, 0.24606, 0.242000, 0.238000, 0.234060,
0.23014, 0.226280, 0.222460, 0.218700, 0.214980, 0.211300, 0.20768, 0.204080, 0.200540, 0.197060,
0.19360, 0.190200, 0.186840, 0.183520, 0.180240, 0.177020, 0.17384, 0.170700, 0.167580, 0.164540,
0.16152, 0.158540, 0.155620, 0.152720, 0.149880, 0.147060, 0.14430, 0.141560, 0.138880, 0.136220,
0.13362, 0.131040, 0.128520, 0.126020, 0.123560, 0.121140, 0.11876, 0.116420, 0.114100, 0.111840,
0.10960, 0.107400, 0.105240, 0.103100, 0.101000, 0.098940, 0.09692, 0.094920, 0.092960, 0.090840,
0.08914, 0.087260, 0.085440, 0.083640, 0.081860, 0.080120, 0.07840, 0.076720, 0.075080, 0.073460,
0.07186, 0.070300, 0.068760, 0.067260, 0.065780, 0.064320, 0.06288, 0.061480, 0.060100, 0.058760,
0.05744, 0.056140, 0.054860, 0.053600, 0.052380, 0.051180, 0.05000, 0.048840, 0.047700, 0.046600,
0.04550, 0.044440, 0.043380, 0.042360, 0.041360, 0.040360, 0.03940, 0.038460, 0.037520, 0.036620,
0.03572, 0.034860, 0.034000, 0.033180, 0.122360, 0.031560, 0.03078, 0.030000, 0.029260, 0.028520,
0.02780, 0.027100, 0.026420, 0.025740, 0.025100, 0.024440, 0.02382, 0.023200, 0.022600, 0.022020,
0.02144, 0.020880, 0.020340, 0.019800, 0.019280, 0.018780, 0.01828, 0.017780, 0.017320, 0.016840,
0.01640, 0.015960, 0.015520, 0.015100, 0.014680, 0.014280, 0.01390, 0.013520, 0.013140, 0.012780,
0.01242, 0.012080, 0.011740, 0.011400, 0.011080, 0.010780, 0.01046, 0.010160, 0.009880, 0.009600,
0.00932, 0.009060, 0.008800, 0.008540, 0.008300, 0.008040, 0.00782, 0.007580, 0.007360, 0.007140,
0.00694, 0.006720, 0.006520, 0.006340, 0.006140, 0.005960, 0.00578, 0.005600, 0.005440, 0.005280,
0.00512, 0.004960, 0.004800, 0.004660, 0.004520, 0.004380, 0.00424, 0.004100, 0.003980, 0.003860,
0.00374, 0.003620, 0.003500, 0.003380, 0.003280, 0.003180, 0.00308, 0.002980, 0.002880, 0.002780,
0.00270, 0.002620, 0.002520, 0.002440, 0.002360, 0.002280, 0.00222, 0.002140, 0.002060, 0.002000,
0.00194, 0.001880, 0.001800, 0.001740, 0.001680, 0.001640, 0.00158, 0.001520, 0.001480, 0.001420,
0.00138, 0.001320, 0.001280, 0.001240, 0.001200, 0.001160, 0.00112, 0.001080, 0.001040, 0.001000,
0.00096, 0.000940, 0.000900, 0.000860, 0.000840, 0.000800, 0.00078, 0.000760, 0.000720, 0.000700
0.00068, 0.000640, 0.000620, 0.000600, 0.000580, 0.000560, 0.00054, 0.000520, 0.000500, 0.000480.
0.00046, 0.000440, 0.000440, 0.000420, 0.000400, 0.000380, 0.00038, 0.000360, 0.000340, 0.000340,
0.00032, 0.000300, 0.000300, 0.000280, 0.000280, 0.000260, 0.00026, 0.000240, 0.000240, 0.000220,
0.00022, 0.000200, 0.000200, 0.000200, 0.000180, 0.000180, 0.00016, 0.000160, 0.000160, 0.000160,
0.00014, 0.000140, 0.000140, 0.000120, 0.000120, 0.000120, 0.00012, 0.000100, 0.000100, 0.000100,
0.00010, 0.000100, 0.000080, 0.000080, 0.000080, 0.000080, 0.00008, 0.000080, 0.000060, 0.000060
};

/****************************************************************************
        This is the .975 column of the student distribution curve.
        Values 1-30 inclusive are uniquiely identified.
        then values 40, 60, 120, infinity.
                                            if (n > 30 && n < 35 )
                                                    Index = 30;
                                            else if (n >= 35 && n < 45 )
                                                    Index = 31;
                                            else if (n >= 45 && n < 90 )
                                                    Index = 32;
                                            else if (n >= 90 && n < 500 )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        Index = 33;
                                else if (n >= 500 )
                                        Index = 34;
****************************************************************************/


double Prediction[35] = {
0,        /* PLACE HOLDER TO OFFSET FROM ZERO */
12.706, 4.303, 3.182, 2.776, 2.571, 2.447, 2.365, 2.306, 2.262, 2.228, 2.201, 2.179, 2.160, 2.145
 2.131, 2.120, 2.101, 2.093, 2.086, 2.080, 2.074, 2.069, 2.064, 2.060, 2.056, 2.052, 2.048, 2.045
 2.042, 2.021, 2.000, 1.980, 1.960
 };
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
// simpleio.c

#include <stdio.h>
#include <windows.h>

#include "simpleio.h"

static int idComDev;

void InitCom(int port)
{
        int err;
        DCB dcb;
        COMSTAT CommStat;

        idComDev = OpenComm("COM2", 1024, 128);
        GetCommError(idComDev, &CommStat);

        if (idComDev < 0)
        {
                printf("OpenComm %d error\n", idComDev);
                return;
        }

        err = BuildCommDCB("COM2:9600,n,8,1", &dcb);
        if (err < 0) {
                printf("BuildCommDCB %d error\n", err);
                return;
        }

        err = SetCommState(&dcb);
        if (err < 0) {
                printf("SetCommState %d error\n", err);
                return;
        }
}

void QuitCom(void)
{
        CloseComm(idComDev);
}

char GetComByte(void)
{
        char Byte;
        int count;

        do
        {
                MSG Msg;

                count = ReadComm(idComDev, &Byte, 1);
                if (GetMessage(&Msg, NULL, 0, 0))
                {
                        TranslateMessage(&Msg);
                        DispatchMessage(&Msg);
                }
        } while (count == 0);

        WriteComm(idComDev, &Byte, 1);

        return Byte;
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
void SendComStr(char *pStr)
{
        char RcvByte;
        int rc;
        int count;
        COMSTAT CommStat;

        do
        {
                rc = WriteComm(idComDev, pStr, 1);
                if (rc < 0)
                {

                        GetCommError(idComDev, &CommStat);
                        break;
                }

                do
                {
                        MSG Msg;
                        char Byte;

                        count = ReadComm(idComDev, &Byte, 1);
                        if (count == 0)
                        {
                                if (GetMessage(&Msg, NULL, 0, 0))
                                {
                                        TranslateMessage(&Msg);
                                        DispatchMessage(&Msg);
                                }
                        }
                } while (count == 0);

        } while (*pStr++);
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*
SIMPLIO.C
This module contains the functions for communicating with the serial IO

NOTE: API Function descriptions are in SIMPLEIO.H
*/

#include <windows.h>
#include <windowsx.h>

#include "stdlib.h"
#include "stdio.h"
#include "string.h"

#define COM_WRITE_STRING WM_USER+1
#define ID_TIMER 16

/***Local Prototypes ******/
BOOL InitCom(int iPortID);
BOOL QuitCom(void);
BOOL SendComStr(LPSTR lpSendStr);

HWND InitNotifyWindow(void);
LRESULT WINAPI _export ComWndProc(HWND hWnd, UINT msg, WPARAM wParam, LPARAM lParam);

/*** Global variables ****/
static UINT                         g_iPortID = 0;
static HWND                         g_hWndNotify = (HWND)NULL;
int                                                         nTimerID = 0;

extern HINSTANCE    hInst;

/**********************************************************************/
/****************** SIMPLEIO API FUNCTIONS ****************************/
/**********************************************************************/
/*
InitCom()
Desc:           Opens the serial port specified by the caller
Input:    Port:Specifies the serial port to be used, i.e. on a PC, 1 = COM1,
                    2= COM2, etc.
Return:   Port TRUE if successful, FALSE if not (Error code is <= 0)
Notes:
*/
BOOL InitCom(int iPortID)
{
        int ID;
        /* Windows interface to com ports */
        char szComName[6];

        wsprintf(szComName, "COM%d", iPortID);
        if(iPortID < 1 )
                return FALSE;
         /*     Open specified port */
        ID = OpenComm(szComName, 16, 16);
        if(ID < 0)
                        // Check for errors if present
                return(FALSE);
                // translate error code
        else
        {
                int                         err = 0;

                g_iPortID = ID;
                //        Set up window to receive notification messages
                g_hWndNotify = InitNotifyWindow();
                if(!g_hWndNotify)
                        err = TRUE;
                else
                {
                        //        Set serial port parameters
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                        char buffer[20];
                        DCB dcb;

                        sprintf(buffer,"COM%d:9600,n,8,1", iPortID);
                        err = BuildCommDCB(buffer, &dcb);
                        if(err != 0)
                                err = TRUE;
                        else
                        {
                                err = SetCommState(&dcb);
                                if(err != 0)
                                        err = TRUE;
                        }
                }
                if(err)
                {
                        // An error occurred after the port was open; close port and
                        //      change port id to error code
                        CloseComm(ID);
                        return FALSE;
                }
        }

        return TRUE;
} // END OF InitCom()


/*
QuitCom()
Desc:           Closes the serial port specified by the caller
Input:  PortID:Specifies the serial port to be closed
Return:
        TRUE or FALSE
*/
BOOL QuitCom(void)
{
        CloseComm(g_iPortID);
        if(g_hWndNotify)
                DestroyWindow(g_hWndNotify);
        return(TRUE);
} // END OF QuitCom()

/*
InitNotifyWindow
Desc:   Initializes window for receiving WM_COMMNOTIFY messages
Input:  PortID:Specifies the serial port to receive messages from
                COM: The ASCII name of the com port
                 hInstance: The instance handle of the application
Return: Handle to a window if successful, NULL if not
Notes:  The Port ID is the value returned from the OpenPort function.
*/
HWND InitNotifyWindow()
{
        HWND hWnd = NULL;
        WNDCLASS wndclass;

        //      Define window class and give it com port name
        wndclass.style = 0;
        wndclass.lpfnWndProc = ComWndProc;
        wndclass.cbClsExtra = 0;
        wndclass.cbWndExtra = 0;
        wndclass.hInstance = hInst;
        wndclass.hIcon = NULL;
        wndclass.hCursor = NULL;
        wndclass.hbrBackground = NULL;
        wndclass.lpszMenuName = NULL;
        wndclass.lpszClassName = "ComNotify";

        RegisterClass(&wndclass);
        //      Create window
        hWnd = CreateWindow("ComNotify", "", 0, 0, 0, 0, 0, NULL, 0, hInst, 0);
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
	if(hWnd)
	{
		//	Setup the WM_COMMNOTIFY message posting
		//	Set to be notified when two data bytes (handshake) arrives
		//	in port
		if(!EnableCommNotification(g_iPortID, hWnd, 1, -1))
		{
			//	We had an error setting up COMMNOTIFY
			//	Destroy window and zero out hWnd
			DestroyWindow(hWnd);
			hWnd = NULL;
		}
	}
	return(hWnd);
} // END OF InitNotifyWindow()


BOOL SendComStr(LPSTR szString)
{
	char FAR *lpszStringPtr;
	UINT nRet;

	lpszStringPtr = (char FAR *)NULL;
	lpszStringPtr = GlobalAllocPtr(GPTR, lstrlen(szString) + 1);
	if(lpszStringPtr == (char FAR *)NULL)
		return(FALSE);
	_fmemset((LPSTR)lpszStringPtr, 0, lstrlen(szString) + 1);
	lstrcpy(lpszStringPtr, szString);
//lstrcat(lpszStringPtr, " ");
	nRet = (UINT) SendMessage(g_hWndNotify, COM_WRITE_STRING, (WPARAM) lstrlen(szString),
		(LPARAM) lpszStringPtr);
	GlobalFreePtr(lpszStringPtr);
	return (nRet);
}

LRESULT WINAPI _export ComWndProc(HWND hWnd, UINT msg, WPARAM wParam, LPARAM lParam)
{
	static BOOL bWriting = FALSE;
	static UINT nStrLen;
	static UINT nBytesWritten;
	static BOOL bError;
	static char FAR *lpszPtr;

	switch (msg)
	{
		case WM_TIMER:
		{
			bError = TRUE;
			bWriting = FALSE;
			KillTimer(hWnd, nTimerID);
			break;
		} // END OF WM_TIMER
		case WM_COMMNOTIFY:
		{
			switch(LOWORD(lParam))
			{
				case CN_RECEIVE:
				{
					char	szByte;
					int		nRet;

					nRet = ReadComm(g_iPortID, &szByte, 1);
					KillTimer(hWnd, nTimerID);
					if (nRet != 1)
						bError = TRUE;

						if(lpszPtr == NULL || !bWriting)
						{
							return(FALSE);
						}
						if (szByte == lpszPtr[0])
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                                {
                                                        lpszPtr++;
                                                        if (++nBytesWritten <= nStrLen || lpszPtr[0] != 0)
                                                        {
                                                                nRet = WriteComm(g_iPortID, lpszPtr, 1);
                                                                nTimerID = SetTimer(hWnd, ID_TIMER, 5000, NULL);
                                                                if (nRet != 1)
                                                                        bError = TRUE;
                                                        }
                                                        else
                                                                bWriting = FALSE;
                                                }
                                                break;
                                        } // END OF CN_RECIEVE
                                        default:
                                                return 0;
                                } // switch(LOWORD(lParam))
                                break;
                        } // END OF WM_COMMNOTIFY
                        case COM_WRITE_STRING:
                        {
                                int             nRet;

                                nStrLen = wParam;
                                nBytesWritten = 0;
                                lpszPtr = (LPSTR) lParam;
                                bWriting = TRUE;
                                bError = FALSE;
                                nRet = WriteComm(g_iPortID, lpszPtr, 1);
                                if (nRet != 1)
                                        bError = TRUE;
                                nTimerID = SetTimer(hWnd, ID_TIMER, 5000, NULL);
                                while (bWriting)
                                {
                                        MSG msg;

                                        if(PeekMessage(&msg, hWnd, 0, 0, PM_REMOVE))
                                        {
                                                TranslateMessage(&msg);
                                                DispatchMessage(&msg);
                                        }
                                } // while(bWriting)
                                return bError;
                        } // END OF COM_WRITE_STRING
                        default:
                                return DefWindowProc(hWnd, msg, wParam, lParam);
                } // switch(msg)
                return DefWindowProc(hWnd, msg, wParam, lParam);
} // END OF CommWndProc()
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*

SIO.C
This module contains the functions for communicating with the serial IO

Author: John R. Elsey

NOTE: API Function descriptions are in SIO.H
*/

#ifdef WINSIO
#include <windows.h>
#endif

#include "sio.h"

#include "stdlib.h"
#include "stdio.h"
#include "string.h"


#ifdef SIOTEST
extern void SetHandshakeVar ( unsigned int handshake, int Rx, long data );
#endif

/***Local Prototypes ******/
int OpenPort( int Port, int Rx );
void ClosePort( int PortID );
int WritePortData( int PortID, char far *buff, int bytes );
int ReadBuffer( int PortID, char far *buff, int bytes );
int ReadPort2Buffer( int PortID );
int       ReadPortData( int PortID, char far *buff, int bytes );
int TranslateSIOError ( int error );
int CheckDevice( int PortID );
void Wait1mSec( void );
int SendHandshake( int PortID, unsigned int Handshake, long Data );
unsigned int GetResponse( int PortID, int wait );
int HandshakeAction( int PortID,  unsigned int msg );
unsigned int CheckMsgStart( int PortID, int msgsize );
unsigned int CheckMsgEnd( int PortID );
void HandleCommEvent( int ID );
void SendBreak( int PortID );
void ClearBuffers( int PortID );

#ifdef WINSIO
HWND InitNotifyWindow( int PortID,  char *COM, HANDLE hInstance );
int SetParameters( char *COM  );
long FAR PASCAL _export PortWndProc( HWND hWnd, UINT msg,

                    UINT wParam, LONG lParam );
BOOL FAR PASCAL FindWindowInst( HWND hWnd, DWORD lParam );
#endif    //WINSIO

/**** Local defines ****/
#define TXRETRYMAX  3                          /* Maximum number of times to resend data from
                                                                                        from Txr
after receiving a SIO_MSG_COUNT_ERROR */
#define   RESPTIMEOUT         50                          /* Approximate time (in msec) to wait
for
                                                                                        response
from device at other end */

/* Serial port configuration parameters */
#define BAUDRATE              "9600"
#define PARITY                       "n"
#define DATABITS              "8"
#define STOPBITS              "1"

/*** SIO Handshake messages ***/
#define SIO_QUERY_DEVICE              0x5501   /*       Rcvr->Txr, check if present */
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
#define SIO_DEVICE_PRESENT            0x5502    /*      Txr->Rcvr, Txr is present */
#define SIO_RCVR_READY                          0x5503    /*      Rcvr->Txr, Rcvr ready for data
*/
#define SIO_MSG_START                           0x5504    /*      Txr->Rcvr, start of data
string + size */

#define SIO_MSG_END                             0x5506    /*      Txr->Rcvr, end of data string
*/
#define SIO_MSG_2BIG                            0x5507    /*      Rcvr->Txr, message too big for
holding buffer */
#define SIO_RCVR_FULL                           0x5508    /*      Rcvr->Txr, holding buffer is
full */
#define SIO_MSG_SEND                            0x5509    /*      Rcvr->Txr, OK to send data
string */
#define SIO_MSG_OK                              0x550a    /*      Rcvr->Txr, Data received ok */
#define SIO_MSG_COUNT_ERROR           0x550b    /*      Rcvr->Txr, Incorrect byte count in
message */
#define SIO_RCVR_CLOSING              0x550c    /*      Rcvr->Txr, Rcvr is closing down */
#define SIO_MSG_ABORT                           0x550d    /*      Rcvr->Txr, A hardware error
occurred which

                              caused the data transmission to be aborted */
#define SIO_MSG_BAD_SIZE              0x550e    /*      Rcvr->Txr, a bad size value (0 or
negative) was

                              send with the SIO_MSG_START handshake */

/*** Local variables ****/
#ifdef WINSIO
static HANDLE hNotifyWnd[MAX_PORTS];
static HANDLE hMainInst = 0;
#endif    //WINSIO
static unsigned long PortFlags[MAX_PORTS];
static unsigned char *HoldingBuffer[MAX_PORTS];
static int HoldingBufferSize[MAX_PORTS];
static int HoldingBufferAvailSize[MAX_PORTS];
static int MsgCount[MAX_PORTS];
static int MsgSize[MAX_PORTS];
static int MsgSizeRcvd[MAX_PORTS];

/***********************************************************************/
/****************** SIO API FUNCTIONS *********************************/
/***********************************************************************/

int OpenReceiver( int Port )
        {
        int ID = SIO_ERR_UNKNOWN;

        /*      Use platform specific calls to open serial port as a Receiver port */
        ID = OpenPort( Port, 1 );

        if( ID >= 0 )
                {
      int err = 0;

                /* Set the port type as a receiver */
                PortFlags[ID] |= PORT_TYPE_RCVR;

                /*      Allocate memory for transmitter buffer */
      HoldingBuffer[ID] = (unsigned char *)malloc( DATABUFF );
                if( !HoldingBuffer[ID] )
                        err = SIO_ERR_BUFFER_MEM;

                else
        {
                        /*      Set Holding Buffer size variables */
                        HoldingBufferSize[ID] = DATABUFF;
    HoldingBufferAvailSize[ID] = DATABUFF;

                        MsgSize[ID] = MsgSizeRcvd[ID] = 0;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                /*      Check for device present */
                err = CheckDevice( ID );

                if( !err )
                        /*      Tell device that initialization is complete */
                        err = SendHandshake( ID, SIO_RCVR_READY, 0 );

        }

        if ( err )
                {
                /* An error occurred after the port was open; close port and
                        change port id to error code */
                CloseReceiver( ID );
        ID = err;
                }
        }

        return ID;
        }

void CloseReceiver( int PortID )
        {

    /*  Tell device that receiver is going away, (if one is there ) */
        if( PortFlags[PortID] & PORT_DEVICE_PRESENT )
                SendHandshake( PortID, SIO_RCVR_CLOSING, 0 );

        /*      Use platform specific calls to close serial port */
        ClosePort( PortID );

    /*  Deallocate memory for receiver buffer, if allocated */
        if( HoldingBuffer[PortID] )
                free( HoldingBuffer[PortID] );

    return;
        }

int OpenTransmitter( int Port )
        {
        int ID = SIO_ERR_UNKNOWN;

        /*      Use platform specific calls to open serial port as a Transmitter port */
        ID = OpenPort( Port, 0 );

        if( ID >= 0 )
                {
                /*      Allocate memory for transmitter buffer */
        HoldingBuffer[ID] = (unsigned char *)malloc( TRXBUFF );
                if( !HoldingBuffer[ID] )
                        {
          /* Could not allocate memory, so close port and return error id */
                        CloseTransmitter( ID );
                        ID = SIO_ERR_BUFFER_MEM;
          }

                else
        {

                        HoldingBufferSize[ID] = HoldingBufferAvailSize[ID] = TRXBUFF;
                        MsgSize[ID] = MsgSizeRcvd[ID] = 0;

                        PortFlags[ID] |= PORT_TYPE_TXR;

                        }

                }

        return ID;
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        }

void CloseTransmitter( int PortID )
        {

        /*      Use platform specific calls to close serial port */
        ClosePort( PortID );

        /*      Deallocate memory for receiver buffer, if allocated */
        if( HoldingBuffer[PortID] )
                free( HoldingBuffer[PortID] );

    return;
        }


int WritePort( int PortID, char far *str, int bytes )
        {
        int err = 0, retry = 1;       /* set retry to 1 to get through loop first time */
        unsigned int resp;
        int Rcvr = -1;
        int tbytes = bytes;
        int bytesent = 0;
    int RcvrBuffer;

        /* Set Rcvr variable based on port type */
        if( PortStatus( PortID, PORT_TYPE_RCVR ) )
                Rcvr = 1;
        else if( PortStatus( PortID, PORT_TYPE_TXR ) )
                Rcvr = 0;
        else
                return SIO_ERR_UNKNOWN;       /* Can't figure out port type */


    /* Determine maximum size of data block from buffer size */
        RcvrBuffer = Rcvr ? RTXBUFF : TTXBUFF;

    /* Make sure receiving port is ready before trying anything */
        if( !Rcvr && !PortStatus( PortID, PORT_RECEIVER_READY ) ||
                Rcvr && !PortStatus( PortID, PORT_DEVICE_PRESENT ) )
                err = SIO_ERR_RCVR_NOT_READY;

        else
        {

                while( retry )
        {

                        if( bytes > RcvrBuffer )
                                bytes = RcvrBuffer;

          err = 0;              /* Clear out for each retry */

                        /* Let other port know that we want to send data */
                        SendHandshake( PortID, SIO_MSG_START, tbytes );

                        resp = GetResponse( PortID, 1 );
                        if( resp )
                                {
                                if( HandshakeAction( PortID, resp ) )
                {       /* An unknown handshake was passed */
                err = SIO_ERR_UNKNOWN;
                                        }

                                else
                                        {
                                        switch( resp )
                                                {
                                                case SIO_RCVR_FULL:
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
err = SIO_ERR_RCVR_FULL;
                                        break;
                                case SIO_MSG_2BIG:
                                        err = SIO_ERR_MSG_2BIG;
                                        break;
                                case SIO_MSG_ABORT:
                                        err = SIO_ERR_MSG_ABORT;
                                        break;
                                case SIO_MSG_BAD_SIZE:
                                        err = SIO_ERR_BAD_SIZE;
                                        break;
                                }
                        }
                }
        else
                {
                /* Timeout occurred */
                err = SIO_ERR_TIMEOUT;
                SendBreak( PortID );
                continue;
                }

        if( !err )
                {
                while( bytesent < tbytes )
                        {
                        err = WritePortData( PortID, str, bytes );

                        if( err > 0 )
                                {
                                bytesent += err;
                                str += err;          /* Increment buffer
pointer */
                                err = 0;   /* No errors*/

                                bytes = tbytes - bytesent;
                                if( bytes > RcvrBuffer )
                                        bytes = RcvrBuffer;
                                }
                        else if( err < 0 )
        break;     /* We got an error, break for handler */
                        }

                if( !err )
                        { /* Send End of Message and check response */
SendHandshake( PortID, SIO_MSG_END, 0 );

                        resp = GetResponse( PortID, 1 );
                        if( resp )
                                {
                                if( HandshakeAction( PortID, resp ) )
                {       /* An unknown handshake was passed */
                err = SIO_ERR_UNKNOWN;
                                        }

                                else
                                        {
                                        switch( resp )
                                                {
                                                case
SIO_MSG_COUNT_ERROR:
                                                        err =
SIO_ERR_COUNT_ERROR;
                                                        break;
                                                case SIO_MSG_OK:
                                                        break;
                                                case SIO_MSG_ABORT:
                                                        err =
SIO_ERR_MSG_ABORT;
                                                        break;
                                                }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        }
                                    }
                            else
                                    {
                                    /* Timeout occurred */
                                    err = SIO_ERR_TIMEOUT;
                SendBreak( PortID );
                                    continue;
                                    }


                            }
                    else
                            {/* An error occurred when writing, send a break
to clear
                                    the channel */
                            SendBreak( PortID );
                            }
                    } //if( !err) from first handshake

            if( err != SIO_ERR_RCVR_FULL || retry >= TXRETRYMAX + 1  )
                    break;    /* Hit maximum retries or no rcvr buffer full
errors */

        retry++;

            }        //while( bytesent < tbytes  && retry )
        }

    return err;
        }


int ReadPort( int PortID, char far *str, int bytes )
        {
        int err = 0;


        if( MsgCount[PortID] )
        {
                err = ReadBuffer( PortID, str, bytes );
                }

    return err;
        }

unsigned int PortStatus( int PortID, unsigned int Flag )
        {
        unsigned int status = PortFlags[PortID];

        if( Flag )
                status &= Flag;

    return status;
    }


int PortReadQuery( int PortID )
        {
        int size = 0;

        if( MsgCount[PortID] )
                {
                size = *((int *)HoldingBuffer[PortID]);
        }

    return size;
    }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*********************************************************************/
/****************** LOCAL FUNCTIONS ***********************************/
/*********************************************************************/
/*
ReadPortData
Desc:     Reads data from the specified port
Input:    PortID:Specifies the serial port to be used, i.e. on a PC, 1 = COM1,
                          2= COM2, etc.
                    buff: Pointer to location where data is to be written
          bytes: Maximum number of bytes to write to buffer
Return:   Number of bytes read if successful, 0 if nothing to read,
                    otherwise an Error code (Error code is < 0)
Notes:
*/
int        ReadPortData( int PortID, char far *buff, int bytes )
           {
    int err = 0;
           #ifdef WINSIO
           COMSTAT Stat;
           #endif    //WINSIO

    /******** WINDOWS SPECIFIC CODE *************/
    #ifdef WINSIO
           err = ReadComm( PortID, buff, bytes);
           if( err < 0 )
                    {
                    err = GetCommError( PortID, &Stat );
                    /* Translate error code */
                    err = TranslateSIOError( err );
        }
           #endif
           /******** END WINDOWS CODE ****************/

           return err;
    }


/*
OpenPort
Desc:     Opens the serial port specified by the caller and sets up buffers
                    (if any)
Input:    Port:Specifies the serial port to be used, i.e. on a PC, 1 = COM1,
                          2= COM2, etc.
Return:   Port ID if successful, Error code if not (Error code is <= 0)
Notes:
*/
int OpenPort( int Port, int Rx )
          {
          int ID = SIO_ERR_UNKNOWN;

    /************ WINDOWS SPECIFIC CODE ***************************/
          #ifdef WINSIO
          {
          /* Windows interface to com ports */
          char ComName[6] = "COM", PortNum[18];

          if( Port > MAX_PORTS || Port < 1 )
          return SIO_ERR_PORTNUM;

          itoa( Port, (char *)&PortNum ,10 );      /* Convert port number to ascii*/
          strcat( ComName, PortNum );    /* Create correct com port name */

    /*    Open specified port */
          ID = OpenComm( ComName, Rx? RRXBUFF:TRXBUFF, Rx? RTXBUFF:TTXBUFF );

          if( ID < 0 )        /* Check for errors; if present translate error code */
                  ID = TranslateSIOError( ID );
          else
                  {
      int err = 0;
      HANDLE hTaskWnd = 0;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                /* Set only the port type in the port flags */
                PortFlags[ID] = 0;
        PortFlags[ID] |= Rx? PORT_TYPE_RCVR : PORT_TYPE_TXR;

                /* Get instance of current task */
                hTaskWnd = GetCurrentTask();
        EnumTaskWindows( hTaskWnd, FindWindowInst, 0 );
                if( !hMainInst )
          err = SIO_ERR_INSTANCE;

                else
                        {
                        /*      Set up window to receive notification messages */
                        hNotifyWnd[ID] = InitNotifyWindow( ID, &ComName[0], hMainInst );
                        if( !hNotifyWnd[ID] )
                                err = SIO_ERR_NOTIFY;
                        else
                                {
                                /* Initialize associated flags */
                                MsgCount[ID] = 0;

                                /* Set to be notified if a comm break  or error occurs */
                      SetCommEventMask( ID, EV_BREAK | EV_ERR );

                                /*      Set serial port parameters */
                                err = SetParameters( &ComName[0] );
                                }
                        }

                if ( err )
                        {
                        /* An error occurred after the port was open; close port and
                                change port id to error code */
                        ClosePort( ID );
          ID = err;
          }
                }
        }
        #endif    //WINSIO
    /************ END WINDOWS CODE ********************************/

    return ID;
        }

/*
ClosePort
Desc:     Closes the serial port specified by the caller
Input:    PortID:Specifies the serial port to be closed
Return:
Notes:    The Port ID is the value returned from the OpenPort function.

*/
void ClosePort( int PortID )
        {

        /************ WINDOWS SPECIFIC CODE ****************************/
        #ifdef WINSIO

        CloseComm( PortID );
    if( hNotifyWnd[PortID] )
        DestroyWindow( hNotifyWnd[PortID] );
        #endif    //WINSIO
    /************ END WINDOWS CODE ********************************/


        return;
        }


/*
WritePortData
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
Desc:     Writes a data to the specified port
Input:    PortID:Specifies the serial port to be written to
                  buff: Pointer to a buffer containing the data to be written
          bytes: Number of bytes from the buffer to write
Return:   Number of bytes written if succesful, errorid if not (errorid < 0 )
Notes:    The Port ID is the value returned from the OpenPort function.

*/
int WritePortData( int PortID, char far *buff, int bytes )
        {
        int err = 0, i;
        #ifdef WINSIO
        COMSTAT Stat;
        MSG WinMsg;
        #endif

        /************ WINDOWS SPECIFIC CODE ****************************/
        #ifdef WINSIO
        err = WriteComm( PortID, buff, bytes );
        if( err < 0 )
                {
                err = GetCommError( PortID, &Stat );
                /* Translate error code */
                err = TranslateSIOError( err );
        }
        else
                {
                /* Wait up until timeout for buffer to clear */
                for( i = 0; i < RESPTIMEOUT ; i++ )
                        {
                        /* Check for message */
                        PeekMessage((LPMSG)&WinMsg, hNotifyWnd[PortID], WM_COMMNOTIFY,
                                      WM_COMMNOTIFY, PM_REMOVE );
                        if( LOWORD(WinMsg.lParam) == CN_TRANSMIT )
                                break;

                        Wait1mSec();
                        }
                if( i >= RESPTIMEOUT )
        err = SIO_ERR_TIMEOUT;          /* Buffer never cleared by timeout */
                }
        #endif    //WINSIO
        /************ END WINDOWS CODE ********************************/


        return err;
    }


/*
ReadBuffer
Desc:     Reads data from the port holding buffer into the calling apps buffer
Input:    PortID:Specifies the serial port to read the data from
                  buff: pointer to the location to write the data to
          bytes: Maximum number of bytes to be read
Return:   Number of bytes read if successful, 0  if nothing to read,
                  less than 0 if an error
Notes:    The Port ID is the value returned from the OpenPort function.  This
                  should only be called if MsgCount[PortID] is greater than 0.

*/
int ReadBuffer( int PortID, char far *buff, int bytes )
        {
        int err = 0, i, msgsize;
        unsigned char *ptr = HoldingBuffer[ PortID ];
    int copysize;

        msgsize = *((unsigned long *)ptr++);
        ptr++;    /* Increment past message size */

        copysize = bytes > msgsize ? msgsize : bytes;
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*      _fmemcpy( buff, ptr, copysize );
        Can't use fmemcpy because it is not ANSI C */
        for(i = 0; i < copysize; i++ ) *buff++ = *ptr++;

        MsgCount[PortID]--; /* One less message in the buffer */

        /*Adjust available buffer size after read */
    if( PortStatus( PortID, PORT_TYPE_RCVR ) )
                HoldingBufferAvailSize[PortID] += copysize + 2;
        else
        HoldingBufferAvailSize[PortID] = HoldingBufferSize[PortID];

        /* Move buffer data down if other messages present or if we have
                received a partial message */
        if( MsgCount[PortID] || MsgSizeRcvd[PortID] )
        {
                ptr += copysize;
                msgsize = HoldingBufferSize[PortID] -
                                        HoldingBufferAvailSize[PortID];

                /* Move other messages down in the buffer */
                memmove( HoldingBuffer[ PortID ], ptr, msgsize );

                }

        return err;
    }

/*
ReadPort2Buffer
Desc:   Reads data from the port rcvr buffer and places it in holding buffer
                if it is a data message, or acts on it if it is a handshake
Input:  PortID:Specifies the serial port to read the data from
Return: Number of bytes read if successful, 0  if nothing to read,
                less than 0 if an error
Notes:  The Port ID is the value returned from the OpenPort function.

*/
int ReadPort2Buffer( int PortID )
        {
        int err = 0;
        int bytesleft = 0;
        int buffoffset = HoldingBufferSize[PortID] - HoldingBufferAvailSize[PortID];


        /* Figure out how many bytes we should expect for this message */
    bytesleft = MsgSize[PortID] - MsgSizeRcvd[PortID];

        if( bytesleft )
                {       /* We need to grab some data */
      /* If we haven't received any data yet, we need to save space for size */
      int sizespc = MsgSizeRcvd[PortID] ? 0 : 2;

                if( sizespc )
        *(( int *)(HoldingBuffer[PortID] + buffoffset)) = MsgSize[PortID];

                err = ReadPortData( PortID,
                                                        (HoldingBuffer[PortID] +
buffoffset + sizespc),
                                                         bytesleft );
                if( err > 0 )
                        {       /* This means we read something, err = number of bytes read
*/
                        MsgSizeRcvd[PortID] += err;

                        /* Reduce available size of buffer by number of bytes read */
                        HoldingBufferAvailSize[PortID] -= err + sizespc;

                        if( MsgSize[PortID] == MsgSizeRcvd[PortID] )
                                {
                                /*      We have read a complete message */
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
PortFlags[PortID] &= ~PORT_MSG_DATA_IN;
MsgCount[PortID]++; /*        We got another message in the
buffer */
}

}
else if( err < 0 )
{
/* dump message, reset variables and flags, send an abort message */

PortFlags[PortID] &= ~PORT_MSG_DATA_IN; /* out of transmit mode */
PortFlags[PortID] &= ~PORT_MSG_DATA_OUT;
HoldingBufferAvailSize[PortID] += MsgSizeRcvd[PortID];
MsgSize[PortID] = MsgSizeRcvd[PortID] = 0;
ClearBuffers( PortID );       /* Flush txr & rxr buffers */

SendHandshake( PortID, SIO_MSG_ABORT, 0 );

/* Reset port notification */
while( !EnableCommNotification( PortID,  hNotifyWnd[PortID], 2, 1) );
}
}

return err;
}

/*
TranslateSIOError
Desc:    Translates a platform specific error message to a common SIO error
         message
Input:   ErrorID: A platform specific error code
Return:  Translated error code
Notes:
*/
int TranslateSIOError ( int error )
    {
    int Err = SIO_ERR_UNKNOWN;

    switch( error )
        {
    /************ WINDOWS SPECIFIC CODE *********************************/
#ifdef WINSIO
        case IE_BADID:
            Err = SIO_ERR_BADID;
    break;
        case IE_BAUDRATE:
            Err = SIO_ERR_BAUDRATE;
    break;
        case IE_BYTESIZE:
            Err = SIO_ERR_BYTESIZE;
    break;
        case IE_DEFAULT:
            Err = SIO_ERR_DEFAULT;
    break;
        case IE_HARDWARE:
            Err = SIO_ERR_HARDWARE;
    break;
        case IE_MEMORY:
            Err = SIO_ERR_MEMORY;
    break;
        case IE_NOPEN:
            Err = SIO_ERR_NOPEN;
    break;
        case IE_OPEN:
            Err = SIO_ERR_OPEN;
    break;
#endif    //WINSIO
    /************ END WINDOWS CODE *********************************/
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                    default:
            /************ WINDOWS SPECIFIC CODE *******************************/
#ifdef WINSIO
                    if( Err & CE_MODE )
                            {
                            Err = SIO_ERR_CE_MODE;
                            break;
                }
                    if( Err & CE_FRAME )
                            {
                            Err = SIO_ERR_CE_FRAME;
                            break;
                }
                    if( Err & CE_RXPARITY )
                            {
                            Err = SIO_ERR_CE_RXPARITY;
                            break;
                }
                    if( Err & CE_BREAK )
                            {
                            Err = SIO_ERR_CE_BREAK;
                            break;
                }
                    if( Err & CE_OVERRUN )
                            {
                            Err = SIO_ERR_CE_OVERRUN;
                            break;
                }
                    if( Err & CE_RXOVER )
                            {
                            Err = SIO_ERR_CE_RXOVER;
                            break;
                }
                    if( Err & CE_TXFULL)
                            {
                            Err = SIO_ERR_CE_TXFULL;
                            break;
                }
#endif      //WINSIO
            /************ END WINDOWS CODE ********************************/
                            break;
                    }

    return Err;
        }

/*
HandshakeAction
Desc:       Interprets the message received from the port and then responds
                    appropriately.
Input:      PortID:Specifies the serial port
        msg: Pointer to the handshake message
Return:     0 if it handled handshake, non zero if not
Notes:      The Port ID is the value returned from the OpenPort function.

*/
int HandshakeAction( int PortID, unsigned int msg )
        {
        int err = 0;
#ifdef SIOTEST
        long data = 0;
#endif


        /*      We should only be getting handshakes if we are not transmitting data.
                If the MsgSizeRcvd variable is non zero and we come here, then the
                msg variable must be the first data received after the data has
                been sent.  Therefore, in this condition, if the msg variable is
                anything other than SIO_MSG_END, then we have a data overrun or some
                other error condition with the data transmission */
        if( MsgSizeRcvd[PortID] && msg != SIO_MSG_END )
```

Docket No.: 1321

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                {
                /* Set MsgSizeRcvd[PortID] > MsgSizeRcvd[PortID] so that
                        CheckEndMsg will return error and provide proper handling.
                        Set msg to SIO_MSG_END to get handling */
                MsgSizeRcvd[PortID] = MsgSizeRcvd[PortID] + 2;
                msg = SIO_MSG_END;
        }

          switch( msg )
                {
                case SIO_QUERY_DEVICE:
                        {
                        SendHandshake( PortID, SIO_DEVICE_PRESENT, 0 );
                        break;
                        }
                case SIO_DEVICE_PRESENT:
                        {
                        PortFlags[PortID] |= PORT_DEVICE_PRESENT;
          break;
                        }
                case SIO_RCVR_READY:
                        {
                        PortFlags[PortID] |= PORT_RECEIVER_READY;
          break;
                        }
                case SIO_RCVR_CLOSING:
                        {
                        PortFlags[PortID] &= ~PORT_RECEIVER_READY;
          break;
                        }
                case SIO_MSG_START:
                        {
                        unsigned int response;
                        int size = 0, tempsize = 0, bytesread = 0, bytesleft = 2;

          /* Read the size of the data from the port */
                        while( bytesread < 2 )
                                {       /* This code ensures we get the correct size data
by
                                                waiting for the next two bytes of data
to come
                                                across the port.  The two bytes may come
in one or
                                                many reads of the port*/
                                bytesread += ReadPortData( PortID,(char *)&size, bytesleft
);
                                if( bytesread == 1 && !tempsize )
                                        {       /* Come here one time after we read one
byte */
                                        bytesleft--;
                                        tempsize = size;
                size = 0;
                                        }
                                if( tempsize && bytesread == 2 )
                                        {       /* Come here if we got the size in two
pieces */
                size = (size << 8) + tempsize;
                }

            }
#ifdef SIOTEST
                        data = (long)size;
#endif
                        if( size > 0 )
                                {
            response = CheckMsgStart( PortID, size );
                                SendHandshake( PortID, response, 0 );
                /************ WINDOWS SPECIFIC CODE ***************************/
                                #ifdef WINSIO

                                if( response == SIO_MSG_SEND )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                                EnableCommNotification( PortID,
hNotifyWnd[PortID], 1, 1);

                              #endif    //WINSIO
                  /************ END WINDOWS CODE ********************************/
                              }
                        else
                              {
                              /* We received a bad size for the message- tell sender */
                              SendHandshake( PortID, SIO_MSG_BAD_SIZE, 0 );
               }
                        break;
                        }
                  case SIO_MSG_2BIG:
        case SIO_RCVR_FULL:
                  case SIO_MSG_BAD_SIZE:
          break;    /* Caller should return error code */
                  case SIO_MSG_SEND:
                        {
            PortFlags[PortID] |= PORT_MSG_DATA_OUT;
                        break;
            }
                  case SIO_MSG_ABORT:
                        {
                        if( PortStatus( PortID, PORT_MSG_DATA_IN ) )
                              /* Reset the Holding buffer */
                              HoldingBufferAvailSize[PortID] += MsgSizeRcvd[PortID];
                        PortFlags[PortID] &= ~PORT_MSG_DATA_OUT;
                        PortFlags[PortID] &= ~PORT_MSG_DATA_IN;
                        MsgSizeRcvd[PortID] = MsgSize[PortID] = 0;
                        ClearBuffers( PortID );

                        /* Reset port notification */
                        while( !EnableCommNotification( PortID,  hNotifyWnd[PortID], 2, 1) );

                        break;
            }
                  case SIO_MSG_END:
                        {
                        unsigned int response = CheckMsgEnd( PortID );

                        /* Return handshake depending on CheckMsgEnd response */
                        SendHandshake( PortID, response, 0 );
         /************ WINDOWS SPECIFIC CODE **************************/
                        #ifdef WINSIO
                        /* Change notify size back to a handshake */
                        EnableCommNotification( PortID, hNotifyWnd[PortID], 2, 1);
                        #endif    //WINSIO
         /************ END WINDOWS CODE ********************************/
                        break;
                        }
                  case SIO_MSG_COUNT_ERROR:
                        /* Caller should return error code */
        case SIO_MSG_OK:
                        break;

                  default:
        err = 1;  /* Didn't recognize handshake */
                  }

#ifdef SIOTEST
        SetHandshakeVar ( msg, 1, data );
#endif

        return err;
   }


/*
CheckDevice
Desc:   Sends a message from the Rcvr and then looks for a repsonse
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                    if a device is present
Input:    PortID:Specifies the serial port to check for device connection
Return:   0 is successful, error id if not
Notes:    The Port ID is the value returned from the OpenPort function.

*/
int CheckDevice( int PortID )
          {
          int err = 0, i;

          /* Query for device on other end of port */
          err = SendHandshake( PortID, SIO_QUERY_DEVICE, 0 );

          if( !err )
                    {

                    unsigned int msg = GetResponse( PortID, 1 );

                    if( !msg || HandshakeAction( PortID, msg ) )
               /*  Time out occurred or unknown handshake */
                              err = SIO_ERR_NODEVICE;

                    }
          return err;
     }



/*
GetResponse
Desc:     Polls the port input for a handshake response
                    with the given timeout period
Input:    PortID:Specifies the serial port to check for device connection
                    wait: Indicates if function should loop up until timeout waiting for
                    a response.
Return:   Returns Handshake message if successful, 0 if timeout or error.
Notes:    The Port ID is the value returned from the OpenPort function.

*/
unsigned int GetResponse( int PortID, int wait )
          {
          unsigned int msg;
    int bytesread = 0, bytesleft = 2;
          int err = 0;
          char buff[2] = "";
          unsigned long i;

          /* Look for response from device before timeout period */
          for( i = 0; i < RESPTIMEOUT; i++ )
                    {
                    buff[1] = 0;

                    err = ReadPortData( PortID, (buff + bytesread), bytesleft );

                    if( !err & !wait )
                              break;    /* There was nothing to read and we're not supposed to
                                                  wait around so break out*/
                    if( err < 0 )
          break;

        bytesread += err;

        if( bytesread == 2 )
                              {
            if( buff[1] == 0x55 )
                                        break;    /* We received some sort of handshake message */

                              /* If we got here we might be out of sync- try to find handshake */
                              buff[0] = buff[1];
                              bytesread--;
                              bytesleft = 1;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                        continue;
        }
            else if( bytesread == 1 && bytesleft == 2 )
                {
                bytesleft--;
                continue;
                }

        WaitlmSec();
            }

    if( i >= RESPTIMEOUT || err < 0 || !buff[0] )
            msg = 0;
    else
            msg = (unsigned int)buff[0] + ((unsigned int )buff[1] << 8);

    return msg;
}

/*
SendHandshake
Desc:     Sends the specified handshake message to the specified port
Input:    PortID:Specifies the serial port to check for device connection
                Handshake: One of the valid handshake messages defined in SIO.H
        Data: Any optional data that may accompany the message
Return:   0 if successful, error id if not
Notes:    The Port ID is the value returned from the OpenPort function.

*/
int SendHandshake( int PortID, unsigned int Handshake, long Data  )
        {
    int err, size = 2;
        char buff[6];
        void *ptr = &buff[0];

        *( int *)ptr = Handshake;
        ptr = &buff[2];

        if( Data )
                {
                if( Handshake == SIO_MSG_START )
                        {       /* Handshake with an int for data */
                        *(int *)ptr = Data;
                        size = 4;
                        }
                else
                        {
                        *(long *)ptr = Data;
          size = 6;
          }
      }

        /* Send Handshake message */
        err = WritePortData( PortID, buff, size );

        if( err > 0 )
                {
                err = 0;  /* No errors */
#ifdef SIOTEST
                SetHandshakeVar ( Handshake, 0, Data );
#endif
                }

    return err;
        }

/*
CheckMsgStart
Desc:     Check the current status to determine response to message start handshake
                and set appropriate port status flags
Input:    PortID:Specifies the serial port to check for device connection
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                    msgsize: size of data to be transmitted
 Return:    SIO_MSG_SEND if ok to start transmision
                    SIO_MSG_2BIG if message won't fit in holding buffer
                    SIO_RCVR_FULL if holding buffer is too big to hold message
        0 for an unknown state
 Notes:     The Port ID is the value returned from the OpenPort function.

 */
 unsigned int CheckMsgStart( int PortID, int msgsize )
          {
          unsigned int response = 0, Rcvr = PortStatus( PortID, PORT_TYPE_RCVR );
          int buffsize, buffavail;
          void *tmpptr;

     msgsize += 2;   /* Save room for data size info */

     /* If it is a Receiver, check holding buffer */
           if( Rcvr )
                    {
                    buffsize = HoldingBufferSize[PortID];
         buffavail = HoldingBufferAvailSize[PortID];
                    }
           else if ( PortStatus( PortID, PORT_TYPE_TXR ) )
                    {         /* Set to transmitter's buffer sizes */
                    buffsize = buffavail = TRXBUFF;
                    }
           else
                    {
                    /* If we got here, it means we are in some unknown state and don't
                             know if we are a receiver or a transmitter */
         return 0;
         }

           /* We can send if the message size is less than the available size if
                    we are a receiver port or is we don't have a message in the Txr
                    holding buffer */
          if( msgsize <= buffavail && ( Rcvr || !MsgCount[PortID] ) )
                    response = SIO_MSG_SEND;

          else
          {
                    /*       If the message size is bigger than buffer max or
                             we can't expand buffer big enough for it, send the too big message */
                    if( msgsize > DATABUFFMAX || ( !Rcvr && msgsize > buffsize ) )
                             response = SIO_MSG_2BIG;
                    else
                             {
                             if( msgsize > buffsize )
                                      {   /* We should only get here if we are a receiver */

                                               /* See if we can increase holding buffer to
accomodate data */
                                      if ( !(tmpptr =
                                                     (unsigned char *)realloc(
HoldingBuffer[PortID], msgsize )))
                                               response = SIO_MSG_2BIG;      /* Can't get the
buffer space */

                                      else
                                               {
                                               int diff = msgsize - buffsize;

                                               /* Reset pointer*/
                        HoldingBuffer[PortID] = (unsigned char *)tmpptr;

                                               /* Update buffer dimensions */

                                               HoldingBufferSize[PortID] += diff;
                                               buffsize = HoldingBufferSize[PortID];

                                               HoldingBufferAvailSize[PortID] += diff;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        buffavail = HoldingBufferAvailSize[PortID];
                                        }
                                }
                        if( !response )
                                {
                                if( msgsize > buffavail )
                                        response = SIO_RCVR_FULL;
                else
                                        response = SIO_MSG_SEND;

                }
                  }
                   }
            if( response == SIO_MSG_SEND )
                    {       /*      Set up some flags and variables */
                    PortFlags[PortID] |= PORT_MSG_DATA_IN;
                    MsgSize[PortID] = msgsize - 2;          /* Take away the two addded before */
                    }

    return response;
    }


/*
CheckMsgEnd
Desc:     Check the current status to determine response to message end handshake
Input:    PortID:Specifies the serial port to check for device connection
Return:   SIO_MSG_OK if message was received ok
                  SIO_MSG_COUNT_ERROR if message count was incorrect
Notes:    The Port ID is the value returned from the OpenPort function.

*/
unsigned int CheckMsgEnd( int PortID )
         {
         unsigned int response = SIO_MSG_OK;

         if( MsgSize[PortID] != MsgSizeRcvd[PortID] )
                 {
                 response = SIO_MSG_COUNT_ERROR;

       /* Clean up message with error condition */
       MsgCount[PortID]--;   /*       This last message is being removed */
       HoldingBufferAvailSize[PortID] += MsgSize[PortID];
                 }

         /* Reset variables and flag for next message */
         MsgSize[PortID] = MsgSizeRcvd[PortID] = 0;
         PortFlags[PortID] &= ~PORT_MSG_DATA_IN;

         return response;
   }


/*
SendBreak
Desc:     Sends a break to the channel because some error has occurred
Input:    PortID:Specifies the serial port to send the break to
Return:   none
Notes:    The Port ID is the value returned from the OpenPort function.

*/
void SendBreak( int PortID )
         {
         unsigned int msg;


         PortFlags[PortID] &= ~PORT_MSG_DATA_IN;
         PortFlags[PortID] &= ~PORT_MSG_DATA_OUT;
         HoldingBufferAvailSize[PortID] += MsgSizeRcvd[PortID];
         MsgSizeRcvd[PortID] = MsgSize[PortID] = 0;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        /************ WINDOWS SPECIFIC CODE ***************************/
#ifdef WINSIO
        ClearBuffers( PortID );
        SetCommBreak( PortID );
        ClearCommBreak( PortID );

        /* Reset port notification */
        while( !EnableCommNotification( PortID,  hNotifyWnd[PortID], 2, 1) );

#endif  //WINSIO
        /************ END WINDOWS CODE ********************************/


        return;
        }


/*
ClearBuffers
Desc:   Clears the ports buffers
Input:  PortID:Specifies the serial port to send the break to
Return: none
Notes:  The Port ID is the value returned from the OpenPort function.

*/
void ClearBuffers( int PortID )
        {
        /************ WINDOWS SPECIFIC CODE ***************************/
#ifdef WINSIO
        FlushComm( PortID, 0 );     /*      Flush txr */
        FlushComm( PortID, 1 );     /*      Flush rcvr */
#endif  //WINSIO
        /************ END WINDOWS CODE ********************************/


        return;
   }



/*
Wait1mSec
Desc:   Creates an approximate 1 - 2 mSec delay
Input:  none
Return: none
Notes:

*/
void Wait1mSec( void )
        {
//      /* !!!!!! Temporary implementation !!!!!!!!!!!! */
//      /*      USE SOME TYPE OF PLATFORM SPECIFIC TIMER FUNCTION !!!!!!!!!!  */
//      int i, j, wait1 = 1000, wait2 = 50;
//
//      for(i = 0; i < wait1; i++ )
//      for( j = 0; j < wait2; j++ );

        /************ WINDOWS SPECIFIC CODE ***************************/
        #ifdef WINSIO
        DWORD stime = GetCurrentTime();
        DWORD dtime = stime;

        while( dtime == stime )
                dtime = GetCurrentTime();

        stime = dtime;

        while( dtime == stime )
                dtime = GetCurrentTime();
   #endif       //WINSIO
        /************ END WINDOWS CODE ********************************/
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        }

/*************************************/
/**** Windows specific functions ****/
/*************************************/

#ifdef WINSIO
/*
InitNotifyWindow
Desc:     Initializes window for receiving WM_COMMNOTIFY messages
Input:    PortID:Specifies the serial port to receive messages from
                    COM: The ASCII name of the com port
          hInstance: The instance handle of the application
Return:   Handle to a window if successful, NULL if not
Notes:    The Port ID is the value returned from the OpenPort function.

*/
HWND InitNotifyWindow( int PortID, char *COM, HANDLE hInstance )
        {
        HWND hWnd = NULL;
        WNDCLASS wndclass;

        /*      Define window class and give it com port name */
    wndclass.style = 0;
        wndclass.lpfnWndProc = PortWndProc;
        wndclass.cbClsExtra = 0;
        wndclass.cbWndExtra = 2;
        wndclass.hInstance = hInstance;
        wndclass.hIcon = NULL;
        wndclass.hCursor = NULL;
        wndclass.hbrBackground = NULL;
        wndclass.lpszMenuName = NULL;
        wndclass.lpszClassName = COM;

    RegisterClass( &wndclass );

        /*      Create window */
        hWnd = CreateWindow( COM, "", 0, 0, 0, 0, 0, 0, 0, hInstance, 0 );

        if( hWnd )
                {
                /*      Store Port ID in window */
            SetWindowWord( hWnd, 0, PortID );

                /*      Setup the WM_COMMNOTIFY message posting
                        Set to be notified when two data bytes (handshake) arrives
                        in port */
                if( !EnableCommNotification( PortID, hWnd, 2, 1) )
                        {
                        /*      We had an error setting up COMMNOTIFY
                                Destroy window and zero out hWnd */
                        DestroyWindow( hWnd );
         hWnd = NULL;
         }
      }
       return hWnd;
   }


/*
SetParameters
Desc:     Sets the serial port parameters such as baud rate, stop bits etc.
Input:    COM: string specifying the port to use (i.e. "COM1")
Return:   0 if successful, windows error code if not
Notes:    The Port ID is the value returned from the OpenPort function.

*/
int SetParameters( char *COM )
        {
        int err = 0;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
            char buffer[25];
        DCB dcb;

            sprintf(buffer,"%s:%s,%s,%s,%s",COM, BAUDRATE, PARITY, DATABITS, STOPBITS );
            err = BuildCommDCB( buffer, &dcb );
            if( !err )
                    err = SetCommState( &dcb );

            return err;
            }

long FAR PASCAL _export PortWndProc( HWND hWnd, UINT msg,

                    UINT wParam, LONG lParam )
            {
            if( msg == WM_COMMNOTIFY )
                    {
                    /* PortID is stored in window instance */
                    int PortID = GetWindowWord( hWnd, 0 );

                    switch( LOWORD( lParam ) )
                            {
                            case CN_RECEIVE:
                                    if( PortStatus( PortID, PORT_MSG_DATA_IN ) )
                                            {       /* We're in the process of reading da a
*/
                                            while ( PortStatus( PortID, PORT_MSG_DATA_IN ) &
                                                            ReadPort2Buffer( PortID ) > (
);

                                            /* If we just got done reading the message, check
for
                                                    SIO_MSG_END handshake */
                                            if( !PortStatus( PortID, PORT_MSG_DATA_IN ) )
                                                    {
                                                    unsigned int msg = GetResponse( PortID,
1 );

                                                    if ( msg )
                                                            HandshakeAction( PortID, msg
);
                                                    }
                    }
                else
                                            {
                                            unsigned int msg = GetResponse( PortID, 0 );

                                            if ( msg )
                                                    HandshakeAction( PortID, msg );
                                            }

                                    break;

                            case CN_EVENT:
                                    {
                                    HandleCommEvent( PortID );
                                    break;
                }

            }
        return 0;
                    }
    else
                    return DefWindowProc( hWnd, msg, wParam, lParam );
        }


void HandleCommEvent( int PortID )
        {
        unsigned int msg;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

Docket No.: 13217.2

```
COMSTAT Stat;

/* Find out what the event was and clear it */
msg = GetCommEventMask( PortID, EV_ERR | EV_BREAK );

/* Clear the event */
GetCommError( PortID, &Stat );

if( msg )
        {
        /* We're here because a break or other error occurred */

        ClearBuffers( PortID );        /* Flush txr & rxr buffers */

        if( PortStatus( PortID, PORT_MSG_DATA_IN ) )
                {
                PortFlags[PortID] &= ~PORT_MSG_DATA_IN;

                /* Tell the transmitting port that we have aborted */
  SendHandshake( PortID, SIO_MSG_ABORT, 0 );

  /* Reset the Holding buffer */
                HoldingBufferAvailSize[PortID] += MsgSizeRcvd[PortID];
        }
        else if( PortStatus( PortID, PORT_MSG_DATA_OUT ) )
                {
                PortFlags[PortID] &= ~PORT_MSG_DATA_OUT;

                /* If we received an error, while transmitting, send a break
                        to the receiving port */
                SendBreak( PortID );
                }

        /* Clear these variables regardless of the PORT_MSG_DATA_IN\OUT flag
                since they could still have a value */
        MsgSizeRcvd[PortID] = MsgSize[PortID] = 0;

        /* Reset port notification */
        while( !EnableCommNotification( PortID,  hNotifyWnd[PortID], 2, 1) );

        }
}



/*
        Callback function for EnumTaskWindows
*/
#pragma argsused
BOOL FAR PASCAL FindWindowInst( HWND hWnd, DWORD lParam )
        {
        HWND hParent, hPrevParent = hWnd;

        while( hParent )
                {
                hParent = GetParent( hPrevParent );
                if( hParent )
        hPrevParent = hParent;
        }
        hMainInst = GetWindowWord( hPrevParent, GWW_HINSTANCE );
        return 1;
    }

#endif    // WINSIO
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE****************************************************************
        FILE            : sreinit.c
        DESC            : Initialization and Cleanup routines for the Sound Recognition Engine
        TABS            : 3
        OWNER           : Brent Hale
        DATE CREATED: 27 Oct 1994

                                        Copyright Synergetics 1993, 1994

                                        Warning Confidential Material
                                        Property of Synergetics
                                        Copyright 1993, 1994 All Rights Reserved

        SYNOPSIS: Initializes things on the 68030 side.
*END_HEADER*******************************************************************/

#include  "synergy.h"
#include  "srengine.h"
#include  "errors.h"
#include "bach.h"
#include  "compress.h"
#include  "evaltd.h"

/***************************** Global Data *********************************/
GLOBAL struct HIGGINS *pSREHList = (struct HIGGINS *)0;

GLOBAL void (*sreEventHandler)( struct HIGGINS *, struct HIGGINS * ) = 0;

/*FUNCTION_HEADER*********************
NAME:           sreInitialize
DESC:           Initialize the Sound Recognition Engine
IN:             none
OUT:            none
RETURN:   ALL_OK on success.
                        non-zero on failure.
NOTES:
*END_HEADER***************************/
int sreInitialize( void (*pEventHandler)( struct HIGGINS *, struct HIGGINS * ))
{
        /* Keep a pointer to the event handler */
        sreEventHandler = pEventHandler;

        /* Create the HIGGINS doublely linked list; we'll reuse it for
                each chunk of data processed in sreProcessBuffer(). */
        if (CreateHigginsList( NumberOfNodes, &pSREHList ) != ALL_OK) {
                return 1;
        }

        /* Initialize the CompressPhones() memory */
        InitializeCompressPhones();

        return ALL_OK;
}

/*FUNCTION_HEADER**********************
NAME:           sreCleanUp
DESC:           Clean up any memory issues in the Sound Recognition Engine
IN:             none
OUT:            none
RETURN:   none
NOTES:
*END_HEADER***************************/
void sreCleanUp( void )
{
        FreeHigginsList( pSREHList );
        CleanUpCompressPhones();

        pSREHList = (struct HIGGINS *)0;
}
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/*C_HEADER_FILE****************************************************************
        FILE            : srengine.c
        DESC            : Routine used to interface with the Sound Recognition Engine.
        TABS            : 3
        OWNER           : Brent Hale
        DATE CREATED: 27 Oct 1994

                                        Copyright Synergetics 1993, 1994

                                        Warning Confidential Material
                                        Property of Synergetics
                                        Copyright 1993, 1994 All Rights Reserved

        SYNOPSIS: This code will be on the 68030
*END_HEADER*******************************************************************/
#include "srengine._h"
#include "fixtrack.h"
#include  "pmi.h"
#include  "evaluate.h"
#include  "compress.h"
#include  "errors.h"

/**************************** Externs *************************************/

/*FUNCTION_HEADER*********************
NAME:           sreProcessHiggins
DESC:           Processes one chunk of data through the Sound Recognition Engine.
IN:             *pHiggins - ptr to the higgins list to process.
                        dspMaxAmpl - the MaxAmpl calculated on the DSP.
OUT:
RETURN:  ALL_OK - on success
                        error # - on failure.
NOTES:   This code will be on the 68030 and is what needs to happen
                        once we get the information from the DSP.
*END_HEADER**************************/
int sreProcessHiggins( struct HIGGINS *pHiggins, int dspMaxAmpl )
{
        struct HIGGINS *pNewList;

        /*  Smooth the formant tracks (bins), delete extraneous
                frequencies and fill in any holes  */
        FixTrack( pHiggins );

        /*  Find the Points of max intelligence from the formants to
                indicate areas for sound recognition. */
        PointMaxIntelligence( pHiggins );

        /* Match points of maximum intelligence with sounds. */
        Evaluate( pHiggins, dspMaxAmpl );

        /* Combine any possible phon's into phonemes */
        pNewList = CompressPhones( pHiggins );

        /* pass the higgins list to someone who cares. */
        sreEventHandler( pNewList, pHiggins );

        return ALL_OK;
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

Docket No.: 13217.2

```
/*C_HEADER_FILE*****************************************************************
        FILE                : stdrds.c
        DESC                : Standards Data
        TABS                : 4
        OWNER               : Brent Hale
        DATE CREATED:

                                            Copyright Synergetics 1993, 1994

                                            Warning Confidential Material
                                            Property of Synergetics
                                            Copyright 1993, 1994 All Rights Reserved

        SYNOPSIS:
*END_HEADER*****************************************************************/
#include "stdrds.h"


/* The regression equations constants for Formants 1,2,3 where

        Fi = (m * Fo) + b                              Formant frequency as a function of Fo
        F200 = Fi + m(200 - Fo)                   Formant frequency normalized to Fo = 200

 Pascii  B1    B2     B3          M1    M2     M3     */
/* FormantFormulaConstant - Linear vs Linear */

/* Formulas used to create the standards for the Voiced Fricatives */
FORMULA VoicedFricFormulas[] = {
/* Pascii          B1                B2                B3                M1
        M2      M3       */
/*---------------------------------------------------------------------------*/
        { 58,     {160.61,  1069.83,  1885.17},         {0.7726,  2.211,    4.020}},
        { 60,     {150.61,  1169.83,  2085.17},         {0.9726,  3.211,    3.720}},
        { 62,     {170.61,  1009.83,  1985.17},         {0.5726,  1.911,    3.920}},
        { 66,     {140.61,  1269.83,  1785.17},         {0.8726,  2.811,    4.420}},
        { 0,      {180.61,  1199.83,  1955.17},         {0.6726,  2.611,    4.220}},
};

HARMONIC_FORMULA VoicedHarFricFormulas[] = {
/* Pascii          */
/*----------*/
        { 58,
/*                  b                          m                 */
/*-------------------------------------*/
          {{ 0.0,         0.0,       },
                { 0.0,         0.0,       },
                { 0.0,         0.0,       },
                { 0.0,         0.0,       },
                { 0.0,         0.0,       },
                { 0.0,         0.0,       },
                { 0.0,         0.0,       },
                { 0.0,         0.0,       },
                { 0.0,         0.0,       },
                { 0.0,         0.0,       },
                { 0.0,         0.0,       },
                { 0.0,         0.0,       },
                { 0.0,         0.0,       },
                { 0.0,         0.0,       },
                { 0.0,         0.0,       }}},

        { 60,
/*                  b                          m                 */
/*-------------------------------------*/
          {{ 0.0,         0.0,       },
                { 0.0,         0.0,       },
                { 0.0,         0.0,       },
                { 0.0,         0.0,       },
                { 0.0,         0.0,       },
                { 0.0,         0.0,       },
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      }}},

      { 62,
/*                     b                    m                */
/*-------------------------------------*/
        {{ 0.0,         0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      }}},

      { 66,
/*                     b                    m                */
/*-------------------------------------*/
        {{ 0.0,         0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      }}},

/* End of list */
      { 0,
/*                     b                    m                */
/*-------------------------------------*/
        {{ 0.0,         0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      },
            { 0.0,          0.0,      }}},
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

Docket No.: 13217.2

```
};

STANDARD VoicedFricStd[] = {
/* pascii#          pattern   */
/*-----------------------------------------------------------------*/
        { 58,
                  { 0, 0, 0, 0, 0, 0, 0, 0, 0, 0, 0, 0, 0, 0, 0, 0,          /* Frequencies will
go here. */
                    0, 0, 0, 0, 0, 0, 0, 0, 0, 0, 0, 0, 0, 0, 0, 0, }},      /* Amplitudes are
hard-coded here */
        { 60,
                  { 0, 0, 0, 0, 0, 0, 0, 0, 0, 0, 0, 0, 0, 0, 0, 0,          /* Frequencies will
go here. */
                    0, 0, 0, 0, 0, 0, 0, 0, 0, 0, 0, 0, 0, 0, 0, 0, }},      /* Amplitudes are
hard-coded here */
        { 62,
                  { 0, 0, 0, 0, 0, 0, 0, 0, 0, 0, 0, 0, 0, 0, 0, 0,          /* Frequencies will
go here. */
                    0, 0, 0, 0, 0, 0, 0, 0, 0, 0, 0, 0, 0, 0, 0, 0, }},      /* Amplitudes are
hard-coded here */
        { 66,
                  { 0, 0, 0, 0, 0, 0, 0, 0, 0, 0, 0, 0, 0, 0, 0, 0,          /* Frequencies will
go here. */
                    0, 0, 0, 0, 0, 0, 0, 0, 0, 0, 0, 0, 0, 0, 0, 0, }},      /* Amplitudes are
hard-coded here */
        { 0,
                  { 0, 0, 0, 0, 0, 0, 0, 0, 0, 0, 0, 0, 0, 0, 0, 0,          /* Frequencies will
go here. */
                    0, 0, 0, 0, 0, 0, 0, 0, 0, 0, 0, 0, 0, 0, 0, 0, }},      /* Amplitudes are
hard-coded here */
};


/* Formulas used to create the standards for other Voiced Phon's */
FORMULA VoicedOtherFormulas[] = {
/* Pascii         B1                  B2                  B3                  M1
        M2        M3        */
/*---------------------------------------------------------------------------*/
        { 1,      {315.009, 3112.74,            -397.143},                    {-0.045,
        -2.46722, 22.8098}},
        { 3,      {294.94,            1353.82,            2034.65},
{0.987,           5.131,    4.964}},
        { 5,      {179.21,            1293.11,            2389.94},
{1.502,           5.264,    2.573}},
        { 7,      {403.27,            1458.76,            2034.53},
{1.428,           3.731,    4.985}},
        { 9,      {810.942, 2371.93,            2007.90},
{-0.161121,                 -5.14041, 2.83241}},
        { 14,     {466.32,            922.03,             2079.02},
{1.681,           3.383,    4.136}},
        { 17,     {261.297, 1119.81,            2670.54},
{0.702667,                  0.845097, 0.410589}},
        { 19,     {342.47,            948.59,             1665.52},
{0.830,           3.867,    5.004}},
        { 21,     {442.702, 822.747,            2402.59},
{-0.33241,                  -0.718643,          -0.80881}},
        { 22,     {431.22,            811.98,             2475.73},           {0.2606,
        0.5000,   1.704}},
        { 23,     {431.22,            811.98,             2475.73},           {0.2606,
        0.5000,   1.704}},
        { 24,     {709.628, 1124.91,            2371.97},           {0.410212,
0.339828, 3.10956}},
        { 29,     {314.23,            977.42,             1174.83},           {1.113,
        3.731,    4.428}},
        { 31,     {435.111, 658.758,            2806.82},           {-0.277778,
        -0.334204,          -2.43432}},
        { 33,     {211.21,            462.80,             2183.49},           {0.4859,
        5.110,    1.923}},
        { 36,     {211.21,            593.80,             2183.49},           {0.4859,
        2.854,    1.923}},
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        { 90,    {431.22,          811.98,          2475.73},         {0.2606,
        0.5000,  1.704}},
        { 94,    {431.22,          811.98,          2475.73},         {0.2606,
        0.5000,  1.704}},
        { 0,     {0.0,                      0.0,                      0.0},
                          {0.0,                     0.0,      0.0}},
};

/* Formulas used to create the standards for other Voiced Phon's */
HARMONIC_FORMULA VoicedHarOtherFormulas[] = {
        { 1,
/*                        b                          m                  */
/*----------------------*/
                  {{ 23.925,          0.0639,           },
                   { 43.1006,         0.116964, },
                   { 54.5453,         0.1132,           },
                   { 60.7934,         0.111916, },
                   { 62.7092,         0.0989,           },
                   { 66.9046,         0.105248, },
                   { 68.9042,         0.101159, },
                   { 70.9394,         0.102078, },
                   { 73.8657,         0.103871, },
                   { 76.6542,         0.109661, },
                   { 78.566,          0.105545, },
                   { 0.0,    0.0,     },
                   { 0.0,    0.0, },
                   { 0.0,    0.0,     },
                   { 0.0,    0.0,     }}},

        { 3,
/*                        b                          m                  */
/*----------------------*/
                  {{ 31.0818,         0.0948,           },
                   { 37.6375,         0.0787,           },
                   { 54.8824,         0.115936, },
                   { 59.882,          0.103487, },
                   { 61.8428,         0.097235,         },
                   { 67.4577,         0.107712, },
                   { 69.8282,         0.106478, },
                   { 71.9363,         0.104027, },
                   { 74.1275,         0.105246, },
                   { 75.6143,         0.102906, },
                   { 79.3344,         0.106665, },
                   { 0.0,    0.0,     },
                   { 0.0,    0.0, },
                   { 0.0,    0.0,     },
                   { 0.0,    0.0,     }}},

        { 7,
/*                        b                          m                  */
/*----------------------*/
                  {{ 35.8081,         0.117513,         },
                   { 37.9594,         0.0862,           },
                   { 55.9232,         0.122236, },
                   { 59.2746,         0.105329, },
                   { 64.3502,         0.111596, },
                   { 66.8912,         0.105726, },
                   { 70.5895,         0.110907, },
                   { 72.3561,         0.108349, },
                   { 74.6623,         0.108032, },
                   { 76.825,          0.11056,          },
                   { 79.5416,         0.110216, },
                   { 0.0,    0.0,     },
                   { 0.0,    0.0, },
                   { 0.0,    0.0,     },
                   { 0.0,    0.0,     }}},

        { 9,
/*                        b                          m                  */
/*----------------------*/
                  {{ 27.3808,         0.0891,           },
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                { 46.0161,         0.117744, },
                { 57.4503,         0.132157, },
                { 59.863,          0.113996, },
                { 67.1216,         0.130564, },
                { 68.5702,         0.119971, },
                { 72.1892,         0.122477, },
                { 73.8496,         0.11908,          },
                { 77.1308,         0.125179, },
                { 78.0586,         0.118421, },
                { 81.6235,         0.125473, },
                { 0.0,    0.0,     },
                { 0.0,    0.0, },
                { 0.0,    0.0,     },
                { 0.0,    0.0,     }}},

        { 14,
/*                      b                          m                    */
/*---------------------*/
               {{ 29.9976,         0.0967,           },
                { 40.7298,         0.0901,           },
                { 55.0417,         0.117045, },
                { 58.4921,         0.107211, },
                { 65.8377,         0.119586,         },
                { 65.9093,         0.100399, },
                { 70.9514,         0.113684, },
                { 72.519,          0.107896, },
                { 75.3182,         0.113199, },
                { 76.5463,         0.108146, },
                { 79.4491,         0.109836, },
                { 0.0,    0.0,     },
                { 0.0,    0.0, },
                { 0.0,    0.0,     },
                { 0.0,    0.0,     }}},

        { 17,
/*                      b                          m                    */
/*---------------------*/
               {{ 26.9756,         0.076984,         },
                { 51.8834,         0.148419, },
                { 50.9061,         0.0955,           },
                { 60.211,          0.111777, },
                { 63.4817,         0.10496,  },
                { 67.1155,         0.106036, },
                { 70.9826,         0.112958, },
                { 71.1014,         0.0997,           },
                { 74.2932,         0.106116, },
                { 76.5634,         0.107109, },
                { 80.2467,         0.0114159,        },
                { 0.0,    0.0,     },
                { 0.0,    0.0, },
                { 0.0,    0.0,     },
                { 0.0,    0.0,     }}},

        { 21,
/*                      b                          m                    */
/*---------------------*/
               {{ 35.6987,         0.118874,         },
                { 42.9284,         0.104448, },
                { 51.6091,         0.106709, },
                { 59.6202,         0.108802, },
                { 64.0317,         0.107957,         },
                { 66.9097,         0.10484,          },
                { 70.2666,         0.107929, },
                { 71.7338,         0.102196, },
                { 75.2727,         0.111200, },
                { 76.7847,         0.107923, },
                { 79.5333,         0.109177, },
                { 0.0,    0.0,     },
                { 0.0,    0.0, },
                { 0.0,    0.0,     },
                { 0.0,    0.0,     }}},
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        { 24,
/*                       b                            m                    */
/*---------------------*/
                 {{ 26.3645,        0.0772,            },
                  { 43.4946,        0.095061, },
                  { 50.796,         0.0974,            },
                  { 60.6949,        0.122010, },
                  { 65.2771,        0.116403,          },
                  { 66.9481,        0.106186, },
                  { 71.0327,        0.1114422,         },
                  { 72.5388,        0.108871, },
                  { 76.0082,        0.116995, },
                  { 77.3385,        0.112669, },
                  { 78.6243,        0.104959, },
                  { 0.0,    0.0,      },
                  { 0.0,    0.0, },
                  { 0.0,    0.0,      },
                  { 0.0,    0.0,      }}},

        { 26,
/*                       b                            m                    */
/*---------------------*/
                 {{ 94.161,         0.346415,          },
                  { 28.8099,        0.0448,            },
                  { 55.6297,        0.107713, },
                  { 40.9908,        0.0250,            },
                  { 63.7703,        0.103867,          },
                  { 56.7514,        0.0615,            },
                  { 64.7022,        0.0792,            },
                  { 97.9576,        0.229010,          },
                  { 66.7865,        0.0708,            },
                  { 72.7685,        0.087492, },
                  { 74.6368,        0.0865,            },
                  { 0.0,    0.0,      },
                  { 0.0,    0.0, },
                  { 0.0,    0.0,      },
                  { 0.0,    0.0,      }}},

        { 29,
/*                       b                            m                    */
/*---------------------*/
                 {{ 37.5589,        0.134410,          },
                  { 29.1422,        0.0426,            },
                  { 55.5325,        0.112150, },
                  { 56.7644,        0.095904, },
                  { 62.0948,        0.103664,          },
                  { 66.5342,        0.104791, },
                  { 68.3164,        0.0982,            },
                  { 71.9616,        0.104908, },
                  { 73.2931,        0.100259, },
                  { 75.6625,        0.102199, },
                  { 77.4381,        0.0989,            },
                  { 0.0,    0.0,      },
                  { 0.0,    0.0, },
                  { 0.0,    0.0,      },
                  { 0.0,    0.0,      }}},

        { 31,
/*                       b                            m                    */
/*---------------------*/
                 {{ 24.0535,        0.065356,          },
                  { 46.3754,        0.123127, },
                  { 50.9352,        0.091369, },
                  { 56.8214,        0.0948,            },
                  { 60.8415,        0.089737, },
                  { 63.9034,        0.0906,            },
                  { 66.7104,        0.0894,            },
                  { 69.1107,        0.0879,            },
                  { 71.9378,        0.094015, },
                  { 73.6224,        0.0913,            },
                  { 77.2013,        0.0941,            },
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                { 0.0,   0.0,      },
                { 0.0,   0.0, },
                { 0.0,   0.0,      },
                { 0.0,   0.0,      }}},

        { 33,
/*                      b                          m                    */
/*---------------------*/
               {{ 36.1683,          0.136196,},
                { 40.7677,          0.0997,   },
                { 51.0809,          0.0938,   },
                { 57.2837,          0.0961,   },
                { 61.365,           0.0925,   },
                { 64.1689,          0.0924,   },
                { 67.4613,          0.0944,   },
                { 66.918,           0.0806,   },
                { 72.5547,          0.0951,   },
                { 74.3771,          0.095119,},
                { 77.5436,          0.0966,   },
                { 0.0,   0.0,      },
                { 0.0,   0.0, },
                { 0.0,   0.0,      },
                { 0.0,   0.0,      }}},

        { 36,
/*                      b                          m                    */
/*---------------------*/
               {{ 25.1280,          0.0677,   },
                { 42.9834,          0.110396,},
                { 50.5331,          0.0918,   },
                { 57.1574,          0.0935,   },
                { 60.3679,          0.0872,  },
                { 64.1232,          0.0916,   },
                { 67.7702,          0.0953,   },
                { 69.967,           0.0934,   },
                { 71.8082,          0.0916,   },
                { 74.66, 0.0975,   },
                { 77.0475,          0.0955,   },
                { 0.0,   0.0,      },
                { 0.0,   0.0, },
                { 0.0,   0.0,      },
                { 0.0,   0.0,      }}},

        { 90,
/*                      b                          m                    */
/*---------------------*/
               {{ 34.559,           0.117681, },
                { 45.7616,          0.123735, },
                { 52.5577,          0.110983, },
                { 60.4452,          0.116582, },
                { 65.0779,          0.113763, },
                { 66.9828,          0.107816, },
                { 70.2725,          0.108867, },
                { 72.0092,          0.106249, },
                { 75.4537,          0.113103, },
                { 76.8398,          0.110225, },
                { 79.5101,          0.110944, },
                { 0.0,   0.0,      },
                { 0.0,   0.0, },
                { 0.0,   0.0,      },
                { 0.0,   0.0,      }}},

        { 94,
/*                      b                          m                    */
/*---------------------*/
               {{ 33.01, 0.103040, },
                { 19.5992,          0.0222,            },
                { 54.2337,          0.102615, },
                { 58.7361,          0.106557, },
                { 62.8017,          0.106312, },
                { 69.182,           0.120343, },
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                    { 70.1864,          0.108033, },
                    { 71.856,           0.105312, },
                    { 75.8229,          0.114387, },
                    { 76.1835,          0.105750, },
                    { 79.8682,          0.110951, },
                    { 0.0,    0.0,      },
                    { 0.0,    0.0, },
                    { 0.0,    0.0,      },
                    { 0.0,    0.0,      }}},
};

STANDARD VoicedOtherStd[] = {
/* pascii#          pattern */
/*-------------------------------------------------------------*/
        { 1,
                    { 0, 0, 0, 0, 0, 0, 0, 0, 0, 0, 0, 0, 0, 0, 0, 0,         /* Frequencies will
go here. */
                              0.73378,  0.08242,  0.01025, 0.01257,   0.06235,  0.07415,
0.09800,  0.05573,  0.02970,  0.01606, 0.02196,   0,        0,        0,        0         }},

        { 3,
                    { 0, 0, 0, 0, 0, 0, 0, 0, 0, 0, 0, 0, 0, 0, 0, 0,         /* Frequencies will
go here. */
                              0.7639,   0.2279,   0.02602, 0.05287,   0.11788,  0.10825,
0.04873,  0.02985,  0.02271,  0.00936, 0.01144,   0,        0,        0,        0         }},

        { 7,
                    { 0, 0, 0, 0, 0, 0, 0, 0, 0, 0, 0, 0, 0, 0, 0, 0,         /* Frequencies will
go here. */
                              0.7151,   0.6677,   0.05651, 0.2010,    0.15908,  0.10852,
0.07466,  0.03763,  0.02601,  0.1840, 0.02638,    0,        0,        0,        0         }},

        { 9,
                    { 0, 0, 0, 0, 0, 0, 0, 0, 0, 0, 0, 0, 0, 0, 0, 0,         /* Frequencies will
go here. */
                              0.6873,   0.6969,   0.2288, 0.3164,     0.16726,  0.10475,
0.04561,  0.4229,   0.02519,  0.02961, 0.02507,   0,        0,        0,        0         }},

        { 14,
                    { 0, 0, 0, 0, 0, 0, 0, 0, 0, 0, 0, 0, 0, 0, 0, 0,         /* Frequencies will
go here. */
                              0.6035,   0.73174,  0.24344, 0.10904,   0.04517,  0.05183,
0.03564,  0.02398,  0.01906,  0.01425, 0.01929,   0,        0,        0,        0         }},

        { 17,
                    { 0, 0, 0, 0, 0, 0, 0, 0, 0, 0, 0, 0, 0, 0, 0, 0,         /* Frequencies will
go here. */
                              0.84656,  0.13270,  0.06494, 0.01722,   0.01704,  0.01187,
0.01020,  0.0844,   0.00498,  0.00430, 0.00328,   0,        0,        0,        0         }},

        { 21,
                    { 0, 0, 0, 0, 0, 0, 0, 0, 0, 0, 0, 0, 0, 0, 0, 0,         /* Frequencies will
go here. */
                              0.8169,   0.6282,   0.09954, 0.01004,   0.01519,  0.01394,
0.01664,  0.01172,  0.00420,  0.00334, 0.00760,   0,        0,        0,        0         }},

        { 24,
                    { 0, 0, 0, 0, 0, 0, 0, 0, 0, 0, 0, 0, 0, 0, 0, 0,         /* Frequencies will
go here. */
                              0.5820,   0.71981,  0.46648, 0.05332,   0.03806,  0.05735,
0.03654,  0.03031,  0.01378,  0.01700, 0.01591,   0,        0,        0,        0         }},

        { 26,
                    { 0, 0, 0, 0, 0, 0, 0, 0, 0, 0, 0, 0, 0, 0, 0, 0,         /* Frequencies will
go here. */
                              0.4687,   0.8466,   0.09751, 0.14443,   0.08847,  0.02578,
0.02344,  0.01238,  0.00421,  0.00633,  0.00621,  0,        0,        0,        0         }},

        { 29,
                    { 0, 0, 0, 0, 0, 0, 0, 0, 0, 0, 0, 0, 0, 0, 0, 0,         /* Frequencies will
go here. */
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                              0.7303,    0.6409,    0.14210, 0.18553,    0.04658,  0.01132,
 0.00950,  0.01173,  0.00455,  0.00503, 0.00525,   0,         0,          0,         0          }},

          { 31,
                    { 0, 0, 0, 0, 0, 0, 0, 0, 0, 0, 0, 0, 0, 0, 0, 0,          /* Frequencies will
go here. */
                              0.59022,  0.06093,  0.04107, 0.02801,   0.03190,  0.02579,
0.01022,  0.00956,  0.00827,  0.00389, 0.00562,   0,         0,          0,         0          }},

          { 33,
                    { 0, 0, 0, 0, 0, 0, 0, 0, 0, 0, 0, 0, 0, 0, 0, 0,          /* Frequencies will
go here. */
                              0.6386,   0.08579,  0.01947, 0.02064,   0.02314,  0.01728,
0.00754,  0.00404,  0.00525,  0.00264, 0.00300,   0,         0,          0,         0          }},

          { 36,
                    { 0, 0, 0, 0, 0, 0, 0, 0, 0, 0, 0, 0, 0, 0, 0, 0,          /* Frequencies will
go here. */
                              0.6428,   0.11144,  0.04302, 0.01870,   0.03721,  0.03611,
0.01658,  0.01300,  0.00673,  0.00614, 0.00722,   0,         0,          0,         0          }},

          { 90,
                    { 0, 0, 0, 0, 0, 0, 0, 0, 0, 0, 0, 0, 0, 0, 0, 0,          /* Frequencies wil
go here. */
                              0.8455,   0.6897,   0.04924, 0.00760,   0.00872,  0.01520,
0.01178,  0.01369,  0.00705,  0.00562, 0.00961,   0,         0,          0,         0          }},

          { 94,
                    { 0, 0, 0, 0, 0, 0, 0, 0, 0, 0, 0, 0, 0, 0, 0, 0,          /* Frequencies will
go here. */
                              0.9353,   0.6894,   0.14631, 0.12756,   0.02257,  0.02135,
0.00881,  0.00561,  0.00194,  0.00151, 0.00182,   0,         0,          0,         0          }},

          { 0,
                    { 0, 0, 0, 0, 0, 0, 0, 0, 0, 0, 0, 0, 0, 0, 0, 0,          /* Frequencies will
go here. */
                      0, 0, 0, 0, 0, 0, 0, 0, 0, 0, 0, 0, 0, 0, 0, 0, }},      /* Amplitudes are
hard-coded here */
};

#ifdef    DONT_HAVE_YET
STANDARD UnvoicedOtherStd[] = {
/************************ Unvoiced Fricatives ***********************/
/* pascii#           RelAmp    zcr       duration  F1                          F2
                     F3...F15  */
/*---------------------------------------------------------------*/
          { 57,     25,                1,                  1,                  {1.0,
          0.6197126,          0.8366405,          0.6755267,          0.6473607,
0.5344577,          0.4145395,          0.4515694,          0.4292353,          0.4739683,
25.075697,          31.050948,          37.193311,          38.939808,
52.578000,          31.842832}},
          { 59,               20,                 1,                  1,
{1.0,          0.4126457,     0.5133013,          0.4331075,          0.4055385,
0.3949356,          0.3749263,          0.3738890,          0.3525115,          0.4131706,
19.627148,          25.616308,          29.471095,          40.967576,
55.971921,          32.802699}},
          { 61,     35,                1,                  1,
{0.3336067,         0.2188756,          0.2916701,          0.2994318,
0.5955675,          0.8826834,          0.9252790,          1.0,           0.9986759,       0.9054088,
 22.995122,         29.808178,          81.536262,          206.514450,
301.739860,         119.002000}},
          { 65,     65,                1,                  1,
{0.1386761,         0.1327473,          0.6699939,          1.0,           0.8056134,
0.4685289,          0.2660963,          0.2295498,          0.1468817,          0.1022510,
89.805304, 284.936730,        375.913760,         226.613180,         133.803160,  36.378877}},

/************************ Other Unvoiced Sounds *********************/
/* pascii#           RelAmp    zcr       duration  F1                          F2
                     F3...F15  */
/*---------------------------------------------------------------*/
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        { 39,    25,              1,              1,              {1.0,
        0.6197126,       0.8366405,       0.6755267,       0.6473607,
0.5344577,       0.4145395,       0.4515694,       0.4292353,       0.4739683,
25.075697,        31.050948,       37.193311,       38.939808,
52.578000,        31.842832}},
        { 41,    40,              1,              1,              {1.0,
        0.6197126,       0.8366405,       0.6755267,       0.6473607,
0.5344577,       0.4145395,       0.4515694,       0.4292353,       0.4739683,
25.075697,        31.050948,       37.193311,       38.939808,
52.578000,        31.842832}},
        { 47,    40,              1,              1,              {1.0,
        0.6197126,       0.8366405,       0.6755267,       0.6473607,
0.5344577,       0.4145395,       0.4515694,       0.4292353,       0.4739683,
25.075697,        31.050948,       37.193311,       38.939808,
52.578000,        31.842832}},
        { 76,    35,              1,              1,              {1.0,
        0.6197126,       0.8366405,       0.6755267,       0.6473607,
0.5344577,       0.4145395,       0.4515694,       0.4292353,       0.4739683,
25.075697,        31.050948,       37.193311,       38.939808,
52.578000,        31.842832}},
        { 0,             0,                              0,              0,
        { 0,             0,                              0,
0,                       0,              0,              0,       0,
                 0,                      0,                               0,
                  0,              0,              0,              0,
         0  }, },
};
#endif

/* An index lookup table for 2^(index/12).  Enough for 6 octaves plus */
float PowerTblLookup[80] = {
        1.0594631433, 1.1224620342, 1.1892070770, 1.2599210739, 1.3348398209,
        1.4142135382, 1.4983071089, 1.5874010324, 1.6817928553, 1.7817974091,

        1.8877485991, 2.0000000000, 2.1189262867, 2.2449240685, 2.3784141541,
        2.5198421478, 2.6696796417, 2.8284270763, 2.9966142178, 3.1748020649,

        3.3635857105, 3.5635950565, 3.7754971981, 4.0000000000, 4.2378520966,
        4.4898486137, 4.7568283081, 5.0396838188, 5.3393597603, 5.6568541527,

        5.9932279587, 6.3496046066, 6.7271714211, 7.1271891594, 7.5509948730,
        8.0000000000, 8.4757041931, 8.9796972275, 9.5136566162, 10.0793676376,

        10.6787195206, 11.3137083054, 11.9864559174, 12.6992092133, 13.4543428421,
        14.2543783188, 15.1019897461, 16.0000000000, 16.9514122009, 17.9593906403,

        19.0273132324, 20.1587390900, 21.3574352264, 22.6274166107, 23.9729156494,
        25.3984146118, 26.9086856842, 28.5087623596, 30.2039737701, 32.0000000000,

        33.9028244019, 35.9187812805, 38.0546264648, 40.3174781799, 42.7148704529,
        45.2548332214, 47.9458312988, 50.7968292236, 53.8173713684, 57.0175247192,

        60.4079475403, 64.0000000000, 67.8056488037, 71.8375625610, 76.1092529297,
        80.6349563599, 85.4297409058, 90.5096664429, 95.8916625977, 101.5936584473,
};
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/************************************************
 *                    -- dynamic.c --
 *  Copywrite Synergetics 1993, 1994
 *  Written by Tom Jensen
 *
 * Warning Confidential Material
 * Property of Synergetics
 * Copyright 1993, 1994 All Rights Reserved
 ************************************************/

#include "dsp.h"
#include  "wavio.h"

extern int MaxAmpl;

typedef struct {
          int pmi;
          char Type;
          long Location;
          int  Size;
          int  Ls;
          int       Fo;
          int MaxAmpl;
          int ZCR;
          int SumSlope;
          int ffreq[MAXFORMANTS];
          int ampl[MAXFORMANTS];
} MICROBE;


extern struct COMMANDLINE clo;
extern int PersonNumber;

/************************************************
StuffHigginsToDisk


************************************************/
void StuffHigginsToDisk(struct HIGGINS *frmstart)
{
          struct HIGGINS *Higgins;
          FILE *fpFormant;
          MICROBE Microbe;
          int i;
          static int FirstTime = 1;
          char Filename[MAXBUFFER];
          static int CurPerson = 0;

          Higgins = frmstart;
          sprintf(Filename, "c:\\dump\\formants.%d", PersonNumber);

          if(CurPerson != PersonNumber)
          {
                    CurPerson = PersonNumber;
                    fpFormant = fopen(Filename, "wb");
                    if(fpFormant)
                    {
                              fclose(fpFormant);
                    }
                    FirstTime = 1;
          }

/* Here we walk through the list of Higgins structures and save them to disk */

          while(Higgins && Higgins->type != 'N')
          {
                    Microbe.ZCR = Higgins->zcr;
                    Microbe.SumSlope = Higgins->sumSlope;
                    Microbe.Type = Higgins->type;
                    Microbe.pmi = Higgins->pmi;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                Microbe.Location = GetFileLocation( Higgins->loc );
                Microbe.Size = Higgins->size;
                Microbe.Ls = Higgins->Ls;
                Microbe.Fo = Higgins->Fo;
                Microbe.MaxAmpl = MaxAmpl;
                for ( i = 0; i < MAXFORMANTS; i++ )
                {
                        Microbe.ffreq[i] = Higgins->ffreq[i];
                        Microbe.ampl[i] = Higgins->ampl[i];
                }

                fpFormant = fopen(Filename, "ab");

                if(fpFormant)
                {
                        fwrite((void *)&Microbe, sizeof(MICROBE), 1, fpFormant);
                        fclose(fpFormant);
                }

                Higgins = Higgins->next;

        }
        FirstTime = 0;
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
// troi.c

#include "windows.h"
#include "troi.h"
#include "permman.h"
#include "codes.h"
#include "simpleio.h"
#include "_federat.h"
#include "error.h"
//#include "memtest.h"

/***********************************************************************
          Defines
***********************************************************************/
#define GROWTH_SIZE 16

/***********************************************************************
          Globals
***********************************************************************/
static int          numDictionaries;
TroiContext         Troi;
#if 0     //@
static int          PacketID=0x01ff;
#endif

/***********************************************************************
          Prototypes
***********************************************************************/
static int /*OK!=0*/ SearchForSound (
          unsigned char        Sound,
          unsigned      offSound
);

/***********************************************************************
          Code
***********************************************************************/

#if 0
/***********************************************************************
          MergeFromLists makes a second list that has the from_place structs of
          both of the origional list. They are merged so as to still be sorted
          in decending order by the key offSound and then decending order by the
          secondary key pSound->idDict.
***********************************************************************/
list_t /*pNewFromList*/ *MergeFromLists(
          list_t *pFromList1, list_t *pFromList2
) {
 list_t              *RetVal;
 from_place          *pFromNew,           *pFrom1,  *pFrom2;

          if (pFromList1==NULL || pFromList2==NULL) {
                    RetVal = duplicate_list(pFromList1--NULL ? pFromList2 : pFromList1);
          } else if ((RetVal = create_list(sizeof(from_place))) != NULL) {
                    pFrom1 = last_in_list(pFromList1);
                    pFrom2 = last_in_list(pFromList2);
                    while (pFrom1 || pFrom2) {
                              pFromNew = append_to_list(RetVal);
                              if (pFrom1==NULL) {
                                        memcpy(pFromNew, pFrom2, sizeof(from_place));
                                        pFrom2 = next_in_list(pFrom2);
                              } else if (pFrom2==NULL) {
                                        memcpy(pFromNew, pFrom1, sizeof(from_place));
                                        pFrom1 = next_in_list(pFrom1);
                              } else if (
                                        (pFrom1->offSound > pFrom2->offSound)
                                        || (
                                                  (pFrom1->offSound == pFrom2->offSound)
                                                  && (pFrom1->pSound->idDict >
pFrom2->pSound->idDict)
                                        )
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                        ) {
                                memcpy(pFromNew, pFrom2, sizeof(from_place));
                                pFrom2 = next_in_list(pFrom2);
                        } else {
                                memcpy(pFromNew, pFrom1, sizeof(from_place));
                                pFrom1 = next_in_list(pFrom1);
                        }

                }
        } else {
                DebugOutput(DBF_ERROR, "Out of memory!\n");
        }

        return RetVal;
}

/*********************************************************************
dupPathElement2
        Create a duplicate path element
*********************************************************************/
void dupPathElement2(path_elment *pNewElement, path_elment *pOrgElement) {
 path_elment        *pOrgListElement;
 list_t                 *pElementList;

        pNewElement->type = pOrgElement->type;
        switch (pOrgElement->type) {
                case PT_WORD:
                        pNewElement->data.pSound = pOrgElement->data.pSound;
                break;

                case PT_CHOICES:
                case PT_SEQUENCE:
                        pNewElement->data.pElementList = pElementList = create_list(
                                sizeof(path_elment)
                        );
                        for (
                                pOrgListElement = first_in_list(
                                        pOrgElement->data.pElementList
                                );
                                pOrgListElement;
                                pOrgListElement = next_in_list(pOrgListElement)
                        ) {
                                dupPathElement2(append_to_list(pElementList),
pOrgListElement);
                        }
                break;
        }
}

/*********************************************************************
dupPathElement
        Create a duplicate path element
*********************************************************************/
path_elment *dupPathElement(path_elment *OrgElement) {
 path_elment        *RetVal=NULL;

        if (OrgElement) {
                RetVal = malloc(sizeof(path_elment));
                if (RetVal==NULL) {
                        DebugOutput(DBF_ERROR, "Out of memory");
                        return RetVal;
                }
                dupPathElement2(RetVal, OrgElement);
        }

        return RetVal;
}
#endif

/*********************************************************************
InitPossibleWords
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        Initialize the possible words data.
***********************************************************************/
static  PossibleWord *InitPossibleWords (
        unsigned  offFirstSound
) {
 PossibleWord       *pWord,   *pLast,   *RetVal=NULL;
 DictContext        *pDict;
 unsigned           idDict=0;
 unsigned                      maxDict=0;

        pDict = first_in_list(Troi.pDictList);
        for (
                pLast=NULL,
                        pWord = Troi.pFirstActiveWord ?
                                Troi.pFirstActiveWord :
first_in_list(Troi.pPossibleWordList);
                pWord && pWord->offFirstSound<=offFirstSound;
                pLast=pWord, pWord=next_in_list(pWord)
        ) {
                if (pWord->offFirstSound==offFirstSound) {
                        if (RetVal==NULL) {
                                RetVal = pWord;
                        }
                        pDict = next_in_list (pDict);
                        if (pWord->idDict > maxDict) {
                                maxDict = pWord->idDict;
                        }
                }
        }
        for (
                idDict=maxDict+1;
                idDict<=Troi.numDictsInUse;
                idDict++, pDict=next_in_list(pDict)
        ) {
                if (
                        (pWord = insert_after_in_list(
                                Troi.pPossibleWordList, pLast
                        )) != NULL
                ) {
                        memset(pWord, 0, sizeof(PossibleWord));
                        pWord->offFirstSound = pWord->offLastSound = offFirstSound;
                        pWord->idDict = idDict;
                        pWord->pDict = malloc(sizeof(DictContext));
                        if (pWord->pDict==NULL) {
                                DebugOutput(DBF_ERROR, "Out of memory");
                                return NULL;
                        }
                        memcpy(pWord->pDict, pDict, sizeof(DictContext));
                        if (
                                !Troi.pFirstActiveWord
                                || Troi.pFirstActiveWord->offFirstSound>offFirstSound
                        ) {
                                Troi.pFirstActiveWord = RetVal = pWord;
                        }
                } else {
                        //error out of memory?
                        DebugOutput(DBF_ERROR, "Out of memory!\n");
                }
        }

        return RetVal;
}

/*********************************************************************
InitTroi
        Initialize the TroiContext
*********************************************************************/
void InitTroi() {

        Troi.pDictList = create_list(sizeof(DictContext));
        if (InitPhonicTree("common.PHD",      append_to_list(Troi.pDictList))) {
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                    wsprintf(ErrorBuff, "Unable to load dictionary %s", "common.PHD");
                    DebugOutput(DBF_ERROR, ErrorBuff);
          }
//        if (InitPhonicTree("FULL.PHD",                  append_to_list(Troi.pDictList))) {
//                  wsprintf(ErrorBuff, "Unable to load dictionary %s", "FULL.PHD");
//                  DebugOutput(DBF_ERROR, ErrorBuff);
//        }
          wsprintf(
                    ErrorBuff,
                    "%d dictionaries loaded.\n",
                    numDictionaries = count_in_list(Troi.pDictList)
          );
          DebugOutput(DBF_TRACE, ErrorBuff);
          Troi.numDictsInUse = 1;
          Troi.pPossibleWordList = create_list(sizeof(PossibleWord));
          Troi.pPasciiList = create_list(sizeof(POSSIBLE) * MAX_POSSIBILITIES);
          Troi.pFirstActiveWord = NULL;
          InitPossibleWords(0);
          InitPermMan();
}

/***********************************************************************
ResetTroi
          Reset the TroiContext
***********************************************************************/
void ResetTroi(void) {
 PossibleWord       *pWord;

          Troi.idxSound = 0;
          if (Troi.pPossibleWordList) {
                    for (
                              pWord = first_in_list(Troi.pPossibleWordList);
                              pWord;
                              pWord = next_in_list(pWord)
                    ) {
                              if (pWord->pDict) {
                                        free(pWord->pDict);
                              }
                    }
                    destroy_list(Troi.pPossibleWordList);
          }
          Troi.pPossibleWordList = create_list(sizeof(PossibleWord));
          if (Troi.pPasciiList) {
                    destroy_list(Troi.pPasciiList);
          }
          Troi.pPasciiList = create_list(sizeof(POSSIBLE) * MAX_POSSIBILITIES);
          Troi.idxPostLastWord = 0;
          Troi.numDictsInUse = 1;
          Troi.pFirstActiveWord = NULL;
          InitPossibleWords(0);
          ResetPermMan();
}

/***********************************************************************
QuitTroi
          Cleanup the TroiContext
***********************************************************************/
void QuitTroi() {
 PossibleWord       *pWord;
 DictContext        *pDict,   *pTemp;

          pDict = first_in_list(Troi.pDictList);
          while (pDict) {
                    QuitPhonicTree(pDict);
                    pTemp = pDict;
                    pDict = next_in_list (pTemp);
                    remove_from_list(Troi.pDictList, pTemp);
          }
          destroy_list(Troi.pDictList);

          for (pWord = first_in_list(Troi.pPossibleWordList);
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                    pWord;
                    pWord = next_in_list(pWord)
        ) {
                if (pWord->pDict) {
                        free(pWord->pDict);
                }
        }

        destroy_list(Troi.pPossibleWordList);
        destroy_list(Troi.pPasciiList);
        QuitPermMan();
}

#if 0
/**********************************************************************
GenerateChoices(PossibleWord *pPostBreakWord);
**********************************************************************/
static path_elment *GenerateChoices (PossibleWord *pPostBreakWord) {
 PossibleWord       *pWord;
 path_elment        *pPrevPath,             *pPathElement;
 path_elment        *pThisChoice,    *RetVal=NULL;
 from_place                 *pFromPlace,       *pNextFromPlace;
 int                        cMatchingPaths,    cPaths;
 list_t                     *pChoiceList;

        if (pPostBreakWord->pPath) {
                /* The path to here has already been generated */
                return pPostBreakWord->pPath;
        } else if (
                pPostBreakWord->pFromList &&
                (cPaths = count_in_list(pPostBreakWord->pFromList))!=0
        ) {
                /* this is a non-leaf node (ie. we got here from somewhere) */
                for (
                        cMatchingPaths = 0,
                        pNextFromPlace = pFromPlace = last_in_list(
                                pPostBreakWord->pFromList
                        );
                        pNextFromPlace &&
                        pNextFromPlace->offSound==pFromPlace->offSound;
                        cMatchingPaths++,
                        pNextFromPlace = prev_in_list(pNextFromPlace)
                ); /* count the dicts that sent us here from the same place */
                do {    //build the sequence
                        pWord = prev_in_list(pPostBreakWord);
                        /* backup to pFromPlace
                                (ie. the last place we found a way here from)
                        */
                        while (
                                pWord && (
                                        pWord->offFirstSound > pFromPlace->offSound ||
                                        pWord->idDict != pFromPlace->pSound->idDict
                                )
                        ) {
                                pWord = prev_in_list(pWord);
                        }       //pWord is the start of the word of the nearest from place
                        pPrevPath = dupPathElement (
                                GenerateChoices(pWord)
                        );
                        /*
                                pWord is the word we got here from;
                                pPrevPath represents how we got to pWord;
                                cMatchingPaths is how many dicts can get us to pWord from
pFromPlace;
                                cPaths is how many ways we can get to here;
                                RetVal is NULL OR represents other ways we got to here
                        */
                        if (cPaths==cMatchingPaths) { /* we can only get here from one place
*/
                                if (!pPrevPath || pPrevPath->type!=PT_SEQUENCE) {
                                        //Create a new sequence
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                                        RetVal = malloc(sizeof(path_elment));
                                        if (RetVal==NULL) {
                                                DebugOutput(DBF_ERROR, "Out of memory");
                                                return RetVal;
                                        }
                                        RetVal->type = PT_SEQUENCE;
                                        RetVal->data.pElementList = create_list(
                                                sizeof(path_elment)
                                        );
                                        if (pPrevPath) {
                                                //Add the way to pWord as the first item
                                                pPathElement = append_to_list(
                                                        RetVal->data.pElementList
                                                );
                                                memcpy(pPathElement, pPrevPath,
sizeof(path_elment));
                                        }
                                } else {
                                        //just add the way to here from pWord to the way
to pWord
                                        RetVal = pPrevPath;
                                }
                                pPathElement = append_to_list(RetVal->data.pElementList);
                        } else { /* we can get here from multiple places */
                                if (!RetVal) {
                                        RetVal = malloc(sizeof(path_elment));
                                        if (RetVal==NULL) {
                                                DebugOutput(DBF_ERROR, "Out of memory");
                                                return RetVal;
                                        }
                                        RetVal->type = PT_CHOICES;
                                        RetVal->data.pElementList = create_list(
                                                sizeof(path_elment)
                                        );
                                }
                                pPathElement = append_to_list(RetVal->data.pElementList);
                                if (pPrevPath && pPrevPath->type==PT_SEQUENCE) {
                                        //expand pPrevPath to make this choice
                                        memcpy(pPathElement, pPrevPath,
sizeof(path_elment));
                                        pPathElement = append_to_list(
                                                pPathElement->data.pElementList
                                        );
                                } else {
                                        //make a new sequence that starts with pPrevPath
for this choice
                                        pThisChoice = malloc(sizeof(path_elment));
                                        if (pThisChoice==NULL) {
                                                DebugOutput(DBF_ERROR, "Out of memory");
                                                return pThisChoice;
                                        }
                                        pThisChoice->type = PT_SEQUENCE;
                                        pThisChoice->data.pElementList = create_list(
                                                sizeof(path_elment)
                                        );
                                        memcpy(pPathElement, pThisChoice,
sizeof(path_elment));
                                        if (pPrevPath) {
                                                //Add the way to pWord as the first item
                                                pPathElement = append_to_list(
                                                        pThisChoice->data.pElementList
                                                );
                                                memcpy(pPathElement, pPrevPath,
sizeof(path_elment));
                                        }
                                        pPathElement = append_to_list(
                                                pThisChoice->data.pElementList
                                        );
                                }
                        }
                        //pPathElement is to be how to get from pWord to here
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
					if (cMatchingPaths==1) {
						pPathElement->type = PT_WORD;
						pPathElement->data.pSound = pFromPlace->pSound;
					} else {  //there are multiple paths back to the prev place
						pPathElement->type = PT_CHOICES;
						pPathElement->data.pElementList = pChoiceList = create_list(
							sizeof(path_elment)
						);
						for (
							pNextFromPlace = pFromPlace;
							pNextFromPlace &&
							pNextFromPlace->offSound==pFromPlace->offSound;
							pNextFromPlace = prev_in_list(pNextFromPlace)
						) {
							pPathElement = append_to_list(pChoiceList);
							pPathElement->type = PT_WORD;
							pPathElement->data.pSound =
pNextFromPlace->pSound;
						}
					}
					pFromPlace = pNextFromPlace;
					cMatchingPaths = 0;
					while (
						pNextFromPlace &&
						pNextFromPlace->offSound==pFromPlace->offSound
					) {
						cMatchingPaths++;
						pNextFromPlace = prev_in_list(pNextFromPlace);
					}
				} while (pFromPlace);

		} else {
			//This is a leaf word so just return NULL
		}
		 pPostBreakWord->pPath = RetVal;

		return RetVal;

}

/*************************************************************************
		idxThis = AddToBuff(pBuff, plenBuff, NULL, sizeof(int));
*************************************************************************/
static int AddToBuff(
		char **pBuff, int *plenBuff, void *pData, int lenData
) {
 char		*Buff;
 int		oldSize,  newSize,  RetVal;

		oldSize = (*plenBuff +                              GROWTH_SIZE-1)/GROWTH_SIZE;
		//if this is the first addition make room for a len and packetID also
		if (!*plenBuff) {
			*plenBuff += sizeof(int) + sizeof(int);
		}
		newSize = (*plenBuff + lenData + GROWTH_SIZE-1)/GROWTH_SIZE;
		RetVal = *plenBuff;
		if (newSize > oldSize) {
			if (*pBuff) {
				Buff = *pBuff = realloc (*pBuff, newSize*GROWTH_SIZE);
			} else {
				Buff = *pBuff = malloc (newSize*GROWTH_SIZE);
			}
		} else {
			Buff = *pBuff;
		}
		if (Buff) {
			if (pData) {
				memcpy (Buff+RetVal, pData, lenData);
			}
			*plenBuff += lenData;
		} else {
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                //error out of memory
                DebugOutput(DBF_ERROR, "Out of memory!\n");
        }

        return  RetVal;
}

/**********************************************************************
OutputChoices2
**********************************************************************/
static void OutputChoices2 (path_elment *pPath,   char **pBuff, int *plenBuff) {
 path_elment        *pElement;
 int                        bFirst=1, cItems,   idxLenThis;

        idxLenThis = AddToBuff(pBuff, plenBuff, NULL, sizeof(int));
        AddToBuff(pBuff, plenBuff, &pPath->type, sizeof(PATH_ELEMENT_TYPE));
        switch (pPath->type) {
                case PT_SOUND:
                        //add <(unsigned char) Sound>
                        AddToBuff(
                                pBuff, plenBuff,
                                &pPath->data.pSound->Sound, sizeof(unsigned char)
                        );
                break;

                case PT_WORD:
                        OutputWords(
                                pPath->data.pSound->idDict, pPath->data.pSound->pDict,
                                pBuff, plenBuff
                        );
                break;

                case PT_SEQUENCE:
                        if ((cItems=count_in_list(pPath->data.pElementList))>1) {
                                DebugOutput(DBF_TRACE, "<");
                        }
                        AddToBuff(pBuff, plenBuff, &cItems, sizeof(int));
                        for (
                                pElement = first_in_list(pPath->data.pElementList);
                                pElement;
                                pElement = next_in_list(pElement)
                        ) {
                                OutputChoices2(pElement, pBuff, plenBuff);
                        }
                        if (cItems>1) {
                                DebugOutput(DBF_TRACE, ">");
                        }
                break;

                case PT_CHOICES:
                        DebugOutput(DBF_TRACE, "<");
                        cItems = count_in_list(pPath->data.pElementList);
                        AddToBuff(pBuff, plenBuff, &cItems, sizeof(int));
                        for (
                                pElement = first_in_list(pPath->data.pElementList);
                                pElement;
                                pElement = next_in_list(pElement)
                        ) {
                                if (!bFirst) {
                                        DebugOutput(DBF_TRACE, "|");
                                }
                                bFirst = 0;
                                OutputChoices2(pElement, pBuff, plenBuff);
                        }
                        DebugOutput(DBF_TRACE, ">");
                break;
        }
        *(int *)(*pBuff + idxLenThis) = *plenBuff - idxLenThis;
}

/**********************************************************************
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
OutputChoices
***********************************************************************/
static void OutputChoices (path_elment *pPath, int idxCutoff) {
 char     *Buff=NULL;
 int      lenBuff=0,          posBuff=sizeof(int) + sizeof(int);

          OutputChoices2 (pPath,        &Buff, &lenBuff);
          if (Buff) {
                    if (AppOpts.DestID >= DEST_PORT) {
                              lenBuff -= sizeof(int) + sizeof(int);
                              while (lenBuff) {
                                        lenBuff += sizeof(int) + sizeof(int);
                                        posBuff -= sizeof(int) + sizeof(int);
                                        *(int *)(Buff+posBuff+sizeof(int)) =
                                                  PacketID = (++PacketID&0x00ff)|0x0100;
                                        if (lenBuff>TTXBUFF) {
                                                  *(int *)(Buff+posBuff) = TTXBUFF;
                                                  WritePort(PortID, Buff+posBuff, TTXBUFF);
                                                  lenBuff -= TTXBUFF;
                                                  posBuff += TTXBUFF;
                                        } else {
                                                  *(int *)(Buff+posBuff) = lenBuff;
                                                  WritePort(PortID, Buff+posBuff, lenBuff);
                                                  lenBuff = 0;
                                        }
                              }
                    }
                    free (Buff);
          }
}

static void OutputSound(SoundInfo *pSound, int idxCutoff) {
 path_elment Path;

 Path.type = PT_SOUND;
 Path.data.pSound = pSound;
 OutputChoices(&Path, idxCutoff);
}

/***********************************************************************
ReleaseChoices (path_elment *pPath);
***********************************************************************/
static void ReleaseChoices(path_elment *pPath) {
 path_elment        *pElement,          *pNextElement;

          switch (pPath->type) {
                    case PT_WORD:
                    break;

                    case PT_SEQUENCE:
                    case PT_CHOICES:
                              pNextElement = first_in_list(pPath->data.pElementList);
                              while ((pElement=pNextElement)!=NULL) {
                                        pNextElement = next_in_list(pElement);
                                        ReleaseChoices(pElement);
                                        remove_from_list(pPath->data.pElementList, pElement);
                              }
                              destroy_list(pPath->data.pElementList);
                              pPath->data.pElementList = NULL;
                    break;
          }
}

/***********************************************************************
PrimaryWordFinished
          We want to see if the primary word (the first possible word in the
list) is complete.  This occurs when the primary word is finished and,
one of two events has occured for each word found in this primary word.
1) the sounds following a word make another finished word or
2) the sounds following a word do not make a word at all.
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
An example:
 0 *: a^n^dar^stmnd^                    (primary word)
 5 *: stmnd^                                      (secondary word)
10 *: jo^                                         (secondary word)
12  : w

This word is marked as finished by the '*'.
The sounds following "a" and "an" did not make a word.
The sounds following "andar" and "andarstmd" make a finished word.
***********************************************************************/
static int PrimaryWordFinished (
          PossibleWord        *pPrimaryWord,
          PossibleWord        **ppPostBreakWord
) {
 int                        numDictsInUse=Troi.numDictsInUse;
 int                        RetVal=0;
 int                        iSound=0; //the index of the sound following the possible break
 int                        num_finished_words=0,         num_started_words=0;
 PossibleWord       *pWord=pPrimaryWord;          // the next possible word to look at as

                    // the word following each word break in the

                    // primary word
 unsigned           offFirstSound=pWord->offFirstSound;

          while (pWord && pWord->offFirstSound==offFirstSound) {
                    if (pWord->fFinished) {
                              num_started_words += pWord->cWordFound;
                              pWord = next_in_list(pWord);
                    } else {

                              return RetVal;
                    }
          }
          while (pWord) {
                    if (iSound) {
                              //an un-finished word has been found that starts at iSound
                              //so if there isn't a convergence at this cut-off there isn't one
                              if (pWord->offFirstSound!=iSound) {

                                        return RetVal;
                              } else {
                                        num_finished_words += count_in_list(pWord->pFromList);
                                        if (num_finished_words==num_started_words*numDictsInUse) {
                                                  *ppPostBreakWord = pWord;
                                                  RetVal = pWord->offFirstSound;

                                                  return    RetVal;
                                        }
                              }
                    } else {
                              num_finished_words += count_in_list(pWord->pFromList);
                              if (num_finished_words==num_started_words*numDictsInUse) {
                                        *ppPostBreakWord = pWord;
                                        RetVal = pWord->offFirstSound;
                              }
                              if (pWord->fFinished) {
                                        num_started_words += pWord->cWordFound;
                              } else {
                                        iSound = pWord->offFirstSound;
                              }
                    }
                    pWord = next_in_list(pWord);

          }

          return RetVal;
}
#endif

/***********************************************************************
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
RemoveUsedWords
        Remove all the possible words that have been passed on.
*********************************************************************/
static void RemoveUsedWords (
        unsigned short idxNextWord
) {
 PossibleWord       *pWord,   *pNext;

                                                    // decrease the first sounds offset and

                                                    // remove any words that are not needed
        pNext = first_in_list(Troi.pPossibleWordList);
        while ((pWord = pNext) != NULL) {
                pNext = next_in_list(pWord);
                if (pWord->offFirstSound < idxNextWord) {
                        if (pWord->pDict) {
                                free(pWord->pDict);
                        }
                        remove_from_list(Troi.pPossibleWordList, pWord);
                }
        }

                                                                    // adjust the offset
of the first sound in
                                                                    // the possible word
        for (
                pWord = first_in_list(Troi.pPossibleWordList);
                pWord;
                pWord = next_in_list(pWord)
        ) {
                pWord->offFirstSound -= idxNextWord;
                pWord->offLastSound -= idxNextWord;
        }
        // remove the used sounds from the pPasciiList
        while (idxNextWord-- > 1) {
                POSSIBLE  *pPascii;

                if ((pPascii = first_in_list(Troi.pPasciiList))!=NULL) {
                        remove_from_list(Troi.pPasciiList, pPascii);
                }
        }
}

#ifdef DEBUG
/*********************************************************************
ShowSounds
        Show the possible sounds.
*********************************************************************/
static void ShowSounds (void) {
        PossibleWord *pWord;

        for (pWord = first_in_list(Troi.pPossibleWordList);
                 pWord;
                 pWord = next_in_list(pWord))
        {
                wsprintf(
                        ErrorBuff, "%2d-%2d",         pWord->offFirstSound,
pWord->offLastSound
                );
                DebugOutput(DBF_TRACE, ErrorBuff);
        }
}
#endif

#if 0
/*********************************************************************
EndOfSounds2
        The end of the sounds has been encountered so dump out what is left.
        and conditionaly include any sounds that havent make a full word yet.
*********************************************************************/
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
void EndOfSounds2 (int          bShowEndSounds) {
 PossibleWord        *pWord;
 SoundInfo                      *pSound;
 int                            offSound, fFirstWord=TRUE;

          if ((pWord = last_in_list(Troi.pPossibleWordList))!=NULL) {
                    offSound = pWord->offFirstSound;
                    GenerateChoices(pWord);
                    if (bShowEndSounds && pWord->pSoundList) {
                              pSound=first_in_list(pWord->pSoundList);
                              if (pWord->pPath) {
                                        if (pSound) {
                                                  DebugOutput(DBF_TRACE, "<");
                                        }
                                        OutputChoices (pWord->pPath, offSound);
                              }
                              while (pSound) {
                                        if (pSound->Sound) {
                                                  if (fFirstWord) {
                                                            DebugOutput(DBF_TRACE, "["');
                                                            fFirstWord = FALSE;
                                                  }
                                                  wsprintf(ErrorBuff, "%c",
AsciiCode[pSound->Sound]);

                                                  DebugOutput(DBF_TRACE, ErrorBuff);
                                                  OutputSound(pSound, ++offSound);
                                        }
                                        pSound = next_in_list(pSound);
                              }
                              if (!fFirstWord) {
                                        DebugOutput(DBF_TRACE, "]");
                                        if (pWord->pPath) {
                                                  DebugOutput(DBF_TRACE, ">");
                                        }
                              }
                    } else if (pWord->pPath) {
                              if (fFirstWord) {
                                        OutputChoices (pWord->pPath, offSound);
                              }
//                            ReleaseChoices(pWord->pPath);
//                            free(pWord->pPath);
//                            pWord->pPath = NULL;
                    }

                              // Remove all the used words
//                  RemoveUsedWords(offSound+1);
          }
}
#endif

/***********************************************************************
EndOfSounds
          The end of the sounds has been encountered so dump out what is left
          including any sounds that havent make a full word yet.
***********************************************************************/
void EndOfSounds (void) {
//@       EndOfSounds2(1);
}

/***********************************************************************
TroiSoundOut
          Tells the premutaion manager that the only way to get from sound
          offFirstSound to sound offPostSound with the dictionaries currently
          being used is via an unused sound.
***********************************************************************/
static void TroiSoundOut (unsigned offFirstSound, unsigned offPostSound) {
 char                Buff[256];
 int                 idxBuff;
 POSSIBLE *pPascii;
 unsigned char       offSound=(unsigned char)offFirstSound;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
	idxBuff = wsprintf(Buff, "%d[", offFirstSound);
	for (
		pPascii = item_in_list(Troi.pPasciiList, offSound);
		offSound<offPostSound && pPascii;
		pPascii = next_in_list(pPascii), offSound++
	) {
		idxBuff += wsprintf(&Buff[idxBuff], "%c", AsciiCode[pPascii[0].p]);
	}
	wsprintf(&Buff[idxBuff], "]%d", offPostSound);
	DebugOutput(DBF_TRACE, Buff);
	AddEdge(offFirstSound, offPostSound, NULL);
}

/**********************************************************************
TroiWordOut
	Tells the premutaion manager that one way to get from sound offFirstSound
	to sound offPostSound is via pWord.
**********************************************************************/
static void TroiWordOut(PossibleWord *pWord) {
 char			Buff[256];
 int			idxBuff=0;
 unsigned char	WordData[256];
 WordContext	WordCntxt;
 unsigned char	*pWordData;
 unsigned short	Flags;

	idxBuff = wsprintf(Buff, "%d<%c-", pWord->offFirstSound, (char)pWord->idDict+'0');
	for (pWordData = GetFirstPhonicWord(pWord->pDict, &WordCntxt, WordData);
		 pWordData;
		 pWordData = GetNextPhonicWord(pWord->pDict, &WordCntxt, WordData))
	{
		Flags = *((unsigned short *)&WordData[1]);
		idxBuff += wsprintf(
			&Buff[idxBuff], "%s%s", &WordData[3], (Flags & LAST_WORD ? ">" : ", ")
		);
	}
	idxBuff += wsprintf(&Buff[idxBuff], "%d ", pWord->offLastSound);
	DebugOutput(DBF_TRACE, Buff);
	AddEdge(pWord->offFirstSound, pWord->offLastSound, pWord->pDict);
}

/**********************************************************************
SearchForSound
	For each possible word, search the phonetic dict for the next sound,
start from the end of the list, because new possible words are
appended at the end of the list, we don't want to search the new ones
added this round yet, thier first time will come on the next sound
**********************************************************************/
static int /*OK!=0*/ SearchForSound (
	unsigned char	Sound,
	unsigned	offSound
) {
 PossibleWord	*pWord=NULL;
 DictContext	*pDict;
 DictContext	CurrDict;
 int			fSoundFound,		bSoundFoundAnywhere=FALSE;
 int			fWordFound,			bWordFoundAnywhere=FALSE;

	if ((pWord = Troi.pFirstActiveWord)==NULL) {
		pWord = first_in_list(Troi.pPossibleWordList);
	};
	for (
		;
		pWord && pWord->offFirstSound<=offSound;
		pWord = next_in_list(pWord)
	) {
		if (!pWord->bFinished && offSound == pWord->offLastSound) {
			if (Troi.pFirstActiveWord==NULL) {
				Troi.pFirstActiveWord = pWord;
			}
			// get the place in the phonetic tree to search this time.
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                    pDict = pWord->pDict;
                    fSoundFound = SearchPhonicTree(         // search the phonetic dict
                            pDict, Sound, NormalEmph, &CurrDict, &fWordFound
                    );
                    if (fSoundFound) {  // sound was found, save the info
                            pWord->offLastSound++;
                            bSoundFoundAnywhere = TRUE;
                            memcpy(pDict, &CurrDict, sizeof(DictContext));

                            // after a word has been found, setup
                            // a new possible word to start with
                            // the next sound
                            if (fWordFound) {
                                    Troi.idxPostLastWord = offSound;
                                    bWordFoundAnywhere=TRUE;
                                    pWord->cWordFound++;
                                    TroiWordOut(pWord);
                            }
                    } else {
                            pWord->bFinished = 1;
                            //leave this node in the tree for now
                            if (Troi.pFirstActiveWord==pWord) {
                                    //but we don't need to look at this any more
                                    Troi.pFirstActiveWord = NULL;
                            }
                    }
            }
        }
        if (bWordFoundAnywhere || !bSoundFoundAnywhere) {
                pWord = InitPossibleWords(offSound+1);
                if (!bSoundFoundAnywhere) {
                        //there are no possible ways to get to this sound
                        TroiSoundOut(Troi.idxPostLastWord, offSound+1);
                        Troi.idxPostLastWord = offSound+1;

                }
        }
        if (Troi.pFirstActiveWord==NULL) {
                Troi.pFirstActiveWord = pWord;
        }

        return bSoundFoundAnywhere;
}

/***********************************************************************
TroiUseNthDict
        Tell Troi to use 1..Nth dictionaries
***********************************************************************/
static int /*OK!=0*/ TroiUseNthDict (int N) {
 int                    i,      RetVal=0;
 PossibleWord       *pWord, *pLast;
 POSSIBLE           *pPascii;


        if (N <= count_in_list(Troi.pDictList)) {
                //@reset Troi state
                Troi.idxPostLastWord = 0;
                Troi.pFirstActiveWord = NULL;
                pWord = last_in_list(Troi.pPossibleWordList);
                if (Troi.numDictsInUse > N) {
                        while (pWord) {
                                if (pWord->idDict > N) {
                                        free(pWord->pDict);
                                        pWord = prev_in_list(pLast=pWord);
                                        remove_from_list(Troi.pPossibleWordList, pLast);
                                } else {
                                        pWord = prev_in_list(pLast=pWord);
                                }
                        }
                }
                Troi.numDictsInUse = N;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
                pWord = first_in_list(Troi.pPossibleWordList);
                while (pWord) {
                        InitPossibleWords(pWord->offFirstSound);
                        do {
                                pWord = next_in_list(pLast=pWord);
                        } while (pWord && pWord->offFirstSound==pLast->offFirstSound);
                }

                for (
                        i=0, pPascii=first_in_list(Troi.pPasciiList);
                        pPascii;
                        i++, pPascii=next_in_list(pPascii)
                ) {
                        if (SearchForSound(pPascii[0].p, i)) {
                                RetVal = 1;
                        }
#ifdef DEBUG
                        ShowSounds();
#endif
                }
        }

        return RetVal;
}

/***********************************************************************
TroiUseNextDict
        Tell Troi to use one more dictionary than it currently is
***********************************************************************/
int /*OK!=0*/ TroiUseNextDict (void) {

        return TroiUseNthDict(Troi.numDictsInUse+1);
}

#if 0
/***********************************************************************
OutputWords
        Pass on the possible words
***********************************************************************/
static void OutputWords (
        unsigned idDict,    DictContext *pDict, char **pBuff, int *plenBuff
) {
 unsigned char      WordData[256];
 WordContext        WordCntxt;
 unsigned char      *pWordData;
 unsigned short     Flags;
 int                        Count=0,  idxCount, idxlencStringZ;
 int                        lencStringZ;

                                                                        // output the
word(s)
        wsprintf(ErrorBuff, "<%c-", (char)idDict+'0');
        DebugOutput(DBF_TRACE, ErrorBuff);
        AddToBuff(pBuff, plenBuff, &idDict, sizeof(unsigned));
        idxCount = AddToBuff(pBuff, plenBuff, NULL, sizeof(int));
        for (pWordData = GetFirstPhonicWord(pDict, &WordCntxt, WordData);
                 pWordData;
                 Count++, pWordData = GetNextPhonicWord(pDict, &WordCntxt, WordData))
        {
                Flags = *((unsigned short *)&WordData[1]);
                wsprintf(ErrorBuff, "%s%s", &WordData[3], (Flags & LAST_WORD ? ">" : ", "));
                DebugOutput(DBF_TRACE, ErrorBuff);
                idxlencStringZ = AddToBuff(
                        pBuff, plenBuff, NULL, sizeof(unsigned char)
                );
                lencStringZ = strlen((char *)&WordData[3])+1;     //len of string plus
terminating \0
                AddToBuff(pBuff, plenBuff, &WordData[3], lencStringZ);
                *(unsigned char *)(*pBuff + idxlencStringZ) = (unsigned char)
                        sizeof (unsigned char) + lencStringZ;
        }
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        *(int *)(*pBuff + idxCount) = Count;
}
#endif

/**********************************************************************
SoundToTroi
        A single sound (PAscii code) in a Higgins structure is passed in to
be searched for in the phonetic dictionary
**********************************************************************/
void SoundToTroi (
        struct HIGGINS *pHiggins
) {
 POSSIBLE                    *pNewPascii;
// float                               Confidence;
 unsigned char               Sound;

        if (pHiggins->pascii[0].p && pHiggins->pascii[0].p!=128) {
                pNewPascii = append_to_list(Troi.pPasciiList);
                memcpy(pNewPascii, pHiggins->pascii, sizeof(pHiggins->pascii));
                Sound = pNewPascii[0].p;
//              Confidence = pNewPascii[0].c;
#ifdef DEBUG
                wsprintf(ErrorBuff, "+%c+\n", AsciiCode[Sound]);
                DebugOutput(DBF_TRACE, ErrorBuff);
#endif
                SearchForSound(Sound, Troi.idxSound++);
#ifdef DEBUG
                ShowSounds();
#endif
        }
}

/**********************************************************************
AcceptWordsFromTroi
        Tell troi that we have found the word combination that we want for the
        next cSounds HIGGINS struts. Troi will here-in free up all data that it
        has generated to interpet these sounds.
**********************************************************************/
void AcceptSoundsTroiDetermined (int cSounds) {
        if (
                Troi.pFirstActiveWord
                && cSounds<=Troi.pFirstActiveWord->offFirstSound
        ) {
                RemoveUsedWords(cSounds);
                Troi.idxPostLastWord -= cSounds;
                Troi.pFirstActiveWord = NULL;
                Troi.idxSound -= cSounds;
        } else {
                DebugOutput(DBF_ERROR, "In call to AcceptSoundsTroiDetermined().");
        }
}

#if 0
/**********************************************************************
GetWordsFromTroi
        returns the Path to the end of the determined words
**********************************************************************/
path_elment *GetWordsFromTroi (void) {

        return GenerateChoices(pPostBreakWord);
}
#endif

/**********************************************************************
GivePhonemeFileToTroi
        Is an alternative to GiveToTroi() so that a phonemefile can be used
        as input vs. a list of HIGGING structs for debuging/development purposes.
**********************************************************************/
void GivePhonemeFileToTroi (void) {
 struct HIGGINS     Higgins;
 FILE                       *pFile;
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
 unsigned char       Line[256];
 path_elment         *pPerms;
 int                          cSounds;
 char                         Buff[1024];

         memset(&Higgins, 0, sizeof(Higgins));
         Higgins.pascii[0].c = 1.0;

         pFile = fopen((const char *)AppOpts.szPhonemeFile, "r");
         fgets((char *)Line, sizeof(Line), pFile);
         while (!feof(pFile)) {
                  unsigned char *pSound;

                  for (
                           pSound = Line;
                           *pSound && *pSound != ';' && *pSound != '\n';
                           pSound++
                  ) {
                           Higgins.pascii[0].p = PAsciiCode[*pSound];
                           SoundToTroi(&Higgins);
                  }
                  fgets((char *)Line, sizeof(Line), pFile);
         }
         Higgins.pascii[0].p = 0;
         SoundToTroi(&Higgins);
         TroiUseNextDict();
#ifdef DEBUG
         ShowSounds();
         ShowEdges();
#endif
         if ((cSounds=SoundsPermManDetermined())!=0) {
                  pPerms = GetSoundsPermManDetermined(cSounds);
                  if (BuildPermDspBuff(pPerms, Buff)) {
                           SendComStr(Buff);
                           DebugOutput(DBF_TRACE, Buff);
                  }
                  AcceptSoundsPermManDetermined(cSounds);
//                ReleasePerms(pPerms);
         }

#ifdef DEBUG
         ShowSounds();
#endif
         fclose(pFile);
         ResetTroi();
#ifdef DEBUG
         ShowSounds();
#endif
}

/**********************************************************************
GiveToTroi
         Is an the main entery point. It is used to give a list of HIGGING structs
         to troi.
**********************************************************************/
void GiveToTroi (struct HIGGINS **pfrmstart) {
 struct HIGGINS *frame=*pfrmstart;
#if 0    //@
 path_elment         *pPerms;
 int                          cSounds;
#endif

         if (AppOpts.DestID <= DEST_PHONEMEFILE) {
                  while (frame) {
                           fprintf(g_fpPhonemeFile, "%c\n", AsciiCode[frame->pascii[0].p]);
#ifdef DEBUG
                           wsprintf(ErrorBuff, "+%c+\n", AsciiCode[frame->pascii[0].p]);
                           DebugOutput(DBF_TRACE, ErrorBuff);
#endif
                           frame = frame->next;
                  }
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
        } else {
                while (frame) {
                        SoundToTroi(frame);
                        frame = frame->next;
                }
#if 0   //@
        if ((cSounds=SoundsPermManDetermined())!=0) {
                pPerms = GetSoundsPermManDetermined(cSounds);
                AcceptSoundsPermManDetermined(cSounds);
                ReleasePerms(pPerms);
        }
#endif
        }
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
;**********************************************************
; VBDSPIN.C
; Desc:   This file contains the routine the handshakes data across
;         from the DSP.
;
;**********************************************************

        XREF HiggBuffers,NumBuffers

        INCLUDE voicebox.h


BuffCount DS.W      0

READ_DSP:

;******* First save registers I am going to use. *********

        MOVEM.L   A0-A1/D0-D2,-(A7)

        MOVE.L    #DSPBase,A0         ; Set up pointer to the DSP
        MOVE.L    HiggBuffers,A1      ; Get base of array that contains pointers
                                      ; to the allocated buffers

        MOVE.W    BuffCount,D0        ; Get number of the buffer
        ASL.L     #2,D0               ; Mult D0 by 4.
        MOVE.L    (0,A1,D0.W),A1      ; Pointer to free buffer
        ADDQ.W    #1,BuffCount        ; Increment the number of the buffer
        MOVE.W    BuffCount,D0        ;
        CMP.W     NumBuffers,D0       ;
        BLT       RDSP_10
        MOVE.W    #0,BuffCount        ; Reset to first buffer
RDSP_10:

;*******************************************************************
; At this point A0 points to the base address of the DSP.
; and A1 points to the location in memory where the data should go.
;



;********************************************************************
; Here we read the type of function and then the number of items to be passed
;

        MOVE.B    DSP_RXH(A0),D1      ; Get function
        CMP.B     #HIGG,D1  ; Is it higgin structs?
        BNE       RDSP_30             ; Nope, So we eat it.

        CLR.L     D1
        MOVE.B    DSP_RXM(A0),D1      ; Get first Byte of the length
        ASL.L     #8,D1               ; Move it to the next byte
        MOVE.L    DSP_RXL(A0),D1      ; Get Second byte.

;********************************************************************
; Now we turn off the DSP RXDF interrupt while we read the data.
;
        AND.B     #-RREQ,DSP_ICR(A0)



;*********************************************************************
; Now we read the data from the DSP

RDSP_20:
        MOVE.B    DSP_ISR(A0),D0      ; Read the status register to see if
        BTST.B    #RXDF,D0  ; there is data ready.
        BEQ       RDSP_20             ; Wait until data ready
        CLR.L     D2
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
         MOVE.B    DSP_RXM(A0),D2      ; Read the upper byte,
         ASL.W     #8,D2
         MOVE.B    DSP_RXL(A0),D2      ; Read the lower byte

         MOVE.W    D2,(A1)+  ; Write the byte out

         DBRA      D1,RDSP_20          ; Do this until D0 = 0

         BRA       RDSP_999

RDSP_30:
;**********************************************************************
; Here we eat all of the data and throw it in the bit bucket

         MOVE.B    DSP_ISR(A0),D0      ; Read the status register to see if
         BTST.B    #RXDF,D0  ; there is data ready.
         BEQ       RDSP_20             ; Wait until data ready
         CLR.L     D2
         MOVE.B    DSP_RXL(A0),D2      ; Read the lower byte
         DBRA      D1,RDSP_20          ; Do this until D0 = 0

RDSP_999:
         OR.B      #RREQ,DSP_ICR(A0)   ; Turn the interrupt back on.
         MOVEM.L   (A7)+,A0-A1/D0-D2   ; Restore the regs.
         RTE                           ; Return from our interrupt.
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
VBSCHED.C:

/***************************************************
SCHED.C
 Desc:    This file contains the code that manages control
                                      of the "ELROND" and "TROI" modules of the voicebox

******************************************************/

#include <stdio.h>
#include "voicebox.h"
#include "vbutils.h"
#include "dsp.h"
#include "higlist.h"


int BufferFlag, NumBuffers, CurBuffer;
struct HIGGINS *Buffers[MAX_BUFFERS];


void Scheduler( void )
{

         struct HIGGINS *Higg;
         int x, b, WriteStrobe;
         unsigned char *Diag = DiagPort;

#ifdef LING_TEST
         unsigned int *BaseLineHigg;
         long Len;
         unsigned int Data;
#endif


/** First thing we do is allocat the buffers for the data from the
 DSP ******************/

         BufferFlag = 0;

         for(x = 0; x < MAX_BUFFERS; x++)
         {
                  Buffers[x] = malloc(BUFFSIZE);
                  if(!Buffers[x])     /* Didn't allocate, so now we deal */
                  {
                           break;
                  }
         }

         /*** At this point x is the number of buffers allocated ***/

         if(x)      /* if x is 0 then we have a big! problem */
         {
                  NumBuffers = x;
         }
         else
         {
                  /* Output the error to the Diagnostics port and then lock up */
                  *Diag = MEMORY_ERROR;
                  while(1);
         }

         CurBuffer = 0;

         /**** Here  we would start the DSP ***/


         b = 0;

         do {

#ifdef LING_TEST
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
/**** Here we read the phoneme file from the COM port ***/
        Len = TransLen();   /* Get length of data to transfer */

        BaseLineHigg = Buffers[b];
        WriteStrobe = 1;
        Data = 0;

        for(x =0; x < Len; x++)
        {
                while((c = fgetc(stdin)) == EOF);       /* Wait until character */

                Data <<= 8;
                Data += (unsigned char)c;
                WriteStrobe ^= 1;

                if(WriteStrobe)
                {
                        *BaseLineHigg++ = Data;
                        Data = 0;
                }

        }

        BufferFlag++;

#endif

                while(!BufferFlag); /* Wait until there are buffers */


/***** OK, now we must have data *****/

/** Now we must relink the list **/
                Higg = Buffers[b];

                Higg->prev = NULL;
                Higg->next = (char *)Higg + sizeof(HIGGINS);
                Higg = higg->next;

                for ( x = 0; x < 38; x++ )
                {
                        Higg->prev = (char *)Higg - sizeof(HIGGINS);
                        Higg->next = (char *)Higg + sizeof(HIGGINS);

                        Higg = Higg->next;
                }

                Higg->prev = (char *)Higg - sizeof(HIGGINS);

                Higg->next = NULL;



#ifndef LING_TEST
                sreProcessHiggins(Buffers[b++]);        /* Process Higgins structs */
#else
                GiveToTroi(Buffers[b++]);       /* This is for testng purposes */
#endif

                BufferFlag--;       /*** Show that a buffer has been used ***/

                if(b == NumBuffers)
                {
                        b = 0;
                }


        } while (1);

}
```

Docket No.: 13217.2

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

```
#include <stdio.h>

/************************************************
 TransLen
 Desc:    Gets the number of bytes that will be transfered
                                    after the 4 byte len value.
 *******************************************************/

int TransLen( void )
{
        long Data;
        int c,x;


        Data = 0;

        for(x = 0; x < 4; x++)
        {
                while((c = fgetc(stdin)) == EOF); /* Wait for a byte */

                Data <<= 8;

                Data += (unsigned char)c;
        }

        return(Data);
}
```

WORKMAN, NYDEGGER & SEELEY
A PROFESSIONAL CORPORATION
ATTORNEYS AT LAW
1000 EAGLE GATE TOWER
60 EAST SOUTH TEMPLE
SALT LAKE CITY, UTAH 84111

What is claimed and desired to be secured by United States Patent is:

1. A computer program product for use in a computerized sound recognition system that is adapted for receiving an audio speech signal and converting the audio speech signal into a representative audio electrical signal that is digitized, the computer program product comprising:

a computer readable medium for storing computer readable code means which, when executed by the computerized sound recognition system, will enable the system to identify phoneme sound types that are contained within the audio speech signal; and wherein the computer readable code means is comprised of computer readable instructions for causing the computerized sound recognition system to execute a method comprising the steps of:

receiving an audio speech signal;

converting the audio speech signal into a representative audio electrical signal;

digitizing the audio electrical signal at a predetermined sampling rate so as to produce a digitized audio signal;

performing a time domain analysis on segmentized portions of the digitized audio signal so as to identify at least one time domain sound characteristic of said audio speech signal;

filtering the segmentized portions of the digitized audio signal using a plurality of filter bands having predetermined high and low cutoff frequencies;

measuring at least one frequency domain sound characteristic of each of said filtered segmentized portions; and based on the at least one time domain characteristic and the at least one frequency domain characteristic, identifying at least one phoneme sound type contained within the audio speech signal.

2. A computer program product as defined in claim 1, wherein the at least one time domain characteristic includes at least one of the following: an average amplitude of the audio speech signal; an absolute difference average of the audio speech signal; and a zero crossing rate of the audio speech signal.

3. A computer program product as defined in claim 1, wherein the at least one frequency domain characteristic includes at least one of the following: a frequency of at least one of said filtered segmentized portions; and an amplitude of at least one of said filtered segmentized portions.

4. A computer program product for use in a computerized sound recognition system that is adapted for receiving an audio speech signal and converting the audio speech signal into a representative audio electrical signal that is digitized, the computer program product comprising:

a computer readable medium for storing computer readable code means which, when executed by the computerized sound recognition system, will enable the system to identify phoneme sound types that are contained within the audio speech signal; and wherein the computer readable code means is comprised of computer readable instructions for causing the computerized sound recognition system to execute a method comprising the steps of:

(a) receiving an audio speech signal;

(b) converting the audio speech signal into a representative audio electrical signal;

(c) digitizing the audio electrical signal at a predetermined sampling rate so as to produce a digitized audio signal that is segmentized to form a plurality of separate time sliced signals;

(d) performing a time domain analysis on the digitized audio signal so as to identify at least one time domain sound characteristic of said audio speech signal;

(e) using a plurality of filter bands having predetermined cutoff frequencies to successively filter the time sliced signals of the digitized audio signal;

(f) measuring at least one frequency domain sound characteristic from each of said filtered time sliced signals; and (g) based on the at least one time domain characteristic and the at least one frequency domain characteristic, identifying at least one phoneme sound type contained within the audio speech signal.

5. A computer program product as defined in claim 4, wherein the said at least one time domain characteristic includes at least one of the following: an average amplitude of the audio speech signal; an absolute difference average of the audio speech signal; and a zero crossing rate of the audio speech signal.

6. A computer program product as defined in claim 5, wherein the said at least one frequency domain characteristic includes at least one of the following: a frequency of at least one of said filtered time sliced signals; and an amplitude of at least one of said filtered time sliced signals.

7. A computer program product as defined in claim 6, wherein the at least one phoneme sound type contained within the audio speech signal is identified by comparing the at least one measured frequency domain characteristic to a plurality of sound standards each having an associated phoneme sound type and at least one corresponding standard frequency domain characteristic, wherein the at least one identified sound type is the sound standard type having a standard frequency domain characteristic that matches the measured frequency domain characteristic most closely.

8. A sound recognition system for identifying the phoneme sound types that are contained within an audio speech signal, the sound recognition system comprising:

a microphone capable of receiving the audio speech signal and converting it to an audio electrical signal;

audio processing circuitry, electrically connected to the microphone, that conditions the audio electrical signal so that it is placed in a representative electrical form that is suitable for digital sampling;

an analog-to-digital conversion circuit, electrically connected to the audio processing circuitry, that is capable of digitizing the audio electrical signal at a predetermined sampling rate so as to produce a digitized audio signal;

a plurality of bandpass filters, each having a predetermined high and low cutoff frequency, and through each of which segmentized time slices of the digitized audio signal are passed;

a sound recognition processor circuit comprising:

a programmable digital sound processor capable of performing the following programmable steps:

(a) performing a time domain analysis on the segmentized time slices of the digitized audio signal so as to identify at least one time domain sound characteristic of the audio speech signal; and (b) measuring at least one frequency domain sound characteristic determined as a result of the segmentized time slices being filtered by the plurality of bandpass filters; and a host sound processor capable of performing the following programmable steps:

(a) identifying at least one phoneme sound type contained within the audio speech signal based on the at least one time domain characteristic and the at least one frequency domain characteristic; and (b) translating said at least one phoneme sound type into at least one representative word of a preselected language.

9. A sound recognition system as defined in claim 8, wherein the digital sound processor the host sound processor are comprised of a single programmable device.

10. A sound recognition system as defined in claim 8, wherein the plurality of bandpass filters are programmably implemented on the digital sound processor.

11. A sound recognition system as defined in claim 8, wherein the audio processing circuitry comprises:

signal amplifier that is capable of amplifying the audio electrical signal to a predetermined level;

a limiting circuit that is capable of limiting the level of the amplified audio electrical signal to a predetermined output level; and an anti-aliasing filter circuit, connected to the limiting circuit, for limiting the audio electrical signal to a predetermined maximum frequency of interest.

* * * * *